Jan. 10, 1950     F. M. CARROLL ET AL     2,493,858
ALPHABET PRINTING TABULATOR WITH PROGRAM CONTROLS
Filed Nov. 28, 1942     36 Sheets—Sheet 1

INVENTORS
Fred M. Carroll
Arthur F. Smith
BY
ATTORNEY.

Jan. 10, 1950     F. M. CARROLL ET AL     2,493,858
ALPHABET PRINTING TABULATOR WITH PROGRAM CONTROLS
Filed Nov. 28, 1942     36 Sheets-Sheet 2
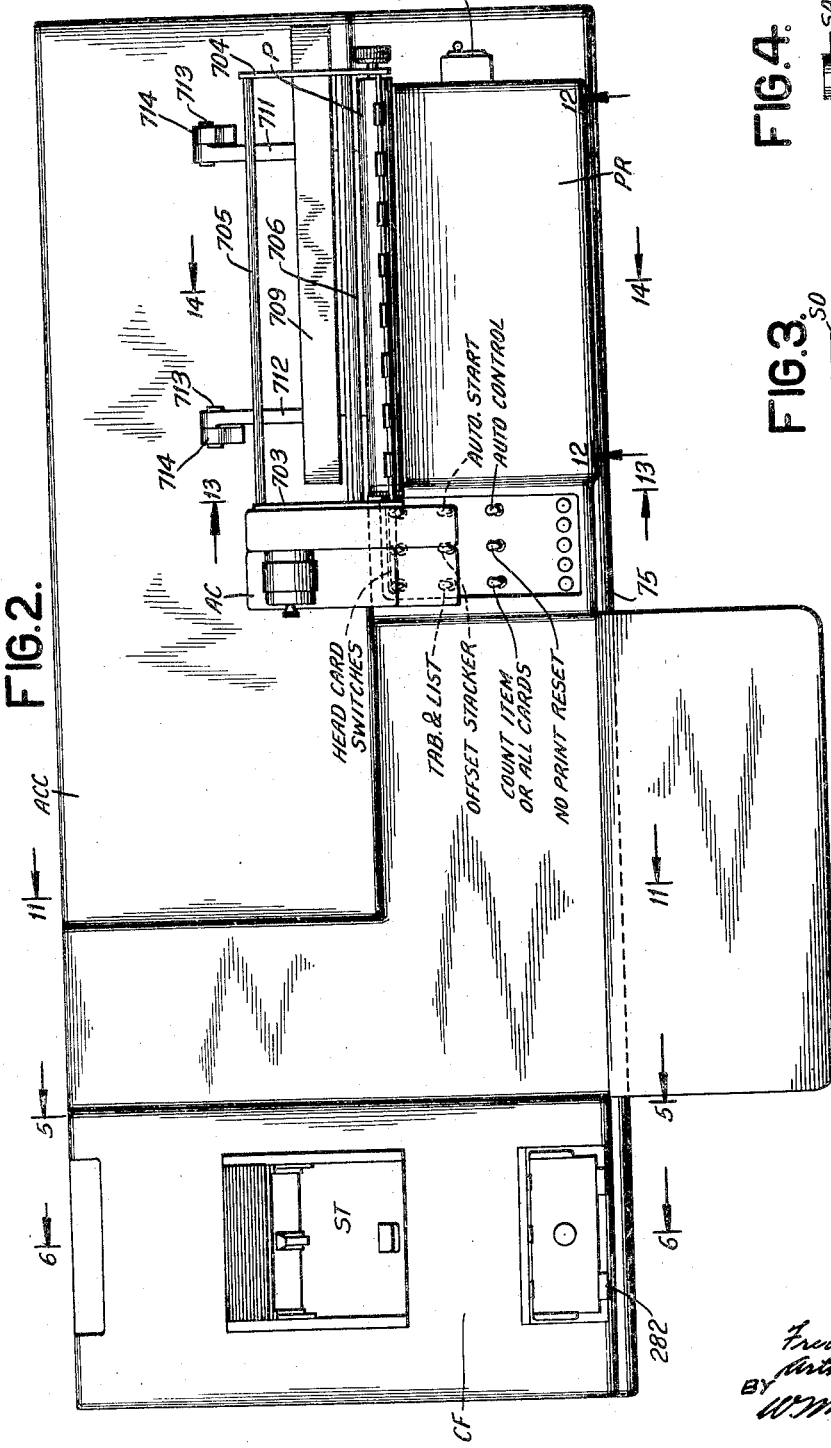
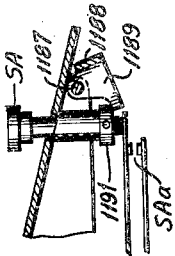
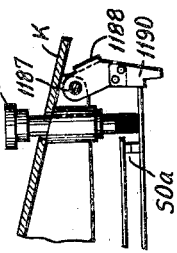

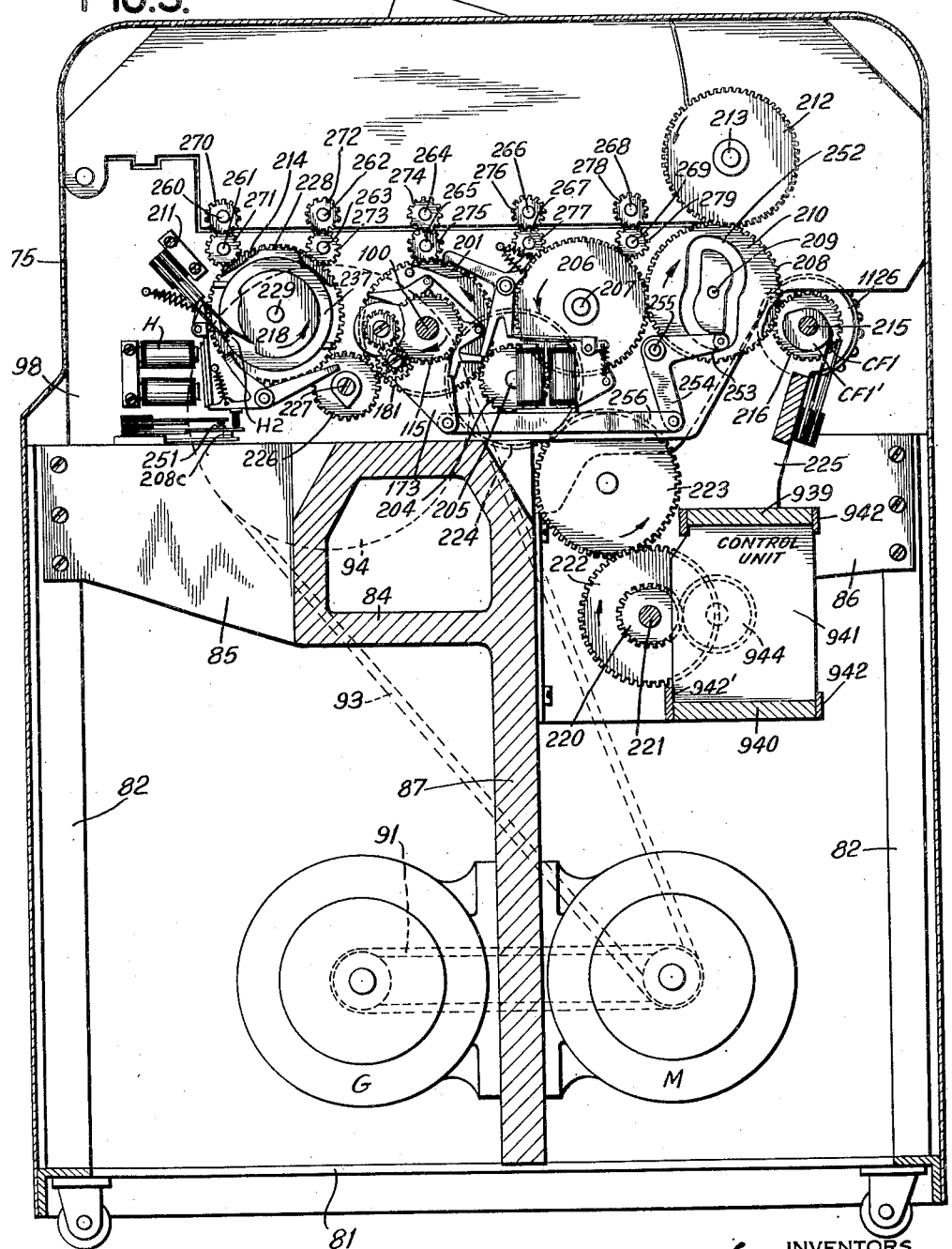

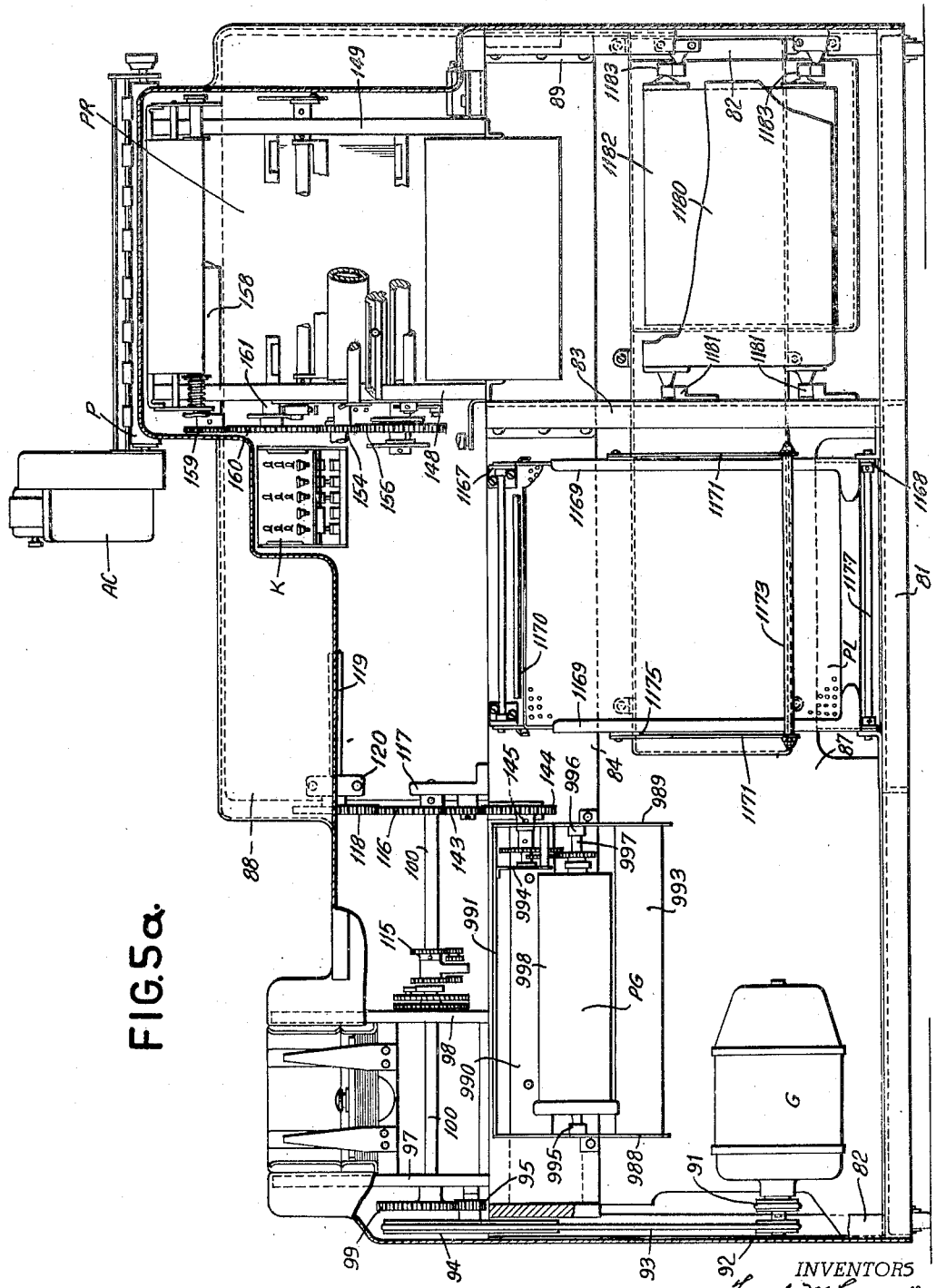

Jan. 10, 1950     F. M. CARROLL ET AL     2,493,858
ALPHABET PRINTING TABULATOR WITH PROGRAM CONTROLS
Filed Nov. 28, 1942     36 Sheets-Sheet 5

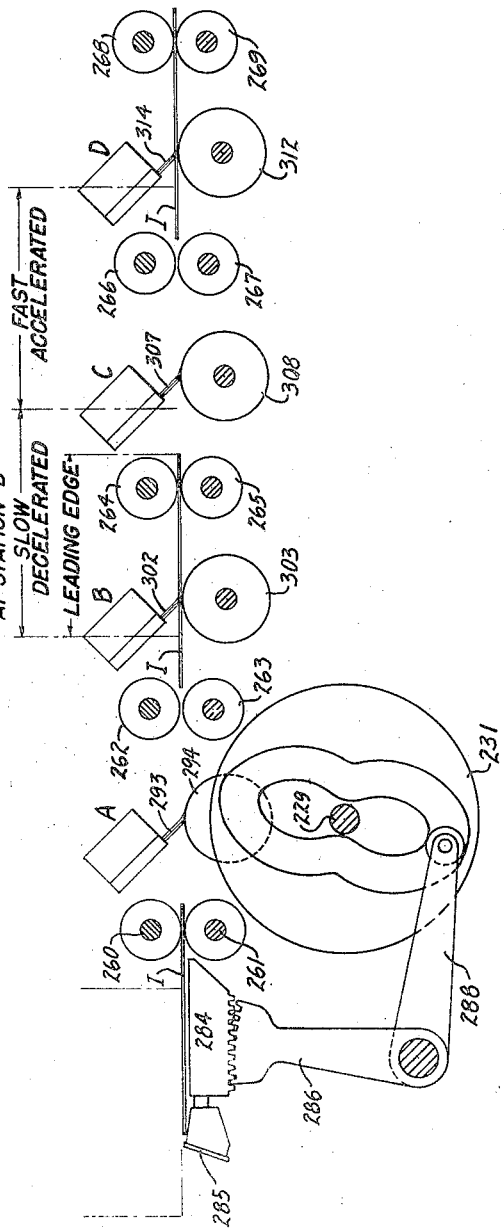

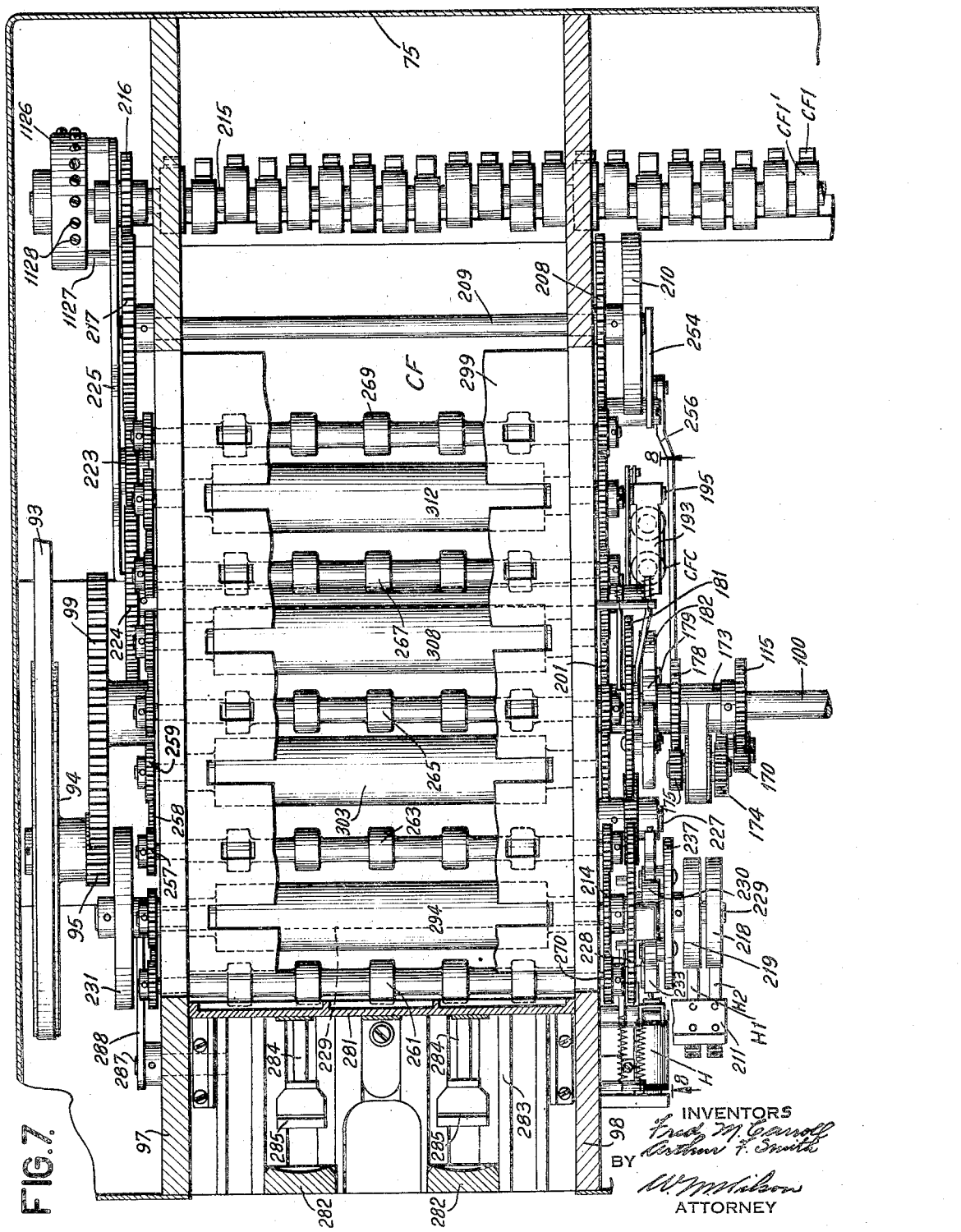

Jan. 10, 1950  F. M. CARROLL ET AL  2,493,858
ALPHABET PRINTING TABULATOR WITH PROGRAM CONTROLS
Filed Nov. 28, 1942  36 Sheets-Sheet 8
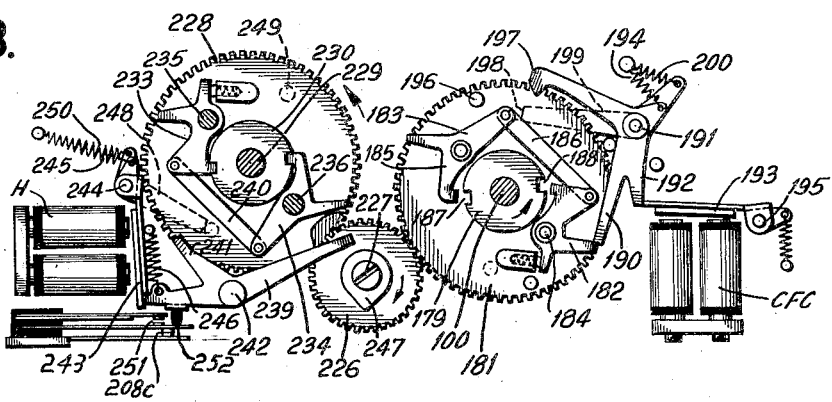
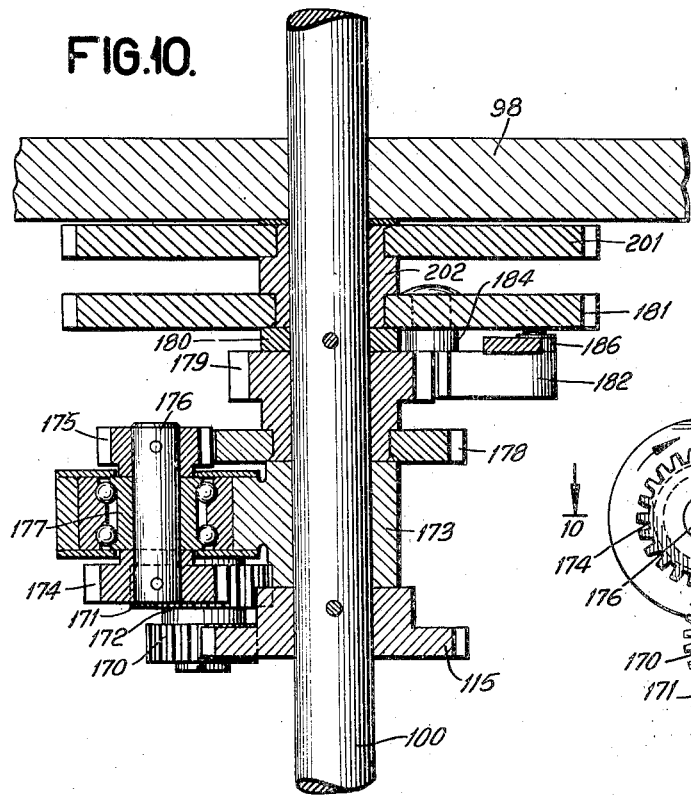
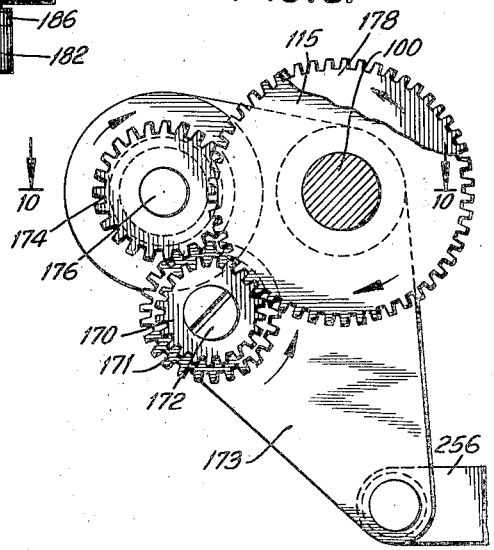
INVENTORS
Fred M. Carroll
Arthur F. Smith
BY
ATTORNEY

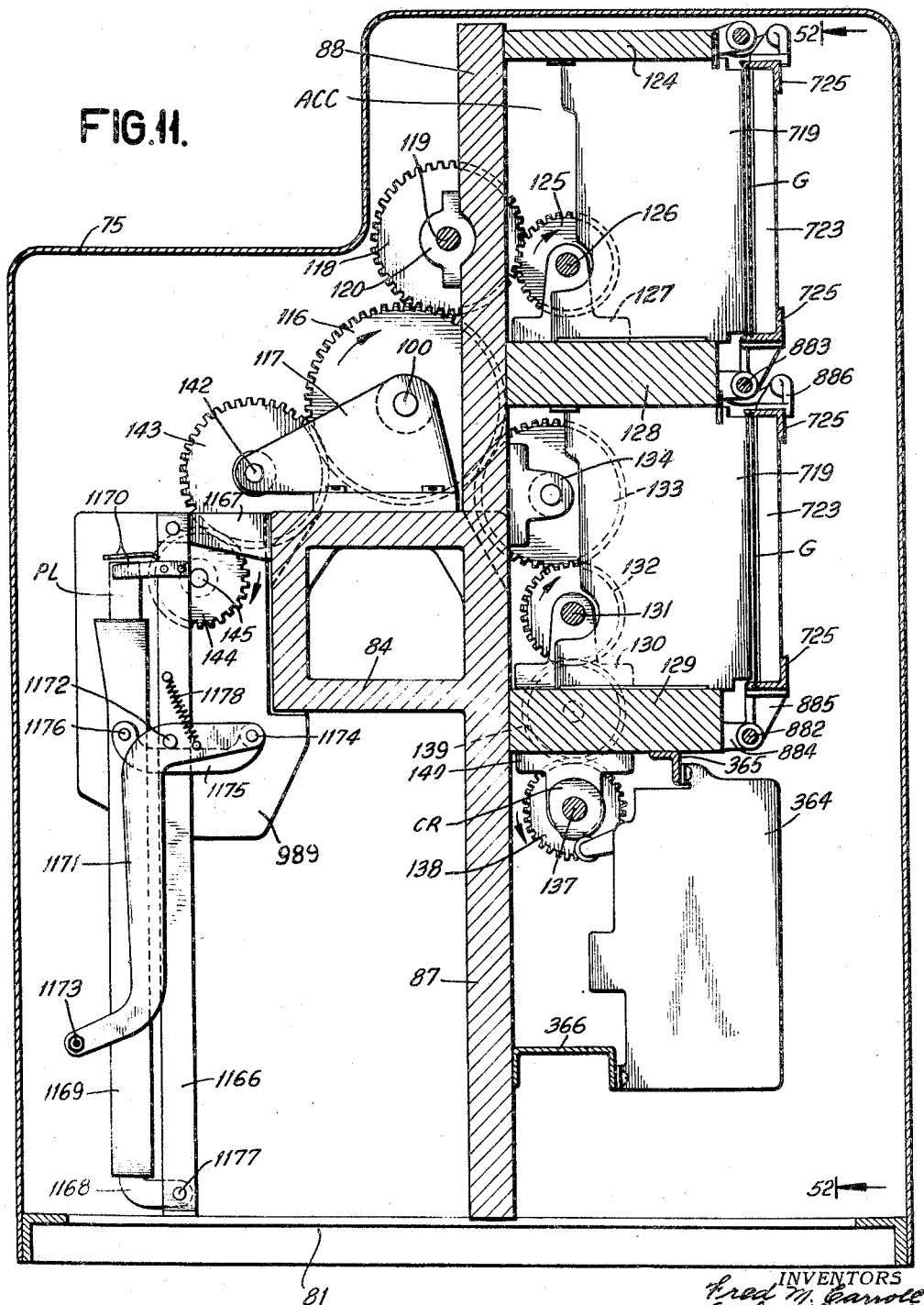

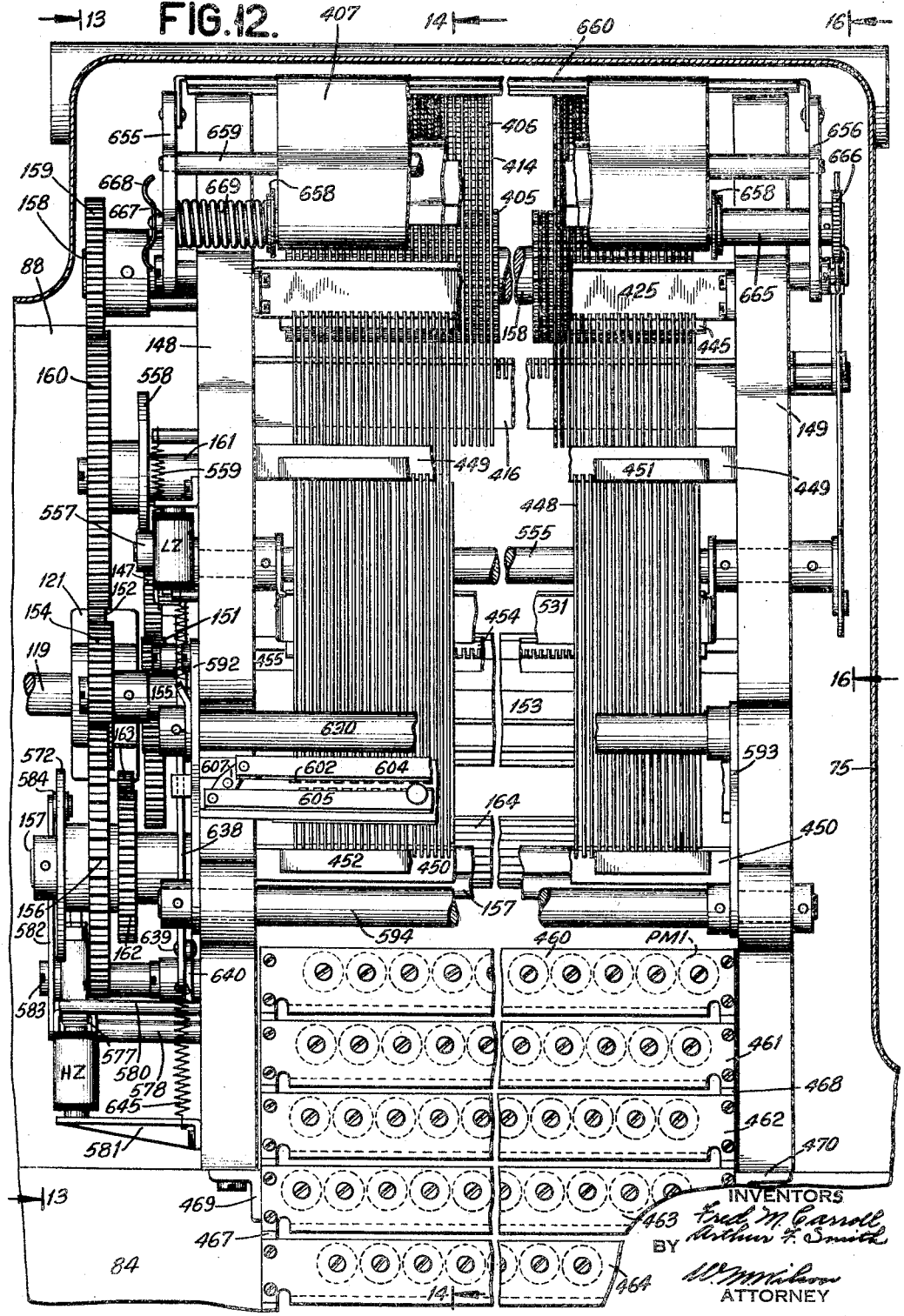

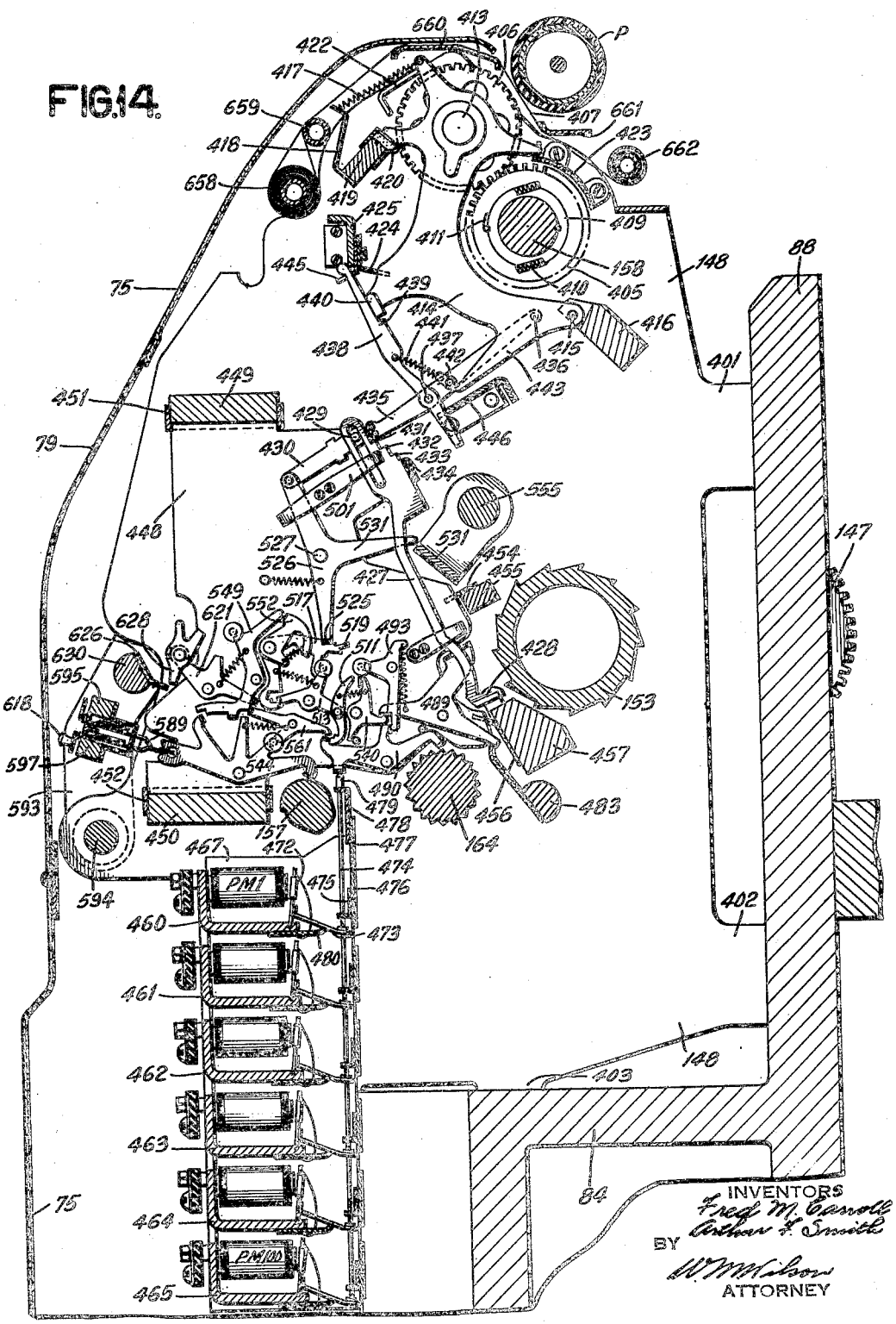

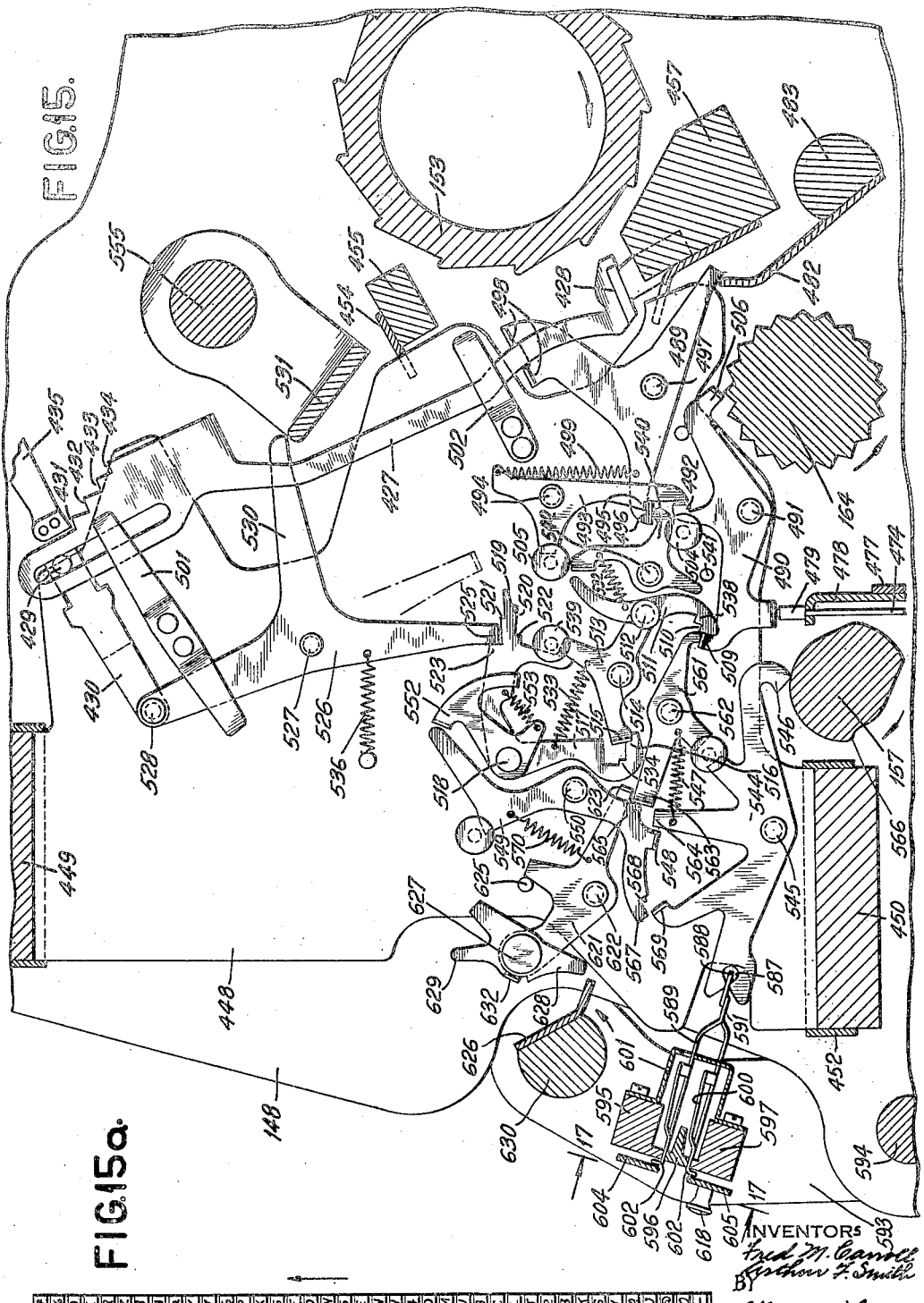

Jan. 10, 1950  F. M. CARROLL ET AL  2,493,858
ALPHABET PRINTING TABULATOR WITH PROGRAM CONTROLS
Filed Nov. 28, 1942  36 Sheets-Sheet 14
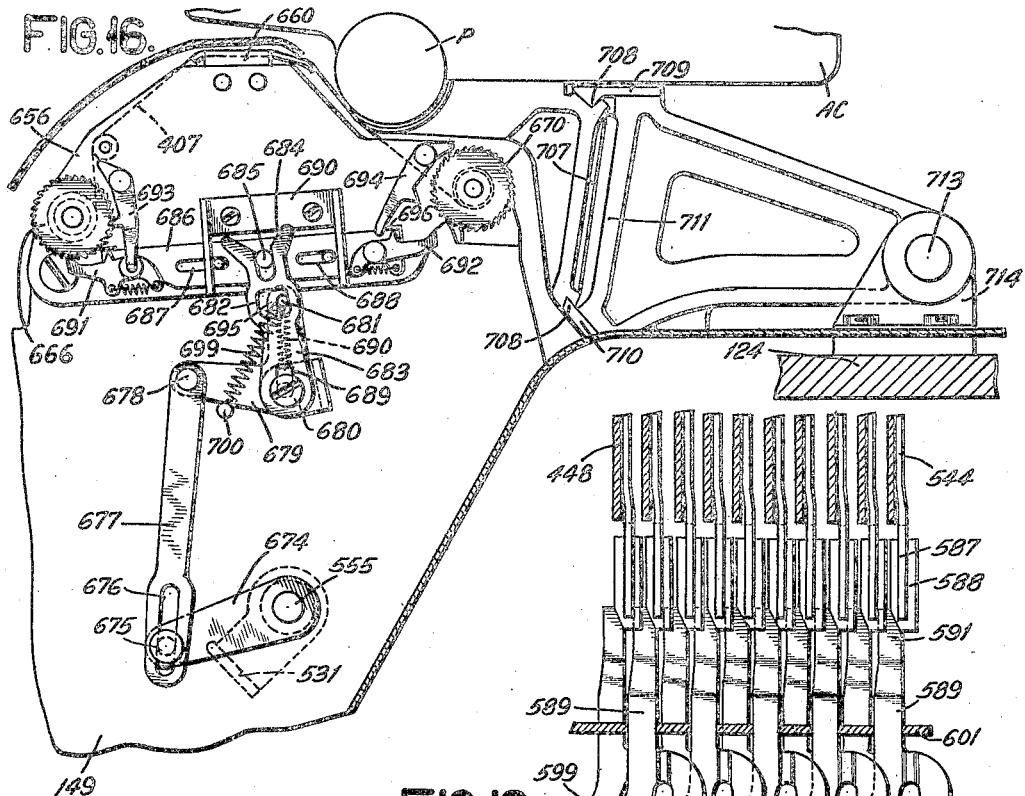
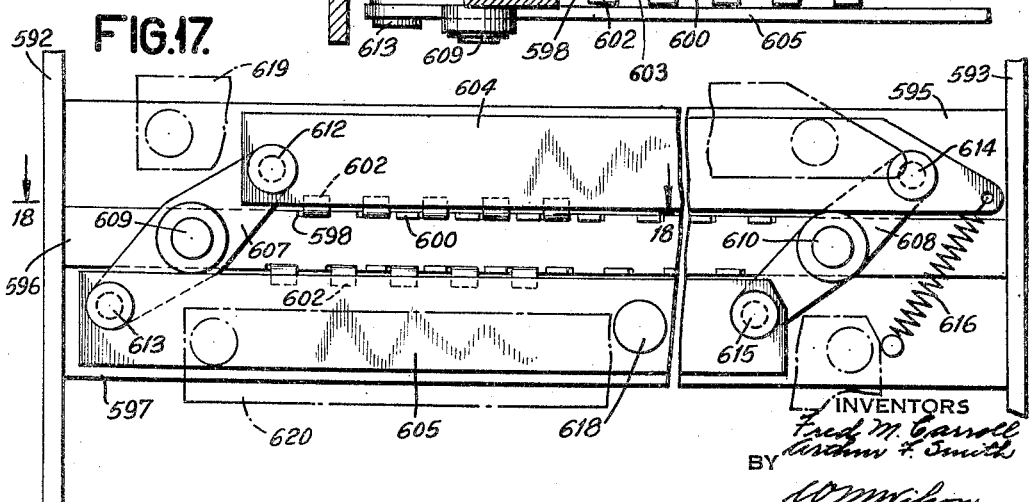

Jan. 10, 1950   F. M. CARROLL ET AL   2,493,858
ALPHABET PRINTING TABULATOR WITH PROGRAM CONTROLS
Filed Nov. 28, 1942   36 Sheets-Sheet 16
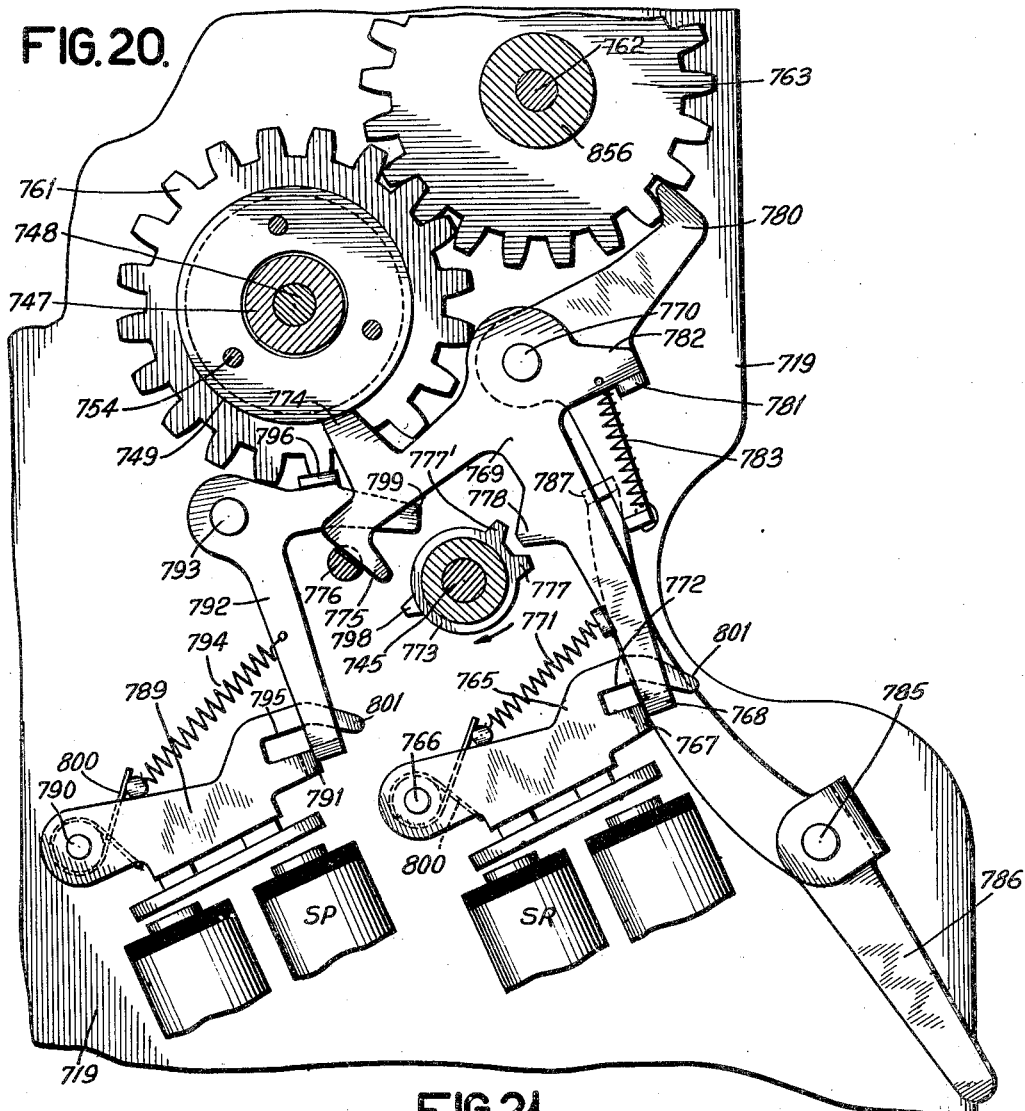
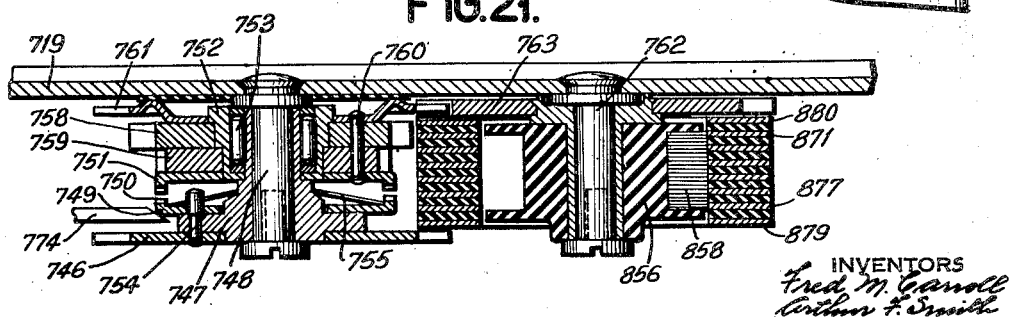

Jan. 10, 1950     F. M. CARROLL ET AL     2,493,858
ALPHABET PRINTING TABULATOR WITH PROGRAM CONTROLS
Filed Nov. 28, 1942     36 Sheets-Sheet 17

INVENTORS
Fred M. Carroll
Arthur F. Smith
BY
W. M. Wilson
ATTORNEY

Jan. 10, 1950     F. M. CARROLL ET AL     2,493,858
ALPHABET PRINTING TABULATOR WITH PROGRAM CONTROLS
Filed Nov. 28, 1942     36 Sheets-Sheet 18

INVENTORS
Fred M. Carroll
Arthur F. Smith
BY
ATTORNEY

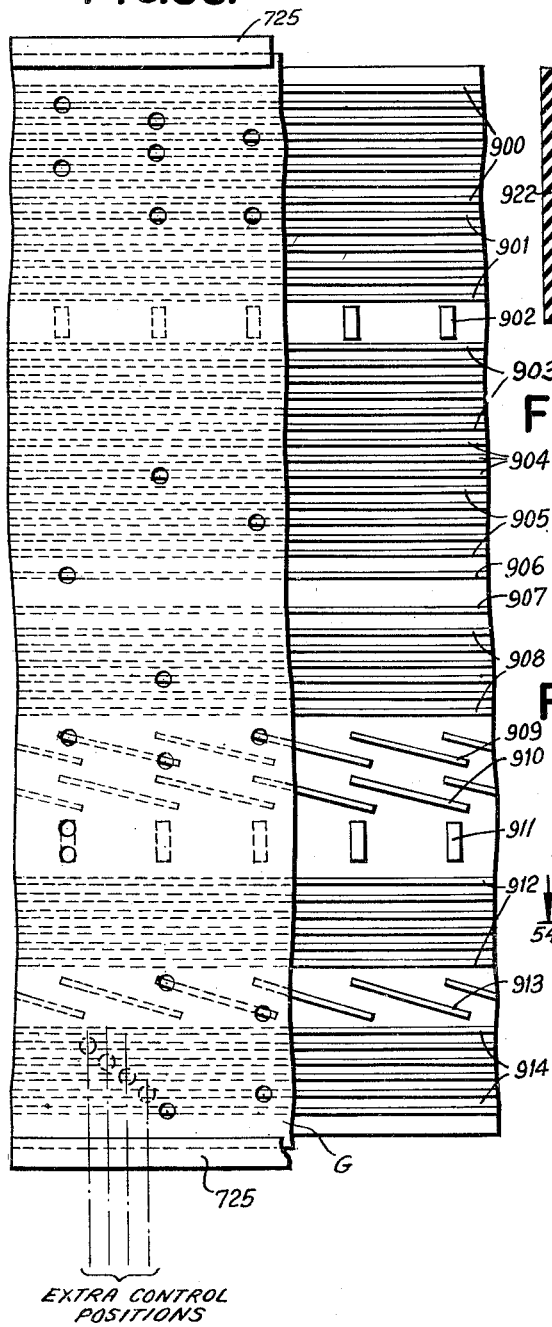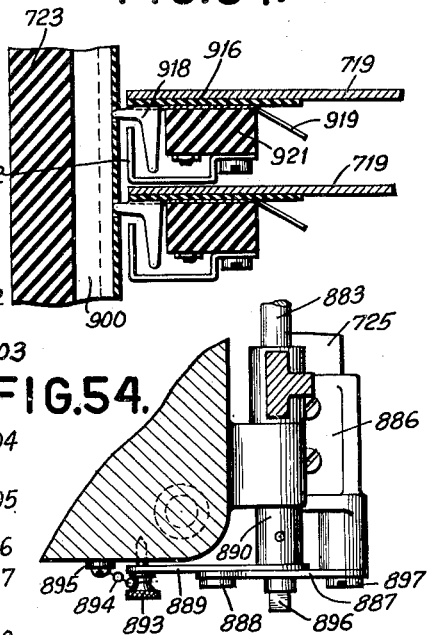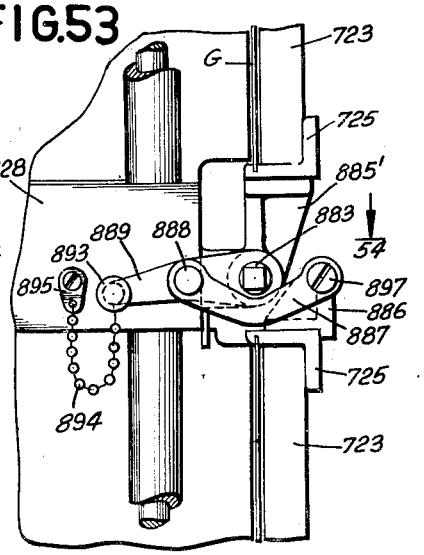

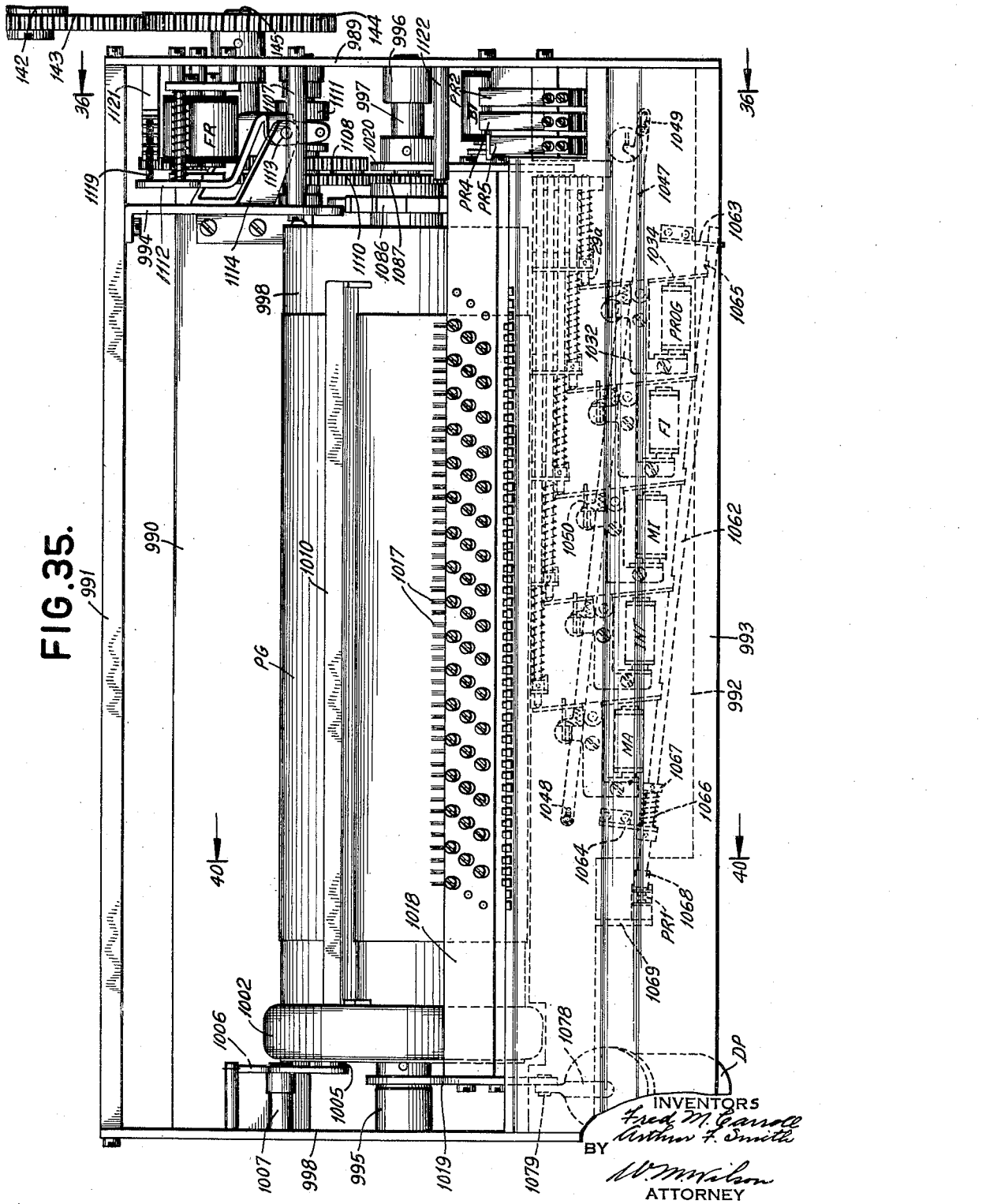

Jan. 10, 1950     F. M. CARROLL ET AL     2,493,858
ALPHABET PRINTING TABULATOR WITH PROGRAM CONTROLS
Filed Nov. 28, 1942     36 Sheets-Sheet 21

INVENTORS
Fred M. Carroll
Arthur F. Smith
BY
ATTORNEY

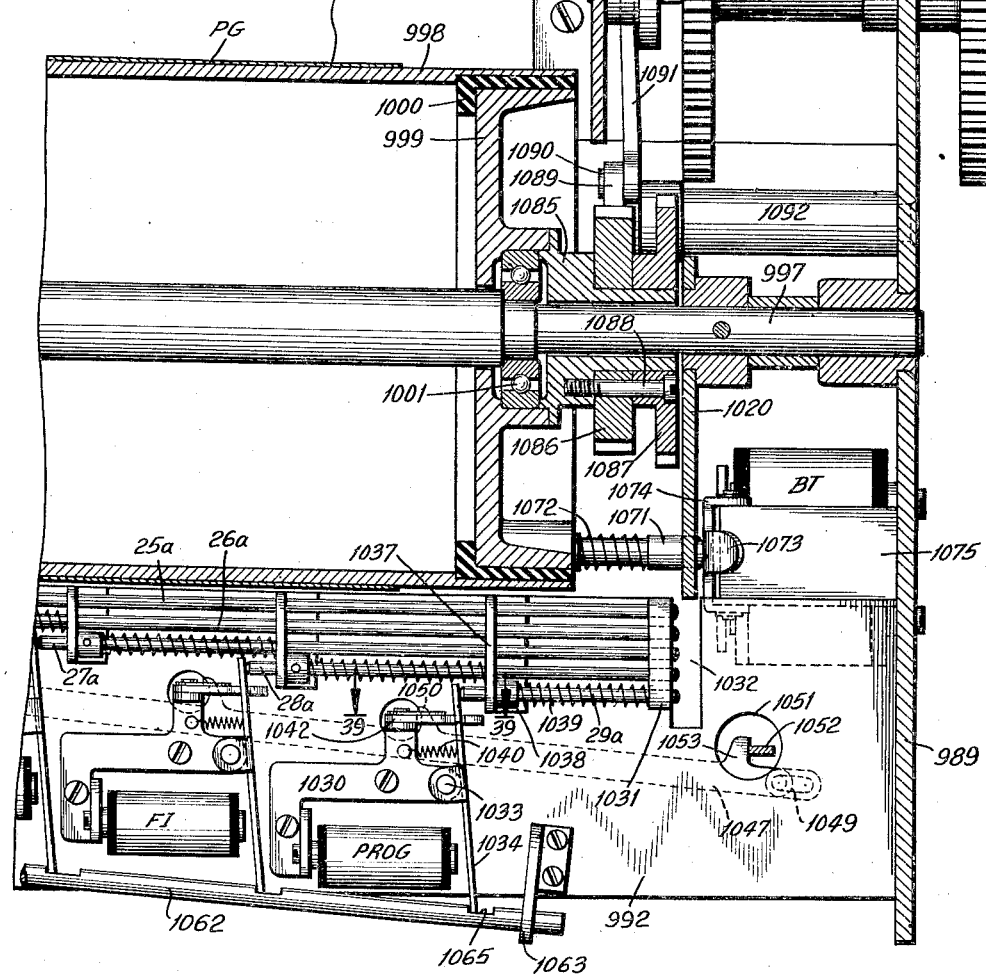
Jan. 10, 1950     F. M. CARROLL ET AL     2,493,858
ALPHABET PRINTING TABULATOR WITH PROGRAM CONTROLS
Filed Nov. 28, 1942     36 Sheets-Sheet 22

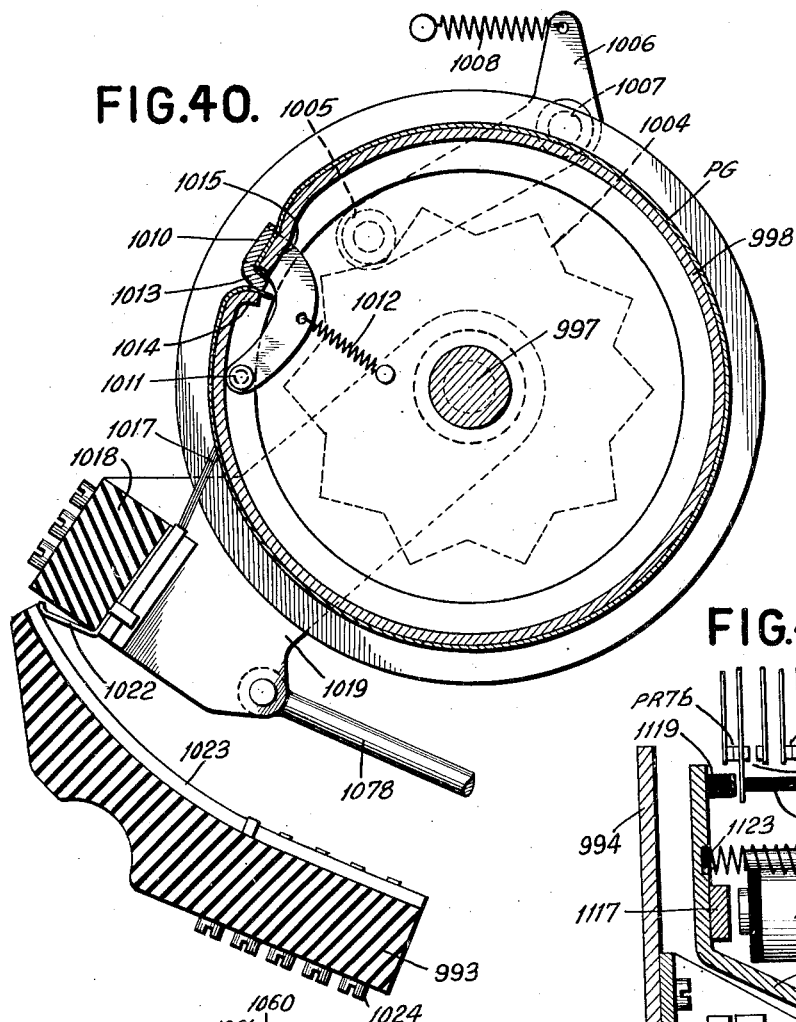
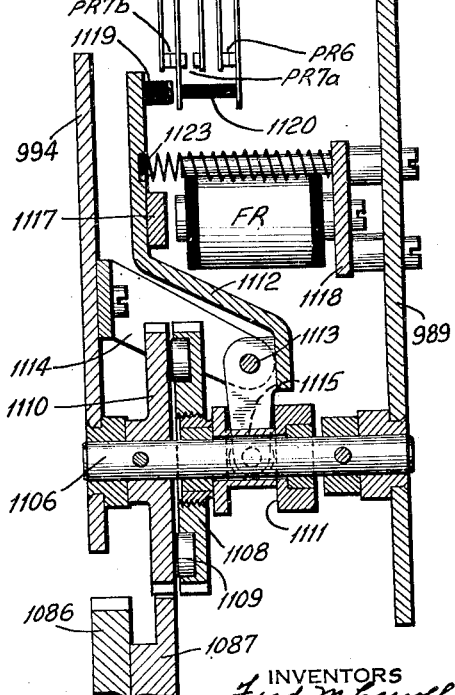
FIG.40.
FIG.41.
FIG.40a.

Jan. 10, 1950  F. M. CARROLL ET AL  2,493,858
ALPHABET PRINTING TABULATOR WITH PROGRAM CONTROLS
Filed Nov. 28, 1942  36 Sheets-Sheet 24

INVENTORS
Fred M. Carroll
Arthur F. Smith
BY
ATTORNEY

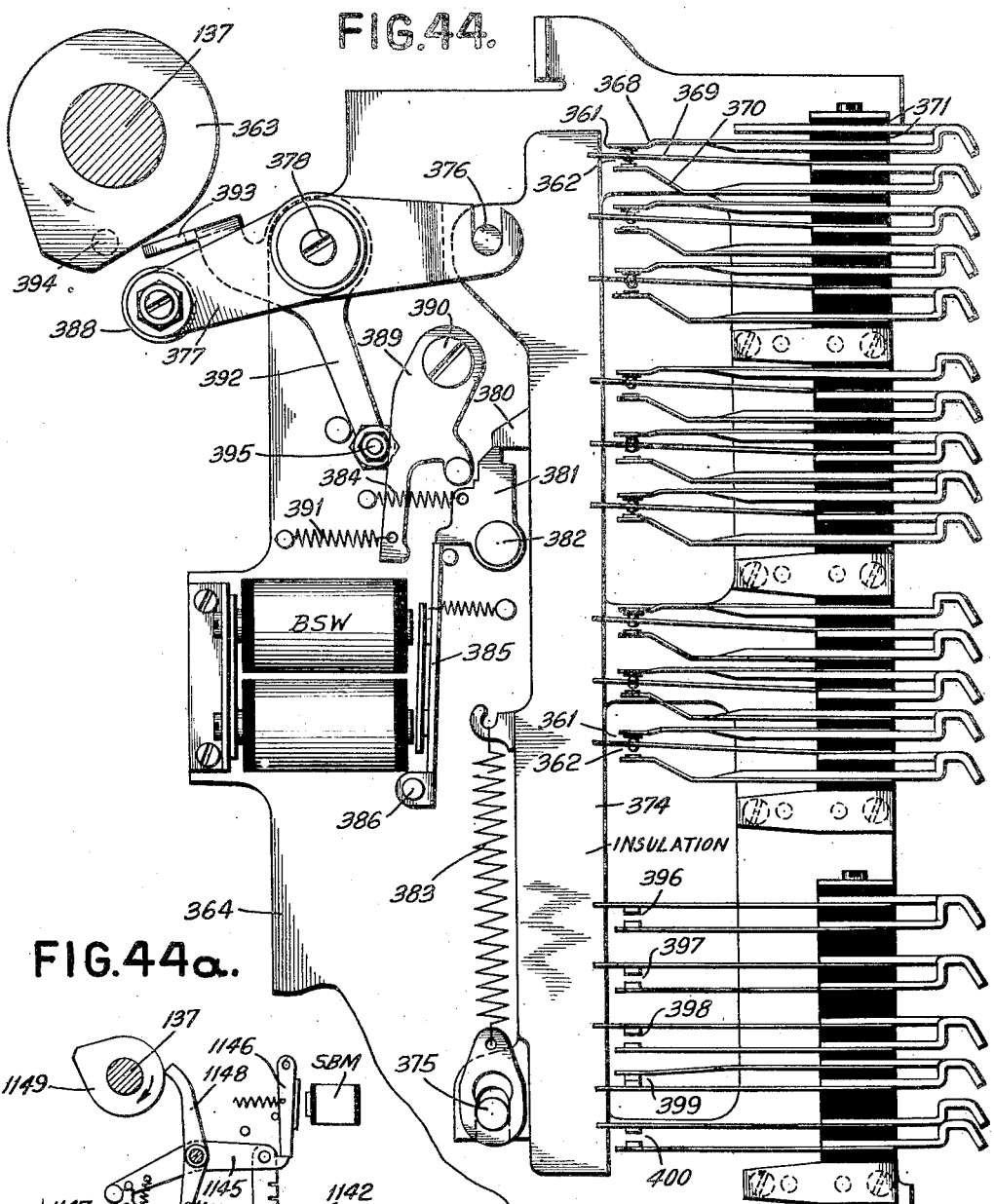
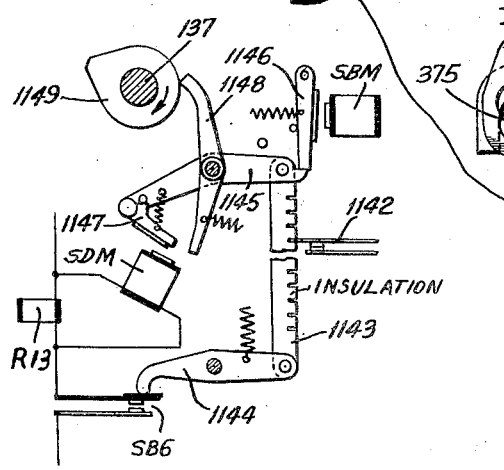

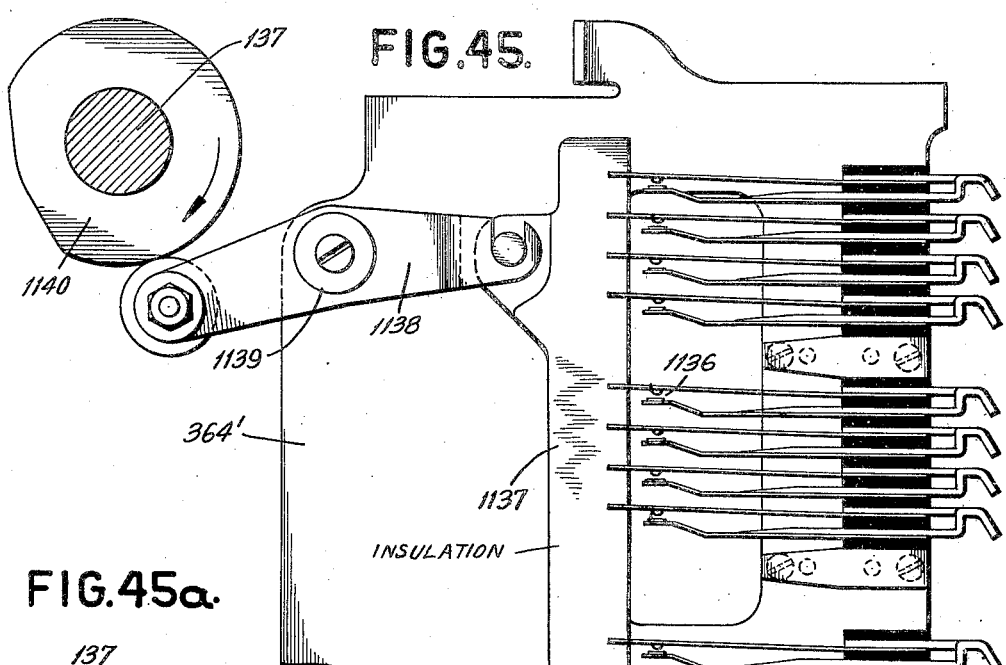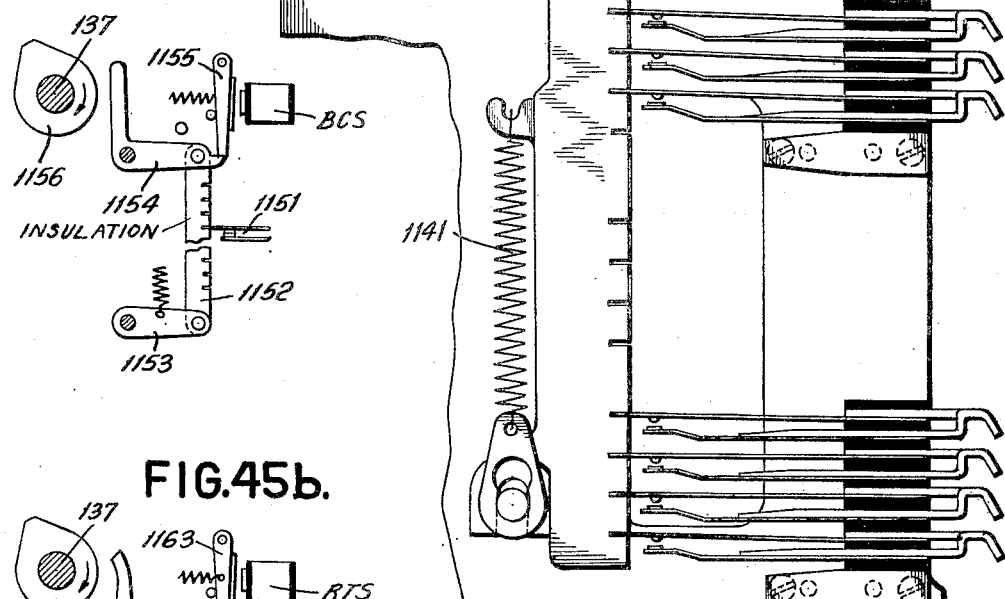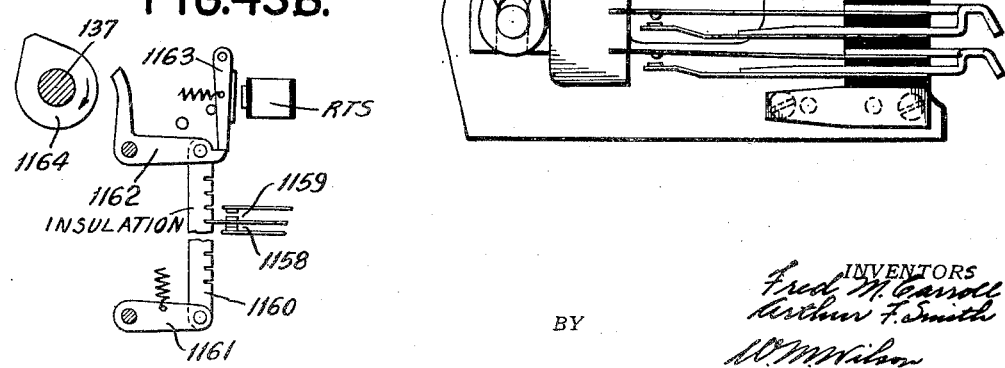

Figures 46, 47:
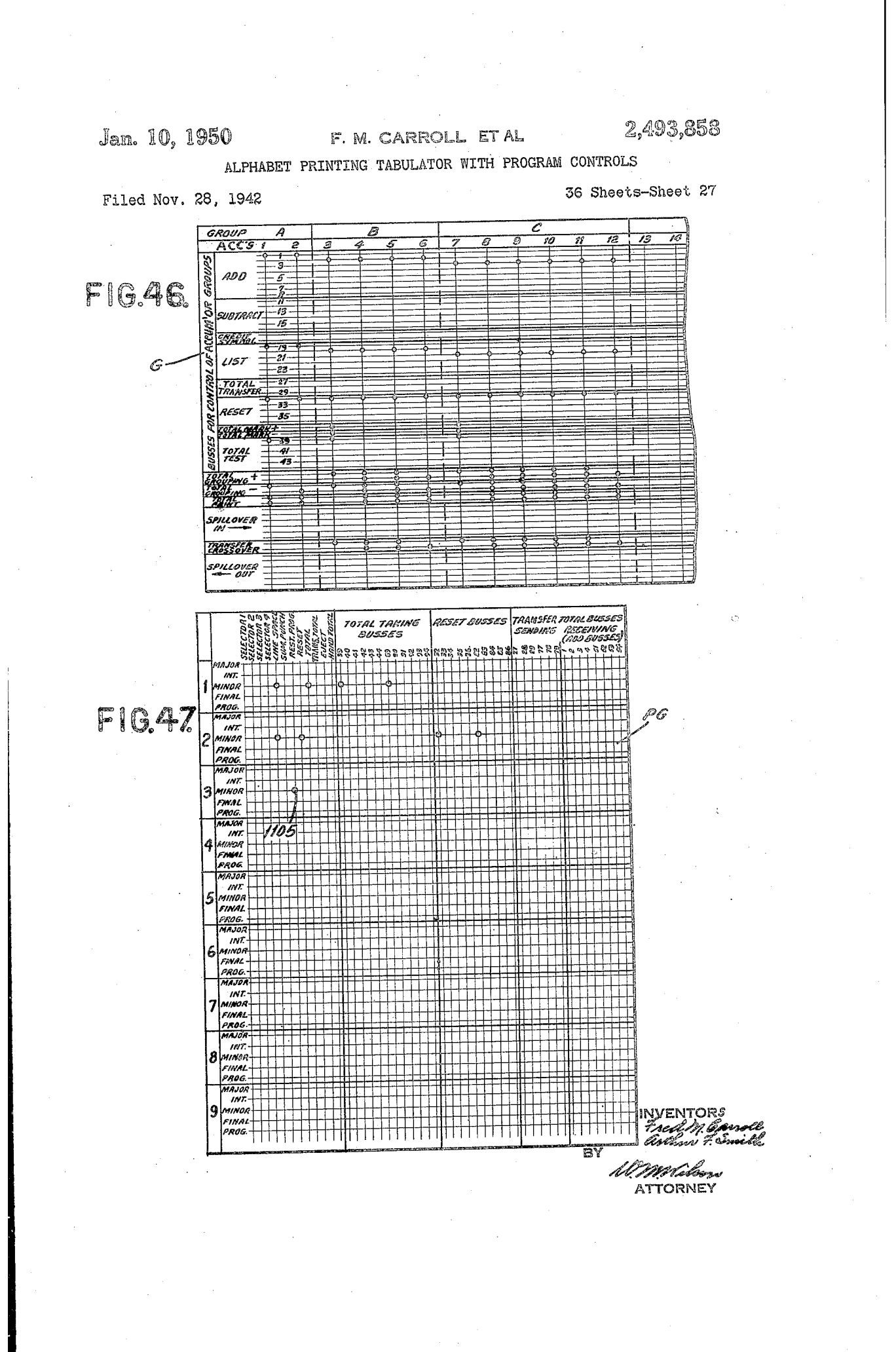

Jan. 10, 1950  F. M. CARROLL ET AL  2,493,858
ALPHABET PRINTING TABULATOR WITH PROGRAM CONTROLS
Filed Nov. 28, 1942  36 Sheets-Sheet 27

INVENTORS
Fred M. Carroll
Arthur F. Smith
BY
ATTORNEY

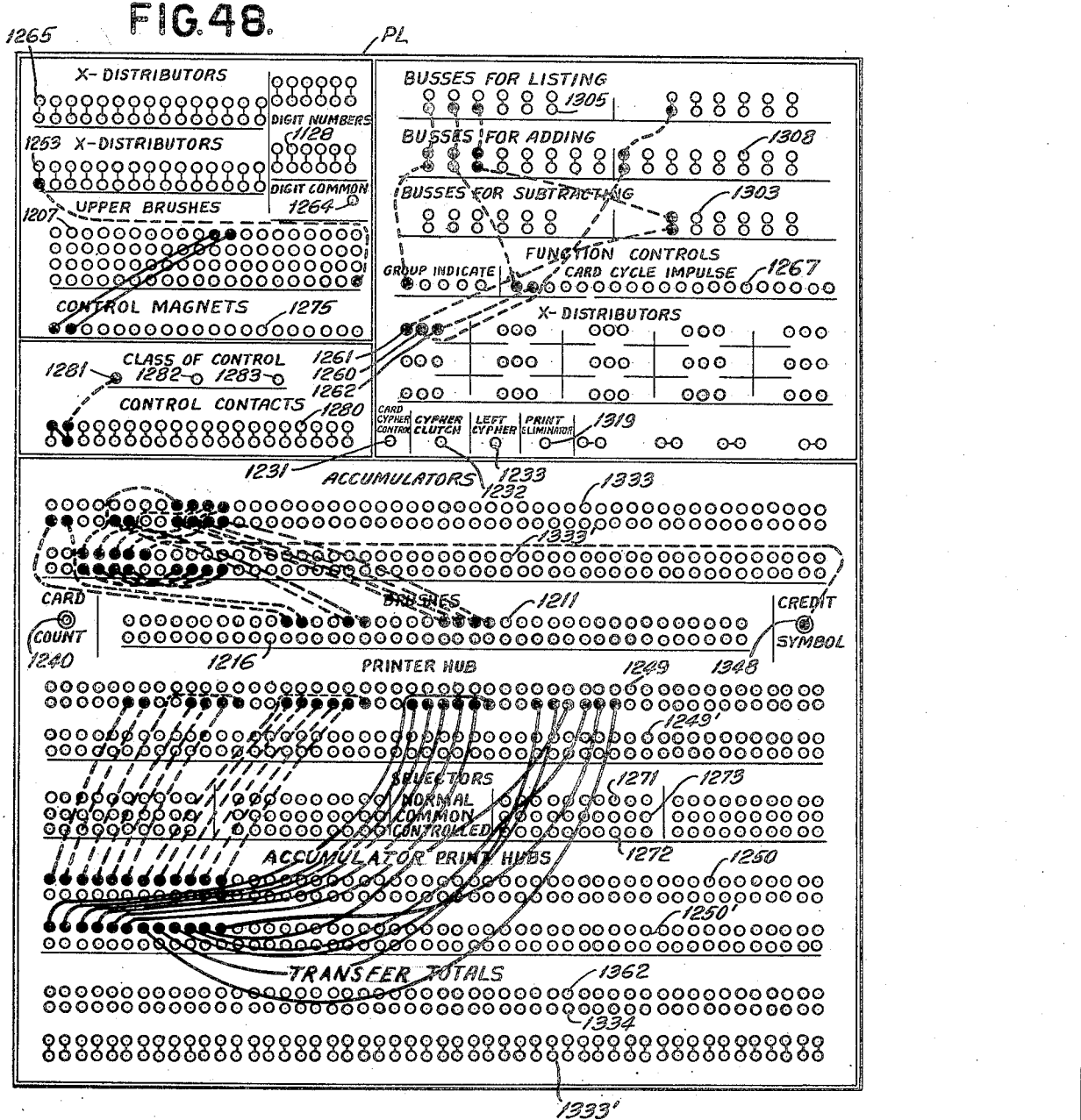

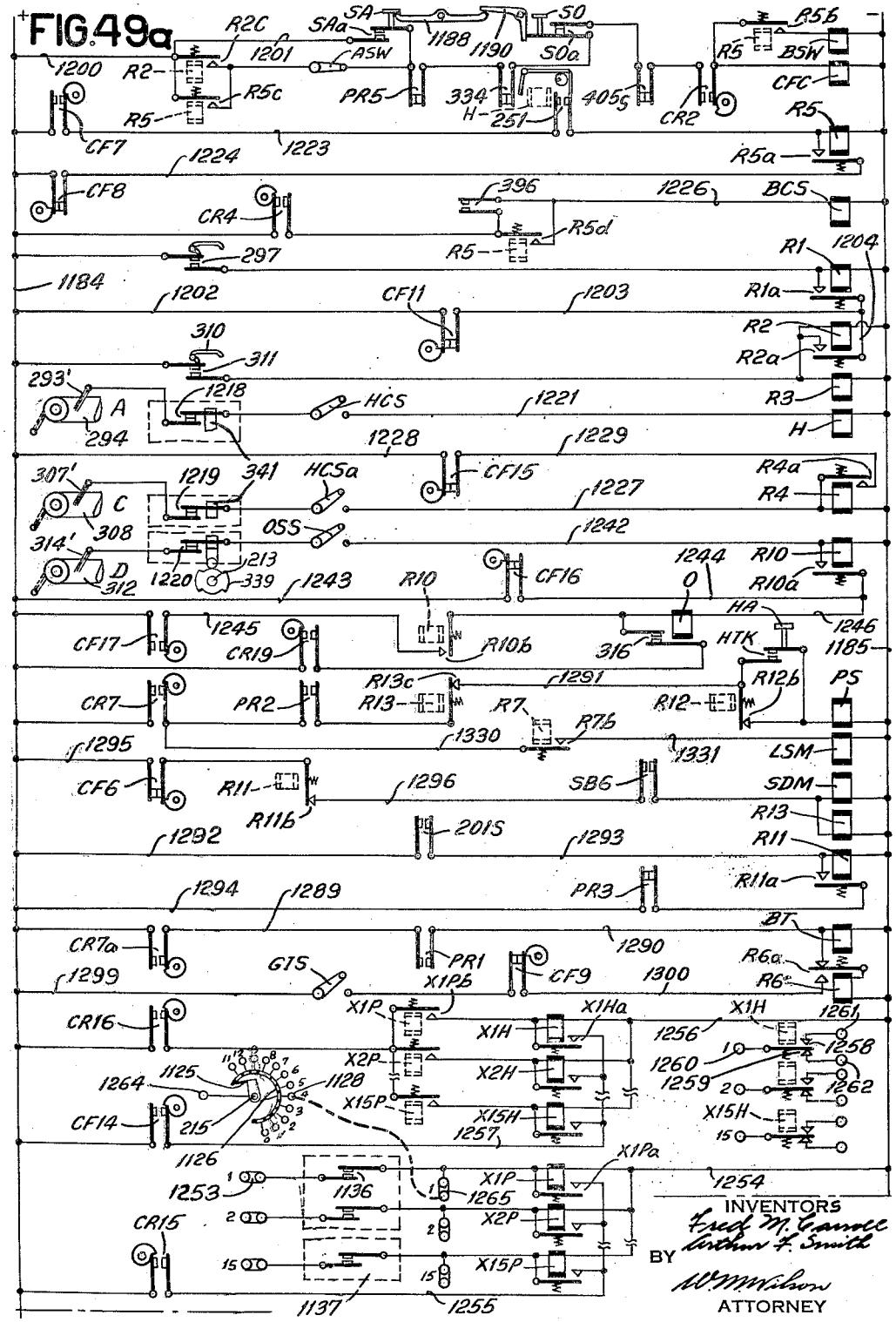

Jan. 10, 1950  F. M. CARROLL ET AL  2,493,858
ALPHABET PRINTING TABULATOR WITH PROGRAM CONTROLS
Filed Nov. 28, 1942  36 Sheets-Sheet 35
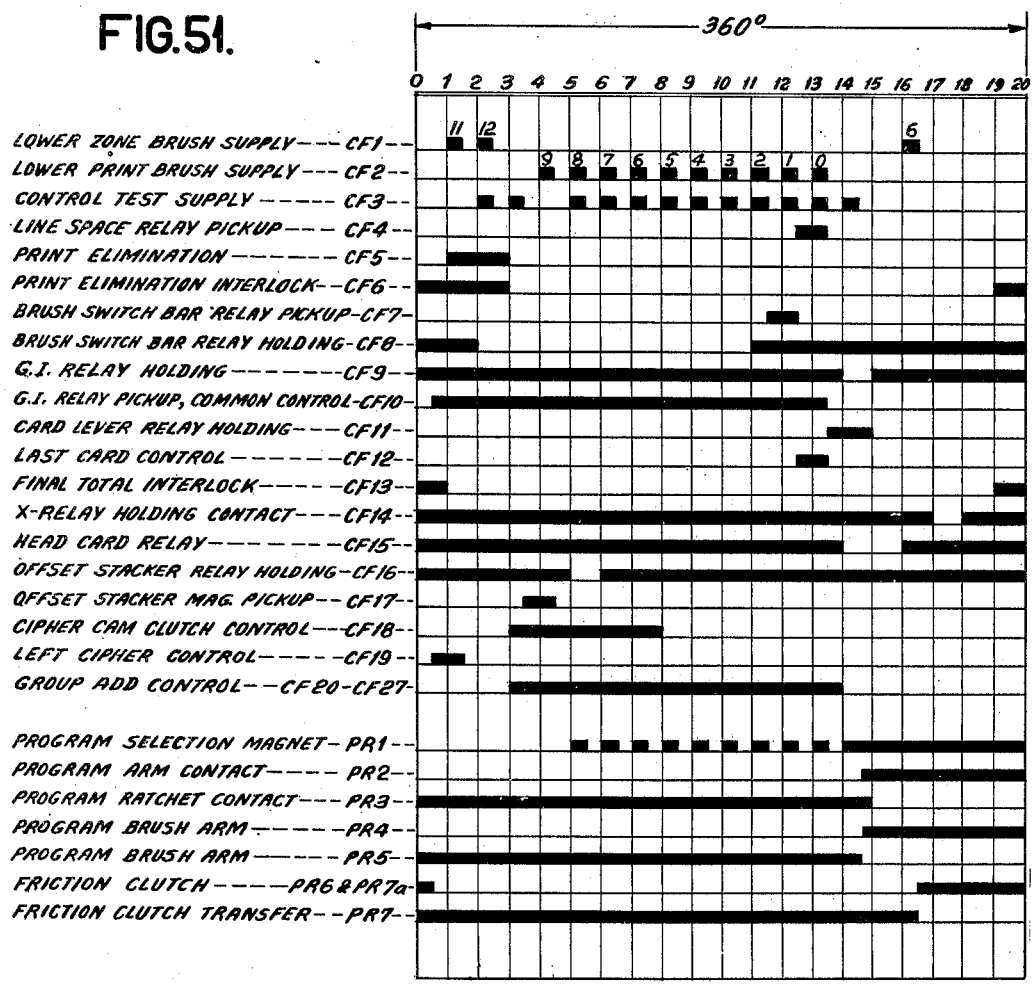

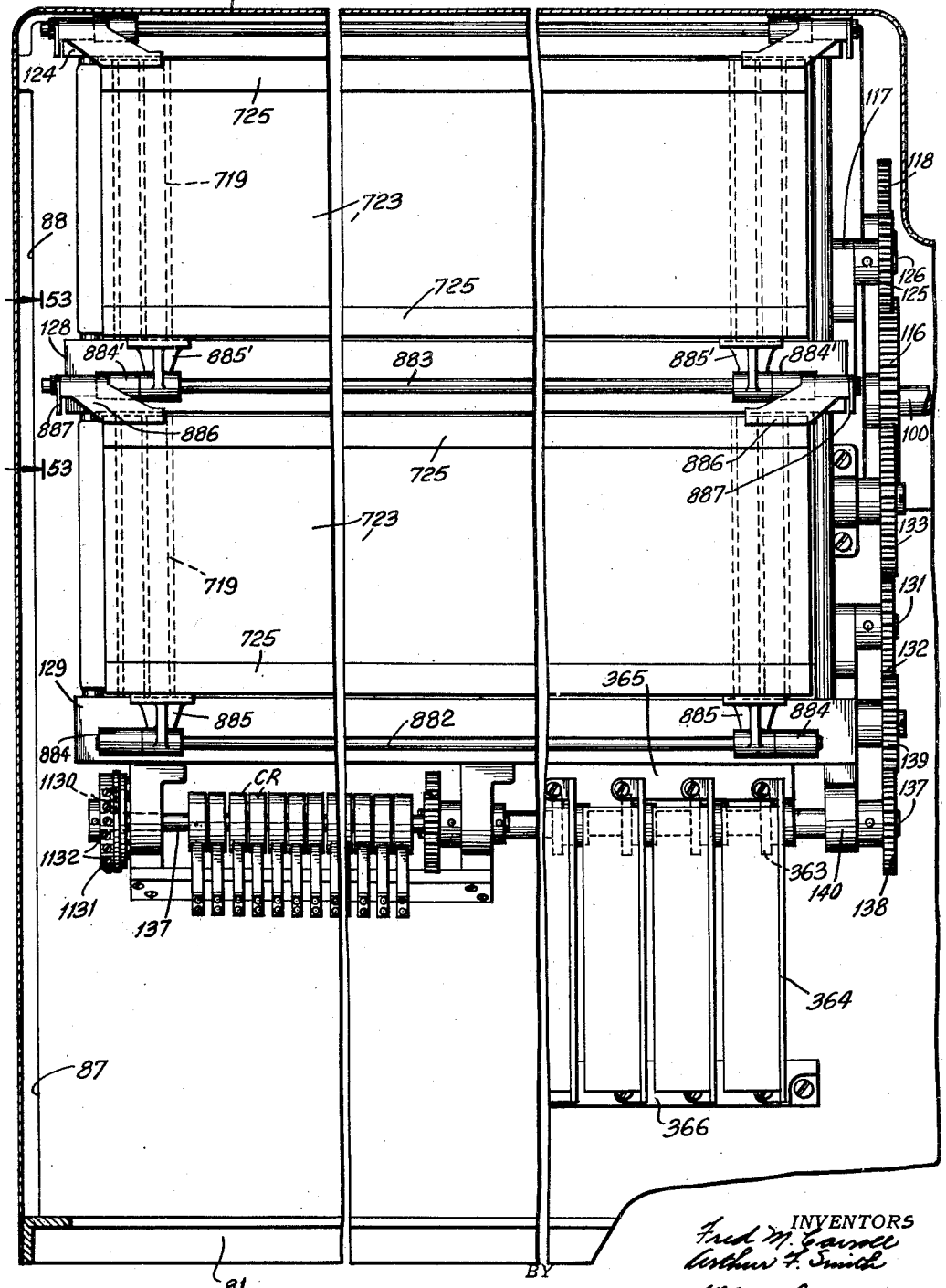

Patented Jan. 10, 1950

2,493,858

UNITED STATES PATENT OFFICE 2,493,858

ALPHABET PRINTING TABULATOR WITH PROGRAM CONTROLS

Fred M. Carroll, Binghamton, and Arthur F. Smith, Endicott, N. Y., assignors to International Business Machines Corporation, New York, N. Y., a corporation of New York Application November 28, 1942, Serial No. 467,244

54 Claims. (Cl. 235—61.8)

This invention relates to accounting machines and more specifically to improvements in record card controlled tabulating devices.

Heretofore, the control of tabulating functions resided either in a complicated arrangement of relays or required the attention of an operator to control the sequence of operations called for upon termination of sensing of a group of record cards. Although many machines are arranged to detect changes in card groups and automatically initiate the taking of totals, resetting the accumulators and restarting operations to sense the following groups of records, they are not equipped to run through a series of special total taking, total transferring, sheet feeding, progressive totaling, summary punching and resetting operations. The few machines that approach automatic control of such successive operations do so through a complicated array of relays, each useful only on a rare occasion when an unusual sequence of operation is desired.

It is an object of the present invention to provide devices for the selective control of tabulator operations without the attention of an operator and without the provision of a large number of seldom used relays. The novel results are brought about by the use of program devices with a perforated control record punched to effect diversified control of the machine. These program devices are called into operation upon the detection of different kinds of changes in card groups and serve as a brain of the machine to call into operation an almost unlimited number of different sequences of functional operation. The program sheet is perforated to suit the requirements of the report which the machine is to prepare under control of the usual perforated cards. After the machine has gone through the usual item adding and printing operations, it functions automatically to combine and arrange data and produce a report as the result of the use of any combination of the amount handling and sheet feeding controls.

Another object of the invention is the provision of devices for selectively grouping the denominational orders of accumulators. In the past, accumulators have been made with separate units for each denominational order and these units have been made universal and interchangeable, but they were not self-contained. In other words, prior to the present invention, accumulator denominational order units were separate but dependent upon adjacent units of the same kind for many functions such as adding, subtracting, transferring, resetting, total taking, total transferring and listing. The present accumulating device includes an accumulating unit which is self-contained in that it embodies a complete series of function control relays and contacts for controlling all the diverse functions associated with an accumulator without dependence on outside controls for other than initiation of operations, and independent of control by adjacent similar units if so desired. As a result of the construction just mentioned it is possible to select an almost unlimited number of accumulator order groupings under control of a perforated record. A grouping control record is placed over a series of common conducting bars provided to convey impulses calling for any or all of the special functions required in connection with accumulation, and on the opposite side of the perforated record are the individual contact members connected to the many control relays of a single denominational accumulator unit.

From the foregoing it is apparent that by predetermined arrangement of perforations in the grouping record sheet it is possible to bring any number of the accumulator units under control of any of the tabulator registering controls. The direction of control over the selectively grouped accumulators is brought about through control by the program devices, a plugboard arrangement, or manual operation by the operator. The program devices control the functions involving the numbers in the accumulator as an incident to total printing, while the plugboard involves operations under control of the record cards such as class selection control, X hole control, digit selector control, group indication, and credit and debit control, while the operator through key manipulation, controls total taking as well as starting and stopping the machine.

A further object of the invention is the provision of improved sensing devices for sensing the record cards more than once in the control of printing. In the usual tabulator, the record cards are sensed by two sets of sensing brushes, but only one of these sets is a print control set while the other is part of a comparing mechanism. In the present case, four card sensing stations are provided, two of which are comparing control stations while the other two are print controlling stations. Through the provision of these means it is possible to print two successive lines of data under control of the same card. It is contemplated having heading cards that will be provided with two areas or zones denoting alphabetic information such as names and addresses, and as such cards pass through the machine they pass the four sensing stations in succession. After being detected as a heading card by one station, the card then controls printing by operation of the same printing mechanism under control of two different zones on the card in cooperation with two different sets of sensing brushes. Thus, it is possible by the placement of two heading cards at the head of the group of related item amount cards, to print a four line heading on a report sheet.

As part of the improved sensing device there is provided an accelerated feed mechanism to speed up the advance of the card between sensing stations which are spaced apart far enough to provide room for interspersed feeding rollers. The machine is operated on a 20 point cycle but the room required for the interspersed rollers causes the analyzing stations to be separated further than a distance commensurate with 20 point operation. Therefore, the difference in distances is made up by accelerating the movement of the card between stations. Another feature found operating in connection with the sensing devices is the mechanism arranged for offset stacking of heading cards. The offset stacker is operated under control of special perforations. These are the special perforations which are used to control printing of alphabetic information from different heading card zones.

A further object of the invention is the provision of improved alphabet printing devices The alphabetic and numeric type are arranged around a circular type wheel which is constantly rotated. The angular relationship between a rocking arm carrying the type wheels, a platen and a driving gear is so proportioned that, when a wheel is thrown against the platen, a movement is produced which neutralizes the forward motion of the wheel in such a way that the type is stationary relative to the platen when it effects printing.

Another feature involved in the printing controls is the use of a single sensing brush to control the zoning of the type wheel as well as the selection of digital spacing of the type wheel. Cooperating with the alphabet printing devices is a cipher eliminating mechanism for selectively preventing the printing of zeros to the left of the highest significant digit.

Another object of the invention is the provision of electrical accumulator controls arranged in banks, each bank comprising one denominational order of a debit and credit balance accumulator associated with relays for controlling adding and subtracting operations as well as resetting, total transfer, listing, and positive and negative total taking controls. The association of the control relays directly with the related accumulator bank makes the unit a universal one adapted for cooperation with any one of a hundred similar units arranged in two tiers in the machine.

Another object of the invention is the provision of improved readout devices in the form of a commutator comprising a series of thin metallic plates for forming contact spots differentially arranged to read out code combinations of positive and negative balances.

A further object of the invention is the provision of program selecting devices operated in a novel manner under control of group change detecting devices. Upon the detection of a minor, intermediate, major, final, or progressive total, the drum carrying the program sheet is spaced differentially to assume a position wherein a set of perforations are located to select a series of operations governed by the class of total found in the change between groups. The program sheet is further sub-divided in perforation bearing zones so that a sequence of selective operations may follow the one initially selected by the movement of the program drum to one of five positions depending on the class of total, as already mentioned. In other words, the class of total selects an initial function from the initial starting position on the program drum, and upon subsequent operations, the drum is spaced to carry the sheet from zone to zone upon each cycle of operation of the machine. In this way the occurrence of a certain class of total may call into operation the taking of a total in connection with an accumulator A followed by the transfer of said total to accumulator B, then followed by a summary punching operation and a progressive totaling operation followed by transfer to accumulator C before restoration of accumulators A and B. Any number of such selected functions may be prearranged, limited only by the number of classes of totals and the zones on the program sheet limited by the diameter of the program drum.

A still further object of the invention is the provision of improved group control sensing devices. In the ordinary tabulator, the group control devices involve the use of two sets of sensing brushes spaced apart in the path of travel of the cards, so that successive cards pass in synchronism under the brushes. When similar index points are sensed, it is an indication that the cards relate to the same group and circuits are maintained for keeping the tabulator running. The improved devices of the present invention involve the use of only one set of sensing brushes for comparing control. These brushes cooperate with a pin wheel moving in synchronism with the feeding of the cards and the wheel carries enough pins to represent the index points of more than one cycle of operation. As a card passes the comparing analyzing station, a related pin on the comparing wheel passes the armature lever of a relay provided to push the pin into an extended position if a perforation is sensed. Upon the sensing of two successive cards, a pair of pins is extended in positions on the pin wheel coinciding with the positions of the perforations on successive cards. The extending pins then cooperate with contact closing devices to set up group control circuits for maintaining tabulator operation when successive cards relate to the same group.

Another object of the invention is the provision of record controlled means for grouping accumulating and printing control units of a tabulator. Heretofore, the various accumulator orders of a tabulator were correlated by plugging connections and relay operated contact connections. The present scheme of unit relationship is extremely flexible in that the entire relationship between one hundred different adding and printing units of the tabulator may be changed in an instant by merely substituting a different perforated grouping control sheet.

Other objects of the invention will be pointed out in the following description and claims and illustrated in the accompanying drawings, which disclose, by way of example, the principle of the invention and the best mode, which has been contemplated, of applying that principle.

In the drawings:

Fig. 2 is a plan view of the improved tabulator.

Fig. 3 is a detail view of the stop key and the associated contact interlock.

Fig. 4 is a detail view of the start key cooperating with contact releasing devices.

Fig. 5 is a sectional elevation view taken along line 5—5 in Fig. 2 and showing the clutch devices and drive gearing cooperating with the card feeding rollers.

Fig. 5a is a schematic front elevation view showing the framework and driving connections.

Fig. 6a is a diagrammatic view of the card feeding and sensing devices with a plurality of cards en route.

Fig. 7 is a sectional plan view taken along line 7—7 in Fig. 6 and showing the card feeding devices.

Fig. 8 is a detail view taken along line 8—8 in Fig. 7 and showing the clutching devices cooperating with card feeding mechanism.

Fig. 9 is a detail view in side elevation showing the planetary gearing provided for accelerating certain sets of card feeding rollers.

Fig. 10 is a sectional plan view taken along line 10—10 in Fig. 9 and showing the feed accelerating gearing.

Fig. 11 is a sectional elevation view taken along line 11—11 in Fig. 2 and showing the arrangement of the accumulator units, the switch plates, the program device and the drive gearing connections thereto.

Fig. 12 is a front elevation view of the alphabet printing devices as viewed along line 12—12 in Fig. 2.

Fig. 14 is a sectional elevation view taken along line 14—14 in Fig. 12 and showing the zoning control and cipher elimination mechanisms cooperating with the alphabet printing devices.

Fig. 15 is an enlarged elevation view showing the alphabet zoning and zero elimination control for controlling printing.

Fig. 15a is a detail view showing the character type arrangement on a typebar.

Fig. 16 is a side elevation view seen from line 16—16 in Fig. 12 and showing the ribbon feed mechanism and the automatic reversing devices.

Fig. 17 is a detail elevation view taken along lines 17—17 in Fig. 15 and disclosing the controls for manual selection of zero elimination.

Fig. 18 is a sectional plan view taken along line 18—18 in Fig. 17 and showing the zero elimination cross-over devices.

Fig. 20 is an enlarged detail view in side elevation showing the starting and stopping controls for the accumulator mechanism.

Fig. 21 is a detail plan view in a section taken along line 21—21 in Fig. 19 and showing one adding wheel of the accumulator and the cooperating total readout devices.

Fig. 33 is a rear elevation view taken along line 33—33 in Fig. 19 and showing the grouping control bars cooperating with the accumulator contacts and the grouping control sheet placed between the bars and the accumulator units.

Fig. 34 is a sectional plan view taken along line 34—34 in Fig. 19 and showing the manner in which the accumulator contact devices establish contact through the grouping control sheet.

Fig. 35 is an elevation view showing the program drum, cooperating sensing devices and the drum rotating control devices.

Fig. 38 is a sectional elevation view taken along line 38—38 in Fig. 36 and showing the program setting control devices.

Fig. 39 is a detail section view as seen from line 39—39 in Fig. 38 and showing a latch cooperating with one of the armature levers for operating a program setting pin.

Fig. 40 is a sectional elevation view taken along line 40—40 in Fig. 35 and showing the program sheet clamp and the detenting devices cooperating with a star wheel on the left end of the program drum.

Fig. 40a is a detail view of the tripping lever for releasing the program setting armature latches.

Fig. 41 is a sectional elevation view taken along the line 41—41 in Fig. 36 and showing the clutch cooperating with the program drum.

Fig. 44 is an elevation view showing a switch control device for shifting contacts leading to different sensing brush controls when a heading card is sensed.

Fig. 44a is a diagrammatic view of another switch for opening contacts to prevent printing during punching.

Fig. 45 is an elevation view showing a switch bar for controlling distribution of impulses initiated by X hole perforations.

Fig. 45a is a diagrammatic view of a switch for opening usual printing connections when recording heading data from first or upper set of sensing brushes.

Fig. 45b is a diagrammatic view of a switch for opening card sensing brush circuits and closing rolling total connections.

Fig. 46 shows a perforated control sheet for grouping selected accumulator banks.

Fig. 47 shows a program sheet perforated to effect selected tabulator controls automatically and successively.

Fig. 48 shows the plugboard of the machine with some plug wires connected to effect a selected mode of operation.

Figs. 49a, b, c, d and e, when taken together, form a wiring diagram illustrating the electrical controls of the machine.

Figure 50:
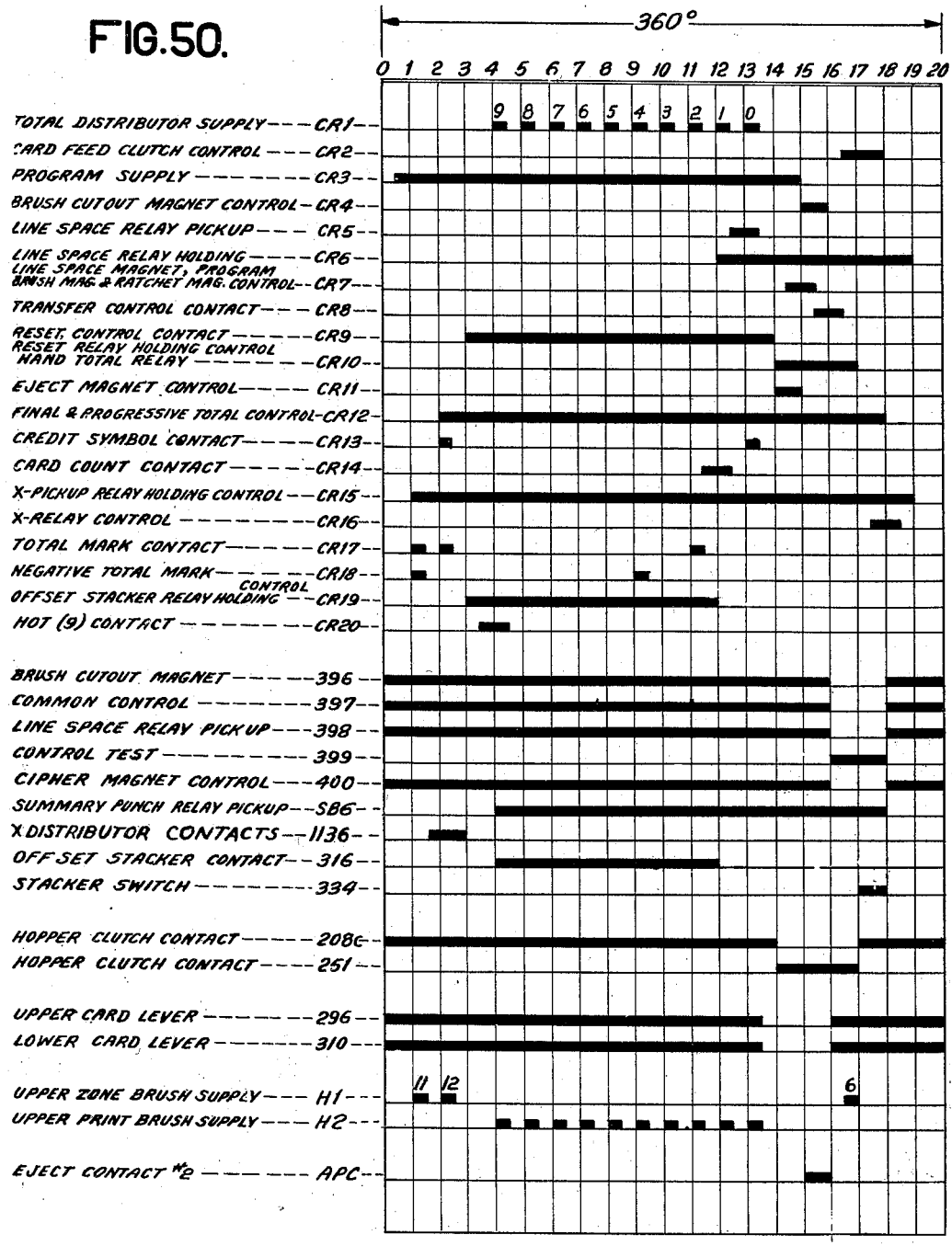

Figs. 50 and 51 are time charts illustrating the sequence of events in connection with the control elements for various functions.

Fig. 52 is a rear elevation view taken along line 52—52 in Fig. 11 and showing the holding means for two tiers of accumulator units and the cooperating grouping sheet holders. This view also shows the driving connections to the cam operated contacts and the switch bar operating cams.

Fig. 53 is a side elevation view as seen from line 53—53 in Fig. 52 and showing the toggle connection for opening and closing the holder pressing the grouping control sheet against the accumulator contact members.

Fig. 54 is a sectional plan view taken along line 54—54 in Fig. 53 and showing the hinge and toggle connection forming part of the grouping sheet holder.

*The illustrative machine*

Figure 1:
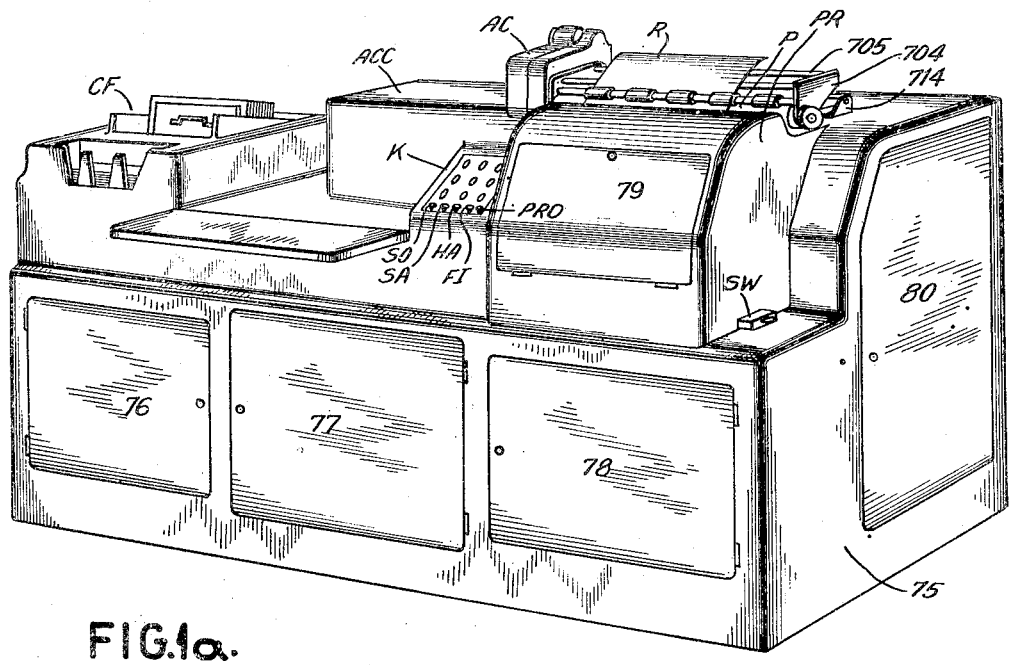
Fig. 1 is a perspective view of the entire machine.

A perspective view of the entire machine is shown in Fig. 1. There it is seen that a case 75 encloses the various operating units of the machine. At the upper left hand corner is a mechanism CF provided to feed and sense the perforated record cards. Extending across the rear of the machine is a portion ACC wherein is held one hundred orders or banks of accumulators assembled in two tiers with fifty separate orders in each tier. Near the center of the machine is a keyboard K upon which is mounted a series of five control keys and a set of nine control switches. At the right side of the machine is an extension containing the printing mechanism identified by the designation PR. Extending from this printing unit is a box containing the main switch SW. At the rear of the printing unit is a platen P holding the record sheet R, the movement of which is controlled by an automatic carriage mechanism AC of the kind shown in Patent No. 2,189,025. Across the front of the machine is a series of door openings for making accessible the parts of the machine requiring changes of record sheets or plugging connections. Door 76 covers a program device and door 77 covers the plugboard. When door 78 is open, a pair of relay gates may be swung outwardly to make inspection of the relays and the wiring connections. A door 79 covering the front of the printer unit PR is opened for access thereto when a change in zero elimination control is desired. Another door 80 located on the right wall of the case 75 is provided to give access to control sheet storage bins and a total impulse distributor.

*Framework*

The operating mechanism of the machine is suspended within a cage made up of a series of connected horizontal and vertical angle irons or bars. Referring to Figs. 5, 5a and 11, it is noted that a series of horizontal angle irons are connected to form a base 81. Supported at the four corners of the base are vertical bars 82 and other bars 83 are placed in an intermediate position to strengthen the center of the framework. The main support in the machine is located in the center of the cage of angle irons and extends from left to right through the full length of the machine. This main support is composed of a central hollow core 84 extending the entire length of the machine, and from it there extend substantial webs for supporting many units of mechanism. It is a large casting, formed as a unit with the extending webs branching therefrom.

In Fig. 5, which is a view looking toward the left side of the machine, it is seen that extending from the central core 84 is a pair of horizontal webs 85 and 86 extending to the left and right, respectively, and connecting the main support to the angle irons 82 situated at the left side of the machine. Also extending from core 84 is a large central vertical web 87 supported on the base 81 and extending through the entire length of the machine.

Another vertical web 88 (Figs. 5a and 11) is shown extending above the top of the core 84 and in front of the accumulator unit ACC. At the right side of the machine, Fig. 5a, the main support is connected to the vertical bars 82 by a bracket 89 secured between the side of the core 84 and the front web of the front angle iron. It will be noted that the frame work forms an unusually strong support for the various mechanisms which are mounted upon or hung from the strong central core of the main frame.

*The driving mechanism*

In Fig. 5 it is seen that a motor M is attached to the rear side of the vertical frame web 87. Opposite the motor M and attached to the other side of the web 87 is a generator G. Connecting the motor and generator is a belt 91 for driving the generator to create operating current whenever the motor M is operated from the usual alternating current source of power. In Fig. 5a, it is seen that the motor shaft extends toward the left beyond the generator shaft and carries a pulley 92 around which is wrapped a belt 93 passing upwardly around a large driving pulley 94 connected to a spur gear 95 pivoted on a center 96 extending from one of the card feed unit frames 97. The driving motion is communicated through gear 95 to a large gear 99 attached to a main drive shaft 100 passing through the card feed unit.

At this point it is well to mention that the driving mechanism is not all operated with a uniform motion. Although the driving action of shaft 100 is communicated directly to the printing, accumulating, total taking, and other devices of the machine, for operation in a uniform manner, other gearing devices associated with the card feed, and group control mechanisms are driven through a gear 115 (Figs. 5, 5a, 7, 9, 10), attached to shaft 100 and cooperating with a planetary gear train for accelerating the drive connections associated with the card feed for reasons explained more fully hereinafter. Shaft 100 rotates at the rate of only one revolution for two cycles of operation, but the shafts geared thereto are driven with a 1 to 1 ratio.

Figure 13:
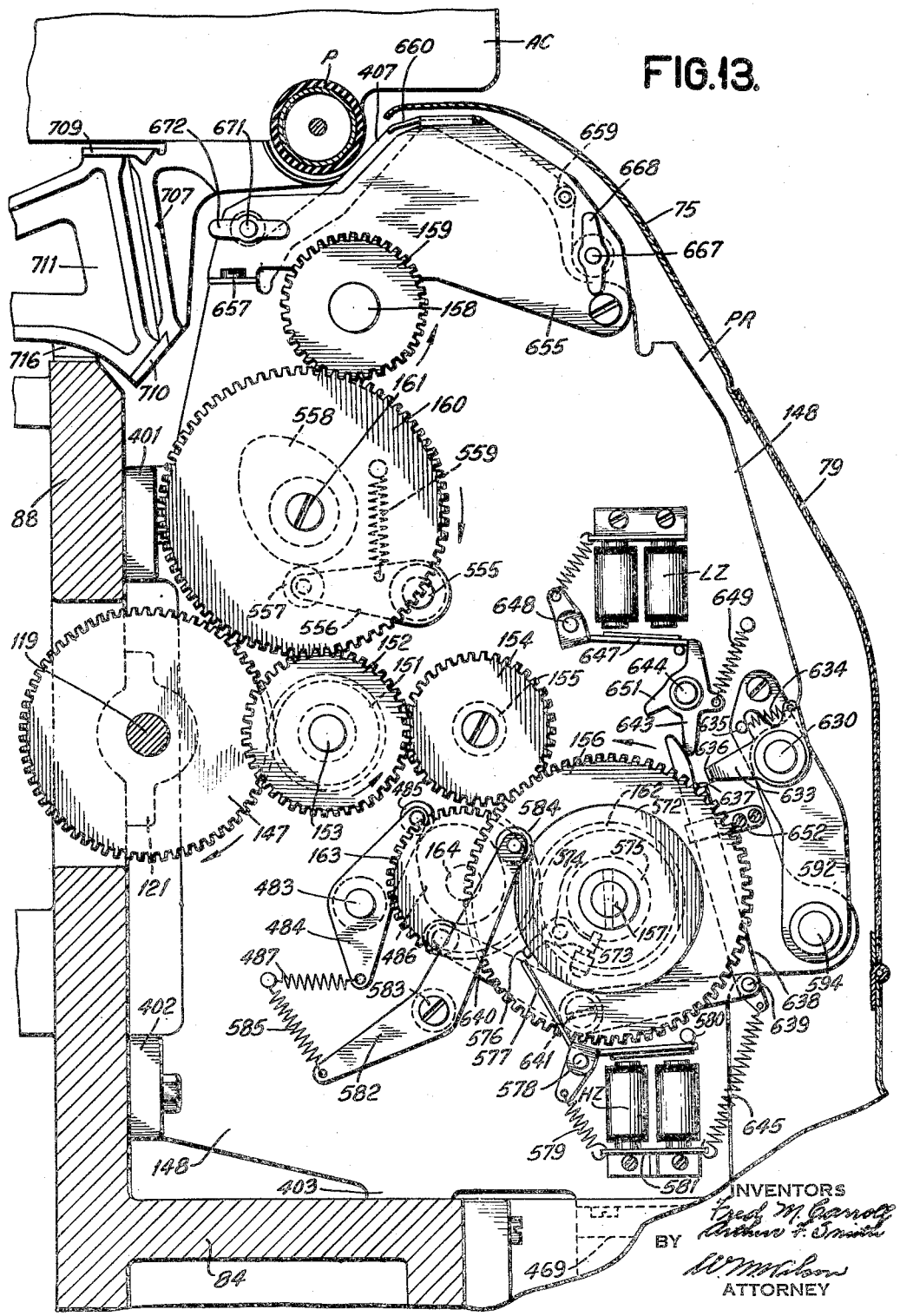
Fig. 13 is a side elevation view as seen along line 13—13 in Fig. 12 and showing the drive gearing and clutch cooperating with the printing control mechanism.

For purposes of connection to the devices driven with a uniform motion, shaft 100 (Fig. 5a) extends toward the right of the machine and has attached thereto a large gear 116 fastened alongside a supporting bracket 117 secured on top of the core 84. This gear 116 (Fig. 11) cooperates with gearing connections for driving the accumulating controls, the program drum, and the switch plate operating shaft. Meshing with gear 116 is a gear 118 fastened on a printer operating shaft 119. This shaft 119, Fig. 5a, extends across the center of the machine in front of the accumulator units ACC and behind the keyboard. It is supported in a pair of bearing blocks 120 and 121 fastened to the front side of the web 88 (Figs. 11 and 13).

Referring again to Fig. 11, it is noted that in mesh with drive gear 118 is a smaller gear 125 fastened to a shaft 126 acting as a drive shaft for the upper tier of accumulator units. Shaft 126 is supported on standards 127 fastened to the top of a supporting block 128 attached to the rear face of web 88. Another such block 129 is also attached to the rear face of the main frame and is spaced below block 128 in order that a second or lower tier of accumulator units may be accommodated between the two blocks. Resting on the lower block 129 are standards 130 supporting a second accumulator drive shaft 131 carrying a gear 132 meshing with an idler gear 133 supported on a bearing 134 and engaging the gear 116 on the main drive shaft 100. Since the main shaft is rotating in a clockwise direction (Fig. 11) and the drive connections to shafts 126 and 131 are indirect, they too, rotate in a clockwise direction.

Driving connections are established to a shaft 137 carrying cams for operating switch plate shifting members to alter the condition of various contacts. Attached to shaft 137 is a gear 138 meshing with an idler gear 139 pivoted on the side of block 129 and cooperating with the accumulator gear 132. Shaft 137 is supported in hangers 140 suspended under the accumulator supporting block 129.

Operating connections are carried from the main drive shaft 100 into the program unit located near the front of the machine. The bearing bracket 117, already mentioned, is formed with a forward extension and a bearing stud 142 carrying an idler gear 143. This gear meshes with the main drive gear 116 and also cooperates with a smaller gear 144 fastened on the shaft 145 leading into the program unit (Figs. 36, 38) to operate ratchet and pawl mechanism therein.

The drive for the printer mechanism is carried through shaft 119 (Fig. 5a) and a gear 147 (Fig. 13) secured thereon near the right hand bearing block 121. The printer mechanism is supported between a pair of main printer side frames 148 and 149 (Fig. 12). These frames rest on top of the core 84 and are bolted against the vertical web 88. Extending outside the left printer frame 148 are a series of gears arranged to be driven by the gear 147. Meshing with gear 147 (Fig. 13) is the smaller gear 151 of a pair of gears 151, 152 attached to a shaft 153 connected to a printer operating ratchet wheel. An idler gear 154 rotates freely on a stud 155 and cooperates with a large clutch operating gear 156 loosely mounted on a shaft 157.

The driving connections also communicate with the print wheel rotating shaft 158 upon which is secured a small gear 159 meshing with a large idler gear 160 loosely mounted on a stud 161 and cooperating with the larger gear 152 of the pair of drive gears already mentioned.

An alphabet zoning ratchet shaft 164 (Fig. 14) extends through the printer side frame 148 (Fig. 13) and has attached thereto, a pinion 163 cooperating with a gear 162 fastened to the driving gear 156 already mentioned.

As already explained, the driving connections to the program device, the printer, the accumulators, and the switch plates shown diagrammatically in Fig. 11, are operated with a uniform motion. Cooperating with these devices are a series of cam contacts operated by cams on the shaft 137 shown in Figs. 11 and 52. The timing of these devices is shown in the diagram or timing chart of Fig. 50.

There are other driving devices the motions of which are not uniform but have accelerated intervals and the timing of the electrical controls associated therewith are shown diagrammatically in the timing chart of Fig. 51. Before discussing the operation of the driving mechanism for feeding and sensing a record card, it is believed well to point out the arrangements of index points on the record cards and the influence such arrangements have on the card feeding drive.

*Perforated record card*

Figure 1A:
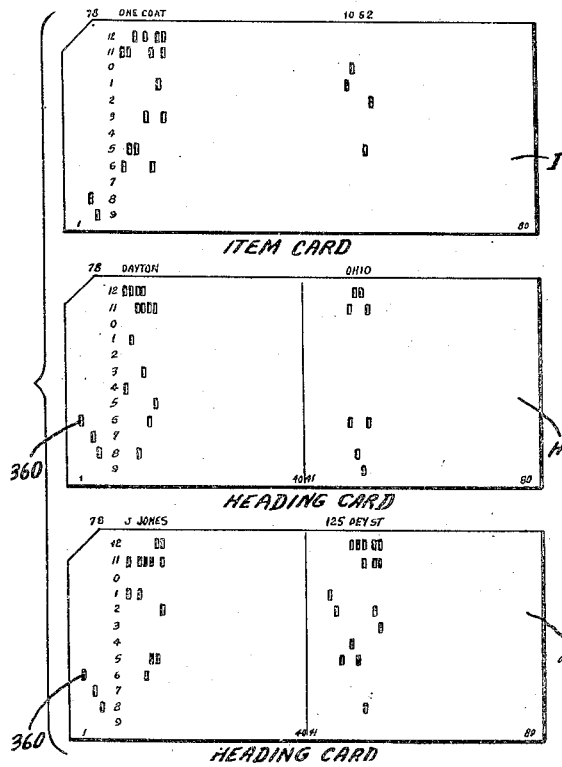
Fig. 1a shows sample item and heading cards.

The three cards illustrated in Fig. 1a are representative of the different cards found in a group relating to an account, a class, or related items having some other common origin. The two lower cards H1C and H2C are heading cards for controlling the printing of alphabet matter, such as name, address, names of merchandise, etc. The top card I is an item card, many of which are associated with each pair of heading cards to carry numerical information regarding number, amount, size, etc. In order that more than one line of alphabet printing may be taken from each heading card, the card is divided into two halves and the sensing mechanism is provided with two print control stations. Usually, as the heading card passes through the sensing means, one line of alphabet printing may be derived from one half the card, and then later, as it passes through the other sensing station, another line of alphabet printing may be recorded from the perforated information appearing in the other half of the card.

Figure 6:
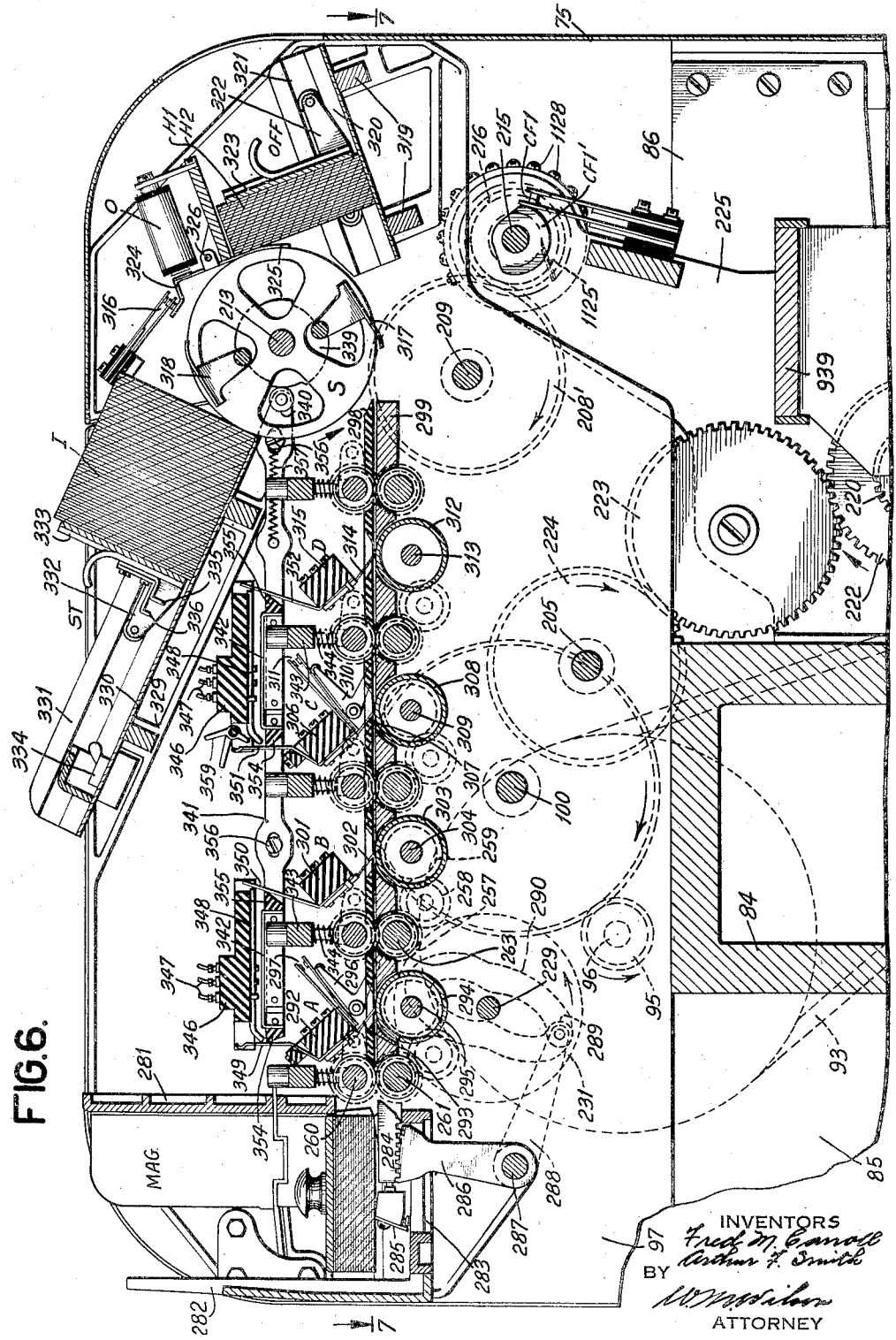
Fig. 6 is a sectional elevation taken along line 6—6 in Fig. 2 and showing the card feeding and sensing devices.

The path followed by the cards in passing through the sensing devices may be observed in Fig. 6. There it is seen that the cards are assembled in a magazine MAG at the left with the heading cards interspersed between related item cards I. The cards are picked off one by one from the bottom of the stack in the magazine and sent across the machine toward the right (i. e. toward the back of the machine when observed from the front) and through a series of four sensing stations lettered A, B, C and D. Each card passes a pair of sensing stations in a single cycle of operation. The brushes at the sensing station A comprise an upper zoning control while the next set of brushes B are devoted to control for printing. The next set of sensing brushes C form another or secondary zoning control, and the sensing devices at D comprise a second printing control station. After leaving the last sensing station D, the cards continue to move toward the right and are picked up successively by a stacker drum S which deposits them in one of two places. The first stacking station OFF is identified as an offset stacking station for receiving the heading cards which are thus segregated from the item cards carried further by the stacking drum S and deposited in the stack ST containing all item cards I. The card handling devices are described more fully hereinafter, reference here being merely for the purpose of describing the path of motion taken by a card when passing through the sensing stations.

The cards are ordinarily picked out of the magazine in evenly timed succession and at intervals adapted to place one card in cooperation with brushes at stations A—B while the advanced card is in a similar state of cooperation with the brushes at stations C—D. An exception is involved in the handling of heading cards in that successive feeding is interrupted as explained hereinafter under "Heading card control."

Referring again to Fig. 1a, it is noted that the cards each contain eighty vertical rows of index positions, each row having twelve index points, ten of which are allotted to digit representations in the form of perforations and two other upper positions 12 and 11 for zone control or special X and R control perforations. This is the usual Hollerith arrangement of index points on a perforated record. As is usual in machines of this kind, the vertical distance between index points is taken as a measure of machine cycle operation. Many machines have a sixteen point cycle, that is, they feed a card uniformly through the twelve vertical index positions under a sensing device and then have four additional and similar time intervals devoted to control operations.

In the present machine, a cycle of twenty points was found necessary to allow sufficient time for operations other than sensing operations. In one operating cycle of the present machine more than half of the operating time is consumed by the passage of the twelve vertically arranged index points on a record card under the sensing devices, and then eight other intervals of time similar to that consumed by the passage of a card from one index point to another are provided for control operations. The feeding motion is accelerated during the last third of each cycle.

In explaining the need for a card feed drive that is not uniform in motion, reference may be made to Fig. 6 wherein by comparison with the twelve points of width of the card it is seen that the card sensing stations A and C cannot be spaced close enough to be within twenty index point positions with respect to one another. In other words, a uniform motion of the cards across the machine under the sensing devices would not conform with the twenty point cycle found desirable for operation of the remainder of the machine. An amount of time greater than twenty intervals would be required to feed a card from station A to station C. Therefore, the card feeding devices are provided with planetary gearing for speeding up the motion of the card and all other cooperating devices during card feeding time other than the perforation sensing time.

The use of planetary gearing is not a provision for getting a net gain of time for each cycle, but rather for a better distribution of the time available; i. e., for getting a comparatively slow card movement while a precise analysis of the index points of the card is taking place, and then, in the last, less critical portion of the cycle, speeding up the card movement.

Notations regarding points of change of speed are noted on Fig. 6a and there given with reference to the leading edge of the card under the brush at station B. The extent of feed with deceleration or slow travel, the extent of acceleration or fast travel, are both shown. While the 11 and 12 index points of the card are passing under the brush at A, the movement is comparatively slow. Directly thereafter the 9 to 0 index points are sensed by the brush at B and that is also done slowly. However, after the 0 point is sensed at B, then the object is to move the card quickly to the right to bring the 11 index point over under the brush at station C. The extent of that last, fast and accelerated part of each cycle of card motion is shown on Fig. 6a.

A card is moved with a uniform but decelerated motion under a pair of sets of sensing brushes while the perforations are controlling printing. Then, immediately after this phase of the operation is ended, the same decelerating set of planetary gears cooperates with the driving mechanism to accelerate the card movement and pass through the space leading to the next pair of sets of brushes which is greater than the space equivalent to eight cycle index point intervals remaining in the operating cycle. The accelerating devices for the card feed mechanism will now be described.

*Card feed driving mechanism*

As already pointed out with reference to Fig. 5a, a gear 115 is fastened to the main driving shaft 100 which is constantly operated in a clockwise direction (Fig. 5) one half revolution for each cycle as long as the motor M is operated. This gear 115 is the driving source of the card feeding, card stacking, group control and cam contact operating devices.

In Figs. 9 and 10, it is seen that this gear 115 meshes with the smaller gear 170 of a pair of joined gears 170, 171 loosely pivoted on a stud 172 projecting from the side of an accelerating lever 173 loosely pivoted on shaft 100. Also carried by lever 173 is a pair of planetary pinions 174, 175 which are connected by being pinned on the same stub shaft 176 running through a ball bearing 177 found in the end of an arm extending from lever 173. The planetary pinion 174 meshes with the gear 171 driven by gear 115 through pinion 170. The driving motion of gear 115 is carried directly through the chain of gearing 170, 171, 174 and 175 to another gear 178 attached to a notched clutch disk 179 loosely mounted on shaft 100. The direction of operation is not maintained so that, as drive gear 115 (Fig. 9) is operated in a clockwise direction, clutch disk 179 (Fig. 8) is turned in a counterclockwise direction.

Adjacent clutch disk 179 (Fig. 10) and separated therefrom by a collar 180, is a large gear 181 carrying a pair of clutch dogs 182, 183 (Fig. 8). These clutch dogs are pivoted at 184 and 185, respectively, and are joined by a link 186. Each is formed with a hook-shaped projection adapted to engage either of the notches 187, 188 formed in disk 179. They are normally prevented from doing so by an armature lever 190 which abuts against an extending arm projecting from either clutch dog. The armature lever 190 is pivoted at 191 on the feed unit frame 98 and formed with an extension 192 cooperating with an armature 193 assembled above the card feed control magnet CF. A spring 194 attached to armature lever 190 tends at all times to rock it in a counterclockwise direction and so operates when the magnet CF is energized. Then, the clutch dogs are allowed to engage the disk 179 and turn gear 181 in a counterclockwise direction (Fig. 8) as driven through the planetary gearing. Armature lever 190 is restored by one of two pins 196 projecting from side of gear 181 and cooperating with an extension 197 formed on the lever and placed in the path of the pins when the clutch connection is made.

Another pair of pins 198 projects from the side of gear 181 opposite to the side bearing pins 196, and they cooperate with a rebound preventing latch 199 also pivoted on center 191 and tensioned by spring 200 to snap into place as the clutch gear reaches the normal position.

The driving operation of gear 181 (Fig. 10) is communicated to a similar gear 201 connected thereto by a hub 202 loosely mounted on shaft 100. A chain of gearing reaching toward the rear of the machine is driven through operation of gear 201 while another assemblage of gearing near the front of the machine is driven by gear 181.

In Fig. 5, it is seen that gear 201 meshes with an idler gear 204 on a shaft 205. Cooperating with gear 204 is a larger gear 206 pivoted on a stud 207 extending from the side frame 98. The drive continues from gear 206 to a meshing gear 208 (Fig. 7) fastened on a shaft 209 carrying a box cam 210 for controlling operation of the planetary gears cooperating with the card feed drive. Gear 208 meshes with another gear 212 fastened to a shaft 213 carrying the stacker drum S shown in Fig. 6.

On the left side of the card feed unit (Fig. 7) the drive continues from shaft 209 to a shaft 215 carrying cams for operating card feed control contacts. On shaft 215 is fastened a gear 216 cooperating with a gear 217 fastened to the end of shaft 209 which is driven through gear 208 as already mentioned.

Another branch of the drive gearing is arranged in a downward progression to drive a pinion 220 (Fig. 5) attached to a shaft 221 provided to operate the group control devices. Also attached to shaft 221 is a gear 222 meshing with an idler 223 cooperating with a third gear 224 fastened to the small gear 204 which is already described as driven by one of the main operating gears 201.

A horizontal train of gearing is driven to operate the picker device and the feed rollers for handling the cards as they first appear leaving the magazine. Cooperating with one of the main card feed gears 181 (Fig. 5) is a small gear 226 loosely mounted on a stud 227 extending from the side frame 98. Also meshing with gear 226 is a gear 228 loosely mounted on a shaft 229 and carrying a clutch disk 230 (Fig. 8). Shaft 229 (Fig. 7) extends across the card feed unit, and to its left end is fastened a box cam 231 for controlling movement of a picker for pushing the cards out of the magazine in succession. On the right end of shaft 229, Figs. 5 and 7, are fixed a pair of cams 218 and 219 for operating a pair of upper brush supply contacts H2 and H1, respectively, to control the card sensing impulses originating at sensing stations A and B. Although gear 228 and clutch disk 230 (Fig. 8) are rotated continuously as long as the motor is operating, shaft 229, cams 218 and 219, the connected gearing and the box cam for operating the card moving devices to issue a card out of the magazine, are operated selectively under control of a magnet H which is effective to release a pair of clutch dogs 233 and 234 pivoted at 235 and 236 upon a disk 237 (Fig. 7) attached to shaft 229. The clutch dogs 233 and 234 are shown engaged with disk 230 (Fig. 8) as they are normally when card feeding is operated successively. However, there are times when a heading card is to be held up before the sensing devices while a preceding card is advanced. Then the heading card is sensed twice for successive printing from the same card.

The operation of the clutch devices connected with shaft 229 may be followed further with reference to Fig. 8 by noting that the dogs 233, 234 are connected by a link 240 and both are formed with extensions cooperating with a release lever 241 pivoted at 242. Clutch release lever 241 has a horizontal arm normally abutting against the lower end of armature 243 pivoted at 244 and operated by the hopper control magnet H. A spring 245 tends to rock the armature 243 away from magnet H to hold lever 241 cocked in a counterclockwise direction to release the clutch dogs. However, when the magnet is energized, the armature is rocked in a clockwise direction, releasing lever 241 for operation under control of spring 246 tending to turn it in a clockwise direction and move a vertical arm thereon in the path of the extensions on the dogs, so that they are rocked about pivots 235 and 236 and disengaged from the notched disk 230.

After a cycle of operation wherein the clutch is disengaged, a cam 247 attached to idler gear 226 goes into play to operate a long arm 239 on clutch release lever 241, so that the lever is rocked back in a counterclockwise direction to release the clutch dogs for normal engagement with the card magazine drive.

A rebound locking arm 248 is pivoted on the armature center 244 and disposed in the path of a pair of pins 249 extending from the side of gear 228. Spring 250 maintains the latch 248 in operating position so that, after the pin passes the front end of lever 248, it is prevented from turning backwards in a clockwise direction and the card feeding devices connected with shaft 229 are held in a normal position. The picker and other feeding parts in Figs. 5 and 6 are shown in a partly operated position.

Whenever the clutch release lever 241 is tripped by an operation of magnet H to suspend card issuance, a pair of contacts 251 is allowed to close by movement of an insulation block 252 mounted on the under side of the release lever 241. When the lever is restored, the contacts 251 are opened but, as soon as the lever is released, the contacts are allowed to close. They control contact switching attending heading card sensing as explained hereinafter. Other hopper clutch contacts 208c are assembled below contacts 251 and also operated by clutch lever 241 but, since they are normally closed, they are opened when contacts 251 close. Contacts 208c are used for heading card control to suspend group control functions as noted later.

Before going further into the explanation of the manner of issuing the cards out of the magazine and across the sensing devices, it is believed well to point out how the drive gearing already mentioned is accelerated for a portion of its cycle of operation. Referring to Fig. 5, it is observed that the box cam 210, already mentioned, is driven in a clockwise direction and is formed with a cam groove 252 into which there protrudes a roller 253 on one arm of a bell crank 254 pivoted at 255. The lower end of this bell crank 254 is pivotally attached to a link 256, the other end of which is articulated on the planetary gear carrying arm 173 (Fig. 9). These connections serve to move the gearing 170, 171, 174, 175 with respect to gears 115 and 178, so that instead of direct 1:1 ratio of operation between the driver 115 to the driven gear 178, there is additional movement imparted when the gear carrier 173 moves in a counterclockwise direction (Fig. 9) with respect to the driving gear 115.

The cam groove 252 (Fig. 5) is seen to have a pair of sharply curved lobes, each of which serves to oscillate the bell crank 254 up and down for each cycle as the box cam 210 rotates in a clockwise direction. In the first part of the motion of the cam, the bell crank is rocked in a counterclockwise direction and the planetary gear carrier 173 is also moved in a counterclockwise direction to advance the gearing and accelerate the movement at a time when the card is being brought to the sensing station. Then the connected planetary gears are shifted around the moving driving gear 115 and serve to speed up the operation of the gear 178 connected to the clutch disk. Through the clutch this accelerated motion is imparted to all the chains of gearing mentioned hereinbefore. In other words, the various gear trains deriving their motion from gears 181 and 201 (Fig. 10) are operated through a portion of the cycle in an accelerated manner and then later have a retarded movement as the planetary gears are restored. Deceleration is uniform and the drive gears are proportioned to compensate for it.

After one-half cycle (one quarter revolution of cam 210 (Fig. 5)), the other lobe of the cam cooperates with the bell crank 254 and it pushes arm 173 in a clockwise direction. The planetary gears in moving clockwise (Fig. 9) have a decelerating effect on clutch gear 178 at a time when cards are being analyzed at stations B and D, but the retarding movement is uniform and compensated.

Gears 201 and 206 (Fig. 5) cooperate with six pairs of pinions for rotating the card feeding rollers cooperating directly with the card. Gear 201 operates in a counterclockwise direction and turns a pinion 275 in a clockwise direction to move the card toward the right. Meshing with pinion 275 is a similar pinion 274 on the opposite side of the card path. This cooperating pair of pinions is mounted on shafts 264 and 265 passing through the card feed side frames.

Two other pairs of card feed rollers are operated by the gear 206. The one pair of gears 276, 277 are fastened on shafts 266 and 267, and the lower gear 277 meshes with the driver 206. In a similar fashion shafts 268 and 269 carry the last set of feed rollers and pinions 278 and 279 and are driven by a gear 206. The gear 228 loosely mounted on shaft 229 near the magazine cooperates with two pairs of feed rollers to carry the cards along as they leave the magazine. The first pair of shafts 260, 261 carry pinions 270, 271, the latter meshing with the drive gear 228. In a similar fashion, shafts 262, 263 are rotated by pinions 272, 273 thereon cooperating with the drive gear 228.

The cards are issued out of the magazine (Fig. 6) by means of picker devices operated selectively under control of the clutch devices and magnet H. The magazine is built up with a wall 281 fastened between the card feed unit side frames 97 and 98. Opposite to wall 281 is a pair of vertical card guides 282 (Fig. 7) fastened to a base plate 283 which is slotted to carry a pair of picker slides 284. These slides 284 are mounted directly beneath the table upon which the cards rest in the magazines, and each carries a blade 285 which extends above the card supporting surface far enough to engage the edge of the bottom card when the picker slide is moved to the extreme left position as viewed in Fig. 6.

The bottoms of the picker slides 284 are provided with rack teeth with which there meshes a pair of sectors 286 fastened to a shaft 287 carried in the feed unit side frames. Also attached to shaft 287 and extending outside the left side frame 97 (Fig. 7) is an operating arm 288 carrying a roller 289 fitted within the cam groove 290 cut into the box cam 231. As already explained, cam 231 is attached to the shaft 299 which rotates at all times except when magnet H is energized to disengage the clutch cooperating with shaft 229. The cam groove 290 is proportioned with a double lobe because the connections are operated through a half revolution for each cycle of operation of the machine.

When the cam is operated, the operating arm 288 is lifted rapidly and the picker slide 284 is moved toward the left, Fig. 6, to catch the forward edge of the bottom card. Directly thereafter, the cam groove reverses the motion of the picker oscillating parts and, with a diminished speed of operation, the slide 284 is moved toward the right to carry the bottom card into the first set of card feeding rollers carried by the shafts 260 and 261.

After the card is engaged by the first set of rollers, it is carried across the machine from left to right (Fig. 6) from one set of rollers to the other and cooperating successively with the four sensing stations A, B, C and D. At the first sensing station A, an insulation bar 292 carries a set of downwardly projecting sensing brushes 293 cooperating with a contact roller 294 fastened to a shaft 295. While the card is in cooperation with brushes 293, it rocks a card lever 296 cooperating with a pair of card lever contacts 297 which are closed as long as a card is at the sensing station A. The card is confined to a straight line direction of motion between the various sets of rollers by a pair of slotted plates 298 and 299 extending along the card path on both sides of the line of contact between the upper and lower feed rollers.

After the card passes under the first set of brushes 293, it is carried along by the rollers 262, 263 to the sensing station B wherein a block 301 carries a set of brushes 302 cooperating with a contact roller 303 fastened to shaft 304. The card is shifted further to the left by rollers 264, 265 to station C wherein a carrying block 306 forms a mounting for a set of brushes 307 cooperating with a contact roller 308 on a shaft 309. At this station another card lever 310 is pivoted in the path of the card and, when operated by the card, closes a second pair of card lever contacts 311.

The final sensing station D is reached when the card is advanced by the feed rollers 266, 267, and there the card passes over a contact roller 312 mounted on a shaft 313. Cooperating with contact roller 312 is a set of brushes 314 fastened to an insulation block 315. After passing the last brush station D, the card is carried into the stacker S by means of the feed rollers 268, 269. As the card projects beyond plates 298, 299, it is engaged by one of a pair of grippers 317, 318 pivotally mounted on the stacker drum S. This drum is rotated with shaft 213 in a counterclockwise direction to deposit a card in one of the two card receivers or stackers.

The first stacker is the one for receiving the heading cards, and it is supported on a frame comprising two rectangular bars 319 fastened across the feed unit side frames. Secured above the frame 319 is a base plate 320 formed with a horizontal slot 321, which carries a carriage 322 with a cross plate 323 pressing the deposited cards against the stacker drum S. The cards normally pass this first offset stacking station OFF because the majority of the cards are item cards which are supposed to go to the second stacker. However, when a magnet O is operated, its armature 324 places an elongated deflector 325 in the path of the card as it is carried by one of the grippers 317, 318. When magnet O is operated, it is a sign that the card is a heading card and is supposed to be deposited in the first stacking group. Then, the armature 324 is rocked in a clockwise direction about pivot 326 and the deflector 325 protrudes within the outer periphery of drum S and engages the forward edge of the heading card and presses it back against the group of cards in front of plate 323 as the stacker clip passes and continues to rotate in a counterclockwise direction.

Every time the offset stacker magnet O (Fig. 6) is operated to deposit a heading card in stacker OFF, an upper extension on armature 324 presses a pair of contacts 316 into a closed position. The control exercised by contacts 316 is explained with reference to the wiring diagram.

The stacker ST for the item cards I is held on a frame 329 fastened at an angle between the feed unit side frames. On frame 329 is a base plate 330 and a pair of grooved side walls 331 between which the cards are assembled. Along the grooved side walls there rides a carriage 332 to which is attached a pressure plate 333 for holding the cards upright. A switch 334 is mounted on the base plate 330 near the upper end and in alignment with a rearward projection 335 on the pressure plate 333. As the stacker ST becomes filled, plate 333 and projection 335 move to the left (Fig. 6) against switch 334 to operate it and stop the machine. A second, shorter extension 336 is placed on plate 333 to throw the knob of switch 334 to the "on" position when the plate is moved to the right after the stacked I cards are removed.

The four contact rollers 294, 303, 308 and 312 are driven by gearing located near the left side frame 97 (Fig. 7) of the feed unit. Attached to each of the lower feed rollers 261, 263, 265 and 267 is a pinion 257 in mesh with an idler pinion 258 which drives a contact roller through a pinion 259 fastened thereon. Because of the proportions of the drive gearing, the contact rollers are moved in synchronism with passage of the card through the sensing stations.

Attached to the right end of shaft 229, Fig. 7, are the two cams 218 and 219 for operating the pair of contacts H2 and H1 in timed relation with the operation of the picker. The contacts are mounted on, but insulated from, an extension block 211 fastened to frame 98.

Alternate brush station connection

Provisions are made to cut out the zoning and digit impulses at proper times during a card reading cycle to prevent back circuits. The sensing devices (Fig. 6) are provided with impulse alternating switches operated by a pair of widely spaced cams 339 fastened on stacker shaft 213 directly inside the two feed unit side frames. Cooperating with each cam 339 is a roller 340 on a slide 341. There are two such slides 341, one on each side of the card feed unit, and they are joined by a pair of bails 342 elevated over two cross bars 343 which carry spring pressure pins 344 bearing down on feed roll shafts 262 and 266.

Directly above each bail 342 is a stationary insulation bar 346 with wire terminals 347 connected to elongated contact strips 348 fastened to the bottom of the bar. The ends of each strip 348 are in the path of flexible contact blades 349 and 350 extending from insulation bars 292 and 301, whereon they are electrically connected to a zoning brush 293 and a digit or print brush 302, respectively. Similar sets of flexible blades 351 and 352 extend from the bars 306 and 315 holding zone brushes 307 and print brushes 314.

The upper ends of blades 349 and 350 are moved alternately into and out of contact with the strips 348 by means of insulation blocks 354 and 355 fastened to bails 342 on slides 341. Each slide is movable horizontally on two screw and slot mountings 356, and a spring 357 tends to hold the slide roller 340 toward the right against cam 339. The cam has three different levels or shoulders, and roller 340 normally rides on the middle level with the slide 341 in an intermediate position wherein it holds all flexible blades out of contact and separated from contact strips 348. Therefore, the circuits to all sensing brushes are broken at the beginning of an operating cycle.

As soon as a cycle of operation is started, cam 339 moves counterclockwise, roller 340 shifts to the right on to a lower level, and blocks 354 also move to the right and allow blades 349 and 351 to bend into contact with strips 348. This serves to make brushes 293 and 307 effective at the time when the zoning perforation positions 12 and 11 on the cards (Fig. 1a) are passing thereunder. At the same time, blades 350 and 352 (Fig. 6) are bent further to the right, away from strips 348 so that print brushes 302 and 314 are ineffective during zoning.

Immediately after zoning is completed, and as the digit index points on the cards approach the print brushes, cam 339 pushes the slide 341 toward the left, past the intermediate position, and further, with roller 340 on the high level or outer periphery of the cam. This causes a reversal of the position of the flexible blades so that the zoning blades 349 and 351 are moved out of contact with strips 348, as the digit blades 350 and 352 are allowed to move into contact with the strips. Then brushes 302 and 314 are effective to convey impulses through contact rollers 303 and 312 whenever digit representing perforations appear between the brushes and the rollers.

Zoning impulse elimination

There are times when it is desired to prevent zoning impulses from emanating at sensing station C. For example, it may be desired to put X perforations in the card at zone positions and read them at some station other than station C. For such impulse eliminating purposes, a set of bell cranks 359 are pivoted on bar 346 above station C. Each bell crank cooperates with the upper end of a related flexible blade 351. The horizontal arm of the crank cams the blade away from strip 348 and then the curved end of the blade retains the crank 359 in the manipulated position. When the crank is grasped and moved back to the position shown, normal zoning control is exercised.

Heading card control

As is usual in record controlled accounting, the cards are arranged in related groups so that accumulation and recording of a common kind of information can take place successively. At the head of each group (i. e. at the bottom of the group of cards in the magazine) are placed heading cards H1C and H2C, Fig. 1a, for recording lines of name, address and other identifying alphabetic data at the top of bills, invoices, etc. These cards are identified by the placement of a special perforation 360 in the "6" index point of the first column. The eighty column capacity of each heading card is divided equally into two parts for separate control to print two lines. One line of print is controlled through the print brushes at station B (Fig. 6), and the second line of print is controlled by the brushes of station D. Thus, it is possible with two heading cards to control four lines of heading print. In order to produce such multiple line printing, the heading cards cause suspension of picker operation in a manner about to be described.

As the first heading card H1C (Fig. 1a) of a group passes under the first set of zoning brushes 293 (Fig. 6), the brush of the first column senses special perforation 360. This brush is wired in series with magnet H (Fig. 5), controlling the operation of the picker mechanism and the feed rollers on both sides of brushes 293. The appearance of the first heading card and energization of magnet H causes declutching of the picker feed and card advancing rollers 262, 263, so that the heading card is stopped before entering the first print station B (Fig. 6), while the last item card of the preceding group passes through the print station D to control item printing. On the following card cycle (which may be many machine cycles thereafter depending upon the program initiated by the group change), printing is controlled from the left half of the first heading card as it passes under the print brushes 302.

When magnet H was energized to stop the picker, a cooperating contact 251 was closed to call into operation a brush switch (Fig. 44) for making ineffective print brushes 314 (Fig. 6), while brushes 302 remain effectively connected to the printer. The operation of the brush switch and wiring connections thereto are described more fully hereinafter with reference to the wiring diagram.

After the first heading card controls printing from the first print brushes 302, it continues on past the set of print brushes 314 for the purpose of printing another line under control of the right half of the card. The left side of the card is not effective for printing because contacts are opened in series with half the brushes 314 to prevent reprinting the heading information in columns 2 to 40.

The second heading card H2C is detected and stops short of the first print brushes 302 while the first heading card passes under the second set of print brushes. After printing from the first heading card is completed, the second card is started through the first print brushes 302 and the first item card I follows directly thereafter. As the item card passes under the second set of print brushes (i. e. brushes 314), the brushes in all columns 2 to 80 are effective to control printing.

Brush 314 in column 1 is reserved to sense perforations 360 (Fig. 1a) and control energization of the offset stacker magnet O (Fig. 6), so that the heading cards are separated from the item cards. In column 1 of the zone station C is a brush 307 in series with a heading relay for disabling the group control circuits and preventing the three advanced pairs of card feeding rollers from stopping while heading cards are moving therethrough.

In Fig. 44 is shown the brush switch bar controls for reversing contacts 361 and 362 to print under control of the first set of print brushes 302 and a heading card. Normally, the contacts 361 are closed in series with the ordinary print brushes 314 for recording item card data.

The switch plate shown in Fig. 44 is one of a series of five somewhat similar mechanisms all hung on plates 364 (Fig. 11) fastened at the lower rear part of the machine. An angle iron 365 is fastened under extension 129 and the tops of plates 364 are screwed thereto. The bottom of plates 364 are spaced from and secured to the main frame web 87 by means of a channel 366. When assembled on the frame, the switches are brought into cooperation with cams on the operating shaft 137.

The source of control for the switch of Fig. 44 is an impulse sent upon detection of a heading card at the first zoning station. Special perforation 360 (Fig. 1a) is sensed and a relay is activated to control operation of a magnet BSW, Fig. 44, for tripping the switch. The impulse is sent late in the cycle while a cam 363 is supporting the switch parts and the sensed heading card is stopped before the first set of print brushes B and as the preceding card moves past the second print station D for printing purposes. As the cycle ends, contacts 361, 362 are shifted in readiness for print control from station B through which the heading card passes on the next card cycle.

The sets of three blades 368, 369 and 370 (Fig. 44) are mounted between insulation pieces 371 fastened to the side of plate 364. The ends of the center blades 369 fit into notches cut in the side of a vertical insulation bar 374 which is slotted to slide on stud 375 and articulated at 376 to an arm of a restoring lever 377 pivoted at 378. Extending from the side of bar 374 is a shoulder 380 resting on a latch 381 pivoted at 382. Spring 383 pulls down on bar 374 and holds it in contact with the latch which, in turn, is rocked by a spring 384 to hold the latch in an abutting position with respect to the upper end of an armature lever 385 pivoted at 386.

When magnet BSW is energized, it rocks lever 385 to the left and releases latch 381 to free bar 374 for downward movement as urged by spring 383. At the time the magnet is operated, the high point on cam 363 is under a roller 388 on lever 377 supporting bar 374 so that it does not drop too suddenly. As the bar is allowed to descend by the gradual clockwise rocking of lever 377, contacts 361 are opened and contacts 362 close.

Bar 374 and the contacts are restored upward at the end of the next card cycle by the counterclockwise movement of lever 377 which is rocked by cam 363 turning one complete revolution in a clockwise direction for each card cycle.

Latch 381 and lever 385 are restored by other means in the form of a pendent member 389 pivoted at 390 and pulled out of operation by a spring 391. Cooperating with member 389 is the lower end of a bell crank 392 pivoted at 378 and having an offset lug 393 in the path of a pin 394 on cam 363. Directly after the cam 363 cooperates with roller 388 to lift bar 374, pin 394 strikes crank 392, rocking it counterclockwise, whereupon a stud 395 pushes member 389 to the right. Member 389 then pushes latch 381 under shoulder 380 and rocks lever 385 under the latch so that all parts are returned to the home position.

Bar 374 also operates other pairs of contacts 396, 397, 398, 399 and 400, one blade of each pair projecting into the bar and lowered thereby whenever magnet BSW is energized. Contacts 399 are normally closed and they sustain group control circuits until a heading card is detected. The other four normally open contacts exercise various controls better explained hereinafter with reference to the wiring diagram.

Numeral and alphabet printing

Reference to Figs. 1, 2 and 5a reveals that the printer PR occupies the upper right hand part of the machine. Behind it the platen P carries the record sheet R which is spaced by an automatic carriage unit AC.

The two main printer side frames 148 and 149 (Fig. 12) are fastened at 401 and 402 (Figs. 13 and 14), to the center web 88 of the main frame. The bottoms of the side frames rest on the central core 84 at 403.

As already explained earlier in this specification, the printer operating connections derive their motion from shaft 119 (Fig. 13) and gearing connected thereto. The train of gearing 147, 151, 152, 160 and 159 serves to turn a shaft 158 (Fig. 14) upon which are mounted separate driving gears 405 for rotating the set of one hundred printing wheels 406 which are closely aligned across the unit near the platen P before which an ink ribbon 407 is drawn. Shaft 158 is rotated in a clockwise direction, two revolutions for each cycle of operation of the machine. Since the teeth of each gear 405 mesh in the spaces between the type faces on the equally sized print wheel 406, the wheel is also constantly rotated in a counterclockwise direction at a rate of two complete revolutions for each cycle of machine operation. The motion of the type wheel 406 is synchronized with the feed of the card and total reading so that an accurate selection of the proper type face is made while the type wheel operator is in motion.

Gears 405 are not directly attached to shaft 158, but each one is cushioned thereon to absorb the shock attending printer operation. Within each gear 405 is a collar 409 feather-pinned to shaft 158. The collar is formed with two slanted shoulders against which press the ends of compression springs 410, the other ends of which are held against the sides of notches in gear 405. A pin and slot connection 411 between the gear and collar limits the extent of resilient relative motion. Since the shaft and collar are rotated in a clockwise direction, gears 158 are driven through springs 410.

Each print wheel 406 is formed with forty type faces arranged as shown diagrammatically in Fig. 15a. There it is noted that three special letter type are interspersed between every pair of the ten digit type faces. In addition to the ten digit and twenty-six alphabet characters, four special characters, @, %, - and # are also provided.

The arrangement of characters may be noted by reference to Fig. 51a where it is seen that the ten digit type faces are selected directly by single impulses while the other thirty type characters are selected by combinations of impulses involving the zoning of the type wheel into one of three different intermediate positions according to combinations of "11" and "12" perforations sensed singly or in combination. In Fig. 51a the characters are arranged in four rows, the top row comprising the digits selected directly by a single digit impulse, the next row showing those characters selected by one of the ten digit impulses in combination with "11" and "12" impulses. The third row of characters are those selected by a digit impulse in combination with a "12" impulse and the last row represents the characters selected when a "11" impulse is detected along with any one of the ten digit impulses.

As shown diagrammatically in Fig. 51a, there is a lag of slightly more than one cycle point between the time that a digit impulse is detected and the time that the impression is made. This is caused by the manner of operation involving the rolling of the type wheel around its drive in a manner about to be described.

Referring to Figs. 12 and 14, it is seen that each of the one hundred type wheels 406 is loosely pivoted at 413 on an individual operating lever 414 fulcrumed at 415 on a mounting block 416 fastened between the main printer side frames. These levers 414 are normally drawn towards the left by individual springs 417 attached to the type lever and to a spring holder 418 secured to a stationary bar 419 fastened between the side frames. The stop bar 419 is provided with a cushion 420 against which an extension on lever 414 is drawn by spring 417 to hold the lever in a normal position.

The upper ends of levers 414 are guided by a comb so that, when it is oscillated, the print wheels are carried in accurate registry to print properly spaced across platen P. Cooperating with the upwardly extending spring holding portion of lever 414 is a comb 422 extending across the printer unit. Another comb 423 is formed with a curved base and attached to the side frames in a position to guide levers 414 in a direction which is substantially radial of the center 413 of the type wheels as they are pivoted about center 415. A third guide for levers 414 is provided in the form of a comb 424 secured to an angle iron 425 extending across the unit between the printer side frames. This last mentioned guide cooperates with the center of the levers because they are necessarily made of thin stock and subject to distortion at the center point if not supported as shown.

Levers 414 are rocked in a clockwise direction to throw the print wheels 406 against the platen by a train of connections reaching down to the power roller or operating ratchet 153. Normally disconnected from the ratchet is a shuttle slide 427 with a foot 428 adapted to be placed in the path of teeth on ratchet 153 which is constantly rotating in a clockwise direction. The upper end of shuttle 427 is guided by a pin and slot connection 429, the pin being on the end of a zoning link 430. On the side of the shuttle 427 are cut four operating shoulders 431, 432, 433, 434, the upper one of which is normally effective for operation in digit printing. Cooperating with shoulder 431 is a left end of a lever 435, the other end of which is pivoted at 436 to the typewheel carrier 414. Articulated at 437 on lever 435 is a tripping latch 438 formed with a shoulder 439 engaging an extension 440 on type carrier lever 414. The linkage already described is so arranged that when foot 428 of shuttle 427 is placed in the path of operating ratchet 153, it is moved upward and carries lever 435 along therewith, rocking it in a clockwise direction about pivot 436 and pushing upward on extension 440 to rock lever 414 in a clockwise direction about center 415; and pressing typewheel 406 against platen P. Since this is taking place while the typewheel driving gear 405 is turning in a clockwise direction, the print wheels 406 will have imparted thereto two kinds of motion, a counterclockwise direction of motion imparted by driving gear 405 and a clockwise component of motion caused by the planetary movement of the wheel about the driving gear at a radius from center 415. The parts are so proportioned, and the speed of operation of shuttle 427 is so regulated, that the two opposite motions influencing the typewheels 406 are neutralized, so that when the typewheels strike the platen, it is stationary with respect thereto. Therefore, although printing is effected from a constantly operating type member, the impressions are not blurred, because the operating and striking motions of the type member are merged to cause momentary fixation of the striking face at the time of impact.

Tripping latch 438 is held in contact with the extension 440 by spring 441 which is attached to a clip pivoted on lever 435. Abutting the lower edge of this clip 442 is an arm 443 extending to the left of the pivot of lever 414. The connected linkage of the parts 435, 438 is carried between arm 443 and extension 440 so that they are restored when the related lever 414 is restored by spring 417.

The latches 438 and the levers 435 pivoted thereon are held in accurate lateral positions by guiding means provided at both ends of the latches. The upper ends of the hundred latches 438 are guided by a comb 445 secured to the angle iron 425. Another comb 446 engages the sides of the lower ends of latches 438 so that all vertical movements are restricted. The straight upward movement of latch 438 serves to throw it free from the arcuate path of extension 440 and prevent repetitious impressions. Lever 435 and articulated latch 438 drop down and shoulder 439 snaps under extension 440 to restore the parts.

At this point it may be noted that the construction is arranged for quick replacement of typewheels. In Fig. 14 it is seen that the typewheel carrying parts comprising levers 414, 435 and 438 are held in the machine at only one point, that is by shaft 415 in addition to the attachments involving springs 417. Since the typewheel rocking members are separable from the striking mechanism, including the shuttle 427, they may be removed in an upward direction without disturbing the zoning and cipher control mechanisms held on the separate plates 448 situated at the center of the printer unit. Therefore, by merely unhooking springs 417 and withdrawing shaft 415 one or more of the typewheel carriers may be removed, after the ribbon mechanism is removed, to substitute another typewheel with different characters.

Before describing in detail the striking control mechanisms mounted on plates 448, it is believed well to explain how these plates are constructed and held in place across the machine. There are one hundred units of control mechanism, each held in one removable plate such as plate 448. A pair of notched bars 449 and 450 extend across the printer unit between side frames 148, 149 (Fig. 12). Since the notches in bars 449, 450 are aligned and parallel to each other, plates 448 may be slipped into and out of contact therewith. Access is had when the door opening 79 is lowered on case 75.

When a printer control mechanism is slipped into place between bars 449 and 450, it is held in place by a pair of retaining strips 451, 452 secured across the front of the bars and overlapping the edges of the plates 448. A similar pair of retaining strips are held fixed behind bars 449, 450 to act as stops for the insertion of the various denominational order plates in a printing unit. The rear edges of the thin plates 448 are guided and supported by a comb 454 fastened to a rectangular bar 455 extending across the unit. The plates are further supported by another comb 456 attached to the rigid supporting bar 457. Therefore, when the separate denominational printer control mechanisms and plates 448 are assembled in operating positions, they are located and supported by the notches in bars 449, 450 and also held rigid by combs 454, 456. Before pointing out the nature of the mechanisms held by plates 448, it is believed well to describe the manner in which the printer control magnets PM1—PM100 are suspended at the bottom of the printing unit.

As shown in Figs. 12 and 14, the printer control magnets are arranged in six tiers with seventeen magnets extending across the printer unit in the four upper tiers and sixteen magnets in each of the two lower tiers. In Fig. 12 it is seen that the magnets are staggered with relation to a vertical line so that the hundred operating controls may be compressed in the space available. Each tier of magnets is assembled on a separate one of six angular shaped members 460, 461, 462, 463, 464, 465. Both ends of each of these angle members are attached by screws to a pair of vertical side plates 467, 468 and these side plates in turn are attached to angles 469, 470 attached to the bottoms of the printer side frames 148, 149. The construction is such that the entire magnet holding frame may be removed as a unit by disconnecting it beneath the main side frames where it is normally held by screws fastened upward through angles 469, 470. Cooperating with each of the printer control magnets (Fig. 14) is an armature 472 pivoted on the top of the horizontal lug of the angle irons to which the magnets are secured. Attached to each of the armatures is an extending arm 473 supporting the lower end of a push rod 474 extending upwardly through a perforated guiding angle 475 attached to a plate 476 extending across the magnet unit and attached to the side plates 467, 468. Near the top of the magnet unit is secured a plate 477 holding a raised perforated angle 478 through which the push rods extend and terminate in enlarged operating heads 479. Although one hundred such push rods 474 pass through the upper guiding angle 478, the other guiding angles 475 act only to guide the push rods related to the respective tiers of magnets. The weight of a rod 474 acts to normally retract its armature 472 and press the extension 473 against a stop 480 extending from the bottom of the horizontal lug of the magnet support 460. Whenever a magnet is energized, the related armature 472 is rocked in a counterclockwise direction (Fig. 14) and the extension 473 is lifted to raise rod 474 and operate the print controlling mechanism in a manner about to be described.

The simplest form of control is the one wherein a single digit impulse controls the tripping of the print mechanism to cause the printing of a numerical character. During the time that the digit perforations in a card are passing under the print control sensing brushes, a print controlling bail 482 (Fig. 15) is rocked in a counterclockwise direction to permit tripping of the print control mechanism. While zoning is taking place this bail is held up to lock the print release devices so that although the printing control mechanism is adjusted, it is not tripped to effect a printing operation. The bail 482 is fastened to shaft 483 (Fig. 13) which extends beyond the left printer side frame and has attached thereto an operating bell crank 484. Carried on one end of crank 484 is an operating roller 485 cooperating with a cam 486 attached to shaft 164, the operation of which is already mentioned. A spring 487 tends to rock crank 484 in a clockwise direction and maintains cooperation between the roller and the cam. Two concentric portions are formed on cam 486, the upper one normally cooperating with roller 485 to hold crank 484 in a counterclockwise direction. When the crank is so held, the bail 482 (Fig. 15) is held in a locking position as shown. As the machine operates, cam 486 (Fig. 13) is rotated in a clockwise direction and roller 485 drops from the upper level to the lower level on cam 486 after the zoning index points have passed. This causes crank 484 to rock in a clockwise direction (counterclockwise when viewed in Fig. 15) so that bail 482 is lowered away from the shuttle control levers 489, permitting movement of the shuttles 427 towards the right into engagement with the operating ratchet 153 as controlled by the print magnets.

Whenever a print magnet is energized by a digit impulse, the related push rod 474 (Fig. 15) is raised and the upper end 479 operates a related magnet lever 490. This lever is pivoted at 491 on the side of plate 448 and is formed with an operating arm 492 cooperating with the lower end of a latch 493 pivoted at 494. The latch has a shoulder 495 overlying a tab 496 extending from the control lever 489 which is pivoted at 497. The upper end of control lever 489 is formed with a pair of extensions 498 embracing the sides of shuttle 427 which is free to slide vertically between said extensions. A spring 499 is drawn between latch 493 and control lever 489 so that the lever tends to rock in a clockwise direction about pivot 497, but it is normally prevented from doing so by the shoulder 495 on the latch. However, when a magnet is energized with a digit impulse (at which time bail 482 is lowered) magnet lever 490 is rocked in a clockwise direction and latch 493 is rocked counterclockwise to release control lever 489 and allow movement of shuttle 427 over to the right into engagement with the ratchet wheel 153. The timing of the mechanism is so synchronized that when the digit impulse is directed through the magnet, the corresponding type face on the typewheel is approaching the printing line. Therefore, the tripping movement of the shuttle 427 in an upward direction by operation of ratchet 153, causes striking of the proper type against the platen (Fig. 14) by the rocking movement of the lever 414.

Shuttle 427 (Fig. 15) is held flat against its related plate 448 by a pair of clips 501 and 502 attached to the side of the plate. These clips serve to hold the shuttle into cooperation with pin 429 and in engagement with extensions 498 at the top of control lever 489. It will be observed that during digit printing control, the tripping lever 435 (Fig. 15) is in cooperation with the top shoulder 431 on the shuttle 427. The other three shoulders 432, 433 and 434 come into action when zoning is used for the control of alphabet printing. The printing control parts including lever 490, latch 493 are guided further by studs 504, 505 the enlarged heads of which overlap the flat parts assembled directly against the side of plate 448.

The devices tripped to control printing are restored directly after the action caused by the controlling impulse. Magnet lever 490 is formed with a rearwardly projecting arm 506 normally out of the path of the teeth on the restoring power shaft 164. However, when a magnet is energized and the related lever 490 is rocked in a clockwise direction, arm 506 is dropped into the path of the teeth on shaft 164 and it acts directly thereafter by means of a cam tooth thereon to rock the lever in a counterclockwise direction and move arm 492 towards the left, allowing latch 493 to drop behind the tab 496 on control lever 489 as soon as the shuttle 427 swings back into the home position. Control lever 489 and the cooperating shuttle 427 are restored in a positive manner by the action of bail 482 which rocks in a clockwise direction and swings lever 489 back into the home position in a counterclockwise direction.

The foregoing section of the description of the printing mechanism deals with the control of digit printing. Other mechanisms are provided to zone the printing mechanism so that alphabet characters may be impressed. These devices are designed to pull the link 430 towards the left so that one or the other of the three shoulders 432, 433, 434 cooperate with the end of tripping lever 435 to control alphabet printing. The link 430 has three different degrees of movement, causing movement of upper end of the shuttle 427 towards the left to present one of the three shoulders, thus causing a delay in printer operation resulting in zone selection of one of the three characters interspersed between regular printing positions occupied by digit type faces.

The train of control mechanisms is set in action to vary the shuttle position according to the detection of one or both zoning impulses set up by perforations occupying the "11," "12" positions on the record card as shown in Fig. 1a. Since these two control positions are sensed by the zoning brushes at station A (Fig. 6) or station C, they are initiated before digit impulses are set up at stations B and D. In other words, as the card is passed through the sensing mechanism, perforations are detected at the "11" and "12" positions in passing through a first sensing station before it reaches station B where the digit impulses are detected in the order 9, 8, 7, etc. In order that three variations in zoning may be had with only two zoning perforations, the mechanism is affected differently according to whether one, or the other, or both, zone perforations are detected.

At the time that the zoning positions are being sensed, bail 482 (Fig. 15) is held in the position shown to prevent shifting of the shuttle and printer operation as a result of zoning control alone. The zoning devices are only set up to have a later influence on the selection of a type face, and the final alphabet type selection awaits initiation of a digit impulse. The blocking action of bail 482 not only prevents movement of the shuttle 427 to an effective position, but it also holds control lever 489 in such a position that latch 493 oscillates idly for zoning control without causing printer operation.

During analysis of the zoning control index points, an "11" perforation is detected before a "12" perforation in the card feeding cycle. Upon the detection of an "11" perforation, the following sequence of operations is caused. The push rod 474 is lifted and swings magnet lever 490 in a clockwise direction. The tab 509 on lever 490 engages a shoulder 510 on the zoning arm 511 articulated at 512 on the end of one arm of a three armed zoning latch 513. This zoning latch is pivoted at 514 on the side of plate 448 and carries a tab 515 normally engaging a shoulder 516 cut into a zoning selector crank 517 pivoted at 518. The horizontal arm of the selector crank 517 is formed with an extending point 519 and a series of four shoulders 520, 521, 522, 523. Cooperating with this point 519 and the adjacent shoulders is an overturned lug 525 at the bottom end of a zoning lever 526 pivoted at 527. Pivoted thereon at 528 is the link 430 already mentioned as having a pin and slot connection 429 with the upper end of shuttle 427. This zoning lever 526 is formed with a rearwardly extending arm 530 in the path of a bail 531 which is rocked in synchronism with the movement of the zoning control positions past the sensing brushes.

At the beginning of the zoning control operation, lever 526 is positioned in the dotted line condition (Fig. 15) wherein lug 525 appears to the right of extending point 519. Then the selector 517 is free to move up and down to place any of the four shoulders 520 to 523 in the path of lug 525 as lever 526 is released by bail 531. At the time an "11" impulse is initiated the lug 525 still remains to the right of the point 519 so that upward rocking of selector crank 517 is possible to bring point 519 above the path of lug 525 so that further clockwise action of lever 526 will cause the lug to engage against shoulder 520 which is the locator for the positioning of the zoning devices as set up by an "11" impulse.

It is believed well to explain further the action caused by an "11" impulse and the positioning of the zoning mechanism as a result thereof. Starting with the motion of the magnet lever 490, it is already explained that it operates to put tab 509 above shoulder 510. As this happens, arm 511 is rocked by spring 532 to catch the shoulder under the tab. When the power shaft 164 engages under extension 506 of lever 490, arm 511 is pulled down, and the connected zoning latch 513 is rocked in a clockwise direction to move tab 515 away from shoulder 516. This action allows the counterclockwise motion of selector 517 as urged by spring 533 and consequent stoppage of the selector when a second shoulder 534 thereon engages tab 515. As the selector so moves, point 519 rises above the path of lug 525 and places shoulder 520 in its path so that when the zoning lever 526 comes to rest it will hold link 430 so that shoulder 434 on shuttle 427 stands below the end of lever 435, thus allowing three spaces and intervals of time before the shuttle becomes effective to trip the train of printing connections.

The zoning control just described is the first of three zoning control conditions, each of which is effective to cause printing of a different one of the three alphabet characters interspersed between the digit numerals as shown in Figs. 15a and 51a. For example, in Fig. 51a, it is noted that following the 9 type face on the printer wheel there follows in order the Z, I and R types. Therefore, when a card is presented containing an "11" perforation in addition to the 9 perforation, the zoning controls are set up as already described to carry the printing wheel around three spaces further than usual so that an R is printed rather than a 9.

The second form of zoning control is selected by means of detection of a "12" impulse alone in the zoning area of a record card. When the "12" impulse is initiated, a train of connections are operated, similar in most respects to the sequence of operations caused by the detection of an "11" impulse, as already pointed out. However, the difference in timing is such that lug 525 has passed above point 519 so that selector 517 is no longer able to swing fully in a counterclockwise direction with the result that, although it is released for counterclockwise motion, it is obstructed by the bottom of lug 525 and allowed to rock to such a limited extent that only shoulder 521 is put in the path of the zoning lever 526. The length of time that the "12" impulse is later than the "11" impulse is sufficient for the lug 525 to pass over the point 519 to cause selective presentation of the shoulder 521. Shoulder 521 is seen to be to the left of shoulder 520 permitting further clockwise movement of zoning lever 526 as urged by spring 536. This results in a longer clockwise stroke of lever 526 and consequent movement of link 430 towards the right to a greater extent than when the "11" perforation control causes the presentation of shoulder 434 under the tripping lever 435. In other words, the shuttle 427 when controlled by "12" impulse is positioned so that shoulder 433 is placed directly under the end of lever 435. Referring to Fig. 51a and the arrangement of characters between the 8 and 9 number type, it is evident that zoning control with a "12" perforation in addition to a "9" perforation would cause the printing of an I.

The third and last variation of zoning control is caused by detection of the two zoning perforations present in the same card column. These perforations cause successive zoning impulses and utilization of the second shoulders 538 and 534 found on arm 511 and selector 517 respectively. Upon the detection of the first or "11" impulse, a sequence of operations is put into effect as already described, with the point 519 rising above the path of lug 525. However, although shoulder 520 stands in the path of the lug 525, it is moved out of the way by operations about to be described, put into effect upon the detection of a second or "12" impulse. This second impulse causes magnet lever 490 to rock a second time in a clockwise direction to lift tab 509 above the first shoulder 510 and place it above the second shoulder 538 on arm 511. Then as power roller 164 operates through its cam teeth, the magnet lever 490 is rocked counterclockwise and arm 511 is pulled down to a secondary position wherein latch 513 is rocked counterclockwise to allow a second escapement of zoning selector 517. This second escapement moves tab 515 out of the path of shoulder 534 so that selector 517 is rocked further in a counterclockwise direction to move shoulder 520 out of the path of lug 525 and put the third zoning shoulder 522 in the path of the lug. Since this shoulder 522 is further to the left than either of the other two shoulders 520, 521, it permits the third degree of movement of the zoning lever 526 and consequent operation of link 430 to move the upper end of shuttle 427 towards the right to place shoulder 432 under the end of tripping lever 435. This last mentioned shoulder allows only one space interval of motion before the shuttle engages and actuates the printing train of connections. There results a third variation of zoning to print a "Z" as evident from Fig. 51a, whenever a "9" perforation is accompanied by both "11" and "12" perforations.

The normal position of the shuttle 427 (Fig. 15) is the one assumed to be operative when printing numerals as described hereinbefore. This is the position wherein shoulder 431 is located beneath the end of tripping lever 435. It is the position retained whenever a digit perforation is alone in a column on a record card. When the column of the card is without zoning perforations, then the parts remain as shown in Fig. 15 without the zoning selector 517 being tripped during oscillation of the zoning lever 526. The result is that lug 525 partakes of its full swing of movement, bringing it to the left against the normally presented shoulder 523 which stops the lever 526 in the position shown, with link 430 pushing the upper end of shuttle 427 over to the right to such an extent that shoulder 431 is presented under the end of tripping lever 435.

Parts of latch 513 and selector crank 517 are guided by the enlarged head of a stud 539 projecting from plate 448. The upper end of zoning lever 526 is also guided by an extension on clip 501.

Restoring means is provided to return the tripped zoning controls to a normal position after printing has been effected. Magnet lever 490 is always restored through the prompt action of the teeth on power roller 164. The zoning arm 511 is restored by a crank 540 operated as an incident to preparation for printing, before printing takes place. It is noted from the position of the parts in Fig. 15 that the print release bail 482 holds the shuttle release lever 489 with the offset shoulder 496 cooperating with one of the arms of restoring crank 540 to rock it in a clockwise direction during zoning so it remains out of direct contact with zoning arm 511, but the connected spring 532 tends to rock the arm into zoning control position. Because bail 482 remains in the position shown during zoning, arm 511 is free to act as a latch and an operator for crank 513 during zoning. However, after the zoning portion of the operation, bail 482 is rocked counterclockwise, and shuttle control lever 489 follows thereafter as urged by spring 499 in a clockwise direction to raise the tab 496 into contact with shoulder 495 in readiness for tripping under control of a digit impulse. This tab 496 serves not only to control the tripping of the shuttle release, but it also cooperates with restoring crank 540 to put arm 511 in a restored position. When tab 496 is lifted, crank 540 is urged in a counterclockwise direction about center 542 by the spring 532 which is drawn between the crank and the upper part of arm 511. It will be noted that spring 532 is so connected to the two parts that the influence on crank 540 is exerted at a greater leverage so that it counteracts and overwhelms the smaller force exerted by the pull upon arm 511 near the center 512. The result is that both crank 540 and arm 511 are rocked in a counterclockwise direction with an upper overturned tab pressing against the top part of arm 511. The two parts move in a counterclockwise direction until a lower extension on crank 540, abuts against a stop pin 541 whereupon the parts are positioned with the lower edges of arm 511 spaced away from the extension 509 on magnet lever 490 to free this lever for oscillating motion when a digit impulse is initiated.

Regarding the actions caused by a digit impulse after zoning, it is well to point out again that the zoning impulses are not effective directly to cause printing, but merely select one of the three shoulders 432, 433, and 434 on the shuttle 427 which is withheld from print actuating control until bail 482 releases the various parts for allowing the end of the shuttle 427 to be placed in the path of the operating ratchet 153 when the digit impulse is sensed. In other words, during either numeral printing or alphabet printing the actual operation of printing awaits detection of a digit perforation.

Since the zoning selection lever 517 is tripped and rocked counterclockwise by spring 533 during zoning, it must be restored in a clockwise direction before a second card reading cycle of the machine is started. The selection crank is restored by a train of connections involving "0" printing controls operated by a "0" cam which is shaped on shaft 157 extending across the printer unit. The operation of this cam shaft 157 has been described in a general way with reference to Fig. 13 which shows the connections between the printer drive shaft 119 and the gearing leading up to the clutch with which shaft 157 is associated. Shaft 157 is normally rotated through clutch 573—575 (Fig. 13) as described hereinafter in the section entitled "Heading card control to print all zeros."

Referring back to Fig. 15 it is seen that a "0" elimination lever 544 is pivoted at 545 on plate 448 and has a pointed extension 546 cooperating with the periphery of cam shaft 157. A spring 547 holds the lever in cooperation with the cam. Near the end of each cycle of operation, a high point on the cam, rocks lever 544 in a counterclockwise direction and a vertical arm thereon, cooperates with a tab 548 extending from the bottom of a lock lever 549 pivoted at 550. The upper end of lever 549 cooperates with one side of a restoring arm 552 mounted adjacent to selection crank 517 and sharing the pivot 518 common to the two parts. Restoring arm 552 has an extension beneath the horizontal arm of selection crank 517, and the two parts are held in cooperation by a spring 553 drawn between them. This spring 553 is strong enough to overcome the tendency of spring 533 to move in the opposite direction. However, during zoning operations, spring 553 is ineffective because there is no relative displacement of arm 552 with respect to selection crank 517. The restoring action is performed at the end of a cycle when cam shaft 157 rocks lever 544 in a counterclockwise direction, thus causing clockwise motion of lock lever 549, the upper end of which presses against arm 552 rocking it in a clockwise direction about pivot 518 and tensioning spring 553 so that it tends to pull the selection crank 517 toward the normal position shown. This restoring means is made flexible so that if the tab 525 should be cooperating with either of the shoulders 520 or 522 under the point 519, the parts are not forced into position, but the restoration of the selection crank awaits the movement of the tab 525 towards the right.

Before going further into the description of the mechanism for controlling the printing of zeros, it is believed well to explain the operation of the bail 531 used to control the position of the zoning lever 526. This bail is fastened to a shaft 555 which projects beyond the left printer side frame 148 (Fig. 13) and has attached thereto, an operating arm 556. Carried at the end of the operating arm, is a cam follower roll 557 cooperating with a cam 558 fastened to the gear 160 which is part of the operating train connected to the printer mechanism. A spring 559 draws the arm 556 in a clockwise direction to maintain the roller in contact with the cam. For each cycle of operation, cam 558 is rotated in a clockwise direction and has formed thereon an extension which oscillates shaft 555 just before and during the interval in which zoning takes place. This serves to vibrate the zoning lever 526 (Fig. 15) to move tab 525 into and out of cooperation with the zoning shoulders on the selection lever 517.

*Zero print control*

The machine is provided with controls for printing and eliminating zeros to the right and left of selected denominations. Although a record card may be perforated with zeros extending across the amount field, it is desirable to eliminate the printing of zeros in the higher orders to the left of a significant digit. The controls for eliminating zeros to the left are provided with splitting mechanism so that various sections of the printer will have no eliminating controls over other denominations.

Although the zero eliminating mechanism is normally operative, means is provided for disabling it when heading cards are passing through the machine. A clutch is provided between the driving means and the zero eliminating controls whereby the clutch may be disconnected so that all the perforated name and address matter on a heading record can control printing directly without interference by the zero eliminating controls which are concerned primarily with amount representation.

A further mode of control is provided to manually select the printing of zeros to the left in all orders where selectors are manipulated. Not only are the selectors set but they are selectively operated by a magnet set into action upon the sensing of a special "X" perforation in a heading card or in other cards calling for special printing.

Referring to Fig. 15, it is seen that a lever 561 is pivoted at 562 on the unit plate 448. This zero control lever has one end overlying the tab 509 on the magnet lever 490. When a "0" perforation is sensed, the push rod 474 tends to raise tab 509 as it does for all other control perforations. Of course, control lever 561 also tends to rock in a counterclockwise direction when a zero control impulse is effective. However, various means are provided to lock the zero control lever 561 and hold down lever 490 and push rod 474 to prevent the operation of zero printing, even though the related magnet is energized.

Zero control lever 561 is locked in a non-printing position by the upper end 564 of an extension on the zero elimination lever 544. This is the lever already described as having an extension 546 cooperating with the periphery of the zero control cam 157. Spring 547 maintains contact between the lever 544 and the cam. During the sensing of all zoning and all digit index point positions except the zero index position, point 546 rides on a concentric surface of cam shaft 157. Shortly before the zero position is reached, a drop formation 566 presents itself beneath point 546, allowing zero elimination lever 544 to rock in a clockwise direction and place the locking edge 564 underneath the tab 563 on the zero control lever 561. This serves to hold the parts in a print eliminating condition to prevent the printing of a zero. Should any perforation other than a zero perforation be detected, of course it will occur at a time in the cycle before presentation of the drop 566 on cam shaft 157. In this event, the magnet will be energized and control lever 561 rocked in a counterclockwise direction to move tab 563 away from a shoulder 565 on the zero locking lever 549 which is then rocked by spring 570 to put an extension 567 in the path of a lug 569 on elimination lever 544. Thus, the zero elimination lever 544 is prevented from obstructing tab 563 and locking the zero control lever 561 whenever an impulse other than a zero impulse is controlling the printing function. Other controls are provided to prevent the operation of the zero elimination lever 544 in a manner about to be described.

*Heading card control to print all zeros*

As long as the elimination levers 544 are supported on the concentric surface of zero cam shaft 157, as shown in Fig. 15, the printing of zeros is assured in all positions. It is with the purpose of printing zeros in all positions, where detected on a heading card, that the rotation of cam shaft 157 is suspended under control of such cards. Turning to Fig. 13, it is noted that cam shaft 157 extends beyond the left side frame 148 and has secured thereto, a plate 572 carrying a clutch pawl 573 pivoted at 574 and normally cooperating with a notch in the disk 575 attached to the constantly rotating gear 156. An arm 576 of pawl 573 extends outwardly but normally misses the end of an armature lever 577 pivoted at 578. A spring 579 holds the armature lever against a stop 580 and normally separated from a zero control magnet HZ. This magnet is energized by two means of control, the first means being a special perforation punched in a heading card, and the second means involving control from the brush switch bar which is shifted as heading cards travel between the two different sets of printing control brushes as pointed out hereinbefore.

Upon energization of magnet HZ, lever 577 is rocked in a clockwise direction about center 578 and put in a position to obstruct the travel of pawl 573 and cause it to disengage from disk 575, thereby holding cam shaft 157 in the position shown in Fig. 15. Disk 575 and gear 156 continue to rotate in a counterclockwise direction (Fig. 13) in readiness to pick up the clutch pawl and cam shaft whenever magnet HZ is deenergized. Since the magnet is normally deenergized the clutch is normally connected and the zero eliminating control shaft 156 is normally effective.

Clutch plate 572 is located in the home position when declutched by means of a detent lever 582 pivoted at 583 on the side frame 148. The detent lever carries a roller 584 cooperating with a V-shaped notch in the periphery of plate 572 when it is positioned with a pawl in cooperation with the declutching armature lever. A spring 585 holds the detent in constant cooperation with the clutch plate 572.

*Elimination of zeros to the left*

It is desirable when printing amount figures, to stop with the significant figure representing the highest denomination, and eliminate all zeros to the left of such a figure. A mechanism is provided in cooperation with levers 544 (Fig. 15) to hold all elimination levers 544 in the position shown, when they are to the right of a significant digit, thereby permitting zero printing, and at the same time allow rocking of an elimination lever to the left of such a point, to obstruct or eliminate the printing of zeros. For this purpose the front part of each zero elimination lever 544 is formed with a jaw-like formation 587 engaging the end 588 of one of a set of overlapping zero split slides 589. The shape of this zero split slide is shown better in Fig. 18. There is seen that the end 588 of the slide is offset from, and rises above, another portion 591 of the same slide. This second portion 591 is wide enough to pass beneath one point of end 588 on the next higher slide. This overlapping relationship continues across the machine so that when any one of the slides 589 is held down, Fig. 15, by formation 587 on lever 544 locked by the zero control lever 561 upon the detection of any digit impulse, all other slides to the right of it are also held in a zero print permitting position, Fig. 15. The higher order slides to the left of the holding point are free to rise and allow clockwise rotation (Fig. 15) of the elimination levers 544 when the cam shaft 157 presents the drop formation 566.

The overlapping slides 589 are carried in a box-like holder shown in section in Fig. 15, which has separate side frames so that it is removable from the remainder of the print control mechanism. Because the jaw connection 587 is a readily detachable one, the points of the zero control slides may be readily disconnected therefrom or engaged therewith when the unit is assembled.

Two side frames 592 and 593 for carrying the zero split mechanism may be seen in Fig. 12. There it is noted that they are pinned to a shaft 594 passing through the main printer side frames 148 and 149. Attached between the two frames 592, 593 are three transverse bars 595, 596, 597 (Figs. 15 and 17). The small bar 596 is placed between two extending shoulders on the other two oppositely facing bars 595 and 597. The center bar is notched at 598 to receive one forwardly extending end of arm 599 on slide 589. Each slide is formed with a second extending end 600 also guided by a notch in the center bar 596. The notches are covered to make confined openings between the two larger bars on sides of the center bar. The slides are shaped with the double end to provide additional support to keep them from twisting as they are rocked up and down and slid back and forth. The slides are supported further by a U-shaped cage 601 (Fig. 15) attached to the rear of bars 595, 597 and projecting in toward the zero control mechanism. This cage 601 is formed with vertical slots narrow enough to confine the slides 589 in a horizontal direction, but long enough to provide room for vertical movement of the slides as they are rocked with the zero elimination levers 544. In Fig. 15, it is seen that some of the slides 589 are guided by notches in the top of central bar 596, while others of these slides pass through notches cut in the bottom of the bar. The slides are staggered in this manner because of the limitations of space and the need for substantial guiding surfaces cooperating with the double projecting ends 599 and 600. From the showing in Fig. 15 it is evident that the slides 589 are not only movable through the notches cut in bar 596, but they are also rockable therein as if held on pivots located on the inner edges of bars 595 and 597. The notches are large enough to permit free sliding and rocking movement, and at the same time, the slides are confined so that they cooperate with each other in an overlapping position and engage the jaw-shaped formations 587 of the zero elimination levers.

With the above-explained construction in mind, it is evident that when a lever 544 (Fig. 15) is locked by a digit impulse, the related slide 589 is held depressed and all slides 589 and levers 544 to the right of such an order with a sensed digit are held depressed, even when portion 566 of zero cam 157 passes under the ends 546. However, the slides and levers 544 to the left of the active order, have not the advantage of the overlapping relationship between a downwardly held point 588 and an underlying formation 591 (Fig. 18) and therefore these levers 544 to the left are free to rock in a clockwise direction and obstruct the zero control lever 561 to prevent operation under control of a zero impulse.

*Zero splitting control*

The reason why the overlapping members 589 are formed as slides is so that any one of them may be retracted (Fig. 18) to pull portion 591 out of cooperation with the end 588 on the next higher order slide. Such a separation causes a split in the overlapping control between higher and lower orders so that if two numbers are to be printed with elimination control, each controls the zeros to be printed to the right of the number and will not carry the zero enforcing or eliminating controls over into the other denominations. In other words, two separate numbers may be printed without any zeros appearing above the highest significant digit of either number. In a similar way, any number of figures may be split off in separate sections across the printer unit.

In order that the zero printing controls may be split at any particular point, each slide 589 is provided with a lug 602 (Fig. 18) projecting at a right angle to the end 599. Referring to Fig. 15, it is seen that these lugs 602 project in two directions, the lugs on the upper slides 589 projecting upwardly while the lugs on the lower slides project downwardly. They protrude in front of the surface of bars 595 and 597 and normally lie adjacent thereto, but with sufficient space intervening, so that the operator can engage them with a finger nail and pull them outward to disconnect any of the overlapping zero control portions 588 and 591. The extent to which the slide 589 may be moved outwardly is limited by a notch 603 (Fig. 18) therein cooperating with the side wall of the notches cut into the central bar 596.

Devices are provided to hold the zero split slides in either the normal effective positions or the extended split enforcing positions. Overlying the outer surface of lugs 602 are a pair of parallel links 604 and 605 (Figs. 15, 17 and 18). These long links 604 and 605 extend across the printing unit and, when the slides are in the normal position, the links prevent them from moving outward accidentally because there is an overlying relationship as shown in Fig. 17.

The two links are connected in the manner of the well known parallel ruler by means of equal sized levers 607 and 608 pivoted at 609 and 610 on the outside of the central bar 596. Centers 609 and 610 are fixed but the ends of the levers 609 and 610 are movably articulated at 612, 613, 614 and 615 so that, when one bar is moved downward, the opposite bar is moved the same extent in the other direction. A spring 616 is connected to the upper link 604 and tends to rock the levers 607 and 608 in a clockwise direction, so that the two long links are drawn close together in a position covering the outer surfaces of lugs 602. The parallel linkage is stopped in the collapsed condition when the long links strike the hubs of the levers on centers 609 and 610. The lower link 605 is provided with a knob 618 which may be grasped and pulled down to counteract the tension of spring 616 and put the two parallel links into the dotted line positions 619 and 620 shown in Fig. 17. When the links are so positioned, the lugs 602 in both the upper and lower tiers are made accessible to the operator who then may pull out one or more slides 589 by grasping the related lugs and moving them to the extent limited by notch 603 (Fig. 18). After the selected slides are positioned, the knob 618 is released so that links 604 and 605 can swing back into the position shown in Fig. 17. Then the links not only serve to hold in the undisturbed zero eliminating slides, but also pass behind the lugs 602 on the extended split slides to hold them in the operated position. As the parts are shown in Fig. 15, none of the slides is extended and so all lugs 602 are held behind links 604 and 605.

*Manipulative control for printing zeros at the left*

In certain kinds of recording, it is desired that the numerical tabulation of figures present a straight vertical line or margin at the left, and such a result is accomplished by enforcing the printing of zeros to the left of significant numbers up to a predetermined perforated denomination. The present print control mechanism is provided in each order with a manipulative member for counteracting the zero elimination mechanism, so that instead of preventing zero printing at the left, zero printing is enforced wherever desired.

Turning to Fig. 15, it is noted that a lever 621 is pivoted at 622 on the side plate 448 and is formed with a tab 623 overlying the related zero control lever 561. It is remembered that this lever 561 is rocked from the home position in a counterclockwise direction whenever lever 509 is elevated because a zero is to be printed. The function of lever 621 is to rock in a clockwise direction and press tab 623 down upon lever 561 and rock it in a counterclockwise direction before the zero elimination lever 544 can get underneath lug 563 to hold up the motion of lever 561 to prevent zero printing. The sequence of timing is such that, when lever 621 is selected for operation, it functions before lever 544 is released by cam 157. The "zero to the left" control levers 621 do not normally function, because they are held up by the springs 570 against stop 625 and they are out of the path of a "left zero" control bail 626. This bail is selectively operated under control of special perforations in cards requiring aligned printing with zeros to the left of significant digits.

In order that one or more of the levers 621 may be brought into operation by the bail 626, there is pivoted at 627 on the front end of each lever 621, a manipulative rocking arm 628 which extends downward with a blunt end normally out of the path of the end of bail 626. However, a finger piece 629 is formed on each of the arms 628 and it may be pushed to the rear so that the lower end of 628 rocks into the path of bail 626. When a selected number of arms 628 are positioned to cooperate with the bail, they are lifted when the shaft 630, upon which the bail is secured, is rocked in a counterclockwise direction. When the arms 628 are lifted, they carry along therewith the levers 621 and rock them in a clockwise direction so that the tabs 623 are depressed upon levers 561 to push them down, out of locking position before the zero index point in the cycle of operation.

The pivotal connection 627 between arm 628 and lever 621 is made with a friction washer or any other expedient for maintaining the manipulated part in an adjusted position. The extent of adjustment of arm 628 on lever 621 is limited by an extension 632 on the end of lever cooperating with an arcuate notch cut in the side of the arm.

Turning now to the controls for rocking shaft 630 for printing zeros to the left, reference to Fig. 12 shows that this shaft passes through the two removable side plates 592 and 593 holding the zero elimination devices. At its right end, shaft 630 is loosely mounted in a bearing on plate 593, and at its left end it extends through plate 592 (Fig. 13) and has attached thereto an operating arm 633. This arm is held in a normal position by a spring 634 drawing the arm against a stop 635. An extension 636 on the arm is designed to cooperate with a shoulder 637 on an operating link 638 pivoted at 639 on a bell crank 640 fulcrumed at 641 on the side of the main printer frame 148. The bell crank carries a roller cooperating with the cam 486 already mentioned as being the operator of the print release bail 482 on shaft 483. The cam rotates in a clockwise direction (Fig. 13) and the roller of arm 640 is placed to be operated at the proper time by the high point on the cam. When the crank is operated, it vibrates in a counterclockwise direction to lift link 638 and pass shoulder 637 in front of extension 636. The shoulder and extension are normally prevented from cooperating by a release lever 643 pivoted at 644 and provided with a downwardly extending arm engaging the side of link 638 and holding it out of cooperation with extension 636. A spring 645 attached to the lower end of link 638 tends to rock it in a clockwise direction about pivot 639, to hold it in engagement with lever 643 and endeavor to cooperate with extension 636. Lever 643 is held against the end of an armature 647 pivoted at 648. The armature cooperates with a magnet LZ which is energized under control of special perforations present on record cards calling for zero printing to the left. When the magnet is energized, armature 647 is lifted and a spring 649 rocks lever 643 in a counterclockwise direction, thus permitting link 638 to move toward the right and place shoulder 637 underneath extension 636. Then, later in the operation, when link 638 is raised by cam 486, the arm 633 and the connected shaft 630 are rocked in a clockwise direction (appearing counterclockwise in Fig. 15) to operate levers 621 and cause the disablement of selected zero elimination devices as already explained. Since the zero eliminating devices are disabled in the selected orders and since all such orders are operated by zero perforations appearing in the record cards, zeros are printed to the left of item amounts or other numbers in any desired arrangement of orders.

The parts for operating zero printing to the left, Fig. 13, are self-restoring because as cam 486 continues to lift lever 638 after printing time, the lower end of arm 643 swings in a clockwise direction to push lever 638 away from extension 636 as the upper end of the lever cooperates with an extending arm 651. Since the magnet LZ is deenergized as the parts are operating, the armature 647 falls behind the releasing point of arm 643 as it is restored in the clockwise direction by the upper end of link 638.

Link 638 is guided in its reciprocating movement by a clip 652 which serves to hold the upper end of it near the side frame 148.

*The inking devices*

It is pointed out hereinbefore that an inking ribbon 407 (Fig. 14) is stretched between the printing wheels 406 and the platen P. Referring to Fig. 12, it is noted that this ribbon 407 is wide enough to extend across the printing unit to co-operate with all one hundred printing wheels provided to effect alphabet or numeral impressions. The ribbon is held on a frame comprising side plates 655 and 656 fastened to printer side frames 148 and 149, respectively. The rear end of the ribbon side plates is formed with horizontal tabs 657 (Fig. 13) adapted to be fastened over the top of the printer side plates. The entire ribbon mechanism may be removed as a unit by unscrewing the side plates at the four points where it is attached to the printer side frames.

Turning to Fig. 14, the path followed by the ribbon may be traced by noting that at one end it is wound on a spool 658 and then passes upward over a guide roller 659 before being carried over a guide plate 660. After the ribbon passes in front of the platen, it is guided further by another plate 661 before being wound on the second spool 662. In Fig. 12 it is seen that the upper guide plate 660 extends across the entire unit and is shaped in the form of a bail with side arms secured to the inner surfaces of the two side plates 655 and 656. In a similar way the guide roller 659 extends across the entire unit.

The ribbon carrying spools 658 and 662 are shorter than the distance between the ribbon frame side plates and are supported so that they are removable therefrom. In Fig. 12 it is seen that the front spool 658 is centralized between side plates of the ribbon unit and at the right end it is attached to an operating shaft 665 extending through side plate 656 and carrying an operating ratchet 666. The left end of spool 658 is held in place by a movable plunger 667 which passes through side plate 655 and has attached thereto a finger piece 668 curved to be grasped by a pair of fingers. Between the inner surface of plate 655 and the end of plunger 667, near the side of spool 658, is assembled a compression spring 669. This spring serves to hold the plunger normally in engagement with the end of the spool, to hold the ribbon in an operative position. However, a pair of fingers may be slipped under finger piece 668 to pull it and the attached plunger in an outward direction to release one end of the spool, and then the opposite end may be disconnected from a keying attachment to the drive shaft 665, so that the spool and connected ribbon can be removed from the unit for replacement of the ribbon.

The other spool 662 is connected to another operating ratchet wheel 670 (Fig. 16) and at its opposite end cooperates with a locating plunger 671, Fig. 13, the end of which also carries a finger piece 672 similar to the member 668 already mentioned.

From the foregoing, it is apparent that not only is the ribbon mechanism removable in its entirety but also that the ribbon and connected spools are in turn separable from the frame and operating mechanism.

The operating mechanism for advancing the ribbon is of the kind that is automatically reversible when the supply of ribbon on one spool is exhausted. This operating mechanism cooperating with the ratchet wheels 666 and 670 is shown in Fig. 16. There it is noted that the shaft 555 (already mentioned as the driver for the alphabetic zoning bail) has connections for operating the ribbon feed. For purposes of zoning, this shaft 555 is oscillated early in each operating cycle; it is rocked clockwise and then counterclockwise. This motion is utilized for ribbon feeding by means of an arm 674 attached to the end of shaft 555 extending out beyond the right printer side frame 149. Extending from the end of arm 674 is a stud 675 operating in a slot 676 formed in the lower end of a link 677 articulated at 678 to an operating frame 679 fulcrumed on a stud 680 extending from side frame 149. Frame 679 is formed with a vertical arm, the upper end of which carries a pin 681 extending through a cam opening 682 which is formed with a centralized and upwardly projecting bump 695 formed on an oscillating and sliding arm 683 loosely pivoted by a slot 689 encircling the stud 680. A spring 690 holds arm 683 upward with bump 695 on one side or the other of pin 681. The upper end of arm 683 is fork shaped with a pair of prongs 684 engaging the sides of a pin 685 extending from a feeding slide 686 guided by a pair of pin and slot connections 687 and 688 on the right side plate 656. Slide 686 is held in place against the side of plate 656 by means of a bracket 690 attached to plate 656 and formed with a pair of arms engaging the outer surface of slide 686. Pivoted on opposite ends of slide 686 are a pair of pawls 691 and 692 cooperating with the ratchet wheels 666 and 670. Also designed to cooperate with the two ratchet wheels are a pair of retaining pawls 693 and 694 pivoted on the side of the frame plate 656.

Slide 686 is of such a length that only one or the other of the pairs of pawls are in cooperation with a ratchet wheel. In other words, as shown in Fig. 16, slide 686 is operated toward the left and pawls 691 and 693 cooperate with ratchet wheel 666 to turn it in a clockwise direction and move the ribbon from right to left, while the pawls 692 and 694 are disconnected from the other ratchet wheel 670. The retaining pawl 694 is held away from the related wheel by means of a shoulder 696 extending from the top of slide 686. The other pawl 692 is out of operating position because the slide 686 reciprocates within a zone confined to the right half of the slots 687 and 688 formed on the slide.

As the operating shaft 558 oscillates, the pin 681 is moved toward the right carrying along therewith the oscillating arm 683, slide 686 and pawl 691. Then, as the shaft vibrates back to the normal position, pin 681 also moves toward the left as urged by the restoring spring 699 attached thereto. The lower end of this spring 699 is attached to a stud 700 cooperating with the lower side of frame 679 to act as a stop. As the operating frame rocks toward the left, the oscillating arm 683 is urged to do likewise and carry slide 686 and pawl 691 in the same direction to rotate ratchet wheel 666. Spring 690 is strong enough to cause arm 683 normally to move with frame 679 and pin 681. However, should the supply ribbon be exhausted on the opposite spool, there will be a positive block to such movement causing the arm 683 to remain in the centralized position as it is forced downward with pin 681 riding over the bump 695 and cooperating with the opposite side of it. Thus, slide 686 remains in a centralized position. Then, when shaft 555 resumes oscillating operation, pin 681 moves toward the right and the arm 683 is rocked to the right, operating pawl 692, and ratchet wheel 670 is turned in a counterclockwise direction to move the ribbon web from left to right.

Record sheet feeding devices

In Fig. 1 it is seen that the record sheet R is held on the platen P which is driven by the mechanism AC of the kind disclosed in Patent 2,189,025. The controls for the platen movements are discussed further hereinafter with reference to the wiring diagram.

The platen is held in a slidable carriage frame comprising side plates 703 and 704, Fig. 2, joined by a pair of brace rods 705 and 706. Also formng part of the frame is a casting 707, Figs. 13 and 16, formed with a pair of V-shaped notches 708 cooperating with smooth ways on a pair of carriage guide strips 709 and 710 secured to a pair of pivoted frames 711 and 712, Fig. 2. These last mentioned frames are pivotally mounted at 713, Fig. 16, on bearing standards 714 fastened to the top of the horizontal plate 124 of the main frame. In Fig. 13 it is noted that the pivoted frames are formed with feet 716 resting on the top of the vertical web 88.

From the foregoing explanation it is apparent that carriage frame 707 is slidable along strips 709 and 710 and carries along therewith the platen, record sheet and sheet feeding controls. Since the entire carriage is hinged on standards 714, it may be lifted away from the printer and swung back out of the way to give access to the ribbon unit and printing mechanism.

Accumulating devices

The machine is provided with a series of accumulating devices of a novel form. Heretofore, accounting machine accumulators served the sole purpose of adding and subtracting amounts. The adding wheels and total readout devices associated therewith usually relied upon outside control for determining how the amounts entered in or derived from the accumulator were to be employed. Furthermore, the accumulator orders usually bore a fixed relationship with adjacent orders so that, when a certain number of accumulators were provided in a machine, that number was fixed and only flexible to the degree that accumulators could be split. Of course, in the prior art, accumulators having fixed relationships and inflexible controls required elaborate plugging arrangements and relay controls for effecting special operations, such as operations requiring one or more total transfer operations.

At this point, it is well to define the function known as a total transfer operation. It is an operation wherein an amount registered in one accumulator is transferred to a second accumulator with or without resetting the first accumulator.

In the present case, the accumulator devices are constructed on a unitary basis, each unit having embodied therein all the controls necessary for its own operation as well as the operations of similar units connected therewith for related control. The devices are extremely flexible in operation because of this construction, making each unit adapted to take care of all operations connected with the unit. There results the possibility of selecting certain units and bringing them under common control for common operation in any one of a plurality of ways. The number of functions for which a set of accumulator units may be associated may be listed as follows:

Adding
Subtracting
Total transfer sending
Total transfer receiving
Listing
Positive total reading
Negative total reading
Resetting
Balance total testing
Transferring
Credit and debit symbol printing
Total mark printing There are provided one hundred accumulator units, each capable of independent control for the purposes above mentioned. The devices are influenced from four external sources. These sources are the card sensing brushes, a plugboard, a program device, and a grouping sheet. Although these devices have not all been described in detail, it is believed well to point out in a general way the nature of the relationship which they have with the accumulator devices.

The card reading brushes are the primary source of information for putting credit and debit amounts at the disposal of the accumulators, according to special perforations on the card determining the nature of the amount.

The plugboard determines the direction of the impulses derived from the card, so that they go from the sensing brushes to the proper orders of the accumulator, and pass through the accumulator to selective parts of the printer and also in the transfer of totals, so that direction is again selected to take amounts from certain places and put them in other predetermined places.

The grouping sheet cooperates with all the accumulator units and is perforated in such a manner that some of the units are associated for one purpose and others of the units are associated for other selected purposes. It is because of the inherent independent nature of each accumulator order that such grouping sheet control is made possible so that any one of the units can be brought into cooperation with any one of the other units for a common purpose.

The program device is the fourth outside source cooperating with the accumulator orders through the grouping sheet to influence the operation of the accumulators. These program devices are provided to govern the sequence of operations. The character of the operations is in turn determined by a program selection sheet which is shifted by any one of five automatic group changes varying from minor, major, intermediate, final and progressive.

From the foregoing, it may be gathered that the accumulator devices are grouped together by the grouping sheet and influenced by impulses from card sensing means as directed by the plugboard and operate in a sequence of varying controls as determined by the program device.

Turning now to the actual construction of the accumulating devices, it may be pointed out with reference to Figs. 1 and 11 that the units are arranged in the rear of the machine in the portion marked "ACC." The units are arranged in two tiers (Fig. 11) with the plates 719 upon which each unit of mechanism is mounted being inserted between horizontal frame members 124 and 123 confining the upper tier of fifty units. Another pair of horizontal frame members 128 and 129 are arranged and spaced to receive the other fifty units of the lower tier.

A driving mechanism is provided for the accumulator mechanism in the form of the pair of constantly rotating shafts 126 and 131 already mentioned. The shaft 126 carries fifty gears, such as gear 125', spaced axially equal distances to coincide with the driven gears mounted on each of the plates 719. Lower shaft 131 is equipped in a similar fashion with a series of fifty gears such as gear 132, for driving the operating mechanism for the lower tier of accumulator orders. These gears are constantly operated and differential control is exercised by clutching devices independently operated within each accumulator order.

Figure 19:
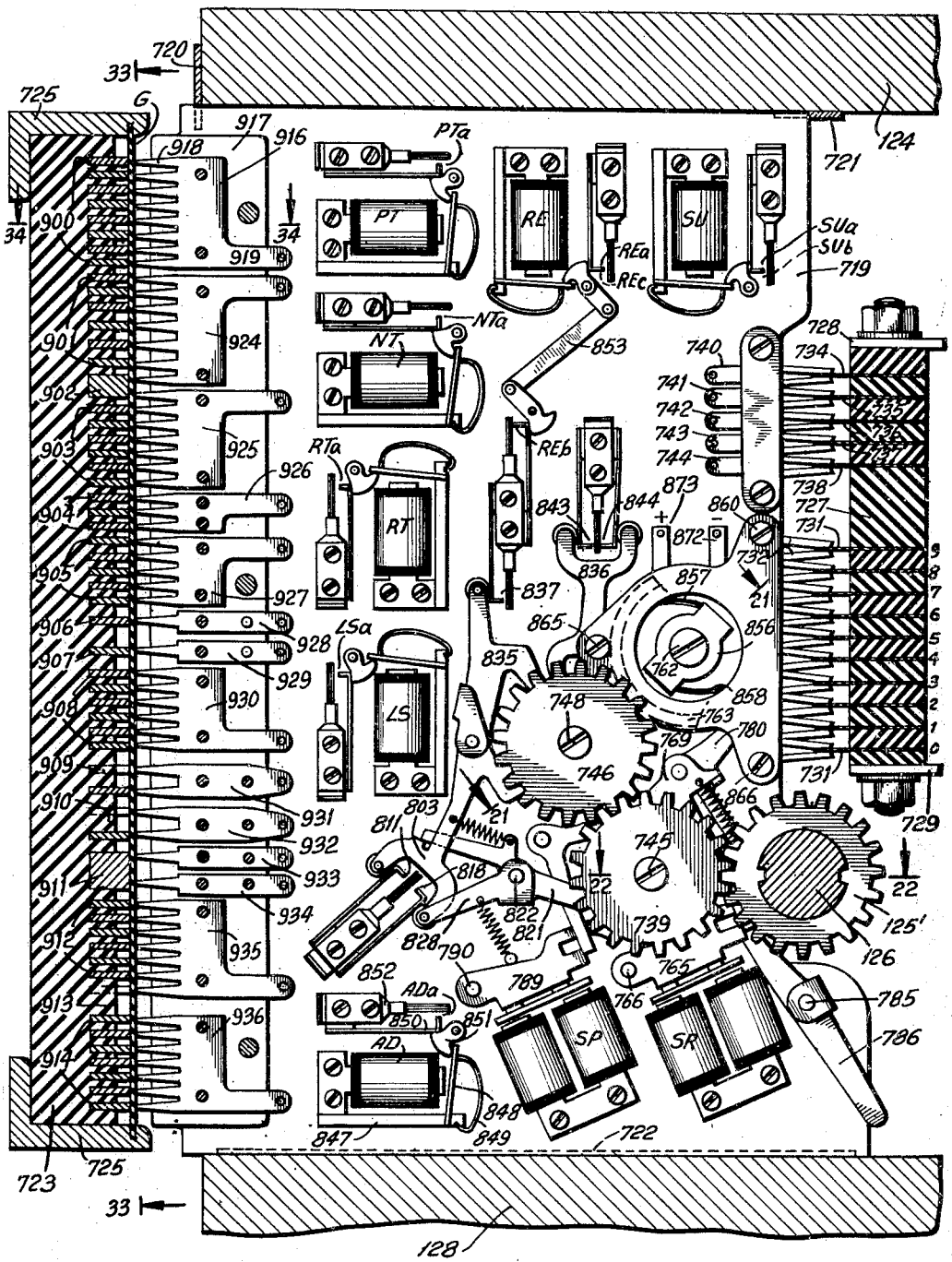
Fig. 19 is a side elevation view showing one of the units on denominational banks of the accumulator.
Figure 22:
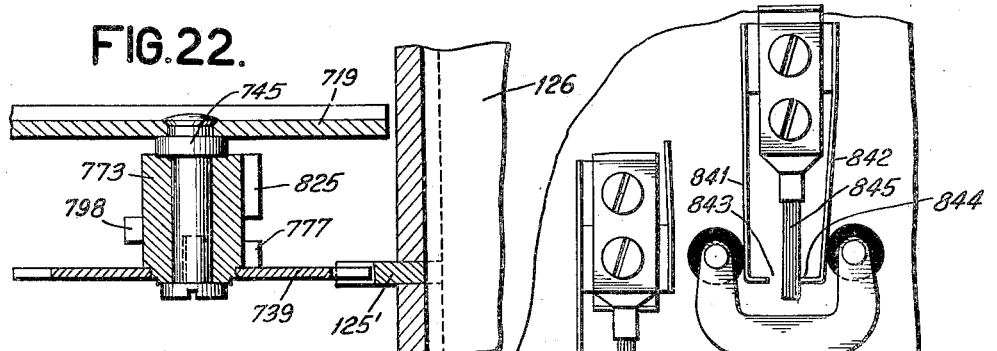
Fig. 22 is a sectional plan view taken along the line 22—22 of Fig. 19 and showing the driving connections to a transfer wheel of the accumulator.

In Fig. 19 is shown one of the plates 719 carrying the accumulating devices and associated controls relating to one of the one hundred order units. The plate is placed in a vertical position between the frame members 124 and 128 and spaced accurately in a horizontal direction by means of a series of separators 722 attached to the top of the lower frame member. Cooperating with the left or rear side of the accumulator unit is a grouping board 723 of insulation material. This board is carried in a frame comprising a border of angle irons 725 which is hinged and movable away from the accumulator. When the hinged frame is away from the rear of the accumulator units, one or more of them may be withdrawn by sliding them toward the left and out of the machine for repair or replacement.

When an accumulator plate 719 is inserted in the machine the devices thereon automatically establish contact with a series of fixed contact blades located within the machine between sets of insulation blocks 727 fastened between a pair of holding plates 728 and 729. Extending to the left of the insulation blocks 727 (Fig. 19) are a series of ten flat blades 731 common to all fifty units of one tier. Cooperating with the blades 731 are pairs of horizontally extending contact wiping members 732 for engaging the upper and lower surfaces of blades 731. These contact members 732 are part of a total readout device which is automatically connected to an impulse emitter through blades 731 as soon as a plate 719 is assembled between frame 124 and 128 and moved inward to proper position, wherein each of the blades 731 is inserted between a related pair of members 732.

In addition to the ten blades 731 found between blocks 727, there are five other fixed blades 734, 735, 736, 737, and 738 cooperating in a similar fashion with a series of contact members 740—744 provided for several special purposes. The top blade 734 is used to convey impulses to the printing mechanism. The second blade 735 carries the impulses from the sensing brushes to the accumulator unit. The third blade 736 provides a connection to the line of the common wiring. The fourth blade 737 carries an impulse known as the "hot 9" impulse for initiating subtracting and total taking operations. The lowest blade 738 carries a transfer impulse for effecting the addition of a unit in the orders higher than those wherein a wheel passes through nine to zero.

The accumulating devices are set by a gear 746 (Fig. 19) driven through an intermediate gear 739, by one of the driving gears 125' secured to shaft 126. Referring to Fig. 21, it is seen that this gear 746 is secured to a bushing 747 mounted on a shouldered stud 748 extending from the side of plate 719. Also attached to bushing 747, but slidable thereon, is a movable clutch disk 749 formed in the shape of a crown gear with teeth 750 cooperating with similarly arranged teeth on an oppositely facing clutch disk 751 attached to a second bushing 752 separated from the first mentioned bushing by a roller bearing 753. The movable clutch disk 749 is keyed to the driven gear 746 by a stud 754 which has a riveting shank passing through holes in bushing 747 and gear 746 to hold the two together, while an extending portion of the stud passes through an opening in the side wall of disk 749, so that the disk is keyed to the driving unit but is free to move relative thereto when the pressure of a cup-shaped spring 755 is overcome.

A gear and a number of cams are secured to the clutch disk 751 to make up the registering part of the accumulator. This settable part of the accumulator mechanism revolves freely about the roller bearing 753 and assumes a position determined by the length of time that the two clutch plates are held together with the teeth 750 cooperating. The larger cam 758 is used to control transferring, while the smaller cam 759 is used to determine the standing of the wheel at zero or 9 for resetting and total testing operation. A pin 760 passes through the clutch disk 751 and the two cams and holds them secure to a gear 761 which is provided to operate a readout contact device mounted on stud 762 and driven by a gear 763 with which gear 761 meshes.

The adjustment of the accumulator wheel is controlled primarily by a pair of start-stop magnets SR and SP with clutch operating mechanism shown enlarged in Fig. 20. Whenever an impulse is sent through the starting control magnet SR, an armature lever 765 cooperating therewith is rocked in a clockwise direction about its center 766. This serves to move an abutment 767 away from a tab 768 formed on the bottom of a clutch engaging crank 769 pivoted at 770 on the side of plate 719. This crank 769 is urged to rock in a clockwise direction by a spring 771 connected thereto and, as soon as the abutment 767 is moved away from the end of the lever, it is free to move the tab 768 into the recess 772 formed in armature lever 765. As crank 769 moves in a clockwise direction, a bevel point 774 thereon cooperates with the side of clutch disk 749 (Fig. 21) to move it into cooperation with the other clutch disk 751 to form a driving connection between the constantly operating gearing and the settable part of the accumulator to which clutch disk 751 is attached. The end 775 of the short arm of crank 769 cooperates with a notched stud 776 so that the bevel point 774 is supported at the end removed from the pivot 770. The operation of the accumulator wheel continues until the disengaging portion of the cycle is reached, at which time a knock-out cam point 777 cooperates with an extension 778 on crank 769 to rock the crank in a counterclockwise direction, moving the bevel extension away from the clutch disk 749 so that spring 755 may push it back to the normal disengaged position. This knock-out cam 777 is rotated freely on center 745 and driven by, and fastened to, the gear 739 already mentioned as the idler between the constantly rotating driver 125' (Fig. 19) and the accumulator driving gear 746. The time that the knock-out extension 777 cooperates with the engaging crank is constant so that, while the time of engagement is variable to enter predetermined amounts, the time of disengagement is constant to terminate driving engagement of the clutch when a selected number has been entered in the accumulator wheel.

A detenting arrangement is provided to hold the accumulator wheel in an adjusted position, Cooperating with the gear 763, which is operated by the accumulator wheel, is a detenting pawl 780 pivoted on stud 770 and formed with a lug 781 cooperating with an extension 782 on the clutch engaging crank 759. A spring 783 is attached between an arm on pawl 780 and crank 769 to tend to rock the detent in the counterclockwise direction with respect to the engaging crank. Whenever the engaging crank 769 is rocked in a clockwise direction to effect a driving relationship with the accumulator wheel, the detent 780 is rocked in the same direction to move it out of cooperation with gear 763. However, as soon as the driving relationship is terminated by the counterclockwise motion of the clutch operating crank, detent 780 is swung back in a counterclockwise direction into engagement with gear 763 to hold it, and the cooperating accumulator wheel, in the adjusted position.

The operations of the accumulator clutch described hereinbefore are concerned with the use of the device in connection with adding operations, wherein the wheel is put into operation at a differential time and the clutch thrown out at a fixed time. There are other kinds of accumulator operations, such as subtracting and total taking, wherein the mode of operation changes in that the accumulator wheel is connected by the clutch at a fixed time and later disconnected at a differential time. Under such conditions, the starting magnet SR, already mentioned, is operated by what is known as a "hot 9" impulse which initiates clutching of the accumulator wheel early in the operating cycle. However, in connection with subtracting or total taking functions, the cam 777 no longer functions as the means for breaking the adding clutch connection, and instead, this control is assumed by the stopping magnet SP which is energized at a differential time. Whenever magnet SP is energized, an armature lever 789 cooperating therewith is pivoted in a clockwise direction about center 790. Formed on the end of lever 789 is an abutment 791 cooperating with the end of a stopping lever 792 pivoted at 793. A spring 794 tends to hold lever 792 in a clockwise direction to strike against the abutment 791. However, when the magnet is energized, armature 789 presents an opening 795 in alignment with the end of lever 792 which is then free to rock in a clockwise direction. As it does so, an extension 796 formed thereon, cooperates with the end of the released engaging crank 769 and pushes down on the crank to rock it in a counterclockwise direction to disengage the clutch.

Stopping lever 792 is restored by a cam point 798 formed on the same member carrying the point 777 for restoring the starting crank 769. Since the cam member rotates in a clockwise direction, the cam extension 798 strikes the lower side of the point 799 on lever 792 and rocks it in a counterclockwise direction to put it on top of the abutment 791.

The restoring action of both armature levers 765 and 789 are similar in that they are provided with coil springs 800 tending to rock them away from the related magnets and into latching positions. Both armature levers are provided with cam extensions 801 cooperating with the lugs on the ends of the starting and stopping levers so that, when these levers are rocked in a counterclockwise direction into the resetting position the armature levers are moved counterclockwise in a positive way to assume the home positions, although the coil springs are also tending to produce such movement to bring the armature levers against the stop studs.

From the foregoing, it is apparent that the accumulator wheel may be put into operation at differential times and disconnected at a fixed time to effect an adding operation, and provisions are made to cause early connection of the accumulator wheel and differential disconnection of the same to effect subtraction or to restore the wheel to the normal position for a total clearing operation.

Devices are provided to set up transferring or carrying impulses to advance higher order wheels under control of lower order wheels which have added numbers rotating them through the 9 position and into the zero position or beyond zero. These impulses, when initiated by a complete revolution of a lower order wheel, actuate the start magnet SR of the next higher order to effect momentary clutching of the adding wheel to the driver so that one step of operation is effected. These transferring or carrying impulses are not only initiated for purposes of proper addition but they are also generated in connection with complemental addition during subtraction, at which time, the highest order of a group of accumulating units passes beyond 9, and the elusive unit is carried around and inserted into the lowest order to fill out the tens complement digit in that order. The parts operated in connection with the setting of circuit relationships for governing the direction of transfer impulses may be studied with reference to Fig. 23.

Figure 23:
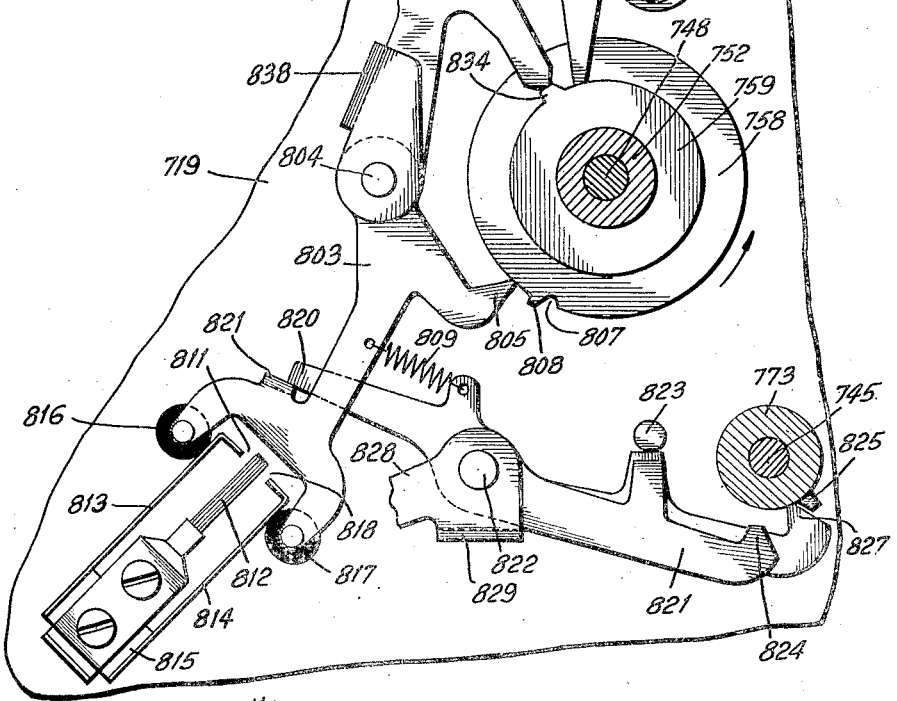
Fig. 23 is a detail elevation view showing transferring mechanism cooperating with an accumulator wheel.

A transfer control lever 803 is pivoted on a stud 804 extending from the side of the accumulator assembly plate 719. This lever is formed with a cam point 805 designed to cooperate with the periphery of cam 758 and to sense the appearance of a notch 807 and an extension 808 formed thereon. Cam 758 is the larger of the pair of cams shown assembled to the accumulator wheel in Fig. 21. As the cam 758 rotates in a counterclockwise direction (Fig. 23), the formations 807 and 808 on the periphery of the cam are placed in cooperation with the cam point 805 on the transfer control lever 803. A spring 809 tends to draw the transfer lever in a counterclockwise direction about pivot 804 so that the cam point rests on the periphery of cam 758. As shown in Fig. 23, the cam is positioned in the zero or home position, wherein the extension 808, marking the cam position intermediate the 9 and zero positions, is slightly to the right of the point 805.

When the accumulator wheel stops in the 9 position, point 805 drops into notch 807, and lever 803 rocks in a counterclockwise direction to close a contact 811 to set up a circuit connection for effecting a long carrying operation should the next lower order wheel pass through 9. Contact 811 is part of a circuit closing arrangement involving a central common brush 812 and a pair of cooperating side blades 813 and 814 mounted on an insulated holder 815 secured to the side of plate 719. Cooperating with the sides of flexible blades 813 and 814 are a pair of rollers 816 and 817 carried on a yoke-shaped end of the transfer control lever 803. By means of this contact operating construction, either of two circuit connections through contacts 811 or 818 may be established according to whether the accumulator wheel is at 9 or has passed through 9 to zero. Normally, the transfer lever 803 is held in a centralized position through its cooperation with the concentric portion on the periphery of cam 758. At the 9 position, the lever is free to rock in a counterclockwise direction to close contact 811 and then, if the wheel continues to rotate from 9 to zero, the cam extension 808 cooperates with cam point 805 to rock the lever in a clockwise direction and close contacts 818.

When the transfer devices are operated by the passage of the wheel beyond the 9 position, the transfer lever 803 is latched to hold contact 818 closed until the transfer time. Of course, if the wheel stands at 9, the other contact 811 is maintained until transfer time. Lever 803 is latched by means of an abutment 820 cooperating with a tab 821 extending from the yoke formed on the lever. This abutment 820 is found on one end of a latch lever 821 pivoted at 822 on the side plate of the accumulator unit. Spring 809 is attached to the latch lever to tend to rock it in a counterclockwise direction so that, when transfer lever 803 is rocked clockwise, the abutment 820 snaps down behind tab 821. The latching movement of lever 821 is limited by a stop pin 823 extending from plate 719. The lower end of latch 821 is formed with a restoring point 824 which is placed in the path of a cam extension 825 whenever the transfer parts are latched. This cam extension 825 is on the member 773 already mentioned as the constantly operating cam which also carries knockout extensions for terminating accumulating operations. Directly after the transferring impulse is sent through contacts 818, cam 825 cooperates with point 824 to rock latch 821 in a clockwise direction so that abutment 820 is lifted out of the path of tab 821 and transfer lever 803 is allowed to swing back into the home position.

Figure 24:
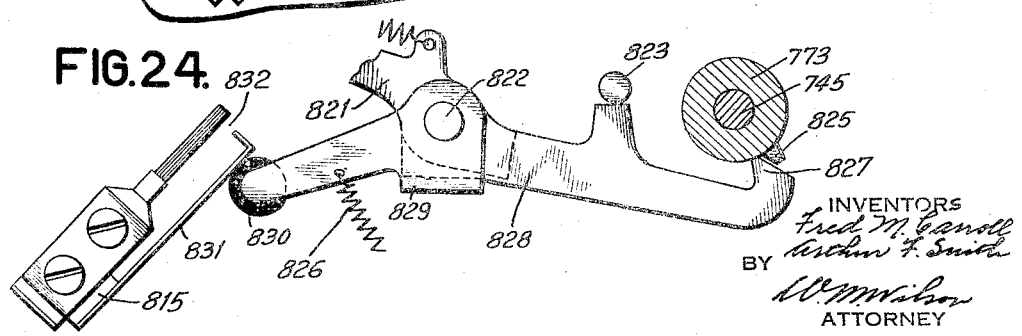
Fig. 24 is a detail elevation view showing a lever cooperating with a transfer cam wheel for closing contact devices to control the timing of transfer impulses.

The initiation of the transfer impulse is timed to be effective directly after the restoring point 777 (Fig. 20) cooperates with the clutch engaging crank 769. This is done so that directly after the accumulator wheel is stopped for differential adjustment, it may be again connected for one step of motion by the energization of starting magnet SR. As the clutch is operated there is consequent clockwise motion of engaging lever 769 to place the restoring point 778 between the primary restoring cam 777 and a secondary restoring point 777′ which comes into effect to declutch the accumulator wheel after one step of motion, when a transferring operation is effected. Although the cam points 777 and 777′ are constantly moving in a clockwise direction, there is an interval of time during which transferring may be effected, and this is done by the cam point 825 (Fig. 24) already mentioned as also extending from the constantly rotating cam member 773. Cooperating with cam 825 is the cam face 827 found on the ends of a timing lever 828 pivoted on center 822 alongside the latch lever 821. This timing lever 828 is formed with a bail formation 829 and an extending arm carrying an insulation roller 830. The roller cooperates with the side of a flexible blade 831 attached to the insulation block 815 already mentioned. Adjacent the blade 831 is a stationary brush forming part of the contact arrangement 832 which is closed to initiate the transfer timing impulse. The timing lever 828 when in the normal position abuts against the stop pin 823. However, at the proper time in the cycle, cam point 825 strikes cam face 827 and rocks the lever in a clockwise direction, lifting roller 830 and closing contacts 832 to complete circuit connections involving one or more of the contacts 811 and 818 previously set up by wheels passing through the 9 position or wheels adjacent such orders standing at 9. The timing lever 828 is restored by the action of a spring 826 directly after the passage of cam point 825 on the opposite side of cam face 827.

The accumulating devices are provided with means for detecting the position of the accumulator wheel to determine whether it stands at zero or 9. These detecting devices form part of the controls for resetting the accumulator and other controls for sensing the presence of negative or positive balances in the accumulator. When a total is to be taken, the highest order of the accumulator affected is tested to determine whether it stands at 9 or some other digit. When it stands at 9, it is an indication that the complemental amounts entered therein were greater than the positive amounts entered, showing that the balance is a negative one. The resetting and total testing controls are governed by the cam 759 (Figs. 21 and 23) already mentioned as being part of the accumulator wheel. Extending from this cam 759 is a cam point 834, Fig. 23, which cooperates with a pair of levers 835 and 836. Lever 835 is pivoted on stud 804 and is provided to govern the resetting of the accumulator according to the number standing therein. When the wheel stands at any position representing a digit other than zero, the lever 835 is rocked in a clockwise direction to close contacts 837. However, when the wheel stands at zero, it is desirable to prevent a resetting operation, and at such times, the cam point 834 is located as shown, directly under the cam extension on lever 835, so that the lever is rocked in a counterclockwise direction to open contacts 837. A bail formation 838 on lever 803 cooperates with lever 835 for the purpose of restoration so that the latter restores the former, positively at zero.

The total testing lever 836 is pivoted on a stud 839 and has an upper yoke formation carrying a pair of insulation rollers cooperating with flexible blades 841 and 842. The arrangement is such that either one or the other of a pair of contacts 843, 844 is closed in cooperation with a common contact brush 845. When a wheel is at a position other than zero, the contact 844 is closed to indicate that a positive balance is in the accumulator, should the wheel be the higest order wheel of the tested accumulator. Although there is one such lever 836 provided in each accumulator order, only a few of such levers are used for negative balance detection and they are the ones which are found in the highest order of balance accumulators. Testing circuits are directed through contacts 843 and 844 to determine whether a 9 is found in the highest order to indicate a negative balance. When a 9 is in such an order, cam point 834 is positioned one step to the right of the position shown in Fig. 23, and it is then under the bottom end of lever 836 and serves to rock the lever in a clockwise direction so that contacts 843 are closed to indicate the presence of a negative balance.

From the foregoing, it is apparent that each accumulator unit is provided with a number of contact operating mechanisms to control transferring, resetting and total testing. However, reference to Fig. 19 shows that a number of additional contacts are provided in each order and placed under direct magnet control. These magnets may be identified as the adding control magnet AD, the listing control magnet LS, the total transfer control magnet RT, the negative total control magnet NT, the positive control magnet PT, the reset control magnet RE, and the subtraction control magnet SU. It is noted that all seven of these magnets and cooperating contacts are constructed in a similar way so that a description of one applies to all.

Referring particularly to the adding control magnet AD, it is seen that this magnet is affixed to a bracket 847 attached to a side of plate 719. Pivoted on bracket 847 is an armature 848 held in a normal position by leaf spring 849. Interposed between the top end of armature 848 and a flexible blade 850, is a small rocker 851 pivoted on the side of the plate 719. The arrangement is such that, when the magnet AD is energized, the armature 848 is drawn toward the left, and rocker 851 is rocked in a clockwise direction to lift the flexible blade and close control contacts ADa. The contacts ADa are affixed to the accumulator unit, but insulated therefrom by a block 852 attached to the side of the plate 719. The connections established by contacts ADa and the other contacts associated with the other six control magnets can be understood more readily when described with reference to the wiring diagram, wherein all external connections are made plain, as well as the connections directly associated with each order, as shown in Fig. 19. The reset magnet RE differs from the other standard magnets in that the rocker associated therewith, operates a linkage including a connecting link 853 for closing a contact REb when the parts are in a normal position. Later, when the contacts REa directly associated with the reset magnet are closed, the other contacts REb are opened.

*Readout devices*

Associated with each accumulator order is a set of commutator devices for electrically detecting the complement or true number of the amount registered on the accumulator wheel. These readout devices are used to control the total printing devices for recording positive or negative balances and also for reading out a true number in a total transfer operation, wherein the number is transferred and added in another accumulator.

It is already explained that a gear 763 (Figs. 20 and 21) meshes with the gear 761 forming part of the accumulator wheel. This gear 763 is provided to carry the brush devices cooperating with a commutator for reading out total amounts. A stud 762 is attached to the accumulator plate 719 to form a bearing for gear 763 which carries a cylindrical insulation member 856 (Fig. 19) holding a pair of wide sensing brushes 857 and 858.

Figure 25:
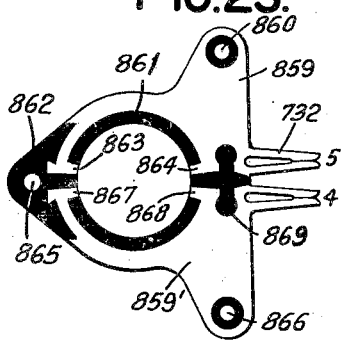
Figs. 25 to 30 are detail views showing the contact plates or elements of a commutator designed to read out impulses representing the number or total registered in the accumulator.
Figure 32:
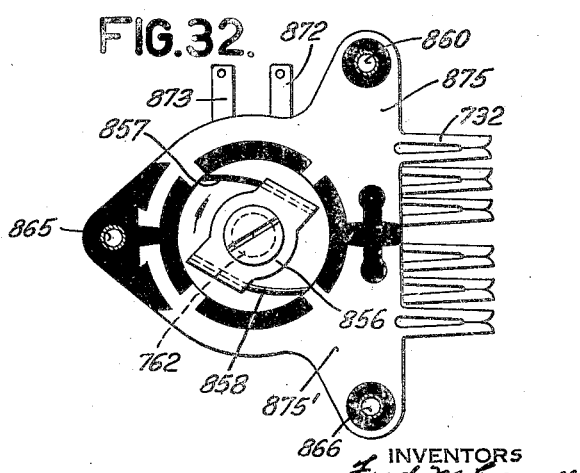
Fig. 32 is a sectional view taken along line 32—32 in Fig. 31 and showing the total readout commutator device.

Referring to Figs. 19 and 32, it is seen that the brushes 857 and 858 rotate in a clockwise direction within a circular opening formed in a set of readout plates tied together and secured to the side plate 719. The plates held within the readout unit are proportioned to present live segments at various positions around the interior of the opening, so that one or the other of the plates are effective to carry impulses according to the position of the brush carrier. The appearance of the six different plates tied together to form the readout unit is illustrated in Figs. 25 to 30. Each commutator plate is completely insulated from the remainder of the accumulating device and is divided into two parts to offer the possibility of reading either a true number or a complement of the amount represented by the position of the brushes. For example, the commutator plate shown in Fig. 25 is the one adapted to give a reading of either 4 or 5 when the associated brush devices stand at 5 or 4. The two contact engaging prongs 732 shown extending from the plate in Fig. 25 are situated so that the upper one engages the 5 impulse sending contact 731 shown in Fig. 19. The lower pair of prongs engage a contact member carrying a 4 impulse from the emitter. The plate 859 is insulated around the center 860 and carries a segmental portion of insulation 861 terminating short of a pair of centralized insulation portions 862 and 869. The impulse conducting part of the upper plate 859 extends at 863 and 864 into the opening in which the pair of brushes rotates. The insulation separator 862 surrounds one of the three assembly posts 860, 865 and 866. The lower plate section 859' is shaped the same as the upper section and is insulated from the third binding post 866.

It also carries conducting segments 867, 868. The arrangement is such that, when an accumulator wheel stands at 5, the connected readout brush structure stands with one brush contacting segment 863 and the other brush contacting segment 868. Through the segment 863 it is possible to read out a 5 impulse giving a true number reading of the accumulated amount 5, and at the same time through the other brush and other segment 868 it is possible to read out a 4 which is the nines complement of the amount in the accumulator. In a similar fashion, when a wheel stands at 4, one brush rests on segment 867 while the other contacts segment 864. Then, a positive true reading of 4 may be taken through plate 859' or a complemental reading of 5 through plate 859 may be directed through segment 864.

Figure 30:
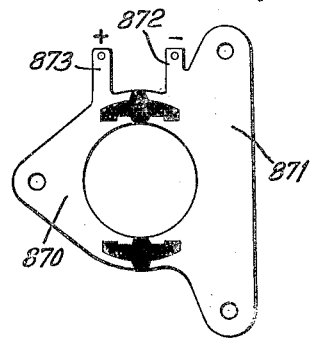

Of course, only one or the other of the two readings is chosen at any one time, and this is done through the negative and positive readout plate shown in Fig. 30. This plate is divided into left and right portions 870 and 871 by a pair of centralized insulation separators. The right part of the plate is the one for reading out complemental readings when a balance is negative. The terminal 872 is provided to carry the impulse away from the commutator. The left portion 870 also has a terminal 873 for conducting the impulses representative of true numbers. As shown in Fig. 21, the commutator brushes are wide enough to contact any of the various digit plates shown in Figs. 25 to 29 and also contact with the conducting surface around the opening between plates 870 and 871 (Fig. 30).

Referring to Fig. 25, it is seen that the segments 863 and 867, for reading out the true representations of amounts, coincide with the left portion 870, Fig. 30, leading to the terminal 873 for conducting positive balance amounts. The other two segments 864 and 868, Fig. 25, are on the side of the opening coinciding with the right portion 871, Fig. 30, provided to conduct complemental impulses.

Figure 26:
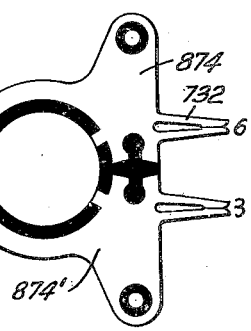
Figure 27:
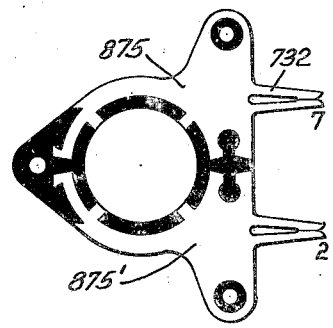
Figure 28:
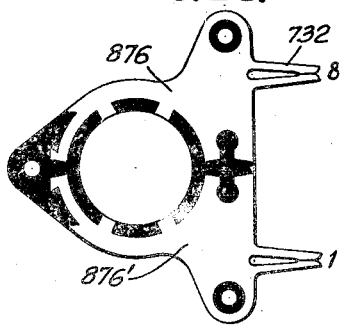
Figure 29:
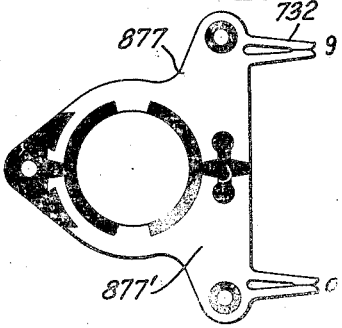
Figure 31:
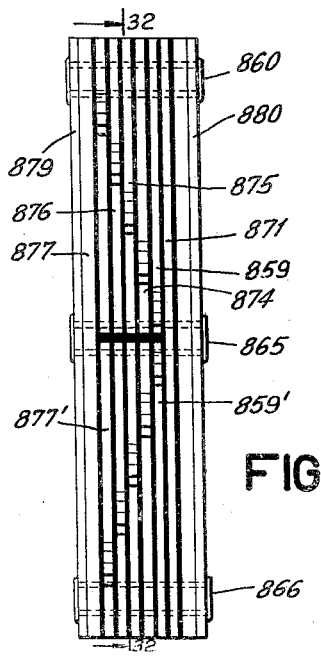
Fig. 31 is a side view of the assembled commutator plates.

The other commutator plates shown in Figs. 26 to 29 are in most respects similar to the plates described with reference to Fig. 25, the only differences being that the segments are situated to read out different amounts and the contact terminals are situated to engage conducting bars carrying differently timed impulses from the emitter. In Fig. 26 the upper plate 874 carries a 6 impulse, while the lower plate 874' carries a 3 impulse. In a like manner the plates 875 and 875' of Fig. 27 carry 7 and 2 impulses, respectively. In Fig. 28 the plates 876 and 876' carry 8 and 1 impulses, respectively. The plates 877 and 877' of Fig. 29 carry 9 and zero impulses, respectively. All six plates are assembled as shown in the end view, Fig. 31. There it is seen that the parts are held together between side plates 879 and 880 but insulated from each other. It is also seen that the contact engaging terminals 732 assume an obtuse V-formation ranging from the closely spaced extensions of plates 859 and 859' to the widely separated contact members of plates 877 and 877'. The interior arrangement of the plates is shown in Fig. 21, where the wide brush 858 is seen to span the positions occupied by all six plates.

Contact is established with only one related pair of plates according to the position of the pair of brushes. In Fig. 32 the parts are shown arranged with the brushes situated in the 7 position. There the brush 857 cooperates with the commutator plate 875 to read out a 7 impulse and direct it over across the brush into the negative plate 870 carrying the terminal 873. Should a negative balance be detected and other total circuit connections be established, then a 2 impulse is read out through plate 875' across brush 858, into the plate 871 and out through the negative terminal 872.

The readout commutator assembly is situated with respect to the other accumulator parts on plate 719 as shown in Fig. 19. There it is seen that the two binding posts 860 and 866 are attached near the right side of the accumulator plate and the third binding post 865 is situated at the left and beyond the teeth of the meshing gears 761 and 763. When the accumulator unit is removed from the machine by being drawn toward the left (Fig. 19), the ten contact engaging clamps 732 are disengaged from the impulse carrying conductors 731. There are no permanent connections, these readout connections and the other five contacts arranged above them being the only connections to the wiring in the machine other than the grouping contacts.

*Accumulator grouping devices*

Provisions are made for grouping one or more accumulator units or denominational order devices together for common control. The object of these novel grouping devices is to provide flexibility in exercising many varieties of control over various sizes of accumulators actuated for different accounting purposes. As already explained with reference to Fig. 11, a plurality of accumulator holding plates 719 are arranged in two tiers at the back of the machine and they are held in place by grouping insulation boards 723. The accumulator arrangement is also shown in the rear view (Fig. 52), where the connections associated with the insulation plates are disclosed more fully.

Before going into detail with regard to the hinged mounting of the two group boards, it is believed well to turn to Fig. 19 and see how the board is assembled with relation to impulse carrying bars carried thereby and the contacting impulse detecting fingers carried by the accumulator plate 719. Between the grouping board and the accumlators is assembled a grouping control sheet G such as that shown in Fig. 46. This sheet extends across an entire tier of fifty accumulator unit mechanisms, and it is divided into fifty horizontal perforation positions wherein one or more perforations may be cut to provide an impulse conveying opening. Furthermore, the sheet is divided into a large number of vertical positions, one or more of which relates to one of the functions to be exercised over certain groups of accumulator mechanisms. For example, in the upper left hand corner of sheet G, the identification "Add" is associated with eight horizontal perforation representing positions. The uppermost line bears two perforations in the first and second horizontal positions. This is an indication that the two accumulating mechanisms at the left of the machine are grouped together for common adding control. In a similar way the second horizontal position of adding control carries four perforations in the third to sixth horizontal positions, showing that the four related accumulating mechanisms are grouped for adding control which may be selected at times differing from the other two adding mechanisms already mentioned.

The sheet bears a great many other perforation positions for the purpose of grouping various orders for other functions, such as subtraction, credit symbol printing, listing, total transferring, resetting, positive and negative total marking, total testing, positive and negative total grouping, total printing, transferring, and spillover transferring.

It is understood that two such sheets are required to control the upper and lower tiers of accumulator mechanisms. Various forms of such sheets may be inserted to control the machine for different accounting problems. They are replaceable and it is the object of the mechanism about to be described to arrange means rendering them easily accessible for changing.

Referring to Fig. 11, it is seen that the two grouping boards 723 are hinged on rods 882 and 883. It is on these rods that they are rocked rearwardly to move the grouping sheets G away from the accumulator plate contacts, so that the grouping sheets may be replaced when other arrangements and functions are desired. Since the swinging mounting of both plates is similar, the description may be confined to the devices associated with the lower board.

In Fig. 52, it is seen that a pair of bearings 884 extend from the horizontal frame 129 and carry the hinge rod 82. Pivoted on opposite sides of this rod are a pair of brackets 885 attached to the bottom side of the angle iron 725 binding the lower grouping board 723. At the upper end, the lower grouping board carries another pair of brackets 886 extending from the top surface of the upper angle iron 725. Pivotally connected to the outside of each of the upper brackets 886 is a link 887 (Figs. 53 and 54 on the sheet with Fig. 33), the other end of which is articulated at 888 on the center of an arm 889 attached to a hub 890 secured to the rod 883. The toggle arrangement including link 887 and arm 889 is provided to lock the grouping board in the normal closed position and alternatively, to hold it in an extended record changing position.

As shown in Figs. 53 and 54, the parts are in the locked position, wherein a plunger formed with a knurled head 893, assembled on the swinging end of arm 889, is inserted in a lock opening in the frame member 128. Attached to this knurled plunger 893 is a chain 894 with a terminal clip 895 at its other end, secured to the frame of the machine. This chain limits the rearward swinging movement of the grouping board. When it is desired to change the grouping sheet G, the knurled knob is grasped and pulled outwardly to free arm 889 and at the same time a socket wrench is placed over the square end 896 on rod 883, and it is rotated in a clockwise direction (Fig. 53) to swing arm 889 clockwise to an extent allowed by chain 894. As this is done, link 887 pushes the upper end of the grouping board 723 toward the right and swings it about the hinged rod 882 (Fig. 11). Thus, an opening is presented between the rear edges of the accumulator contacts and the contact portion of the grouping board. There is enough room for the fingers to reach in and grasp the grouping sheet G and remove it before inserting another sheet.

There are times when it is desired to remove one or more of the accumulator carrier plates 719 (Fig. 11), and then it is necessary to swing the grouping board 723 to a greater extent than the displacement made for changing the grouping sheet. In order that the grouping board may be swung all the way down, below the pivot 882, it is necessary to remove the two pivot screws 897 (Figs. 53 and 54) holding the ends of links 887 to the brackets 886. Then the entire frame is free to be rocked down out of the path of plates 719 (Fig. 11) which are withdrawn by sliding them horizontally to the rear.

Reference to Figs. 19 and 33 shows that a large number of horizontal bars are embedded in the grouping board 723. These bars correspond in number and location with the arrangement of possible horizontal perforation positions shown on the grouping sheet G (Fig. 46). The bars are designated by reference numerals 900 to 914 and are grouped according to the function exercised by the impulses flowing therethrough. For example, the eight upper bars 900 are concerned with the production of impulses for controlling adding in one or more, and as many as eight, different groups of accumulating mechanisms. Cooperating with these eight upper bars (Fig. 19) is a contact plate 916 (Fig. 19) held on accumulator plate 719 but insulated therefrom by a strip of insulation 917. Plate 916 is formed with eight flexible fingers 918 extending away from the accumulating mechanism as shown in Fig. 34 and coinciding with the eight horizontal positions assumed by the grouping bars 900. It is possible that all eight of the fingers 918 could be made ineffective by the presence of a grouping sheet G between the fingers and the grouping bars. However, when a perforation is presented between the two, the finger extends through the grouping sheet and presses into contact with the related bar 900 as shown in Fig. 34. There it is seen that each finger is formed with a double L configuration to provide extreme flexibility at the contacting end. The opposite side of the contact plate 916 is formed with an inwardly extending terminal 919 to which is attached a wire connecting the plate to the related magnet or contact.

In the case of the adding plate 916, the terminal 919 is connected to one side of the magnet coil AD for conveying an impulse thereto to set up contacts for arranging adding control in the related order. The actual connections of all the various terminal plates are not shown in Fig. 19, to avoid unnecessary confusion of the showing therein, since the full disclosure of the wiring connections is given in the wiring diagram to be fully described hereinafter.

Turning back to the showing of Fig. 34, it is seen that an insulation bar 921 is placed in a vertical position over all contact plates and on it is attached an L-shaped guard plate 922, the extending leg of which passes around most of the contact finger 918 to shield the sensitive extensions when the accumulator unit is out of the machine or being removed therefrom. The reason why a plurality of fingers, such as finger 918 (Fig. 19), is provided on a single plate is that, not only is it possible for more than one grouping bar to be effective to call for control of the same accumulator order, but also that any one of the grouping bars may be effective to call any operating controls for the related order when other of the bars are associated with the different orders.

The other of the contact plates may be identified and described with relation to the functions effected by the cooperating grouping bars. The second contact plate 924 (Fig. 19) is associated with the six grouping bars 901 for conducting subtraction control impulses into the accumulator. The lowest finger on this plate cooperates with a wide bar 902 connected to control the marking of a credit symbol on the record sheet. The next contact plate 925 also has a finger cooperating with bar 902 for participating in the control associated with the representation of a credit item. The remaining fingers on this same plate 925 cooperate with six grouping bars 903 for conducting impulses controlling the listing of amounts accumulated in the related accumulator unit. The next contact plate 926 is provided to carry impulses for effecting connections for total transfer control to read out the positive amounts standing in the accumulator orders, wherein such control impulses are directed by one or the other of the three grouping bars 904.

Contact plate 927 is concerned with the sensing of reset control impulses carried through one or the other of the five grouping bars 905. The single finger plate 928 is designed to cooperate with a grouping bar 906 to carry an impulse for controlling the recording of a + sign to indicate the presence of a positive balance. In the same way, the adjacent plate 929 is concerned with contact to a bar 907 for conveying controls for effecting the marking of a minus sign. The next plate 930 cooperates with six grouping bars 908 which direct total testing control impulses into the highest orders of one or more accumulators for detecting whether such accumulators carry positive or negative balances.

A double fingered plate 931 is provided to cooperate with an angular cross-over connecting bar 909 which extends from one vertical line of grouping perforations to the next vertical line of grouping perforations as seen in Fig. 33. This bar 909 and plates 931 are concerned with the grouping of accumulator orders for positive totals. In a similar fashion, the adjacent plates 932 are associated with cross-over grouping bars 910 extending from order to order to couple the parts of groups of orders relating to negative totals.

The next two finger plates 933 and 934 cooperate with a wide grouping bar 911 provided to conduct the total printing control impulses. The two lower contact plates 935 and 936 are concerned with the conduction of transfer control impulses through the cross-over conducting bars 913 extending from lower to higher orders as shown in Fig. 33. These plates 935 and 936 have a plurality of other fingers cooperating with individual grouping bars 912 and 914 which are provided for the purpose of conducting what is termed "spill-over" impulses from the higher to the lower orders of accumulators operated with complemental amounts. During the operation of the series of related accumulator orders in the performance of negative amount entry, complemental amounts are filled out by the addition of an elusive unit, which is an impulse created by the successive addition of the complemental digits 9 in the highest order, resulting in a carry or transfer which is conducted around to the lowest order and added to the 9's complement in that order to fill it out to the tens complement. The ends of the bars 912 and 914 are connected as shown in the wiring diagram to provide a circuitous path leading from one or more of the higher orders of the accumulators to the lower orders of such accumulators. The same connections are also useful in providing transfer circuit paths for widely separated orders of an accumulator.

Although the various connections for producing the many functions relating to accumulating are set forth in the foregoing section of the description, it is apparent that a full explanation of all the controls associated therewith cannot be given at this point in the description. Selection of the various controls is dependent upon the operation of program devices and plugboard connections yet to be described. However, when reference is made hereinafter to the electrical controls with reference to the complete wiring diagram, a fuller understanding may be had of all the operating controls.

In Figs. 19 and 33 it is noted that the angle irons 725 binding the upper and lower edges of grouping board 723 are notched to provide a locating means for the grouping sheet G. Of course, similarly located notches can be provided in a vertical plane to locate the other two edges of the grouping sheet. Moreover, suitable clamping devices may be provided to hold the grouping sheet in a definite horizontal position. Reference to Figs. 33 and 46 shows that the grouping control perforations are spaced apart at the intervals representing the spacing of the accumulator holding plates 719. These spaces are of such widths that a number of intermediate control perforations, as many as four such intermediate perforation positions, may be interspersed to provide five different grouping controls from the same grouping sheet. Then, all that is necessary to change the functional operation of the machine is to slide the grouping sheets horizontally to one of the five different perforation bearing positions and the selected controls are automatically effected through the contact fingers 918 (Figs. 19 and 33) and the cooperating grouping bars. The pressure of the accumulator contact fingers 918 serves to hold the sheet in place after the grouping board is locked in the home position.

Group control devices

The machine is provided with devices for detecting changes in card groups as they pass through the sensing devices. As is usual in tabulating practice, the cards are grouped together, with the cards of the same group bearing similarly arranged perforations representing a common group number. Then, when a plurality of such groups are stacked together in the card magazine, they are advanced one by one through the sensing stations. It is desirable to continue feeding as long as cards relating to the same group are presented. However, upon detection of a difference in group number between the last card of the outgoing group and the first card of the incoming group, it is desired that the machine detect this and initiate controls for taking totals, resetting and cause other operations to take place for gathering accounting data relating to the groups.

Heretofore, group control devices were controlled by pairs of sensing stations so that two successive cards sensed simultaneously revealed whether they related to the same group or two different groups. The present construction differs in that a single sensing station is all that is required. Cooperating with this sensing station are mechanical storage devices for retaining a group number reading for one cycle so that a reading taken from a second card one cycle later may be compared therewith. Cooperating with the storage devices are contact shifting controls for normally preventing control circuits as long as agreeing records of a single group pass the sensing station. However, upon operation of the storage reading device by impulses representative of different group numbers, the contact devices are shifted to make effective circuits for calling into operation minor, intermediate or major group control functions.

It is mentioned heretofore with reference to Fig. 5 that a train of gearing is provided for driving the shaft 221 which is driven through one revolution in a clockwise direction during each cycle of operation of the machine. This shaft carries twenty gears 220 for operating a like number of comparing control units. It is noted that shaft 221 passes through a pair of large brackets 225 secured to the central web 87 running vertically through the center of the machine. Fastened between the two brackets 225 is a pair of horizontal separating members 939 and 940. It is between these two horizontal plates that there is assembled a set of twenty individual control plates 941. Each of these plates 941 carries a group control comparing mechanism such as that shown in Figs. 42 and 43.

Turning back to Fig. 5, it is noted that the unit of mechanism held within brackets 225 includes the card feed cam contacts operated by shaft 215 as well as the comparing unit and the cooperating gearing. These parts may be removed as a unit by unscrewing the brackets from the main frame of the machine. When a smaller section of the comparing unit is to be taken out, such as a single auto control mechanism on one of the plates 941, the confining end plates 942 are removed so that one or more of the plates 941 can be withdrawn horizontally toward the rear of the machine.

Figure 42:
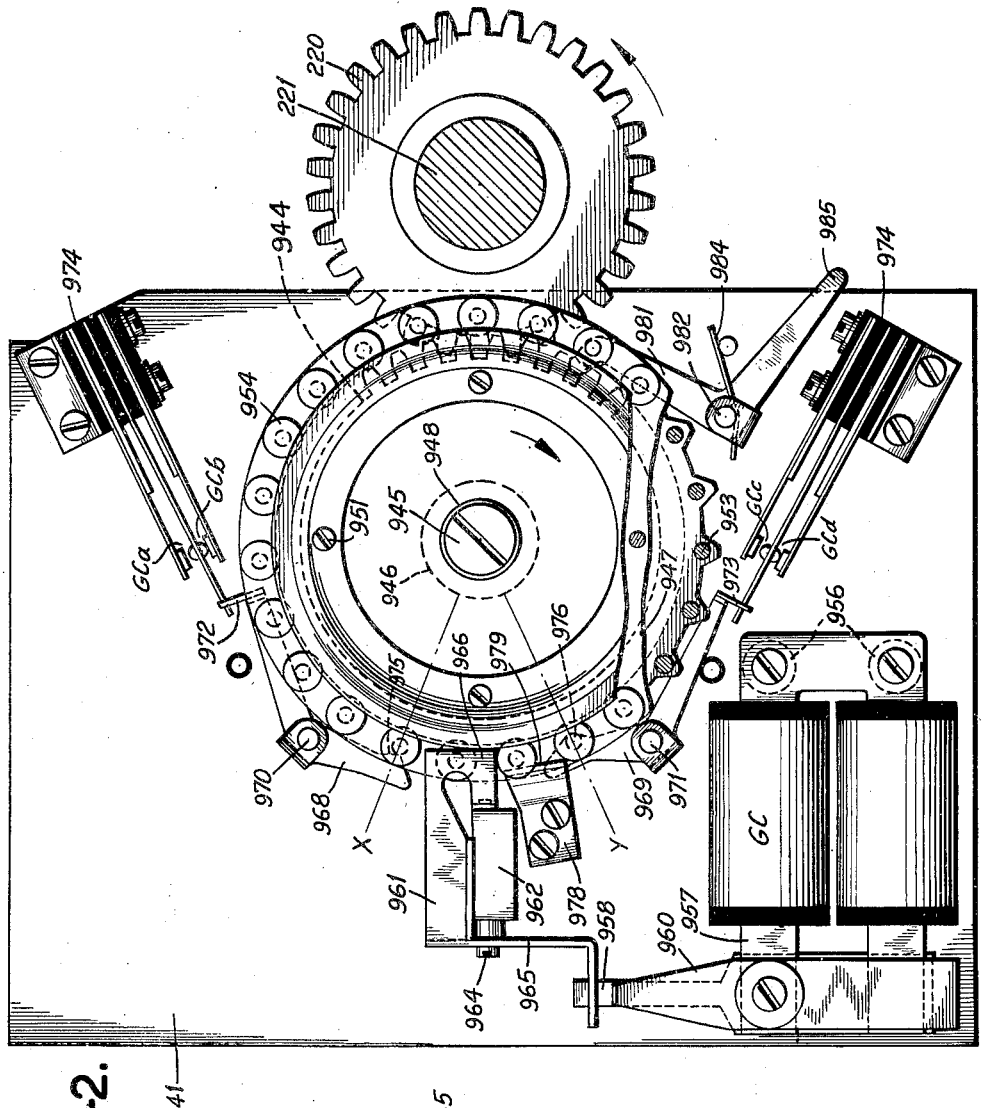
Fig. 42 is an elevation view showing the pin wheel and cooperating contact devices comprising one order of group control mechanism.
Figure 43:
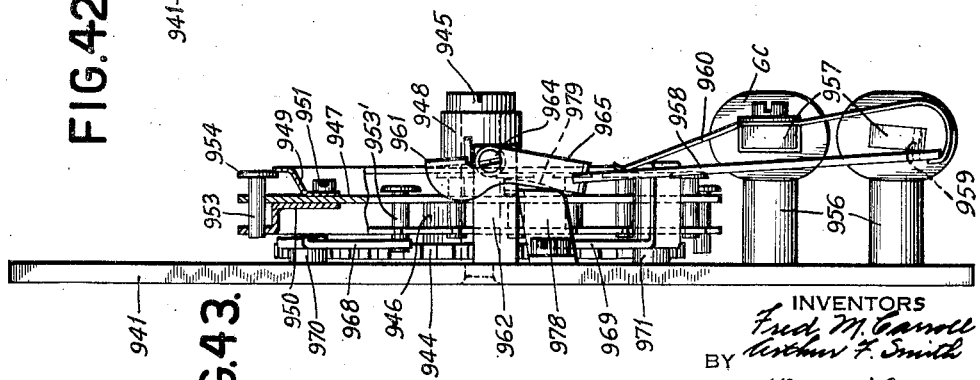
Fig. 43 is a side elevation view partly in section showing the group control devices of Fig. 42.

One of the control unit drive gears 220 is shown in Fig. 42 where it is seen to operate in a counterclockwise direction. It meshes with a somewhat larger drive gear 944 pivoted on a screw stud 945 extending from plate 941. The gear is freely mounted on the stud but is connected to a bushing 946 which is attached at its other end to a pin carrying disk 947. A hub 948 extends outside the disk to rotate on the screw stud 945. Secured on opposite sides of the disk 947, Fig. 43, are a pair of flanges 949 and 950. The three disk parts are held together by a series of four screws 951 spaced at equal intervals around the connected parts of the flanges. Located near the periphery of the central disk 947 and the inner flange 950 are a series of equally spaced and aligned circular openings. There are twenty-three sets of such aligned openings and each one carries a slidable pin 953 formed with a head 954. When these pins 953 are in a normal inactive position, they are located as shown by the top pin in Fig. 43 which is seen to be situated with the head 954 cooperating with the inside face of flange 949. An operated pin 953' is shown pushed over towards the left (Fig. 43).

The means for operating the pins, to slide them into the effective position, is operated under control of a magnet GC, one of which is provided for each of the twenty comparing units. This magnet is mounted on a pair of studs 956 which are attached to plate 941 at one end and at the other end carry a U-shaped pole piece 957. Cooperating with magnet GC is an armature lever 958, the lower end of which carries a pivot point 959 extending into a fulcrum opening formed in the lower leg of the pole piece 957. Attached to the upper extension of the pole piece is a leaf spring 960, the upper end of which presses against armature 958 to tend to rock it counterclockwise and towards the left, Fig. 43, into the inoperative home position. The lower end of the spring is held around the bottom of the armature lever to retain it in cooperation with the fulcrum opening.

Cooperating with the upper end of armature lever 958 is a bail 961 pivoted to rock horizontally on an extending block 962. A screw 964 passes through a collar and into block 962 to act as one of the pivots for bail 961 which is pivoted at the opposite end on a pin extending from the block. Bail 961 is formed with a depending L-shaped arm 965, the lower end of which is shaped as a fork to engage the upper end of the armature lever 958. The arrangement is such that when magnet GC is energized, lever 958 is rocked in a clockwise direction (Fig. 43) and its upper end, rocks bail 961 in a counterclockwise direction so that the portion 966 thereon, extending into the path of the rotating pins 953 (Fig. 42) is depressed into contact with the head 954 of one of the pins. The operation of the machine is timed so that as a perforation position on a card is passing under the sensing brushes 302 (Fig. 6), a registering pin 953 is passing under the extending bail formation 966, as shown in Fig. 42. Then if a perforation is detected, the magnet is energized, the bail is rocked and the pin is pushed to an extended position as shown by pin 953' (Fig. 43).

Placed in the path of the extending operated pins are two contact operating levers 968 and 969. Each of these levers has a bail formation for encircling a fulcrum stud, the upper lever 968 being pivoted at 970 and the lower lever being pivoted at 971. The upper lever carries a fork-shaped extension 972 for engaging the central blade of a pair of contacts GCa and GCb. The lower contact lever carries a similar member 973 engaging the flexible central blade of a pair of contacts GCc and GCd. The four group control contacts are attached to the control plate 941 but insulated therefrom and from each other by sets of insulation blocks 974. The contacts are operated when cam points 975 and 976 are struck by inwardly extending pins placed in the position of operated pin 953' (Fig. 43), the end of which is seen to strike lever 968.

The contact operating levers and the cam faces 975 and 976 are situated so that they are operated by pins spaced to coincide with the twenty cycle points of operation. The operating points are marked by the dot and dash radial lines X and Y extending through the cam points. It is noted that counting in the clockwise direction, starting from the pin cooperating with cam face 975, there are twenty intervals or pin spaces between the X position and the Y position wherein a pin may cooperate with the cam face 976. The parts are so arranged because of the need that the pin passing cam face 976 be exactly one cycle advanced beyond the pin passing cam face 975. When a pair of successive cards carry agreeing group control perforations, the bail 961 is actuated before and after an exact interval of one complete cycle and therefore two pins will be pushed into extending positions at an angle with relation to the periphery of the disk corresponding to the angle defined by the lines X and Y. When such agreeing control pins operate the contact moving levers, the result is that both sets of contacts are shifted at the same time and there is no control circuit set up. However, should there be a difference in group numbers of successive cards, the bail 961 is operated at an interval other than an interval of one complete cycle and pins 953 spaced apart other than a twenty pin space interval will be extended to cause operation of one or the other of the contact levers 968 and 969 alone with the result that one set of the control contacts are shifted at a time when the other set remains stationary. Then a control operating circuit is directed through the shifted contacts to call into operation one of the minor, major, or intermediate total taking functions.

The reason why more than twenty-one pins are provided around the periphery of the storage reading disks is that a pair of extra positions must be provided for the operating and restoring functions connected with the movement of pins 953. It is already explained how bail 961 operates to extend certain pins when they pass one cycle point before the operative X position. Other restoring means is provided to cam out depressed pins when they pass through a position one cycle point beyond the Y position. This restoring means takes the form of a cam plate 978 formed with an angular edge 979 (Fig. 43) for passing under the head of a moving depressed pin and pushing it towards the right (Fig. 43) as it goes from the Y position (Fig. 42) and before it passes under the operating portion 966 of bail 961.

From the foregoing description, it is apparent that when a certain pin is operated, it moves on to the X position to actuate contacts for comparison with a previously operated pin then passing the Y station. The last operated pin then continues beyond the X position and remains extended as it is carried around in a clockwise direction and brought into the Y position where it then becomes an operator for the lever 969, the operation of which should be matched by a corresponding operation of lever 968 by a newly depressed pin, indicating that a second card corresponds in group number with a first card. Since the storage device presents operating members spaced at an interval of twenty points, it is apparent that the record cards for continually and simultaneously operating such members must present number perforations coinciding and having similar twenty cycle point differentials.

As shown in Fig. 42, the contacts GCd remain closed at the same time that contacts GCb are closed and this is an indication of a group change and an impulse is sent through the closed contacts to effect control. In a similar way, if contacts GCc are closed at the same time that contacts GCa are closed, there will result a control operation. In order that the machine may continue to operate, as it should without group changes, both contact levers are to be shifted at the same time, so that contacts GCc are closed when contacts GCb are closed. The full effect of these different contact positions is made evident hereinafter with reference to the wiring diagram showing all circuit connections.

Locking means is provided to hold the operating gear 944 (Fig. 42) in a certain position when the unit plate 941 is removed from the machine. For this purpose, a detent lever 981 is pivoted at 982 and provided with a pointed end 983 extending between the teeth of the gear. A leaf spring 984 cooperating with detent 981, tends to rock it in a counterclockwise direction and hold it in the gear locking position. However, when the unit is assembled, a projecting tail 985 on the detent is pressed against the stopping strip 942' (Fig. 5) and rocked in a clockwise direction to disengage it from the gear. Thus, it is clear that the detent is provided to hold the gear 220 in a meshing position when the control unit is removed from the machine.

Program selecting devices

The machine is provided with record controlled devices for automatically selecting various functions in a predetermined sequence. A program sheet is perforated to cooperate with sensing devices and call into operation one function after another in a sequence predetermined by the arrangement of the perforations. Program control is called into operation in one of five different ways; three of the program initiating controls are effected by changes in card groups involving minor, major and intermediate group number changes. The other two program initiating controls are manually operated by depression of progressive or final total keys. These five different controls for calling program operation into effect, not only do that, but also shift brush devices cooperating with the perforated program sheet so that a predetermined function is selected initially.

After the first selection of program control, the program control sheet is advanced step by step between cycles of operation of the machine, and eight other functions may be selected in sequence through the arrangement of perforations in the record.

From the foregoing and by reference to the program sheet PG shown in Fig. 47, it is apparent that the program devices have nine times five, or forty-five different possible selections of sequence. These are represented by horizontal lines of perforations or indicia positions located in the nine separate sequence blocks on the program sheet. Each of the nine blocks is further divided into five sections relating to the different types of automatic and manual machine controls; major, intermediate, minor, final and progressive.

The forty-five different horizontal lines of control on the program sheet relate merely to selection of sequence of such control, while the forty-eight vertical lines of indicia relate to different functions and different total taking, resetting and total transfer connections which may be effected under program control. Noting the different headings of the vertical columns on the sheet PG in Fig. 47, it is seen that starting in the upper left hand corner, four lines of perforation positions are devoted to selector control and other single lines are provided for the selection of line spacing, summary punching, program resetting, accumulator resetting, total selection, total transfer selection, record sheet ejection and hand total operation. There follows a section of vertical control positions for sending impulses to total taking busses.

Another group of indicia positions is provided for perforations which send impulses to reset busses. A section at the right is sub-divided into two other portions, all for total transfer busses, one of which directs the sending of impulses and the other for receiving impulses to effect adding in those accumulators on the receiving end of a total transfer operation.

Before describing the devices for sensing the program sheet and controlling operations thereby, it is believed well to point out the location and operation of the program devices as a unit. Referring to Fig. 1, it is noted that the door 76 is provided in the lower left hand portion of the case 75, and it is through this door that the program devices may be assembled or removed for adjustment. In Figs. 5a and 11, a program unit is seen to be held within a pair of side frames 988 and 989 attached to the front wall of the square core 84. The side frames are held in a spaced relationship by a rectangular bar 990 also attached to the core of the main frame. Other unit bracing portions are provided in the form of smaller rectangular bars 991, 992 as well as a thick insulation bar 993. A small intermediate frame 994, Fig. 35, is attached to bars 990, 991 and serves to support one end of the short driving connection shaft 145. As already explained hereinbefore, shaft 145 (Fig. 11) carries a gear 144 meshing with the constantly operating gear 143. The relationship is such that shaft 145 is driven through one complete revolution for each cycle of operation of the machine.

Before explaining how the driving connections are used to reset the program device, it is believed well to point out how the program sheet is held and operated. Supported in bearings 995 and 996 attached to the unit side frames, Fig. 35, is a shaft 997 carrying a cylindrical drum 998 upon which the program sheet PG is assembled. The parts making up the program drum are best shown in Fig. 38 where it is seen that the barrel of the drum is separated from a cup-shaped end piece 999 by a circular piece of insulation 1000. The drum is freely rotatable with respect to shaft 997, being carried thereon by a ball bearing 1001. A similar construction (not shown) is provided at the left end of the drum (Fig. 35) with the addition thereto of an extending wheel 1002 provided for manual operation and adjustment of the drum.

Although the program drum is free to rotate on shaft 997, it is held in one of ten regular positions by a detenting arrangement shown in Fig. 40. There it is seen that attached to the left end of the drum is a star wheel 1004 with which there cooperates a roller 1005 on the end of one arm of a bell crank 1006 pivoted at 1007 on the left side frame. A spring 1008 tends to rock the bell crank into cooperation with the star wheel, so that the program drum is held in or advanced to one of the nine operating positions when the sequence control devices are operated as explained hereinafter.

The program sheet PG is held around the periphery of drum 998 by a clamping arrangement best shown in Figs. 35 and 40. The clamp is in the form of a bail 1010 extending across the width of the drum and provided with a pair of inwardly extending arms pivoted at 1011 on the inner wall of the end pieces supporting the drum. A spring 1012 tends to rock the bail in a clockwise direction (Fig. 40) to clamp the ends of the program sheet against the outside of the drum. The drum is formed with a long slot into which there extends from bail 1010 an overturned lug 1013 for pinching the top end of the program sheet against a curved edge 1014 formed alongside the slot in the barrel of the drum. The bottom end of the program sheet is clamped between the lower surface of the cross bar of the bail and a depressed portion 1015 extending across the barrel near the bail opening. The arrangement is such that the bail is normally below the circular surface of the program sheet, so that during restoring there is no obstruction presented as the clamping line passes under the sensing brushes. The clamp is arranged for easy manual operation, so that it may be pulled outwardly to release the sheet, after which the end of a newly selected program sheet may be inserted in the slot in the drum and the tail of the sheet drawn around the drum, so that the lower end extends under the clamp which is then released to hold both ends of the sheet on the drum.

Cooperating with the program sheet is a rocking frame carrying a set of sensing brushes 1017 arranged horizontally across the surface of the sheet. The frame is made up with a cross bar 1018 of insulation material and two side arms 1019 and 1020 carrying hubs which are pinned to shaft 997 as shown in Fig. 38. The arrangement constitutes a bail for carrying the set of forty-eight brushes which can be placed into one of five positions according to the kind of control selected automatically or manually by the group control devices or the total keys of the machine.

Extending from the lower edge of cross bar 1018 (Fig. 40) is a series of contact blades 1022, each of which is electrically connected to a related one of the separate sensing brushes 1017. These blades 1022 are flexible and pressed downward into cooperation with segmental contact strips 1023 embedded in the insulation bar 993. These strips 1023 are formed to be concentric with the center of shaft 997 and wired to posts 1024, so that electrical connections are maintained between the movable brushes 1017 and the stationary binding posts 1024 found on the bottom surface of the insulation bar 993. Impulses are carried through the metallic barrel 998 of the drum and through perforations in the program sheet, allowing brushes 1017 to make contact at predetermined times, and these impulses are carried further through blades 1022 and strips 1023 to posts 1024, from whence they are directed to various parts of the machine as illustrated in the wiring diagram.

Preliminary operation of the program device is effected by movement of the brush carrying bail to one of five different positions under control of the five magnets MA, INT, MI, FI and PROG, shown in Fig. 35. These magnets are operated upon occurrence of group changes in sets of record cards and also upon manual depression of the final and progressive total keys. They serve to set up stops in the path of the right hand side arm 1020 (Fig. 36) attached to the bail carrying the brushes 1017. Arm 1020 is formed with a series of steps or shoulders 1025 to 1029 spaced apart radially at equal intervals. Arranged in the path of the shoulders on the brush carrying bail is a series of five plungers or stopping rods 25a to 29a guided in a bracket 1031 attached to the side of the rectangular bar 992.

In Fig. 38 it is seen that the bracket 1031 is located alongside an opening 1032 in the top of bar 992 through which the bail arm 1020 can swing into contact with a projected end of any one of the five stopping rods. The rods are pushed toward the right in Fig. 38, individually under control of the several magnets already pointed out. Since the operating connections from the magnets to the stopping rods are similar, one of them may be described and taken as representative of all.

Referring to the connections associated with the progressive total magnet PROG (Fig. 38), the magnet is seen to be mounted on a bracket 1030 secured to the side of bar 992 and formed with a series of projections for holding the various operating controls. Pivoted at 1033 on the right end of bracket 1032 is an armature lever 1034, the lower end of which is subject to the attraction of the magnet and so pulled toward the left, to rock in a clockwise direction about center 1033 and cause the upper end to move toward the right to push the plunger rod 29a into the opening 1032 and in the path of arm 1020 (Fig. 36), so that, when the arm and conneced brush holder are released, a spring 1035 is effective to bring shoulder 1029 against the end of pin 1029a. The movement so produced is equivalent to five steps of vertical descending movement to pass the top four horizontal lines of perforations shown on the program sheet PG in Fig. 47. Such movement carries the brushes from a normal position above the line of major control perforations (which is the first line at the top of the program sheet) and brings the brushes down to the fifth line to cooperate with any progressive control perforations found therein.

Turning back to the magnet operating connections shown in Fig. 38, it is seen that the end of rod 29a nearest the magnet is supported by a bracket 1037 provided with openings for all five rods. The end of the rod near bracket 1037 carries a stop collar 1038 normally abutting against the side of the bracket, and between this collar and the main supporting bracket 1038 is a compression spring 1039 for restoring the rod when the armature 1034 is restored counter-clockwise by its spring 1040.

The other rods 25a, 26a, etc. (Fig. 36) are operated in a similar fashion, to be projected into the path of arm 1020 under control of the different magnets and effective to cause differential degrees of movement of the swinging brush holder by virtue of the spacing of the cooperating shoulders 1025, 1026, etc. In this way, any one of five different initial movements may be produced to advance the horizontal line of control brushes 1017 into cooperation with any one of the five horizontal lines of control perforations in the program sheet. This movement is related to selection with respect to the first of nine sequential program controls. It is produced independent of drum movement, but the second and following sequences of control are produced by drum movement rather than brush holder movement.

Turning again to consideration of the mechanisms associated with each magnet, it is noted in Figs. 38 and 39 that a latch crank 1042 is pivoted horizontally at 1043 on an ear projecting from bracket 1032. One arm of this latch is formed with a shoulder 1044 in the path of the upper end of armature lever 1034. A spring 1045 coiled around center 1043, tends to rock the latch in a clockwise direction (Fig. 39) and hold the latch against the side of the armature lever, so that upon energization of the magnet and operation of the armature, the armature moves past shoulder 1044, and the latch snaps in to hold the armature lever in the operated position. The maintenance of the position of the stopping rod 29a is then made independent of the deenergization of magnet PROG. The purpose of these latching arrangements is to hold the brush bail in adjusted position for a plurality of cycles which are likely to occur during operation under program control.

Cooperating with the five latches 1042, associated with the different brush positioning operators, is a common restoring means in the form of a link 1047 (Fig. 35) slidably mounted on pin and slot connections 1048 and 1049 provided on the side of rectangular bar 992. Link 1047 is formed with a series of five projections 1050 projecting vertically alongside the arms on cranks 1042. These crank arms project through openings in bar 992 as shown in Fig. 39, the magnets and operating connections being on one side of bar 992 while the restoring link 1047 is on the other side. An extra opening 1051 (Fig. 38) is formed in bar 992 to provide access for an operating lever 1052 (Fig. 40a) cooperating with another projection 1053 on the restoring link 1047.

Figure 36:
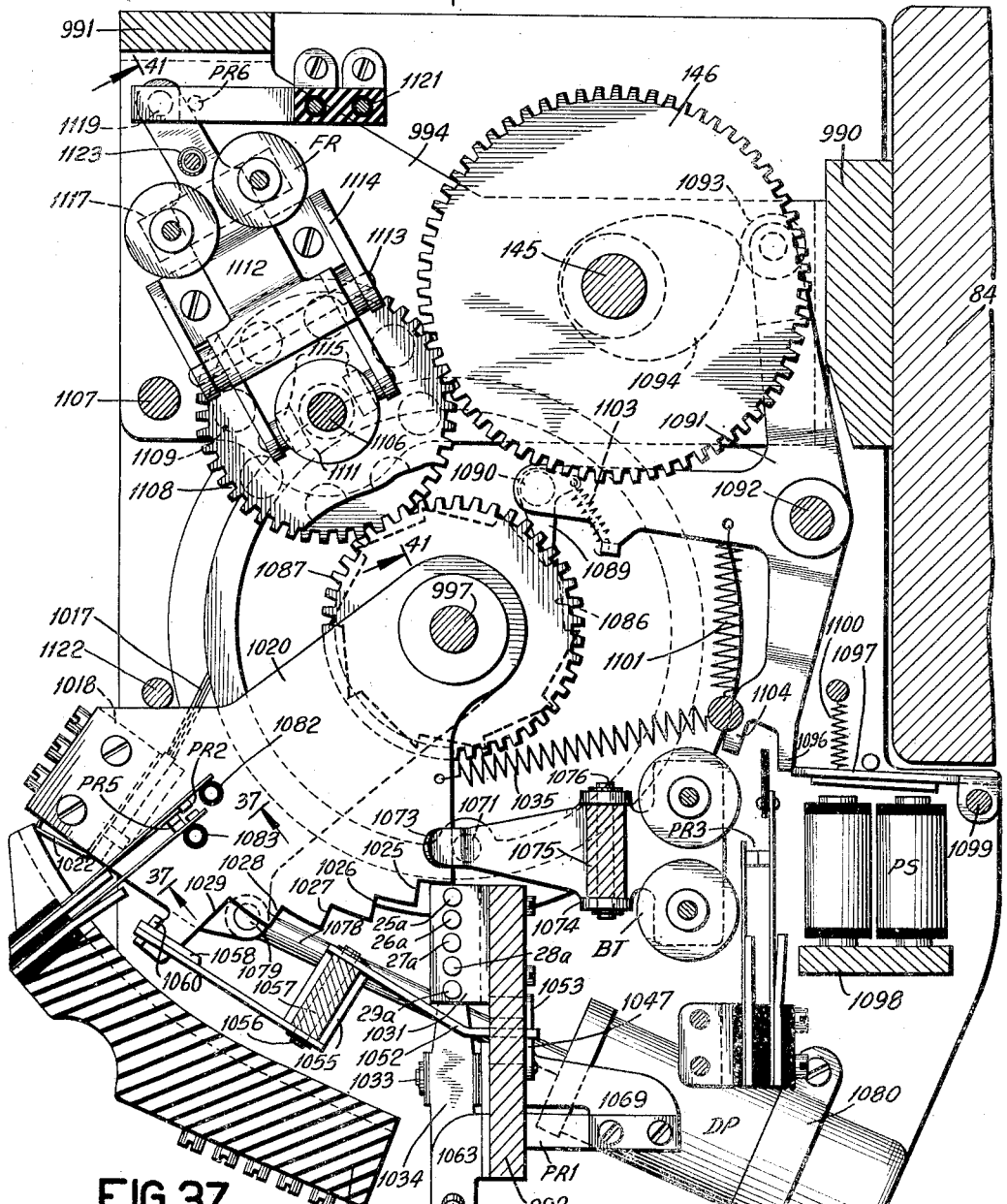
Fig. 36 is a sectional end view taken along line 36—36 in Fig. 35 and showing the program drum, the driving gears therefor and the ratchet and pawl turning devices cooperating therewith.

In Figs. 36 and 40a it is seen that the operating extension 1052 is part of a bail 1055 pivoted horizontally at 1056 on a block 1057 extending from the right side frame of the program unit. The bail is formed with a second arm carrying a cam member 1058 pivoted at 1059 and placed in the path of a lug 1060 formed on the end of the brush holding frame arm 1020. The arrangement is such that during differential placement of the brush holder, the lug 1060 swings past cam member 1058 and rocks it idly with a shoulder 1061 thereon moving away from the edge of the bail arm. However, upon restoration movement of the brush holder and clockwise movement of arm 1020 (Fig. 36), the lug strikes the cam member 1058 (Fig. 40a) in such a position that it rocks into cooperation with the bail and turns the bail in a counterclockwise direction about its pivot 1056. There results a vibration of the bail extension 1052 in cooperation with projection 1053 (Fig. 38) and movement of link 1047 towards the left. When the link is so moved, all five projections 1050 thereon are also moved toward the left and serve to rock latches 1042 (Fig. 39) in a clockwise direction to trip all armatures off shoulders 1044. This restoration of the brush holder adjusting parts takes place at the end of the restoration movement of the brush holder itself, which is in turn restored by rotation of the program drum as described hereinafter.

Other connections common to all five program control magnets are those provided to close contacts for initiating movement of the brush holder. Although the setting pins are operated when the program devices are in the normal position, the brush holder does not move immediately upon such operation, but must be unlatched and released for such movement as an incident to setting up one of the five stops.

Cooperating with the lower ends of all five armature levers is a rod 1062 (Fig. 35) passing through a pair of brackets 1063, 1064 fastened to the side of bar 992 and arranged to carry the rod at an angle to the horizontal position. Referring to Fig. 38, it is seen that the top edge of rod 1062 is cut away near each armature lever as at 1065 to form a shoulder cooperating with the lower end of armature lever 1034. The rod is usually pressed toward the right and cooperates with the armature when it is out of the operating position.

Upon energization of the magnet, the armature swings clockwise and the lower end thereof pushes the rod toward the left. A similar operating connection is provided for the four other control magnets.

Turning again to Fig. 35, it is seen that a spring 1066 is coiled between bracket 1064 and a collar 1067 on rod 1062 and tends to hold it toward the right. The upper end of the rod carries an insulation knob 1068 cooperating with one blade of a pair of normally open contacts PR1. These contacts are attached to, but insulated from, a bracket 1069 (Fig. 36) attached to the inner wall of the bar 992. Referring to Fig. 35, it is seen that bar 992 is cut away near the left side frame 988 to provide for cooperation between the end of rod 1062 and the contacts PR1 attached to the opposite side of the bar.

When contacts PR1 are closed by operation of any one of the five brush positioning control magnets, a circuit is directed through a magnet BT (Figs. 36 and 38) for releasing the brush holding frame so that it may assume the selected position. The brush holding bail is held in the normal position by a plunger 1071 extending from the end piece 999 of the program drum. A spring 1072, pressing between the end piece and a shoulder on plunger 1071, tends to hold it in an extended position with the outer end abutting against the edge of the side arm 1020 (Fig. 36). Cooperating with the end of plunger 1071 is the curved end 1073 of an armature bail 1074 associated with the brush stripping release magnet BT. This magnet is secured directly to the right side frame 989 and alongside is fastened a block 1075 carrying a vertical rod 1076 upon which are pivoted the side arms of armature bail 1074.

Upon energization of magnet BT, due to the closure of contacts PR1 by selection of a brush position, armature bail 1074 is rocked to press the cam end 1073 (Fig. 38) toward the left and to press plunger 1071 into the drum end and out of the path of the brush holder arm 1020. Because of the curved formation of the bail end 1073, arm 1020 (Fig. 36) is enabled to escape past plunger 1071 as urged by the spring 1035. The brush holding bail swings counterclockwise until one of the shoulders thereon, abuts against the extending one of the rods 25a—29a. When the arm 1020 escapes to the right over the end of plunger 1071, the plunger continues to press against the inner surface of the arm and as the plunger is carried clockwise by the successive spacing of the program drum to different positions. After positioning is completed, the pin is carried around further until it again abuts against the front edge of arm 1020 and continues on to restore the arm and connected brush bail from the adjusted position back to the home position. The spacing and restoring movements of the program drum are described more fully hereinafter.

When the brush holding bail is released for differential movement into one of the five selective positions, it is desired that the movement be slowed up to prevent sudden impact caused by the action of spring 1035 as soon as plunger 1071 is removed from the normal locking position. For the purpose of so cushioning the brush holder movement, a dash pot DP (Figs. 35 and 36) is provided with a piston rod 1078 connected directly to, and articulated at 1079 on, the left arm 1019 of the brush holding bail. In Fig. 36 it is seen that a strap 1080 holds the dash pot cylinder against the inner side of side plate 988 and at such an angle that the extending piston rod 1078 is arranged at right angles to the operating radius of the brush holding bail. Upon release of the bail, pressure is built up and gradually released from the cylinder, and the movement into the selected one of the five positions is accomplished without impact against positioning rods.

From the foregoing, it may be gathered that the line of horizontal program sensing brushes is first drawn down along the program sheet to one of five positions determined by the class of control selected. With reference to the program sheet PG shown in Fig. 47, these five initial positions are arranged vertically in the first of the nine different program selection areas. The brushes normally contact the sheet above the first line of control perforations, that is, above the line devoted to major control. From this normal upper position, the intial control of the program devices is concerned with the movement of the brush holder to one of the five control positions.

The foregoing sections of the description relating to program devices are concerned with this initial phase of program control. The portion of the description about to be given is concerned with further sequential control of program selection which is brought about by drum movement rather than brush movement. In other words, the brushes are first moved to one of five positions with respect to the stationary program sheet, and then for all further control after the first cycle, the program sheet is moved relative to the brushes, by spacing the drum holding it, from one to the other of the areas numbered from 1 to 9 along the right hand edge of the program sheet (Fig. 47).

Figure 37:
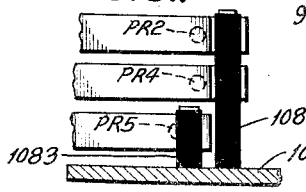
Fig. 37 is a detail view as seen from line 37—37 in Fig. 36 and showing control contacts cooperating with a bail carrying the program sensing brushes.

Cessation of card feeding action and enablement of drum moving action are made contingent upon operation of the brush holder. As soon as the brush holder moves to the selected one of the five positions, circuit controls are effected to break the card feed clutch circuit and to set up another circuit through a ratchet mechanism for spacing the drum. The circuit connections include contacts operated by a pair of insulation extensions 1082 and 1083 fastened to the side of brush holding arm 1020, as shown in Figs. 36 and 37. The extensions cooperate with flexible blades forming part of three pairs of contacts PR2, PR4 and PR5. The first two are normally open and are closed by operation of the brush holder, while the last mentioned contact PR5 is normally closed and is opened when the brushes are moved.

In Fig. 35 it is seen that the three pairs of contact blades are attached to the upper part of a shoulder on the insulation frame 993 and situated near the right side frame 989. The normally closed contacts PR5 are in circuit with the card feed clutch and normally maintain the operation of the card feeding and sensing mechanisms. However, upon program selection, these contacts open to prevent advancement of record cards through the card sensing devices. The other contacts PR4 are normally open, but close to prepare a restoring circuit for the program drum. The third set of contacts PR2 are closed to energize a program spacing control magnet PS cooperating with ratchet mechanism for advancing the program drum.

Referring to Fig. 38, the drum end 999 is seen to have attached thereto an extending bushing 1085 on which is bolted a ratchet wheel 1086 and a gear 1087, all three being tied together by bolts 1088 passing through them and secured in the bushing. Cooperating with ratchet wheel 1086 is a pawl 1089 (Fig. 36) pivoted at 1090 on the end of the horizontal arm of a three-armed operating lever 1091. This operating lever is pivoted on stud 1092 projecting inwardly from the right side frame 989 as shown in Fig. 38. The upper end of the operating lever 1091 (Fig. 36) is provided with a roller 1093 situated to cooperate with a cam 1094 attached to the operating shaft 145. The roller 1093 is normally held away from cam 1094 because the lower end of operating lever 1091 is formed with a projection 1096 abutting against an armature lever 1097 cooperating with the program spacing magnet PS. This magnet is supported on a block 1098 extending from the right side frame, and the armature lever 1097 cooperating therewith is pivoted on a stud 1099 also extending from the right side frame. A spring 1100 lifts armature 1097 and holds it in the path of the lower end of operating arm 1091. However, upon energization of magnet PS armature 1097 is rocked in a counterclockwise direction and the ratchet operating lever 1091 is free to move in a counterclockwise direction under the tension of a spring 1101.

Pawl 1089 is not moved directly but awaits operation under control of cam 1094 which graduates the counterclockwise movement of lever 1091 so that, as the operating shaft 145 turns in a clockwise direction, cam 1094 allows roller 1093 to move toward the left and the operating lever 1091 rocks and depresses pawl 1089 so that the cooperating ratchet wheel 1086 is rotated in a clockwise direction through one step of movement.

Upon continued rotation of the operating shaft 145, the operating lever 1091 is restored and pawl 1089 is lifted upward to ratchet over another tooth on wheel 1086. The pawl is free to move flexibly because a spring 1103 holds it in the operating position. The detenting of the program drum has been described hereinbefore and it is because of such means that the stepping motions are sure to be of equal graduations.

As the ratchet lever 1091 moves to drive the ratchet wheel, it opens a pair of interlock contacts PR3 by means of extension 1104. These contacts PR3 are in series with a relay controlled by punching operation as described hereinafter.

The contacts PR2 (Figs. 36 and 37) are in series with the program stepping control magnet PS and they close part of the circuit connections therethrough when the brush holder is released by magnet BT. However, the closure of contacts PR2 occurs too late to effect immediate drum stepping action on the first program cycle, because the circuit is not complete until machine operated cam contacts close momentarily at the fifteenth cycle point, and that is earlier than the operation of contacts PR2. It is so timed because the initial brush holder shift is sufficient without any need for drum movement to detect the first set of program selection perforations on the program sheet.

At the fifteenth point in the first program cycle and subsequent program cycles, operation of cyclically controlled cam contacts serves to send impulses through magnet PS to cause successive ratcheting operations to advance the drum and carry the program sheet step by step under the sensing brushes 1017. Contacts operated by the hand total key are also effective to send an impulse through magnet PS to cause movement of the program sheet after a hand total is taken.

The drum advancing operations continue until the program sheet presents a resetting control perforation such as the perforation 1105 (Fig. 47) for initiating a circuit through one of the sensing brushes 1017. This particular brush is wired in series with a magnet FR (Figs. 36 and 41) for controlling the closing of a friction clutch to drive the program drum forward to the home position. The amount of restoring movement depends on the number of program cycles previously selected, the restoring movement being in the same direction as the successive selection movements, the difference being that the program circuits are all open during resetting.

The friction clutch comprises a number of rotating elements on a shaft 1106 (Fig. 41) extending between the right side frame 989 and the intermediate frame 994. Loosely assembled on this shaft is a gear 1108 meshing with the gear 146 (Fig. 36), the hub of which is on the short shaft 145 also carrying the constantly rotating gear 144. Gear 1108 (Fig. 41) carries a series of circular blocks 1109 formed of friction material extending from the side of the gear and adapted to cooperate with the face of an adjacent gear 1110 fastened to shaft 1106 and meshing with the gear 1087 (Fig. 38) bolted to the end piece 999 of the program drum. Gear 1108 (Fig. 41) is slidably mounted on shaft 1106 and is normally held out of cooperation and away from gear 1010 by magnet controlled connections and a grooved sleeve 1111 secured to the gear.

Reference to Fig. 36 reveals that a yoke shaped armature lever 1112 is pivoted on a rod 1113 in a bracket 1114 extending from the intermediate frame 994. The lever is formed with two projecting arms carrying a pair of rollers 1115 extending in the circular groove in the sleeve 1111. Attached to lever 1112 is an armature piece 1117 (Fig. 41) normally separated from the core of the magnet FR. This magnet is supported on a plate 1118 attached to the right side frame 989.

When magnet FR is energized by a reset perforation in the program sheet, as already explained, the armature lever 1112 (Fig. 41) is rocked in a clockwise direction, and sleeve 1111 is pushed toward the left, carrying along therewith the constantly rotating friction clutch gear 1108. Then, the friction blocks 1109 are pressed into cooperation with the drum operating gear 1110 and the connected drum (Fig. 36) is rotated in a clockwise direction.

As soon as the resetting operations are initiated, a holding circuit is established for the clutch control magnet FR to maintain the resetting movement until the parts are brought to the home position. For this purpose the upper end of armature lever 1112 is provided with an extension 1119 of insulation material. This extension cooperates with the center flexible blade of a pair of contacts PR7a and PR7b. The center blade also carries an extension of insulation material 1120 cooperating with one blade of a normally closed pair of contacts PR6. Upon operation of the magnet for resetting control, the upper end of the armature lever is moved toward the right, and contacts PR7a are closed to establish a holding circuit through the magnet FR. At the same time, contacts PR7b are opened to break the circuit connections between the magnet FR and the brush 1017 analyzing the program sheet for resetting control. The other pair of contacts PR6, which are opened upon initiation of resetting, are opened in series with the common brush cooperating with the program drum, so that all function selecting circuits are disabled while the drum is being restored, should any program perforations be encountered during restoration.

The contact blades comprising contacts PR6, PR7a and PR7b are assembled with insulation blocks fastened to a rectangular bar 1121 attached to the right side frame.

The extent of resetting movement of the program drum is determined by cooperation between pin 1071, brush holder arm 1120 and a stop pin 1122 extending from the right side frame 989 as shown in Fig. 36. It is already explained that pin 1071 is pushed inward under control of magnet BT to release the brush holder and allow arm 1020 to swing over the outer end of the pin. Then, as the drum is spaced by the ratchet mechanism in a clockwise direction (Fig. 36), the pin continues to press against the inner surface of the arm 1020 but does not obstruct the program spacing control.

When the drum has been advanced through two or three spaces of program selection, the pin passes the left side of arm 1020 and the spring cooperating with it forces it outward in the path of the arm. However, since the direction of movement of the drum continues in a clockwise direction, the pin 1071 moves further and further away from the arm. It is only upon selection of the resetting operation that the drum and extending pin swing around sufficiently to bring the pin again into cooperation with the brush holding arm 1020. Since the resetting direction of movement of the drum is clockwise, the pin 1021 strikes the right side of arm 1020 in any one of the five positions determined by a projecting one of the selecting rods 25a, 26a, etc. As the pin strikes the arm, the friction clutch continues to urge driving movement and the arm is rocked clockwise until it abuts against the stationary stopping pin 1122.

As the arm 1020 reaches the home position, the extension 1082 thereon operates to open contacts PR4 (Fig. 37) and these contacts are in series with the clutch control magnet FR which is then deenergized to separate the clutch parts. The clutch is disabled by a pressure spring 1123 (Fig. 41) which presses between frame 1118 and a recess near the upper end of armature lever 1112. Upon deenergization of magnet FR, the spring becomes effective to rock the lever in a counterclockwise direction and then sleeve 1111 is pulled toward the right along with the friction gear 1108. As the clutch parts are brought into the normal ineffective position, the contacts PR6 and PR7 are also permitted to resume their normal positions.

In addition to the operation of contacts PR4 (Figs. 36 and 37) for disabling the friction drive, the restoration of the brush holder causes opening of contacts PR2 to prevent further movement of the program drum by means of the ratchet mechanism. The other contacts PR5 which are operated upon full restoration of the brush holder, close a circuit through the card feeding clutch and allow restoring of the ordinary tabulating functions, should other conditions warrant such continuation of operation.

The many controls exercised through detection of program perforations by one or more of the brushes 1017 are explained fully hereinafter with reference to the wiring diagram showing the wiring connections from the separate brushes to the plugboard grouping bars and other relay controls in the machine. As many as nine different or similar successive accounting functions may be exercised under control of the program device.

Digit selector

A digit control is provided to select machine operation under control of an ordinary digit representing perforation in one of the columns of the card. A single column commutator has a contacting brush which is pluggable to any one of the card columns connected to the card analyzing brushes in the first analyzing station through which the cards pass. The commutator brush is operated in synchronism with the movement of the record cards and establishes contact with one of twelve commutator segments as the corresponding twelve index positions on the card pass under the analyzing brushes.

It is already explained with reference to Fig. 6 that the card feed contact control shaft 215 is driven by gears 208' and 216 to operate in synchronism with the card feed mechanism. Attached to shaft 215 is a brush 1125 rotating within a circular commutator frame 1126. In Fig. 7 it is seen that this frame 1126 is fastened to the bracket 225 by means of a pair of supporting bars 1127 and thus held stationary with respect to the rotating brush. Distributed at equal intervals around approximately half of the outer periphery of frame 1126 are twelve terminals 1128 extending through the insulation material of the frame and carrying the impulses from the commutator segments to outside wiring connections. Another terminal is provided for a common contact for carrying current to the commutator. The twelve terminals are connected to separate pluggable openings on the plugboard and there made available for control. On the plugboard, the twelve impulse outlets provided by the digit selector are pluggable to X control distributors for the purpose of selectively controlling various machine functions, according to the appearance of one or more perforations in a selected column.

In Fig. 7 it is seen that the shaft 215 carrying the digits selector brush also carries a series of cams, such as cam CF1', for operating card feed control contacts at times determined by the different shapes of the cams. The exact timing of these contacts is illustrated in the timing chart shown in Fig. 51, and the use of the various contacts is explained with reference to the wiring diagram.

Commutator distributor

An impulse emitter or distributor is provided in the form of a commutator arranged to send out ten impulses per cycle, said impulses being directed through the total reading devices in the accumulator units, so that certain of the impulses may be selectively directed into the printer for the control of total printing. The distributor is provided with a brush which is operated in synchronism with the movement of the printing controls and the accumulator controls which come into action during total transfer operation. Therefore, the total distributor plays a part in control of total printing as well as control of total transfer distribution.

A rotating brush 1130 (Fig. 52) cooperates with a stationary frame 1131 comprising the holder for the total distributor. The brush is mounted on a shaft 137 connected to the operating gear 138. It is already explained with reference to Fig. 11 that shaft 137 is a constantly operating shaft being driven by the train of gearing shown in Fig. 11. Turning again to Fig. 52, it is noted that this shaft 137 carries a number of cams CR which cooperate with cam contacts for controlling functions, such as totaling and other controls happening at times not connected solely with card feeding time. The timing of the various CR contacts is illustrated in the timing chart shown in Fig. 50.

In Fig. 52 it is noted that the total distributor frame 1131 is made of insulation material and carries a series of ten terminals 1132 which are connected to the digit reading devices in the accumulator units. Thus, it is possible for the total distributor to direct ten selectively timed impulses into one or more connected accumulator units, and the unit then selectively picks out those impulses representative of the number standing registered on the accumulator device. From the accumulator the impulses may then pass to the printer for total printing control or pass to other accumulating units for total transfer control. The distributor has the usual common lead-in control for maintaining contact between the main line of the wiring controls and the rotating distributor brush. The specific manner in which the distributor impulses are carried through the accumulator unit is shown more fully in the wiring diagram and will be further explained with reference thereto.

Switch bars

Wherever a number of contacts is associated for common operation, they are grouped together and controlled by switch mechanisms, such as those shown in Figs. 44 and 45. It is already explained with reference to Fig. 44 how the contacts 361 and 362 are shifted under control of the brush switch magnet BSW and restored by cam 363. These contacts are used to reverse connections between the upper and lower brushes and leading therefrom to the printing mechanism. There are forty such reversible contacts called into operation by heading card detection for printing heading data under control of a first set of printing control brushes alternately with the printing control by the same card when cooperating with the second set of printing control brushes.

In addition to the switch shown in Fig. 44, there are four other switch units somewhat similar in construction but differing slightly as shown in the illustrations in Figs. 44a, 45, 45a, 45b. Because the three units illustrated in Figs. 44a, 45 and 45b are somewhat the same as the detailed showing in Fig. 44, they are represented diagrammatically to avoid going into further unnecessary detail. The five switch units are assembled together on a pair of brackets 365 and 366 (Figs. 11 and 52) assembled on the rear surface of the central web 87 comprising part of the main frame of the machine. With the switch units so placed, they are adjacent the constantly running shaft 137 carrying cams such as cam 363 for operating and restoring the contacts.

Turning to Fig. 45, we note that a series of fifteen contacts 1136 are mounted on a switch plate 364' and connected for common operation. These contacts do not require magnet control and are shifted by cam operation alone. They are wired in series with the card sensing brushes for detecting X hole perforations and setting up circuit connections at desired intervals to enable such impulses to course through X control pickup relays. The timing of the cam is such that the contacts are closed only momentarily when the zoning perforation passes the sensing brushes. The contacts shown may be by-passed or shunted by direct connection to the digit selector for operating under control of perforations other than an X control perforation.

The shifting control for contacts 1136 comprises a common vertical insulation bar 1137 held in a normally elevated position by a lever 1138 pivoted at 1139 and cooperating with a cam 1140 fastened to the constantly running shaft 137. A spring 1141 tends to draw the bar 1137 downward and rock lever 1138 against the periphery of the cam. At the proper time a depression in the contour of the cam allows the lever 1138 to rock in a clockwise direction, the bar 1137 is lowered and the connected contact blades are carried along therewith to close contacts 1136 for an interval of time determined by the contour of the cam.

Two of the five switch units have been described with reference to Figs. 44 and 45. The other three switch units, shown diagrammatically, differ only slightly from the construction shown in Fig. 44. The arrangement shown in Fig. 44a is provided to control the motion of one-hundred contacts which are to be opened during punching. These contacts are in series with the printing control connections normally effective before summary punching. When the program devices call for summary punching operation, a magnet SBM is energized and serves to operate connections for opening the contacts 1142. As shown in Fig. 44a, contacts 1142 are controlled by a frame comprising an elongated insulation link 1143 suspended between a pair of operating levers 1144, 1145. The last mentioned lever cooperates with an armature 1146 associated with the switch bar magnet SBM. Upon energization of the magnet, the contact frame is released and the contacts 1142 open to break the printing connections. At the same time, the end of lever 1144 is effective to close contacts SB6 in series with the summary punching control relay R13. During summary punching, a switch dog magnet SDM is also energized to attract a release dog 1147 pivoted on the lower end of lever 1145 and normally in the path of a restoring lever 1148. A cam 1149 on the constantly running shaft 137 is arranged to cooperate with restoring lever 1148 when the dog 1147 is in position to abut against the lower end of the restoring lever. After the summary punching operation is completed, the dog is released to assume such an effective position and then the cam operates to rock lever 1145, so that the upper end is restored to the locking position behind the armature 1146 and the contacts 1142 are closed to make printing control effective.

Contacts 1142 are used to provide non-printing control as well as control during summary punching. For non-printing control the switch bar magnet SBM is connected to an X distributor and operated under control of detected X hole indicia provided for non-printing control. A third connection is provided to operate the switch bar magnet cyclically when a switch is closed for tabulating operation. Then, it is desired that the record cards be analyzed to control functions other than printing.

In Fig. 45a, a switch mechanism is shown for operating a series of thirty-nine contacts 1151 which are wired in series between the second set of card sensing brushes and the printing mechanism. The brush cut-out magnet BCS for controlling operation of these contacts is called into operation whenever printing is to be controlled by the first set of printing brushes and, on cycles following such printing, to avoid repetition of the recording of the heading data taken from cards analyzed at the two printing control stations. The blades of the contacts cooperate with a common insulation bar 1152 suspended between an arm 1153 and an operating lever 1154. The upper end of the operating lever cooperates with an armature 1151 of magnet BCS. Also cooperating with lever 1154 is a cam 1156 on shaft 137 for restoring the switch connections to the normal position. However, should the magnet BCS remain analyzed, contacts 1151 reopen to prevent printing from the second set of print control brushes.

The fifth kind of switch is the one shown in Fig. 45b, which is provided to shift contacts associated with total transfer control. A set of one-hundred contacts 1158 is provided in a normally closed condition to connect from the adding control brushes to the accumulating mechanism. When a total transfer operation is selected, contacts 1158 are opened and the adjacent contacts 1159 are closed to conduct total reading impulses from the accumulator to the plugboard from whence the impulses may be carried into another accumulator. The common contact blade for all sets of contacts are associated with an insulation bar 1160 suspended between an arm 1161 and a release lever 1162. Cooperating with the release lever is the armature 1163 of a total transfer control magnet RTS. This magnet is in series with a brush cooperating with the program sheet so that, when a total transfer selection is made, the magnet is energized and switch connections shown in Fig. 45b are reversed. In order to restore the switch parts a cam 1164 is attached to shaft 137 and cooperates with lever 1162 to restore the contacts 1158 and 1159 to home positions.

*Plugboard*

The plugboard PL is shown in Fig. 48. There it is seen that the plug hubs are arranged with regard to functional requirements so that wiring connections are as short as possible. For example, in the upper left hand corner of the plugboard it is seen that the hubs leading to the control brushes are associated with, and adjacent to, the hubs for the control magnets which are connected thereto by wiring. Then, it is also noted that the X distributor outlets are also located for convenient plugging to the control brushes. The digit selectors are also conveniently located with regard to selection of the card column for digit control. The minor, intermediate and the major classes of control are also located in this upper left hand corner of the board and conveniently wired to select the class of control from control contacts through hubs adjacent thereto.

The upper right hand section of the plugboard is arranged conveniently for selection of functions. There it is seen that the listing, adding and subtracting hubs are near the related X distributors as well as the hubs for group indications and card cycle impulse control.

The lower section of the plugboard is devoted to the wiring connections made with relation to the adding and printing control brushes. There the plug hubs are aligned in convenient formations for connections controlling accumulation and printing to be made directly through wiring from the brush hubs or wiring passing through banks of selector switches called into operation by the program device. This section of the plugboard also carries the hubs for wiring to send and receive the impulses controlling rolling totals.

Referring to Fig. 1, it is noted that the front lower section of the case 75 is provided with a door 77 opening into the portion of the machine containing the plugboard.

Referring to the side view shown in Fig. 11, it is seen that the plugboard PL is assembled to be accessible as well as readily movable. It is held on a stationary frame 1166 fastened to the base 81 and to brackets 1167 extending from the core 84. Pivoted on the lower part of frame 1166 is a hinge 1168 carrying a pair of slotted end members 1169 into which the plugboard is lowered. Cooperating with the upper edges of the plugboard are spring fingers 1170 to hold it downward into the slotted end piece.

A toggle mechanism is provided for swinging the plugboard frame down and outward to expose it for changes in plug wiring. For this purpose a long operating lever 1171 is pivoted at 1172 on the sides of frame 1166. There are two arms, such as lever 1171, one on each side of frame 1166. Pivotally connected at 1174 on the short arms of levers 1171, are links 1175 which are pivoted at 1176 on the sides of the board holders 1169. The lower end of levers 1171 are connected by a cross bar 1173 which may be grasped and lifted to rock the levers clockwise and thereby lower links 1175 and push them outwardly so that the plugboard is swung counter-clockwise about the lower center 1177. Springs 1178 tend to restore the toggle linkage and to hold the plugboard in the normal position where it is engaged by the spring fingers 1170.

Relay gates

The relays used in the machine are arranged to be accessible by fastening them on a pair of outwardly swinging gates behind the door 78, Fig. 1, at the lower right section of the casing 75. In Fig. 5a it is seen that a front gate 1180 has hinge connections 1181 to the side of the vertical support 83. A rear gate 1182 swings from the right side on hinges 1183 extending from the frame angle 82. Since the gates swing from opposite sides they may be drawn outward together for changes and inspection of the relays thereon.

The electrical control devices

In Figs. 49a–49e is shown a wiring diagram revealing the manner in which the various devices are connected and electrically controlled. It is understood without showing that the motor M of the machine is connected to a power source by a switch so that the generated power or other source of electrical energy is selectively connected to the main positive and negative lines 1184 and 1185.

In the circuit diagram, relay magnets and their associated contacts are generally shown in close proximity to one another and the relay contacts are designated with the same reference numeral as the controlling magnet, with a lower case letter suffixed thereto. In certain instances, where it would add to the complexity of the circuit connections to show the relay magnets and their contacts together, the magnet is shown in dotted outline, adjacent to the contacts which it controls. It may also be pointed out here that a number of cam controlled contacts are shown in the circuit diagram. Certain of these lettered "CF" operate during card feeding, and others operate constantly as long as the motor is in operation and these are prefixed with the letters "CR."

Figure 49B:
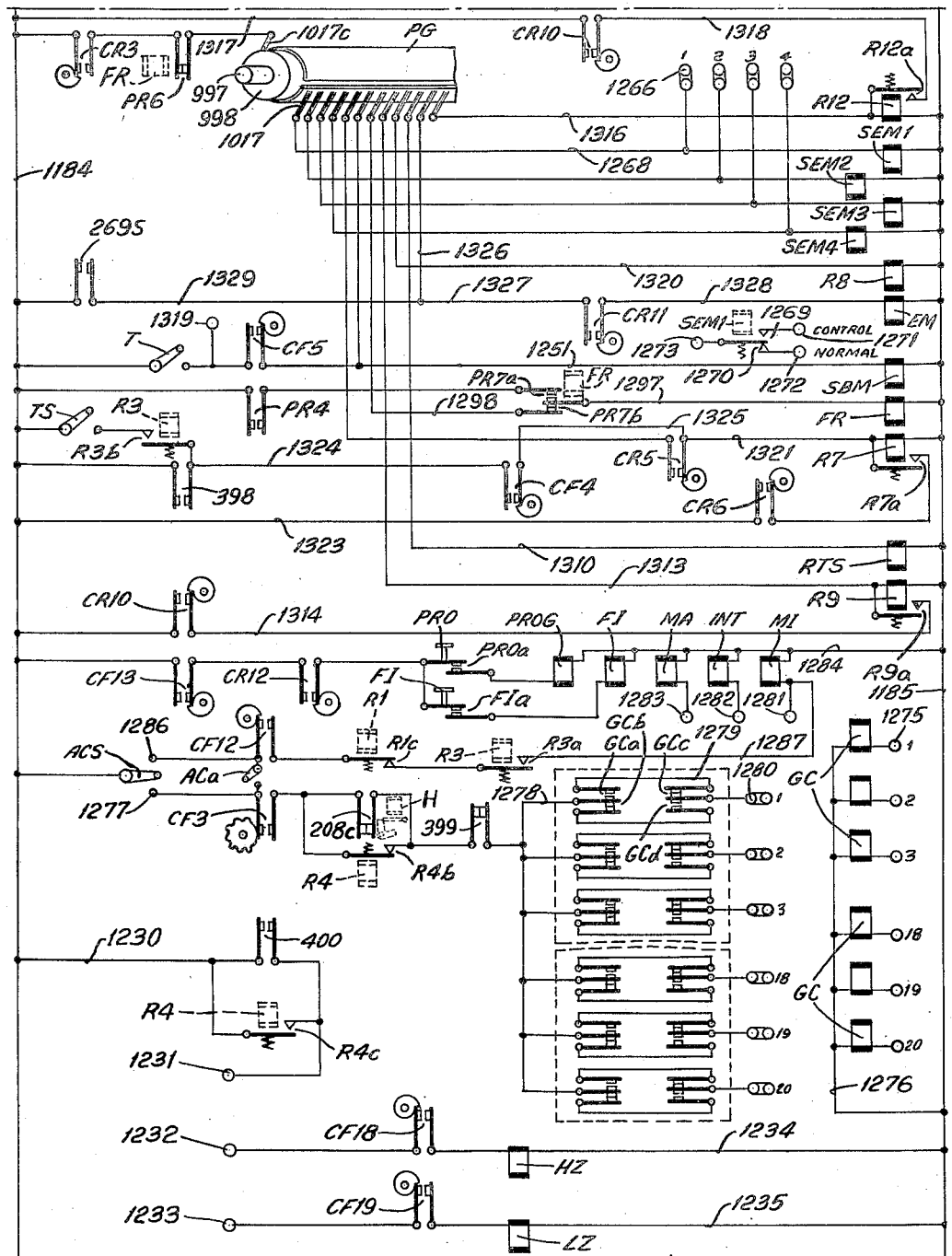
Figure 49C:
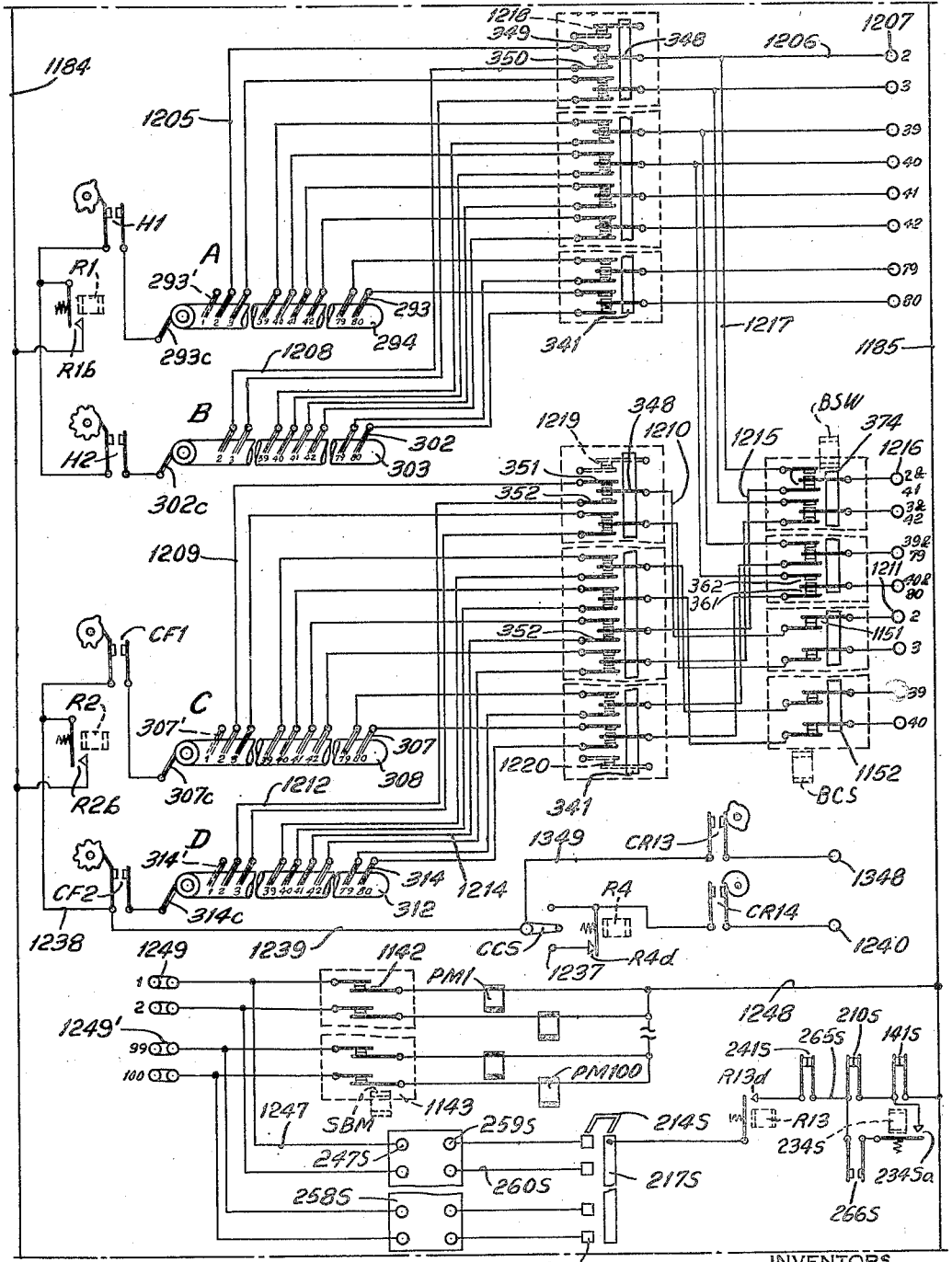
Figure 49D:
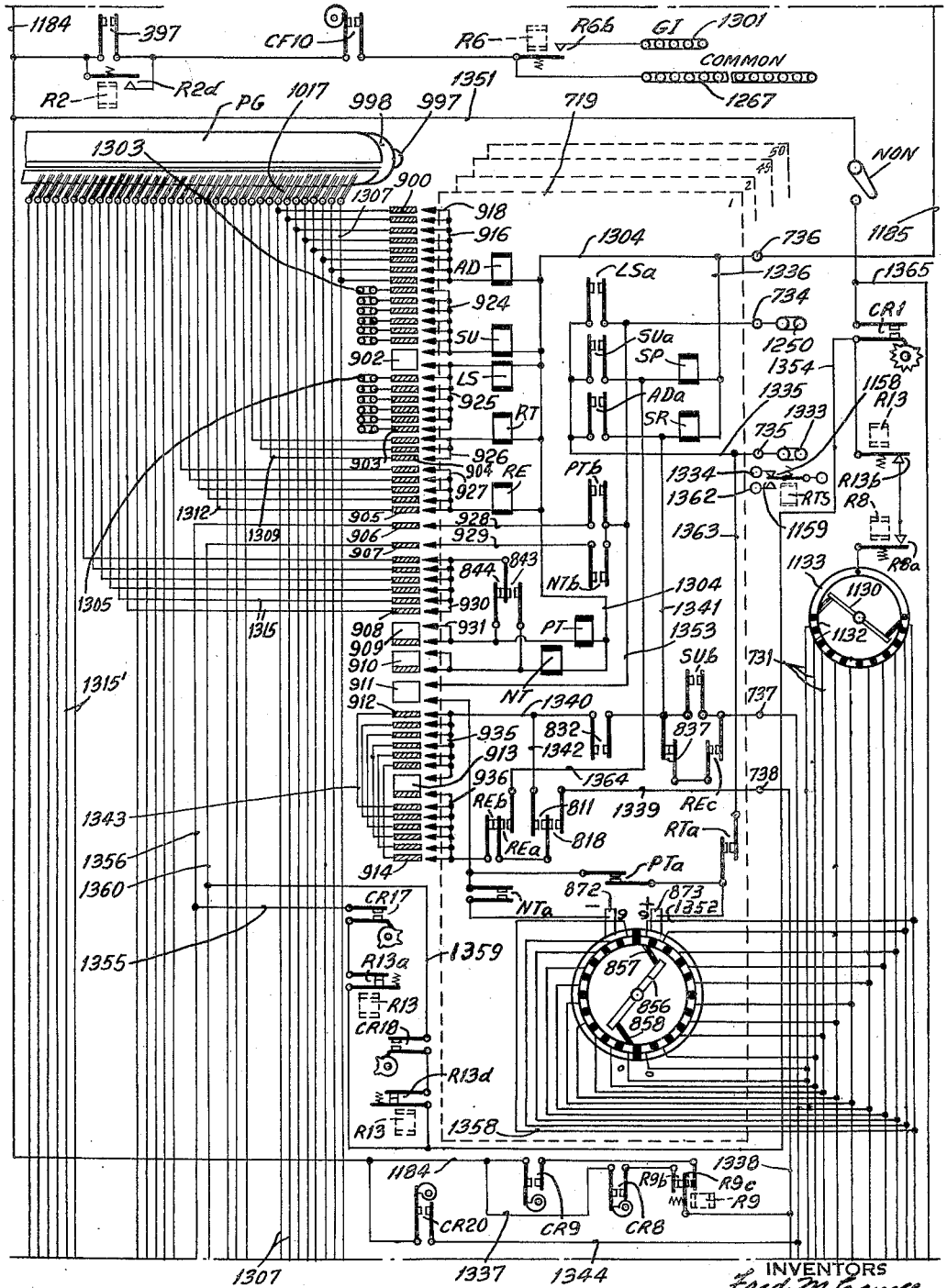
Figure 49E:
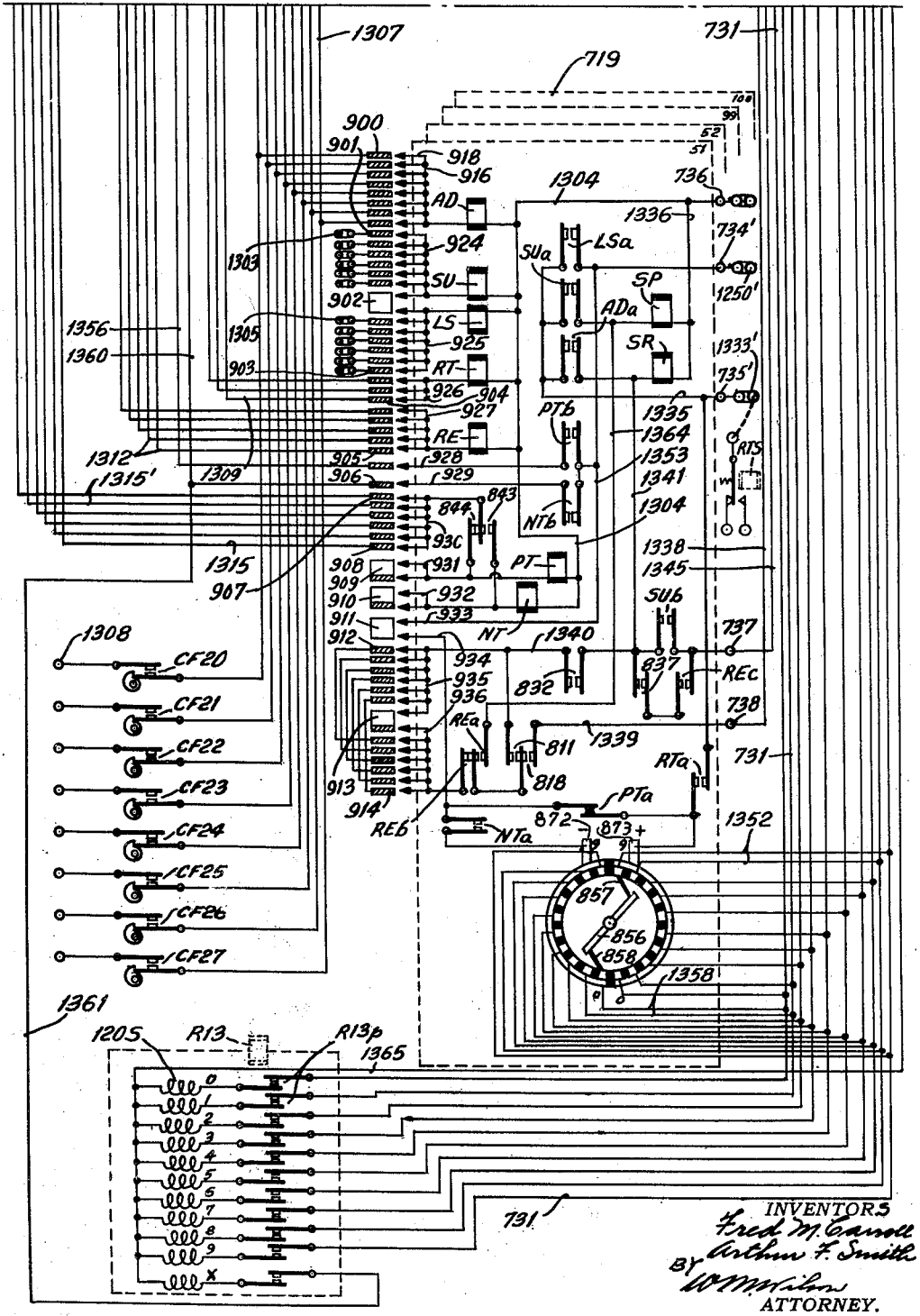

The five sheets of the wiring diagram are arranged to be read by placing the sheet showing Fig. 49a at the top of a vertical column of sheets arranged in order from Fig. 49a down to the bottom sheet, Fig. 49e.

Starting and stopping control

After the motor of the machine is called into operation and cards are placed in the hopper of the magazine, card feeding is initiated by depressing the start key SA (Fig. 49a). This serves to close the start key contacts SAa and set up a circuit through the card feed clutch magnet CFC as follows: From line 1184, through wire 1200, wire 1201, contacts SAa, contacts PR5 normally closed by the program brush holder, contacts 334 closed until the stacker is overcrowded, stop key contacts SOa, platen control contacts 405S (identified as contacts 405 in Patent 2,189,025) normally closed but opened during sheet ejection as explained in Patent 2,189,025, cam contacts CR2, card feed clutch magnet CFC, and line 1185. Operation of the clutch magnet serves to feed the first card out of the hopper and over toward the first set of sensing brushes.

An interlock is provided between the start key SA and the stop key SO. This is shown diagrammatically in Fig. 49a and in greater detail in Figs. 3 and 4. In Fig. 3 it is seen that pivoted adjacent the stop key SO is a bail 1188 on a rod 1187. The bail is formed with a latch plate 1190 cooperating with the bottom blade of the stop key contacts SOa. The result is that, when the stop key is depressed, the associated contacts are held in an open position. An operation of the start key SA is effective to unlock the stop key contacts.

Referring to Fig. 4, it is seen that the bail 1188 extends over to the start key and is formed with an arm 1189 underlying a collar 1191 secured to the bottom of the start key SA. When the machine is stopped by operation of the stop key, operation is not resumed until the start key is depressed to close the contacts SAa.

If the auto start switch ASW (Fig. 49a) is closed, the card feeding operation is sustained after a number of manual selections by closure of the card lever contacts as an incident to movement of the first card. As the cards pass through the four sensing stations, Fig. 6, they cooperate with a pair of card levers, one located near the first sensing station A and the other near the third sensing station C. The first card lever encountered (commonly known as the "upper card lever") is lever 296 which cooperates with contacts 297, Fig. 49a, to set up a circuit through control relay R1. This relay sets up its own holding circuit by closure of associated contacts R1a; the holding circuit including line 1184, wire 1202, cam contacts CF11, wire 1203, contacts R1a, relay R1 and line 1185.

As the first card progresses further along the card sensing path, it encounters the second card lever, commonly known as the "lower card lever." This lever 310 establishes a circuit through contacts 311 and a pair of relays R2 and R3. The two relays are maintained energized by closure of contacts R2a. The holding circuit involves line 1184, wire 1202, cam contacts CF11, wire 1203, wire 1204, contacts R2a, relays R2 and R3, and line 1185.

These relays R1, R2 and R3 operate a number of control contacts throughout the machine for governing operation according to the presence or absence of cards at the sensing stations. A pair of such contacts R2c is placed in series with the auto start switch ASW and parallel with the start key contacts SAa to continue card feeding operations after the first card is under the third sensing station. The running circuit for the card feed clutch then includes line 1184, wire 1200, contacts R2c, switch ASW, contacts PR5, 334, SOa, 405S, cam contacts CR2, clutch magnet CFC and line 1185.

*Card sensing devices*

In Fig. 49c there is a diagrammatic showing of the four card sensing stations A, B, C and D, through which the cards pass in the order mentioned. Each sensing station comprises a contact roller and a line of eighty sensing brushes spaced to cooperate with the eighty columns of index points with perforations or indicia on the card. Location of an indicium in a column determines the value of the impulse initiated thereby. The sending of impulses through the card sensing brushes is partly governed by card lever relay contacts and distributor cam contacts. The sending of impulses through the first sensing station is dependent upon closure of contacts R1b by the upper card lever relay. Also in series with the common contact brush 293c for this station are the cam operated distributor contacts H1 operated with card feeding and closed only at the time of passing of the 12, 11 and 6 index points for zoning and heading card control.

The "6" perforation 360, Fig. 1a, of a heading card is sensed between the 16th and 17th cycle points, Fig. 50, because it is at that time that the forward part of an accelerated incoming card is passing under the A brushes. Soon after the digit perforations of a card are sensed by the B brushes, all cards are accelerated and the second or incoming card is fed rapidly under the A brushes and the "6" perforation of the second card (which is thus identified as a heading card) is sensed after the 16th cycle point by the A brush in the first column. In a similar manner, the first column brush C senses a heading card "6" perforation after the 16th cycle point which is soon after the digit analysis of the preceding card under brushes D.

Although the sensing brushes of the second station B are also in series with the card lever relay contacts R1b, they have different impulse distribution control supplied by contacts H2 operated at the ten digit positions for control of adding and printing.

In a similar way, the effectiveness of the sensing stations C and D is dependent on the presence of a card under the second card lever as made evident by the closure of contacts R2b. The number of impulses sent to the third sensing station C is limited by the distributor contacts CF1 cooperating with a cam for closing them at the 12, 11 and 6 index points. The brushes at the fourth and last sensing station are made effective for adding and printing control by distributor contacts CF2 operated for all digit positions.

The impulses through the sensing brushes at the related stations A and B are carried into a common pluggable line by means of a switching device including the reciprocating bar 341 (Fig. 6). As explained hereinbefore, this bar is shifted at a point in the cycle between the sensing of zoning perforations and the sensing of digit perforations. At the top of Fig. 49c it is seen that the contact blades 349 and 350 may be brought into association alternately with the common blade 348. Early in each cycle, the zoning impulses follow a path including line 1184, contacts R1b, contacts H1, common brush 293c, contact roller 294, brush 293 in the second highest column position, wire 1205, blade 349 closed with blade 348 during zoning, and wire 1206 to the plug socket 1207, or to the heading print control socket 1216, and thence to the accumulator socket 1333, Fig. 49d, and through class selection contacts for list control or directly to print socket 1249, Fig. 49c. After passage of the two zoning positions on the card, bar 341 shifts to break the circuit through blade 349 and establish the digit impulse circuit through blade 350. The circuit set up is from line 1184, contacts R1b, contacts H2, common brush 302c, contact roller 303, sensing brushes 302, wire 1208 at the second column position, blade 350, blade 348, and common wire to socket 1207. From socket 1207 the impulse is carried through a plug wire to other sockets for controlling printing and group control, singly or in combination.

In a similar way the brushes at the sensing stations C and D are connected through the switch contacts 348, 351 and 352 operated by the zone switch bar 341 to carry both zoning and digit impulses into a common connection. A wire 1209 connects the C brush 307 of the second column to the blade 351 which is the first to contact with blade 348 and carry the zoning impulses through wire 1210 and through a normally closed brush switch bar contact 1151 in series with a plug socket 1211.

The same plug socket receives impulses through a related brush in the fourth sensing station D by means of a wire 1212 connected to a brush 314 in the second column position and attached to blade 352 which is brought into contact with blade 348, during the time in the cycle when digit index points on a card are passing under the brushes of station D. These digit impulses are carried along further through wire 1210 and cutout switch contacts 1151 to plug socket 1211, from whence they can influence adding and printing according to the plug connections established on the plugboard.

Other arrangements are made with respect to the brushes 314 of station D cooperating with columns 41 to 80 inclusive of the card columns. These brushes are connected to switch arrangements involving contacts 361 and 362 operated by the brush switch bar shown in Fig. 44. The operation of this switching bar is brought about by heading card control devices to bring about two printing control cycles under control of one heading card. The heading card is divided into two address printing control sections, one extending from the second to the fortieth column of index points and the other extending from the forty-first column to the eightieth column. As the heading card passes through station B, the columns 2 to 40 are to be effective for printing and later, when the card passes through station D, columns 41 to 80 are to be effective. That is the reason why brushes 314 of columns 41 to 80 have connections to the switching contacts 361 and 362.

Tracing the path of an impulse taken through the brush 314 in the forty-first column, it is seen that the wire 1214 connected thereto, directs the impulses to wire 1215 connected to the lower blade of the normally closed contacts 361, connected to the plug socket 1216. This is the same plug socket which was effective on the previous cycle to receive an impulse from the second column brush 302 at the sensing station B when contacts 362 are closed. A wire 1217 is connected between the upper blade of contacts 362 and the wire 1206 leading to the plug socket 1207 of the second column position of the second sensing station.

From the foregoing, it is apparent that plug socket 1216 is the conductor for impulses derived either from the second column position of the second sensing station or the forty-first column position of the fourth sensing station. The switching action between the two sensing stations is not effected unless heading card control is selected. Ordinarily, socket 1216 acts merely as the outlet for impulses through the forty-first column brush of the fourth sensing station.

Before going into detail with regard to heading card control, it is believed well to explain briefly the uses of the brushes at the four sensing stations. The brushes at the first sensing station A convey impulses for the zoning control of printing and also carry an impulse initiated by a special perforation 360 (Fig. 1a) provided in heading cards to distinguish them from item cards. The brushes at the station B carry the impulses for heading card data printing and group controlling. The brushes at station C also serve for zoning and detection of heading cards. The brushes at the fourth station D control item accumulation and item or heading printing and one of the brushes detects the presence of a heading card and controls the offset stacking of such cards.

Heading card control

When heading cards are used and a plurality of printing impressions are to be effected from each card, a number of switches is closed in the machine. The switches HCS, HCSa and OSS (Fig. 49a) are operated to make effective magnets and relays causing heading card control. These three switches are in series with three contacts 1218, 1219, and 1220 also in series with three card reading brushes at the A, C and D stations. Although the three contacts are associated with the zone switching controls, they are not disturbed but remain closed throughout all machine operations. They are connected to brushes in the first column position in alignment with the position occupied by perforation 360 (Fig. 1a) which they are designed to sense. Contacts 1218 are connected to brush 293' in the first position of sensing station A, contacts 1219 are connected to brush 307' in the first position of sensing station C, and contacts 1220 are connected to brush 314' in the first position of sensing station D.

When a heading card is detected at the first sensing station A, a hopper control magnet H is operated to suspend movement of the heading card and prevent movement of cards out of the magazine so that the preceding card can move alone to clear the path for print control from the upper brushes B and multiple printing operations. The circuit for hopper control can be traced from line 1185 at the right, thence through hopper clutch magnet H, wire 1221, switch HCS, contacts 1218, brush 293', through a perforation 360 in the heading card, contact roller 294 (Fig. 49c), common brush 293c, distributor contacts H1, relay contacts R1b, and line 1184.

The hopper clutch magnet H (Fig. 5) not only operates to open the clutch connections to the magazine feed but it also serves to operate pairs of contacts 208c and 251 for effecting other heading card control.

As explained more fully hereinafter, the contacts 208c, Fig. 49b, open to suspend group control operation while heading card operation is taking place. The other hopper control contacts 251 (Fig. 49a) are closed in series with a relay R5. The complete circuit through relay R5 includes line 1184, cam contacts CF7, wire 1223, contacts 251, relay R5 to line 1185. The relay closes holding contacts and a circuit is established through line 1184, cam contacts CF8, wire 1224, holding contacts R5a, relay R5, and line 1185. Relay R5 not only operates the associated holding contacts but it also operates two other pairs of contacts in series with the card feeding control circuit. One of these connections, contacts R5b, is in series with the magnet BSW for operating the brush switch bar shown in Fig. 44. As already explained with reference to the switching of the impulses from the sensing station B shown in Fig. 49c, this magnet is effective for alternating printing control after the heading card passes station B. Turning back to Fig. 49a, it is seen that both contacts R5b and the brush switch magnet BSW are arranged in parallel with the card feed clutch magnet CFC and remain energized while card feed is maintained to feed the delayed heading card. The third set of relay contacts R5c is arranged in shunt around lower card lever relay contacts R2c. They maintain card feeding operation until the heading card passes through the fourth sensing station. A fourth contact R5d is operated by relay R5 to call into operation a brush cutout magnet BCS for shifting the contacts 1151 (Fig. 49c) under control of the devices shown in Fig. 45a. The shifting of the contacts serves to break the item print connections in columns 2-40 of station D, while heading cards are being considered. The circuit for the brush cutout magnet BCS is shown near the top of Fig. 49a and passes from line 1184, through wire 1225, cam contacts CR4, relay contacts R5d, wire 1226, magnet BCS, and line 1185. The circuit initiated by the closure of contacts R5d is sustained by closure of contacts 396 arranged in shunt therewith. These last mentioned contacts are closed by operation of the brush switch bar (Fig. 44) called into operation by relay R5 as already mentioned.

As a heading card continues to move through the card sensing devices, it passes under station C and there connections are established to make effective a relay R4 for causing many controls needed in connection with consideration of heading cards. The relay is picked up by a circuit including line 1185, relay R4, wire 1227, switch HCSa, contacts 1219, brush 307' in the first column, the special perforation in the heading card, contact roller 308 (Fig. 49c), common brush 307c, distributor contacts CF1, relay contacts R2b, and line 1184. A holding circuit is established for relay R4 though line 1184 (Fig. 49a), wire 1228, cam contacts CF15, wire 1229, holding contacts R4a, relay R4, and line 1185.

Relay R4 operates to open contacts R4b (Fig. 49b) in series with the automatic control circuit to disable the circuit while heading cards are passing through the machine.

A third contact is operated by relay R4 for setting up circuit connections to control the printing of zeros. During printing under control of heading cards, it is desired that zeros be printed in address names and numbers to the left of the amount columns. Then there are also other heading data with license or policy numbers requiring zeros to the left of the highest significant digit. For these purposes contacts R4c (Fig. 49b) are closed and circuit connections are established through magnets HZ and LZ. The circuit includes line 1184, wire 1230, contacts R4c, plug socket 1231, a plug wire to socket 1232, for universal zero printing or socket 1233 for zero printing to the left. The circuit for zero printing continues through cam contacts CF18, magnet HZ, wire 1234 and line 1185. The other zero control circuit passes through cam contacts CF19, magnet LZ, wire 1235, and line 1185. Arranged in shunt with contacts R4c are contacts 400 operated by the switch bar 374 (Fig. 44) for the purpose of sustaining the circuit until the cam contacts take over.

A fourth set of contacts operated by relay R4 are connected in a card counting circuit for either counting all cards or counting cards other than heading cards. As shown in Fig. 49c, a card counting switch CCS may be lowered to contact terminal 1237, and it is then in series with relay contacts R4d normally closed to convey card counting impulses but opened whenever a heading card is encountered. The counting circuit is normally closed for an impulse which passes in line 1184, through card lever relay contacts R2b, wire 1238, wire 1239, switch CCS, terminal 1237, contacts R4d, cam contacts CR14, and plug socket 1240 pluggable to any accumulator order. When the counting switch is raised into contact with terminal 1241, the circuit is independent of the operation of relay R4, and then all cards are counted upon cyclical operation of cam contacts CR14.

As the heading card passes through the last sensing station D, it sets up a circuit for the energization of relay R10 which controls the offset stacking of the heading cards. All cards pass the offset station, but the item cards are allowed to continue on to the main stacking station while the heading cards are retained at the intermediate station. The circuit for the stacking control relay passes through line 1185 (Fig. 49a), relay R10, wire 1242, the closed offset stacking switch OSS, the contacts 1220, brush 314' in the first column position, then through the special perforation in the heading card, contact roller 312 (Fig. 49c), common brush 314c, distributor contacts CF2, wire 1238, relay contacts R2b and line 1184. The stacker relay then operates contacts R10a to set up a holding circuit, the circuit in Fig. 49a following a path along line 1184 to wire 1243, cam contacts CF16, wire 1244, contacts R10a, relay R10, and line 1185.

Relay R10 operates other contacts R10b in series with an offset control magnet O. The circuit through magnet O involves line 1184, cam contacts CF17, wire 1245, relay contacts R10b, magnet O, wire 1246, contacts R10a, relay R10 and line 1185. Turning to Fig. 6, it is noted that the magnet O places a deflector in the path of the cards carried by the stacker drum S and causes heading cards to be deposited in the stacking station OFF. There it is also noted that the armature of magnet O operates to close a pair of contacts 316. Turning back to Fig. 49a, it is seen that these contacts 316 are arranged in series with magnet O and serves as part of a sustaining circuit including cam contacts CR19.

It is believed well to summarize the various operations caused by heading card control. The sensing of the first heading card causes energization of the hopper clutch magnet. This clutch disengages for the purpose of retaining the first heading card at the upper brushes, i. e., short of entry under the brushes at station B, while the preceding card passes the lower brushes for item printing purposes. The following card cycle will then be devoted to printing from the heading card under the upper brushes. This is accomplished by unlatching the brush switch bar from the high cam position by the same impulse used to energize the card feed clutch magnet. This impulse in energizing the switch bar magnet BSW must pass through a switch bar relay contact R5b, the relay having been picked up by CF contact CF7 in the cycle that the hopper clutch remained disengaged. A CF contact CF8 is then used to hold the relay circuit until early in the following card cycle. It should be noted that the following cycle may not be a card cycle and, therefore, switch bar latching will be delayed until a card feed clutch engaging impulse is initiated.

The brush switch bar, Fig. 44, tends to remain in the lifted position during the zoning and printing time with the high point of the cam lifting the bar at the point when an impulse is likely to trip the switch magnet. When the magnet is tripped, the bar shifts the printing control from columns 2 to 40 of the upper brushes to the columns 41 to 80 of the lower brushes. Lower brushes in columns 2 to 40 are controlled by the brush cutout bar which remains in the closed contact position, except when the heading card is passing the lower brushes and also when printing from the heading card at the upper brushes.

*Printing control*

In Fig. 49c, it is seen that the hundred print controlling magnets PM1 to PM100 are connected to a common wire 1248 attached to the main line 1185. Also in circuit with the print magnets are individual contacts 1142 which are normally closed but operated by the switching devices shown in Fig. 44a. The print connections end in plug sockets 1249 which may be connected directly to the sockets 1207, 1211, 1216 extending from the sensing brushes at stations B and D or connected to sockets 1250, Fig. 49d, for accumulator grouping and program control. When printing from item cards, the entire width of the sensing station D, Fig. 49c, is available for alphabetic and numeric data. However, the switching arrangements already described are provided so that heading card information may be derived from columns 2 to 40 of station B and columns 41 to 80 of station D by merely plugging from sockets such as socket 1216 to sockets 1249.

The print magnet sockets 1249 are also connected to the sockets 1250 (Fig. 49d) for reading out total control impulses from the accumulators. At such times, the connections from the sensing brushes are ineffective because the card feed contacts in series therewith remain stationary during total printing. However, during a total readout cycle a choice is made between punching and printing, and when summary card punching is selected, the contacts 1142 (Fig. 49c) are opened in series with the print magnets to prevent printer operation. As shown in Fig. 44a, the operation of the switch bar for contacts 1142 is controlled by a magnet SBM, the circuit for which is shown in Fig. 49b. The magnet serves to effect print elimination when a switch T is closed. The circuit for magnet includes line 1184, switch T, cam contacts CF5, wire 1251, magnet SBM and line 1185. Other program control for elimination of printing is described hereinafter.

Before going further into the control of listing and total printing it is believed well to explain the controls for selectively causing printing and other functions at desired times. A number of devices are provided in the machine for selective actuation of the many functions possible. These include control from special X holes in the cards, group control enforced by changes in group number perforations, digit selection by any digit perforation in any column, program control involving selector magnets for calling into operation a group of orders at selective times and group indication control effective on the first cycle after a group change.

X distributor and digit selection control

When X hole control is desired, a card is perforated in the 12 index position in one of the columns. The column chosen is one other than the columns bearing alphabetic print control indicia. Thus, it is distinguished from the zoning perforations found in the alphabetic columns. Control relays are plugged to the sensing brushes for detecting the X hole perforation when the card passes the first set of brushes and switch connections are operated to enable or disable some function according to the selective way it is plugged to the switch contacts.

The pickup circuit for X hole control includes the following connections: Line 1184, Fig. 49c, card lever relay contacts R1b, timer contacts H1, common contact brush 293c, contact roller 294, a brush 293 in any of the column positions and projecting through an X perforation, wire 1205 if in the second column position, contact blade 349, zoning shift blade 348 closed during sensing of the 12th position, wire 1206, plug socket 1207, plug wire to socket 1253, Fig. 49a, contacts 1136 (closed by the X distributor switch bar Fig. 45), pickup magnet X1P and wire 1254 to line 1185. The pickup magnet then operates associated contacts X1Pa to set up a holding circuit through cam contacts CR15 connected thereto by a wire 1255 and attached to the opposite line.

The pickup magnet also operates contacts X1Pb in series with a holding magnet. The initial holding circuit includes line 1184, cam contacts CR16, relay contacts X1Pb, holding coil X1H and wire 1256 and line 1185. The holding coil also operates associated contacts to set up a sustaining circuit through cam contacts CF14. An example of this circuit may be traced from line 1184 through cam contacts CF14, wire 1257, contacts X1Ha, holding coil X1H and wire 1256 to line 1185.

There are fifteen relays such as relay X1H and associated with each is a pair of pluggable contacts such as contacts 1258 and 1259 with a common blade connected to a plug socket 1260 that is pluggable to a common control connection leading to the line 1184 as described hereinafter. The two other sides of the contacts lead out to plug sockets 1261 and 1262 which are identified as "X" and "No X" controls. Since the lower contact 1259 is normally closed, any functional relays plugged to the socket 1262 will be normally effective when no special X perforations are sensed. Such functions will be disabled when an "X" hole is sensed. For an opposite form of control, the functional relay is plugged to socket 1261, whereby the function is normally ineffective and only called into operation when the related X distributor relay is called into action. The X distributor contacts can be plugged to control adding, listing, subtracting, selecting or any of the other functions described hereinafter.

When the X distributor control is to be effected in only one order or only a few orders, the control may be exercised directly through the "X" and "No X" contacts already described. However, when the control is to be enforced over a plurality of orders or banks of such orders, the control is directed through selector magnets, each of which is associated with as many as ten sets of switching contacts for exercising enabling, or disabling control over a substantial section of the machine. The operation and control of the selector magnets are described more fully hereinafter.

There are times when it is desired to use a digit perforation for control rather than a special X perforation. For such control, a digit commutator or selector is interposed between the brush analyzing the control column and the X pickup relay. The digit selector commutator has a number of plug connections, one for each segment of the commutator so that as the sensing operation takes place, only one selected index point position can be effective when a perforation is presented therein. Assuming that the digit 4 is selected for control, a digit selection control circuit may be followed starting with line 1184 in Fig. 49c, then through relay contacts R1b, timer contacts H2, common brush 302c, contact roller 303, sensing brush 302 in the second column position, wire 1208, contacts 350 and 348 closed during digit sensing, wire 1206, plug socket 1207, a plug wire to socket 1264, Fig. 49a, then through brush 1125 of the digit commutator, the segment timed to be engaged at the "4 time," plug socket 1128, a plug wire to socket 1265, magnet X1P and wire 1254 to line 1185. The X control relays X1P and X1H then operate as already described with reference to X hole control and there is caused the switching of a set of contacts such as 1258 and 1259 to vary the circuit connections. When any of the function control magnets or relays such as the adding, listing, subtracting or selecting controls are plugged to the contacts operated by the digit selector, they will be enabled or disabled by the presence of a certain digit according to the plugging arrangement made by the operator of the machine.

The X distributors serve not only to determine elimination of item addition, listing and subtraction, but also distribution of such control as the name implies. Sockets 1261 and 1262 are pluggable to two different sets of add, list or subtract control sockets, and then the impulses from the card sensing brushes are directed along either of the paths depending upon the presence or absence of special X perforations in the cards.

Selector magnet control

At the upper right hand corner of Fig. 49b, it is seen that four selector magnets SEM1—SEM4 are connected separately to wires leading to the program device. Each magnet also has a separate pluggable connection, such as connection 1266 leading to the magnet SEM1. This pluggable connection 1266 can be connected by a plug wire to sockets 1261 or 1262, Fig. 49a, for calling the selector magnet into operation for "X" or "No X" control. Of course, if the X distributor contacts are operated by the digit selection connections, then the connected selector magnets are influenced accordingly.

The complete circuit for selector control includes line 1184, Fig. 49d, then through either the card lever relay contacts R2d or the switch bar contacts 397, cam contacts CF10, one of the common plug sockets 1267, a plug wire to socket 1260, Fig. 49a, contacts 1259, socket 1262, a plug wire to socket 1266, Fig. 49b, wire 1268 and magnet SEM1 to line 1185. The energized selector magnet then shifts selector control contacts 1269 and 1270 so that they are changed from the position shown, to effect control other than normal control. These contacts 1269 and 1270 lead to plug sockets 1271, 1272, the arrangement of which is shown in the plugboard drawing Fig. 48. There it is seen that provision is made for four sets of such contacts, each influenced by one of the selector magnets. Any of the functional control relays or magnets for adding, listing subtracting, or other controls can be plugged to sockets 1271 or 1272 for normal or selected control. Since there are ten pairs of switch contacts in each set, an entire bank of accumulator orders or a bank of printing members can be selectively controlled by one selector magnet. The common socket 1273 of the selector switch contacts, Fig. 49b, is connected by a plug wire to the common plugging connection 1267, Fig. 49d for establishing complete circuit connections on the side of the contacts other than the side to which the functional controls are connected.

*Group control devices*

It is customary to distinguish between cards of different accounts by means of group numbers represented by perforations in the cards. As the cards pass one by one in succession through the machine, it is desired that passage of the last card of a group be detected so that special operations may be enforced before the second group is considered. For such purposes, the present machine is provided with group control devices of a form already described with reference to Figs. 42 and 43. It was noted that sets of contacts were operated according to the timing with which pins were extended on a constantly rotating wheel. The pins were operated under control of group control magnets GC, the circuit for which is about to be traced with reference to the wiring diagram. The control magnets are plugged to the brushes at station B which senses control perforations as the cards pass through the machine. A sample control circuit may be traced from line 1184, Fig. 49c, through relay contacts R1b, timer contacts H2, common brush 302c, contact roller 303, brush 302, wire 1208, contacts 350, 348, wire 1206, plug socket 1207, a plug wire to socket 1275, Fig. 49b, magnet GC and wire 1276 to line 1185. Magnet GC then pushes a pin 953, Fig. 43, into an extended position for changing the position of the group control contacts GCa—GCd. When the group numbers of successive cards agree, the operations of magnet GC are so timed that the pins operated thereby are spaced exactly one cycle apart and cause simultaneous shifting of contacts GCb and GCd so that no control circuit is set up. However, when the group number perforations of successive cards disagree, there is a change in timing in one of the orders and the operating time of the group control contacts is staggered so that one set of contacts sets up a control circuit, an example of which may be traced as follows: Line 1184, Fig. 49b, auto control switch ACS closed to terminal 1277 when auto control is desired, timing contacts CF3, then through either the normally closed hopper clutch contacts 208c or the heading card relay contacts, R4b, the normally closed switch bar contacts 399, wire 1278, contacts GCa, wire 1279, contacts GCc, plug socket 1280 and a plug wire to socket 1281, 1282 or 1283 for minor, intermediate or major control, respectively, a control magnet MI, INT or MA, and wire 1284 to line 1185. A number of control sockets, such as socket 1280 can be connected together for any one of the three control functions. All three of the control magnets MI, INT, or MA may be connected to various sections of the group control mechanism by plugging to selected sockets 1280 and having other connections between groups of the control sockets.

In addition to the influence of the group control mechanism on the minor control magnet MI, another control may be effected whereby the last card passing through the machine calls into operation a minor control function. The last card control circuit includes line 1184, auto control switch ACS raised to contact terminal 1286, cam contacts CF12, card lever relay contacts R1c closed when the last card passes, lower card lever relay contacts R3a, wire 1287, magnet MI and wire 1284 to line 1185. When control for both last card initiation and auto control are desired, a second switch ACa can be closed between the terminals of the cam contacts CF3 and CF12 to connect the last card circuit with the auto control circuit closed by switch ACS touching terminal 1277.

In addition to the three group control magnets operated as already described, there are two other key operated control magnets PROG and FI. The progressive totaling magnet is energized upon depression of the progressive key PRO. A circuit is set up including line 1184, Fig. 49b, cam contacts CF13, cam contacts CR12, key contacts PROa, magnet PROG and wire 1284 to line 1185. The final total magnet FI is arranged in parallel with the progressive total magnet and a circuit therethrough is established by the closure of key contacts FIa by the final total key FI.

From the foregoing, it is apparent that there are five control magnets, three of which are operated automatically upon group changes and the two others operated by hand. All of these control magnets are associated with the program device to initiate operations associated with the end of a record group. These control magnets not only initiate the program operation but they also call for individual programs related to the class of control. This is made possible because, as explained with reference to Fig. 36, the brush holder 1020 is moved differentially to one of five positions according to the class of control. As shown in Fig. 35, the five control magnets have connections to operate individual stopping rods for controlling the initial program selection. As shown in Fig. 47, the first block on the program sheet PG is arranged with five horizontal lines of index point positions, said lines being receptive to five different arrangements of perforations for calling into operation various functions of the machine as selected by the initial brush position, the setting of which is determined by operation of one of the five control magnets. Before going into a description of the control of the program device, it is believed well to again mention that the first program selection is made by differential movement of the program sensing brushes and the other subsequent cycles of program selections from the second to the ninth selection are made by successive step by step rotation of the program drum to carry the perforated program sheet PG thereon under the brushes which are then stationary. The program drum is shown separated in two parts for purposes of illustration with the wiring in a diagrammatic way, with the left end shown in Fig. 49b and the right end in Fig. 49d.

*Controls for program devices*

Referring to Fig. 35, it is noted that energization of any one of the five control magnets causes movement of the rod 1062 towards the left and closure of contacts PR1 operated thereby. Turning to Fig. 49a, it is seen that these contacts PR1 are arranged in series with the brush holder release magnet BT. The circuit may be traced from line 1184, through cam contacts CR7a, wire 1289, contacts PR1, wire 1290, magnet BT and line 1185. The energized magnet BT, Fig. 36, then acts to release the brush holder 1020 to allow it to move differentially to one of five positions determined by the projecting rod 25a—29a operated by a control magnet. The brush holder 1020 not only positions the sheet sensing brushes 1017 to initial program selecting position but it also cooperates with a number of program control contacts PR2, PR4 and PR5.

At the top of Fig. 49a, it is seen that contacts PR5 are normally closed in series with the circuit for the card feed clutch magnet CFC. When program operation is initiated, it is desired to suspend card feeding operation and it is for this reason that contacts PR5 are opened early in the cycle of program operation.

Contacts PR2 which are also operated by initial control of the program device are arranged in series with the magnet PS for controlling ratchet movement of the program drum. This program spacing magnet PS is not operated immediately upon the closure of contacts PR2 but a circuit is partially established in readiness for the second cycle after control is initiated. A circuit for the spacing magnet may be followed in Fig. 49a via line 1184, cam contacts CR7, program contacts PR2, relay contacts R13c, wire 1291, relay contacts R12b, magnet PS and line 1185. In Fig. 36, it is seen that successive operation of magnet PS causes movement of the program drum step by step between the cyclical operations of the constantly running cam contacts. As each of these spacing operations takes place, the ratchet lever 1091 operates to open a pair of normally closed program control contacts PR3. Referring to Fig. 49a, it is noted that these contacts PR3 are in series with the holding circuit of an interlock relay R11 which has influence over magnet SDM and restoration of printing control after the performance of summary punching. This interlock relay R11 is operated under control of a last column relay found in the summary punch such as that disclosed in Patent No. 2,126,595. Contacts 201S (identified by number 201 in Patent 2,126,595; other similar parts show the same relationship by addition of the suffix S) are closed with last column punching and direct a circuit through the relay from line 1184 through wire 1292, contacts 201S operated by the punch, wire 1293, relay R11 and line 1185. Relay R11 then operates associated contacts R11a to set up a holding circuit through program control contacts PR3, said circuit running via line 1184, wire 1294, contacts PR3, relay contacts R11a, relay R11 and line 1185.

Interlock relay R11 also operates contacts R11b to open the circuit which is established for summary punching control. This is a circuit through the switch dog magnet SDM, Fig. 44a, which is operated to suspend restoration of the closed contacts 1142 which are opened during summary punching to prevent printing operation. Operated along with magnet SDM, Fig. 49a, is a relay R13 which serves to close contacts leading from the readout devices of the accumulator into the summary punch machine. The circuit for summary punch control influenced by program operation, includes line 1184, wire 1295, cam contacts CF6, normally closed contacts R11b, wire 1296, switch bar contacts SB6, Fig. 44a, magnet SDM, relay R13 and line 1185. Contacts SB6 are closed whenever there is a summary punch selection and operation of switch magnet SBM due to the closure of switch T, Fig. 49b, or activation of line 1251 by the program device.

Returning to consideration of the other contacts operated by initial movement of the program devices, it is noted that the third contact PR4, Fig. 37, which is operated by the brush holder 1020, is arranged in series with the friction clutch magnet FR, Figs. 36 and 49b, for restoring the program drum. The closure of this contact PR4 by program operation is not immediately effective to cause resetting operation, but is provided to form a sustaining circuit for the friction clutch, operation of which is initiated by a circuit through the program sheet itself. Reference to Fig. 49b shows that closure of contacts PR4 is normally ineffective to cause operation of magnet FR because contacts PR7a are opened. The resetting operation of magnet FR is initiated through contacts PR7b which are normally closed in series with a wire 1297 running to the magnet and another wire 1298 attached to the program sensing brush 1017 for detecting a perforation controlling restoration of the program. Upon operation of magnet FR, the program drum will start to turn to take the restoring control perforation away from the related sensing brush, but before this can happen magnet FR is effective to shift contacts PR7a and close them to sustain the friction restoring cycle through contacts PR4 until the brush holder is brought to the home position in which it again opens contacts PR4 to stop the resetting operation.

Another program control is provided in the form of a pair of normally closed contacts PR6, Fig. 41, which are opened as long as the frictional restoring magnet FR is in operation. These contacts are placed in series with the main program operating circuits to disable all functional controls through the program sheet PG while the drum is moving toward the home position for restoration. At the top of Fig. 49b, it is seen that contacts PR6 are closed in series with the cam contacts CR3 and a common contact brush 1017c of the program device.

From the foregoing, it is apparent that the operation of the program device is initiated by a control magnet shifting the program brush holder and then a number of spacing operations are initiated by the ratchet magnet PS, the number of operations being limited by the placement of a program restoring perforation in the program sheet PG, which when encountered operates the frictional restoring magnet FR for turning the program drum to the home position in readiness for another program control operation.

*Group indicating control devices*

It is customary in tabulating practice to provide group indicating devices for recording a group number by an operation delayed to accompany only the first card cycle after a group change. The present devices are provided with such controls operated in a novel way and having control not only over listing, but the GI controls may be plugged to have group indicating control over adding and selector operation as well as listing.

Referring to Fig. 49a, it is noted that a group indication swich GIS is provided in series with a relay R6 provided for group indicating purposes. The switch is open when the machine is operated with heading card control. At such times, the account is identified directly from the heading cards. When ordinary item entering is under consideration, then switch GIS is closed.

The group indicating control circuit is initiated by closure of the program contacts PR1 which, it will be remembered, are operated upon any group control change. Then the circuit through these contacts not only passes through magnet BT to shift the program brushes, but it also passes through the normally closed relay contacts R6a and through relay coil R6. The relay when energized shifts the contacts to close a holding circuit through the lower points of contacts R6a before breaking the initiating circuit, and a circuit is established from line 1184 through wire 1299, switch GIS, cam contacts CF9, wire 1300, contacts R6a, relay R6 and line 1185. The control to be effected by the group indicating relay R6 is not immediately effective but it is held by the cam contacts so as to take effect on the first card feed cycle after the control change.

The group indicating function is selected by a pluggable connection shown at the top of Fig. 49d. There it is seen that relay R6 operates contacts R6b in series with a set of plug sockets 1301. The group indicating circuit includes line 1184, contacts 397 or R2d, cam contacts CF10, relay contacts R6b, plug socket 1301 and a plug wire to any desired functional control such as the adding, listing, or selector control magnets. As explained hereinafter with respect to the devices held on the sets of accumulator plates, the relays and magnets thereon have connections to the line 1185 for completing circuits when plugged to either the group indicating control or the common control sockets 1267 after passing through the digit selection contacts, the X distributor contacts or the selector control contacts. When the selector magnets SEM1—SEM4, Fig. 49b, are plugged from a socket such as socket 1266 to a group indicating control socket 1301, Fig. 49d, it is apparent that a complete circuit is initiated upon closure of the group relay contacts R6b. Any of the functions initiated by the group indicating control are effective for the first card cycle after a group change, after which the circuit for relay R6 is broken down by the operation of the cam contacts CF9, Fig. 49a.

Devices for selecting functions

A number of connections are established preliminary to functioning for card reading and total taking. For this purpose each accumulator plate has mounted thereon relays for controlling adding, subtracting, listing, resetting, total transferring and balance determination, and there are other relays outside the accumulator unit for serving as auxiliaries for the same purposes. Certain of these relays, such as the subtracting and listing control relays, are independent of program control, while others are controlled solely by program control, such as the total transferring, reset, hand total and total taking relays. There still is a third group of controls which are influenced jointly by the program initiation as well as selection outside of program control, for example, the adding relays, the selector magnet relays, the line spacing and sheet ejection relays, and the summary punch selection relays are influenced by plugging and switch operations other than program selections.

Before describing the actual operation of adding, subtracting, transferring, resetting, total taking, total transferring and other functions, it is believed well to point out how the preliminary connections are established making such control possible.

Common control by the grouping sheet G, Fig. 46, is brought about by cutting perforations in a horizontal line to coordinate the feeler devices of a plurality of accumulator plates with one grouping bar such as bar 900, Fig. 49d.

Subtracting control

As noted in Figs. 49d and 49e each accumulator order is provided with a subtraction control magnet SU. Each of these magnets is connected to a grouping sheet feeler 924 for detecting openings in the grouping sheet G provided to bring a plurality of such magnets under common control as determined by an impulse sent through a grouping bar 901. Connected to each bar 901 is a plug socket 1303 which is to be connected to receive an impulse invariably from the common plug connection 1267 (Fig. 49d) or to be plugged to be selectively energized under X distributor control, digit selection control, selector control, or group indication control. For these various purposes, plug socket 1303 can be connected to sockets 1261 or 1262 (Fig. 49a), sockets 1271 or 1272 (Fig. 49b), or socket 1301 (Fig. 49d). It is noted that all of these subtraction control connections are independent of the program device as they should be for card controlled operation.

Assuming that subtraction is to take place under X hole control, a circuit can be traced as follows: from line 1184 (Fig. 49d), through card lever relay contacts R2d, cam contacts CF10, socket 1267, a plug wire to socket 1260 (Fig. 49a), through contacts 1258 closed upon detection of an X hole, socket 1261, plug wire to socket 1303 (Fig. 49d), bar 901, one or more perforations in the grouping sheet, contact feeler 924, relay coil SU, wire 1304, fixed accumulator connection 736, and line 1185. The energized group of relays SU then acts to close contacts SUa and SUb, for reversing the accumulator starting and stopping connections so that rotation of the accumulator wheels is started early in the card reading cycle and is terminated when the digit representing perforations are sensed.

Listing control

Each accumulator plate carries a listing control relay LS and contacts operated thereby for determining whether or not the impulses received are to control printing. Referring to Figs. 49d and 49e, it is seen that attached to each coil LS is a group sheet sensing member 925. This sensing member is adapted to extend through perforations in the grouping sheet and press into contact with a grouping bar 903. Connected to each bar 903 is a plug socket 1305 for connecting the listing control relays to any of the many various controls for predetermining how the items are to be recorded.

As already explained with reference to subtraction control, it is possible to connect socket 1305 directly to sockets 1301 or 1267 for group indication control or invariable control, and it is also possible to connect them through the X distributor, digit selector or group selector contacts.

Upon energization of the group of listing control relays LS related to a certain number or name, the related coils close contacts LSa in the various accumulator orders and provide a circuit for carrying an incoming impulse from a card sensing brush to a related print control magnet. The impulse comes from the card brush to socket 1333, then through contacts LSa, out at socket 1250, and over to a print control magnet PM1, Fig 49c.

Adding control

An adding control relay AD is carried by each accumulator plate. Attached to each of these relays is a grouping sheet feeler 916 (Fig. 49d). When the grouping sheet has a line of perforations opposite the feeler, contact is established with one of the grouping bars 900. The bars are connected separately to wires 1307 which serve a double purpose in being connected to the program sheet sensing brush 1017 as well as connected to plug sockets 1308, Fig. 49e, through cam contacts. For ordinary item entering operation, the adding control circuit is directed through the socket 1308 in any of the various ways already discussed in connection with subtracting and listing control; in other words, adding in one or more groups of orders may be made invariable or dependent upon X distribution, digit selection, selector operation, or group indication operation.

The connections from the adding relays to the program device is of use in connection with total transfer operation during which the total reading operation of one accumulator is controlled to direct the adding operation of another accumulator, the choice between sending and receiving accumulators being made by perforations in the program sheet.

Whenever an adding control relay AD is operated, it closes associated contacts ADa to direct the card controlled initiating impulse for addition through the starting control magnet SR of the accumulator.

Total transfer control

Each accumulator plate carries a relay RT for controlling the sending of impulses therefrom into another accumulator. As noted in Fig. 49d, the relay is connected to a sensing member 926 for grouping purposes, and the sensing member is adapted to reach through openings in the grouping sheet and engage one of a number of common conductor bars 904. Each of these bars is attached to a wire 1309 connected to a program brush 1017 for sensing the total transfer sending perforation in the program sheet. When the program sheet is positioned with perforations under brushes 1017 calling for a total transfer operation, the relay RT is energized and closes associated contacts RTa for directing impulses out of the reading device of the accumulator order and into another selected accumulator order.

At the same time that the program device influences the energization of relays RT, it exercises control of a total transfer switch magnet RTS, Fig. 45b, for shifting contacts which are normally effective between card sensing brushes and the accumulator, the idea being to separate the sending accumulator from the card sensing devices and at the same time connect it to another accumulator. In Fig. 49b it is seen that the total transfer switch magnet RTS is connected to the line 1185 and to a wire 1310 attached to one of the program sensing brushes 1017 for extending through a perforation calling for a total transfer operation. The circuit continues through the contact roller 998, common brush 1017c, contacts PR6, cam contacts CR3, and line 1184. When the magnet is energized, it operates the switch shown in Fig. 45b and the contacts 1158 and 1159 operated thereby are shown in Fig. 49d, where they may be plugged to the socket 1333 for selectively receiving card sensing impulses. Card controlled entries are effected through the normally closed contacts 1158, and the entries received by transfer from another accumulator are effected through the shifted contacts 1159.

Resetting control devices

All accumulator plates are provided with resetting control relays RE (Fig. 49d) connected to a sensing member 927 for sensing five lines of perforation positions on the grouping sheet. When a perforation is found in the sheet, contact is established with a conductor bar 905 to which is attached a wire 1312, the other end of which is secured to one of the program sensing brushes 1017. When a resetting operation is selected by the program device, the program sheet PG presents a perforation under the related brush, and it is then possible for an impulse to be sent through one or more reset relays RE connected for control in unison by the alignment of perforations on the grouping sheet opposite one bar 905. Relay RE then operates associated contacts REc, REb, and REa to close connections for operating the accumulator wheel to restore it to the home position.

The first mentioned pair of contacts REc provides a path for an impulse delivered early in the cycle of operation to effect operation of the starting magnet SR to connect the accumulator wheel for rotation toward zero. The other contacts REa provide a path for an impulse for stopping the accumulator wheel when it arrives in the zero position. Other contacts REb are opened by the reset control to disable transferring control during resetting.

At the same time that the program device is energizing reset relays RE in the accumulator device, it is also operating a reset relay R9 (Fig. 49b) for effecting external control. The circuit for relay R9 may be traced from line 1185, through relay R9, wire 1313, program brush 1017, through sheet PG, contact roller 998, common brush 1017c, contacts PR6, cam contacts CR3 and line 1184. The energized relay sets up a holding circuit by closure of contacts R9a to which is connected a wire 1314 attached to cam contacts CR10 leading to the opposite line.

Other contacts R9b and R9c, Fig. 49d, are shifted by relay R9 so that, instead of contacts R9b being closed to direct transfer control impulses through the accumulator, they are opened while contacts R9c are closed to direct a stopping control impulse through the accumulator stop magnet SP for resetting control.

Total testing control

In Fig. 49d, it is seen that the accumulator plate is provided with a pair of balance or total determining relays PT and NT for detecting positive or negative totals. Although there is such a pair of relays provided for each order of accumulation, when a group of accumulator plates is brought together for control as a single accumulator, it is only the highest order pair that is used for determining the nature of the total contained by the accumulator. If the highest order of the accumulator contains a zero, it is a sign that it holds a positive total while, on the other hand, if the highest total registers 9, it is an indication that a complement is held in the form of a negative balance.

The program sheet has provisions for presenting a total testing perforation as a selective preliminary to total taking after a series of operations involving addition and subtraction. Turning to Fig. 49d, it is seen that the testing relays PT and NT are connected to the grouping sheet sensing member 930 through a pair of normally closed contacts 844 attached to the positive total relay and a pair of normally opened contacts 843 connected to the negative total relay. These contacts 843 and 844, Fig. 23, are controlled by the position of the accumulator wheel, so that the former is closed at 9 and the latter remains closed as long as the wheel is at zero or any digit other than nine. The grouping sheet G (Fig. 46) is punched only in the highest order "Total test" position of the accumulator. One or the other of the testing control circuits passes through the sensing member 930, Fig. 49d, and the selected perforation in the grouping sheet and through a conducting bar 908. Attached to bar 908 is a wire 1315 leading to a program sensing brush 1017 aligned with a column of the program sheet devoted to index points for perforations calling into operation the total testing function.

As soon as the test control impulse courses through either relay PT or NT, they close contacts PTa or NTa for connecting the printer to the readout segments for reading either the true number or the complement of the amount standing in the accumulator.

Hand total control

There are times during operation under program control when it is desired to stop the program operation, so that time is afforded for changing plugging connections or for making new plug connections to read out a desired total. For this purpose, relay R12 (Fig. 49b) is connected to one line and attached to a wire 1316 leading to a program sensing brush 1017 for detecting a hand total control perforation in the program sheet PG. Upon energization of the relay, associated contacts R12a are closed to establish an extended holding circuit, the circuit including line 1184, wire 1317, cam contacts CR10, wire 1318, contacts R12a, relay R12 and line 1185. Although relay R12 is energized for a substantial portion of each cycle by the program brush circuit and cam contacts CR3, cam contacts CR10 are provided to lengthen the period of energization to overlap the interval of operation of cam contacts CR7 (Fig. 49a) and thereby prevent program spacing.

Other normally closed relay contacts R12b (Fig. 49a) are arranged in series with the program ratchet spacing magnet PS. Operation of the hand total relay R12 causes opening of the ratchet drive circuit and disabling of the program operator. Since the remainder of the machine is stopped during program operation, the entire operating connections are disabled until a hand total key HA is depressed to close contacts HTK arranged in shunt around contacts R12b. Closure of these contacts serves to again energize spacing magnet PS and advance the program sheet to a position wherein a total selection perforation thereon goes beneath one of the program sensing brushes. Any other control can be effected by the proper program perforation. In the interval between the time that the program drum is stopped by the hand total relay and operation is resumed by the hand total key, any desired changes in control may be operated by movement of switches, such as the summary punch control switch, or changes in the plugging and grouping connections for calling into operation various accumulator orders.

Total control

The accumulator is controlled to operate the printer for total recording whenever a total control perforation is encountered on the program sheet. The accumulator reading devices are called into operation by the contacts of a relay R8 shown in Fig. 49b with a wire connection 1320 leading to the program brush 1017 for analyzing the total column on the program sheet. When the relay is energized by the appearance of a total perforation under the program brush, it operates to close contacts R8a (Fig. 49d) arranged in series with the total impulse emitter or commutator connected to the readout devices of all accumulator orders. Also in series with this total reading circuit are normally closed contacts R13b operated by relay R13 (Fig. 49a) which is remembered as arranged in parallel with the printing contact switch control magnet SDM. This relay R13 is called into operation at the same time as the magnet to prevent printing during summary punching operation.

A third control is in series with the total printing devices and it acts to prevent total printing at selected times. It is the switch NON (Fig. 49d) which is normally closed for total printing operation.

Summary punching control

It is already mentioned with reference to Fig. 49b that the switch bar magnet SBM is called into operation selectively by the program device. When the magnet is made effective, it operates to open contacts 1142 (Fig. 49c) in series with the print control magnets PM1—PM100 to disable printing during summary punch operation. The same form of control is called into operation manually by the closure of switch T (Fig. 49b) in series with cam contacts CF5 and wire 1251 arranged in series with the magnet SBM. A third way to call punch control into effect is a way involving plug socket 1319 in series with magnet SBM. This socket is pluggable to X distributor contacts for selective operation.

Every time the summary punch switch magnet SBM is energized, the contacts SB6 (Figs. 44a and 49a) are closed in series with a relay R13. This relay then acts to prepare a number of circuits for summary punch control. In Fig. 49e it is seen that the relay closes a series of contacts R13p in series with the punch control magnets 120S found in a punching machine, such as the one disclosed in Patent 2,126,595.

Other controls effected by relay R13 are shown in Fig. 49d. There it is seen that contacts R13a and R13d are opened in series with positive and negative total mark printing circuits to prevent recording of such marks during summary punching.

Another relay contact R13c (Fig. 49a) is opened in series with the program spacing control magnet PS to prevent program operation during summary punching.

When summary punching operation is selected, the total control impulses instead of going to the print magnets PM1, etc., Fig. 49c, as prevented by the opening of contacts 1142, are redirected through wires 1247 to the plugboard 258S of the punch. This plugboard has a series of 100 sockets 274S on wires 1247, and opposite to them are 45 punch control sockets 259S with wires 260S leading to the column selector points 219S. By means of horizontal plug wires between certain of sockets 274S and 259S, selected accumulated orders are conditioned to be read out in proper denominational order for punching control. Punch operation is controlled step by step by the brush structure 214S of the column selector. The punch relay contacts 234Sa are closed and held for punching operation.

Whenever a circuit is set up through contacts NTb for printing a negative total sign, a branch circuit is set up to cause the punching of an X hole in a summary card. The circuit passes through line 1185 (Fig. 49c), contacts 141S, relay contacts 234Sa, contacts 266S, contacts 241S, relay contacts R13d, column selector 214S, 217S and 219S, plug connections on board 258S, wire 1247 to socket 1249, a plug wire to socket 1250' (Fig. 49e), wire 1353, the accumulator contacts NTb, bar 907, wire 1361, relay contacts R13p, the X punch magnet 120S, and wire 1365 to the left line 1184.

The total reading impulses to the summary punch control magnets 120S are directed seriatim through the readout devices of one after the other of the accumulator orders plugged on board 258S. An example of such a circuit can be followed from line 1184, Fig. 49d, through wire 1351, switch NON, wire 1365, Fig. 49e, one of the digit punching magnets 120S, relay contacts R13p, wire 731, a wire 1352 or 1358 according to positive or negative total selection, readout brushes 857 or 858, common wire 873 or 858, contacts PTa or NTa, feeler 934, bar 911, feeler 933, wire 1353, plug socket 1250', plug wire to socket 1249, Fig. 49c, a wire 1247, plug connections on board 258S, column selector 214S, 217S and 219S, relay contacts R13d, contacts 241S, contacts 266S, relay contacts 234Sa, contacts 141S and line 1185. Punch operation continues until the last column contact 201S, Fig. 49a, is closed in series with relay R11. And this relay R11 has contacts R11b in series with relay R13 which when deenergized, disables the punch connections.

Record sheet feeding control devices

Figure 1B:
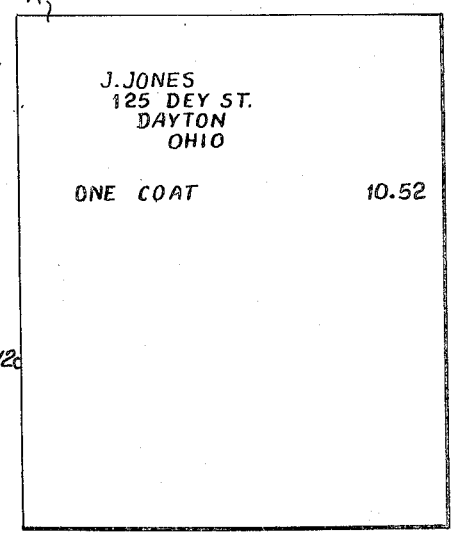
Fig. 1b shows an example of a printed report sheet.

The record sheet R (Fig. 1b) is controlled to advance with line spacing movement during item recording as well as during program operation, when such operations involve printing on a record sheet. Sheet ejection controls are also provided so that, after all operations relating to one account have been recorded, the program device can call into operation sheet ejection controls. Instead of single sheets, a continuous form may be used, and then the ejection controls are arranged to carry the strip from form to form with differential movements calculated to bring the first heading line or the first item line in position after an ejection operation.

The mechanism used is disclosed in greater detail in Patent 2,189,025, but the operating controls are fully disclosed herein.

Turning to Fig. 49b, it is seen that a line space control relay R7 is connected by a wire 1321 to cam contacts CR5 which have a wire 1322 connecting them to one of the program sensing brushes 1017. Upon taking a total with program control and appearance of a perforation calling for line spacing in conjunction with a function such as printing, a circuit is partly established and at the proper time the cam contacts close to send an impulse through the line space control relay. The relay then operates to close contacts R7a and a holding circuit is established from line 1184, through wire 1323, cam contacts CR6, contacts R7a, relay R7 and line 1185. The relay then acts to make effective the line space clutch in the automatic platen spacing unit to advance the record sheet one line space.

Other line spacing controls are provided in addition to the program selection of line spacing. A switch TS may be closed in series with relay R7. Then, a circuit is directed therethrough as an incident to each card feed operation. The circuit follows a path through line 1184, switch TS, lower card lever relay contacts R3b, wire 1324, cam contacts CF4, wires 1325 and 1321, relay R7, and line 1185. During heading card control, switch bar contacts 398 are closed in shunt with the card lever contacts, so that a sheet spacing operation accompanies the recording of each line of heading information.

Whenever the line space control relay is energized, it operates associated contacts R7b (Fig. 49a) arranged in series with the line space control magnet LSM. The circuit for the magnet includes line 1184, cam contacts CR7, wire 1330, relay contacts R7b, wire 1331, magnet LSM and line 1185.

A sheet ejection control magnet EM, Fig. 49b, is wired to the program device and is used to control the eject mechanism just as the similarly identified magnet is used in the automatic carriage unit of Patent 2,189,025 already mentioned. Unless otherwise mentioned herein, the controls of the patent remain unchanged. Wires 1326 and 1327 are connected between a related program sensing brush 1017 and cam contacts CR11 which are wired to the eject magnet by a wire 1328. The ejection control perforation on the program sheet can be placed to follow all operations involving recording on the sheet or strip of record material.

Other ejection controls in the form of contacts 269S (found identified as contacts 269 in Patent 2,189,025) are normally open but connected in series with the eject magnet EM and the cam contacts CR11 through wires 1327, 1328 and 1329. This control of ejection is independent of program control and is called into operation whenever the end of a sheet or the end of a form is reached, the position of which is predetermined by settable controls in the automatic carriage unit as fully described in the patent mentioned.

General operating conditions

The foregoing sections of the description of the electrical connections are concerned in the main with control operations preparatory to actual adding and printing operation. The program devices, the plugboard and the grouping sheet all have the influences already mentioned for selection and control of the operations to be effected. In other words, a foundation is laid for the performance of the accounting functions which are to give the tangible results sought. The actual operation is brought about through control by impulses from the card sensing brushes or through conductors within the accumulator, such as transfer contacts and total readout devices.

No doubt it has been observed that Figs. 49d and 49e appear the same in many respects. The reason for this is that the accumulator plates are of a universal character and the two figures distinguish in that Fig. 49d shows a representation of the fifty plates assembled in an upper tier, while Fig. 49e shows the remainder of the hundred plates arranged in a lower tier. The two tiers of controls are connected for many functions but retain individual control by virtue of selected grouping of orders as predetermined by openings in the grouping sheet. Although only single circuits are traced through one accumulator order, it will be understood that the same effect can be produced in any number of orders and in the upper and lower tiers.

*Item printing and listing operation*

It is already explained with reference to Fig. 49c that printing control may be taken directly from the card sensing brushes, by plugging the socket 1249 which is in series with the print magnets, to one or the other of the sockets 1211 or 1216 for item and heading data printing control that is invariable. However, when printing is to be influenced by the X distributors, group indicating device, selective magnet control, or control exercised by the listing control relay LS (Fig. 49d) and associated contacts LSa, then the print magnets are plugged so that impulses thereto are carried through the devices on the accumulator plate before reaching the print magnet.

Assuming that printing is to occur in columns devoted to heading card information, the plug connection is made between the sockets 1216 (Fig. 49c) and socket 1333 (Fig. 49d).

A more typical print control connection is the one between socket 1211 (Fig. 49c) and socket 1333 (Fig. 49d) for control of item numbering and amount printing. The complete printing circuit can be traced as follows: from line 1184 (Fig. 49c), relay contacts R2b, wire 1238, timing contacts CF2, common brush 314c, contact roller 312, then through the perforation in the card to brush 314, wire 1212, a lower contact 352 contacting with blade 348 during passage of digit index points (if alphabet printing, the upper contact 352 is closed for zoning impulses derived from station C. The circuit continues through wire 1210, contacts 1151, socket 1211, plug wire to socket 1333 (Fig. 49d), or to socket 1334 if control is to be directed through the total transfer contacts 1158, then through the fixed connection 735, wire 1335, contacts LSa, fixed connection 734, plug wire to socket 1250, a plug wire to socket 1249 (Fig. 49c), contacts 1142, print magnet PM1 and wire 1248 to line 1185. The print magnet is then effective to control operation of the print wheel, as explained with reference to Fig. 14, to print one of the digits when it is operated by a single impulse or to print an alphabetic character when it is operated two or three times by zoning impulses and a digit impulse.

In addition to printing numeric and alphabetic information, special signs are recorded under control of the printing mechanisms in a manner described hereinafter.

*Adding operation*

It is already explained that adding control is varied by optional use of the X distributor, digit selector, group indication, selector operation or total transfer control in a selected manner according to the plugging connections to the control magnets AD. The adding control impulses are directed through contacts ADa and thus are subject to distribution, elimination or selection by the selected controls already described. An example of an adding control circuit is as follows: line 1184 (Fig. 49c), relay contacts R2b, wire 1238, timer contacts CF2, common brush 314c, contact roller 312, the card perforation, brush 314, wire 1212, contacts 352, 348, wire 1210, contacts 1151, plug socket 1211, a plug wire to socket 1334 (Fig. 49d), normally closed total transfer contacts 1158, plug wire to socket 1333, fixed contact 735, wire 1335, contacts ADa, starting magnet SR, wire 1336, fixed contact 736, and line 1185.

The energized start magnet SR then operates the clutch associated with the related accumulator wheel (Fig. 20) and connects the wheel to the constantly running shaft. The time of operation depends upon the location of the digit perforation in the card. If a "9" is to be entered, the perforation is located near the bottom of the card, and it is encountered early in the operation, and rotation of the wheel is started early in the cycle. The other smaller digits are entered by perforations progressively timed at later intervals. One cycle point after the entry of a 1 digit, a cam engages the starting clutch arm and disengages the clutch to hold the wheel in a differentially operated position.

As an incident to the adding operation, when a wheel passes from 9 to 0, it is necessary to add a unit in the next higher order. This is done by sending an impulse from the transfer contacts of one order and directing it through the starting magnet SR of the next higher order soon after the normal declutching time, so that the clutch is again engaged and the accumulator wheel is operated for one more step before being again declutched.

Assuming that a wheel has passed from 9 to 0, then the contacts 818 (Fig. 49d) are closed and a transfer circuit is directed into the next higher order as follows: from line 1184 (at bottom of Fig. 49d) through wire 1337, cam contacts CR8, normally closed reset relay contacts R9b, wire 1338, fixed contact 738, wire 1339, contacts 818, reset contacts REb, grouping sheet feeler 936, a grouping perforation in one column, angular cross bar 913 extending from one order to the next, back through a second perforation in the grouping sheet to sensing device 935 of the next higher order, wire 1340, transfer timing contacts 832, wire 1341, starting magnet SR, wire 1336, fixed contacts 736 and line 1185. The higher order wheel is clutched and driven for one step of movement before being declutched by cam operation.

Should an accumulator wheel be standing at 9 when a carry impulse is directed thereto from the next lower order, the impulse will be carried on still further into the order higher than the wheel at 9 through the contacts 811 closed when the wheel is at the 9 position. The parallel circuit set up through the 9's contact 811, branches off from wire 1340 into wire 1342 and passes through contacts 811, through contacts REb, the related grouping sheet feeler 936, then through the grouping sheet into the slanted conductor bar 913 extending from order to order, back through the grouping sheet into the sensing member 935 in the next higher order and through the wire 1340 and other connections including the starting magnet SR as already described.

It is understood that the grouping sheet G will be perforated in the positions opposite the slanted bars 913 so as to make complete, order to order connections between the various banks or orders of accumulator plates selected to act as one accumulator. If the banks of a single accumulator do not lie adjacent each other, they can be connected for transferring control by wires 1343 between output and input conductor bars 912 and 914 arranged behind the grouping sheet to connect separated orders of the same accumulator.

*Subtraction operation*

As already explained, selection of a subtracting operation may be caused by an operation of one or more relays SU associated with the accumulator orders in which subtraction is to take place. The function can be controlled selectively by group indicating, X distributor, digit selector, or selector magnet relays operating on contacts wired in series with relays SU.

Assuming that subtraction is to take place in certain orders, then those orders are connected in such a manner that the start relays of the related accumulator wheels are energized invariably early in the cycle of operation and, as the operation continues, the accumulator wheels are declutched differentially by impulses from the card sensing brushes. In this way it is seen the true number registered on the card is not added, but the complement of the number is entered into the accumulator. For example, if a 6 perforation is found on the card, the accumulator wheel in starting to rotate at the 9 point in the cycle, continues to rotate until the 6 time, and thus accumulates the amount 3 which is the 9's complement of 6.

All orders are operated the same way except the higher and lower orders of the accumulator in which subtraction takes place. These orders require the addition of an elusive unit in all complement adding operations after the first negative entry. Since the higher order stands at 9 before the second operation takes place, it is carried past 9 by the addition of the complement and sends out a transfer impulse which is carried around into the lowest order to supplement the 9's complement entered therein and change it to a tens complement. For example, the addition of 3 already mentioned as the complement of 6 will be increased to 4, should it be added to a complement already in the units order of the accumulator.

An example of a subtraction control circuit may be traced through the brush station D (Fig. 49c) without mentioning all the connections already described in connection with adding. Assuming that a plug wire is connected to socket 1211, it is carried over and connected to socket 1334 (Fig. 49d). However, before the brush circuit is effective for stopping control, another starting control circuit is initiated early in the subtraction cycle. It is believed well to trace this starting circuit first. It runs via line 1184 (bottom of Fig. 49d), through cam contacts CR20, wire 1344, wire 1345, fixed contacts 737, contacts SUb, wire 1341, start magnet SR, wire 1336, fixed contact 736 and line 1185. The start magnet operates the clutch, and the accumulator wheel starts to turn and is stopped when declutched differentially by operation of the stop magnet SP.

The brush circuit already partly traced to socket 1334, continues through total transfer contacts 1158, socket 1333, fixed contacts 735, wire 1335, subtraction relay contacts SUa, stop magnet SP, wire 1336, fixed contact 736, and line 1185. Magnet SP then serves to declutch and stop the accumulator wheel after the addition of the complement.

The grouping sheet is perforated opposite feeler members 935 and 936 and two bars 912 and 914, so that a transfer impulse is carried from the higher order to the lower order of the accumulator which is operated in subtraction. The complement filling circuit passes through contacts 818 and REb and into one of the individual fingers of sensing member 936, and then through the opening provided in the grouping sheet, into a conductor bar 914 and through a wire 1343 to another conductor bar 912 opposite a grouping perforation located to coincide with the lowest order feeler member 935. The impulse is carried through wire 1340, contacts 832, wire 1341, and start magnet SR which then operates the clutch for the units order wheel to turn it one step before the cam declutches the wheel and leaves it holding the result of the addition of the tens complement of the digit sensed on the record card.

*Credit symbol printing operation*

When a group of accumulator orders is devoted to subtraction control, one accumulator plate is arranged to control the printing of a credit symbol "—" to accompany all operations involving subtraction of amounts in the accumulator. Opposite the plate 719 (Fig. 49d) set aside for credit symbol control, the grouping sheet is perforated to allow a feeler 925 for listing to contact with the bar 902. Another perforation opposite bar 902 is aligned with a subtraction feeler 924. Then, whenever subtraction control is selected for the accumulator, a circuit is directed through the related list control magnet LS at the same time that it passes around through bar 902, and through the subtraction control relay SU in a different order. Then a print control circuit is established through a printer magnet for controlling a print wheel to operate at a time when a special symbol such as the minus mark is passing the platen.

A circuit may be followed from line 1184 (Fig. 49c) through relay contacts R2b, wires 1238 and 1239 and 1349, cam contacts CR13 timed to close in accordance with the code for the minus mark, plug socket 1348, plug wire to socket 1333, fixed contact 735, wire 1335, list control contacts LSa, fixed contacts 734, socket 1250, plug wire to socket 1249 (Fig. 49c), contacts 1142, print magnet PM1, and wire 1248 to line 1185. The cam contacts are timed to operate the print wheel when the symbol type is opposite the platen.

*Total operation*

It is already explained that upon the occurrence of a group change in the record cards or upon the selection of a progressive or final total by key operation after the machine stops, control for total taking is shifted to the program device. The program sheet and the accumulator grouping sheet exercise dual control to determine how, when and where the total is to be effected. The program sheet is arranged with five different sections for the five different classes of totals, and nine cycles of program operation make possible the taking of totals from one or more accumulators in a plurality of different operations. Co-operating with the program sheet is the grouping sheet for bringing together in a predetermined relationship various groupings of the one hundred accumulator plates, whereby the program control can treat these groups as individual accumulators.

Upon initiation of a total taking cycle by the program control, the first thing done is the testing of the accumulator selected, to determine whether it holds a negative or positive total. A circuit connection is established through the program sheet and the grouping sheet for testing the number registered by the highest order wheel of the selected accumulator. With the accumulator wheel at 0, or any digit other than 9, it is an indication that the accumulator holds a positive balance or total. Then circuit connections are set up to read out the true number held by the accumulator. When the wheel stands at 9, other connections are established to read out the complement of the complement held by the wheel, and in this way there is printed a true number representing a negative balance.

Assuming first that the selected accumulator holds a positive balance, a circuit is set up as follows: line 1184 (Fig. 49b), cam contacts CR3, contacts PR6, common brush 1017c, contact roller 998, through program sheet PG, a brush 1017 devoted to total testing (Fig. 49d), wire 1315, conductor bar 908, through the grouping sheet perforated at the highest order "Total test" position, sensing member 930, contacts 844 closed at 0–8, magnet PT, wire 1304, fixed contact 736, and line 1185.

The energized magnet PT then sets up two different kinds of total printing control circuits. In one order a total sign printing control is set up by closure of contacts PTb. In all active orders of the accumulator, provisions are made to read out the numbers for printing purposes by the closure of contacts PTa. All magnets PT related to the one accumulator are energized by branches of the total testing circuit going through the "Total grouping" perforations (Fig. 46) and the slanted bars 909, 910 (Fig. 33), connecting adjacent orders. The total test circuit just described not only passes from contacts 844 (Fig. 49d) to the magnet PT of the highest order, but it runs along wire 931 and through a "Total grouping" perforation to the slanted bar 909 which extends over to the grouping perforation of the adjacent or next lower order contact connection to magnet PT. In a similar way, all other related magnets PT are energized through the forked contacts on lines 931 extending through grouping perforations and contacting bars 909 to provide parallel circuit connections to the testing contacts 844. Preparations for negative total printing are made in a similar way by grouping the magnets NT for energization by a testing circuit through contacts 843. An example of a positive total printing circuit is as follows: line 1184 (Fig. 49d), wire 1351, non-print switch NON, timer contacts CR1, relay contacts R13b opened only for summary punching, relay contacts R8a closed for selection of total printing, the common sector 1133 of the total emitter, brush 1130, and segments 1132 of the emitter, then through one of the digit impulse carrying wires 731, diagrammatic paths 1352 leading to the readout segments, then through one of the segments selected by the position of brush holder 856 and through wide brush 857 or 858, depending on the digit represented, then through the common lead 873, contacts PTa, grouping sheet sensing member 934, conductor bar 911 for grouping selection of total printing, sensing member 933, wire 1353, fixed contact 734, plug socket 1250, a plug wire to socket 1249 (Fig. 49c), contacts 1142, print magnet PM1, wire 1248 and line 1185.

It is noted that the impulse for controlling numeral printing, as already described, is selected by the readout device of the particular accumulator order and is timed in its delivery by the total impulse emitter. The emitter is operated in synchronism with the rotation of the printing wheel and coordinated with the arrangement of digit type thereon, so that whatever digit is represented in the accumulator order is printed by movement of the wheel against the platen.

In the same cycle that the digits are printed from the group of accumulator orders representing a positive balance, a total mark T representing a positive total is also printed by means of the following circuit: line 1184 (Fig. 49d), wire 1351, switch NON, timer contacts CR1, wire 1354, relay contacts R13a, cam contacts CR17 timed to close in accordance with the code for a "T", wire 1355, wire 1356, conducting bar 906, an opening in the grouping sheet, feeler finger 928, contacts PTb, wire 1353, fixed contacts 734, plug socket 1250, a plug wire to one of the sockets 1249' (Fig. 49c), contacts 1142, print magnet PM100 associated with a type wheel carrying alphabet type, wire 1248, and line 1185. The print magnet operates the wheel to print T as a total sign.

When a negative total is detected in the selected accumulator, the contacts 843 (Fig. 49d) are closed by the highest order wheel at 9, and the magnet NT operates connections for shifting the printing control circuits through the negative segments of the readout device. It does this by closing contacts NTa, and at the same time it operates contacts NTb for printing a minus sign or negative total mark.

The digit printing portion of a negative total cycle is similar to that traced in connection with positive total printing, except that in coming from the total emitter and through line 731, Fig. 49d, the impulses, instead of going through paths 1352, go through paths 1358. They then pass through the negative segment of the readout device and through the wide brush 857 or 858 and into the common terminal 872 made effective by the closed contacts NTa. The negative total printing circuit from the grouping sheet feeler 934 onward is the same as that traced in connection with the control of the positive total.

The control for the printing of the negative total mark N is somewhat the same as that used to print the positive total sign, the only difference being that it is timed differently and directed through contacts NTb. The circuit comprises line 1184 (Fig. 49d), wire 1351, switch NON, cam contacts CR1, wire 1354, relay contacts R13d, cam contacts CR18 timed to close in accordance with the code for an "N", wire 1359, wire 1360, conducting bar 907, through the grouping sheet, feeler 929, contact NTb, wire 1353, fixed contact 734, plug socket 1250, a plug wire to socket 1249' (Fig. 49c), contacts 1142, print magnet PM100, wire 1248 and line 1185. The print wheel used for all total sign printing is controlled by the magnet to operate against the platen in a type impressing position to record an "N" and designate a negative total.

*Grouping for total recording*

It should be noted that the related orders of an accumulator or totalizer are grouped together for common positive or negative total control by slanted grouping bars 909 and 910 (Fig. 49d). Two adjacent feeler contacts 931 are seen to have double prongs for reaching through the grouping sheet and contacting with the upper and lower edges of a slanted bar 909 extending from order to order. When the grouping sheet is formed with pairs of vertically aligned total grouping perforations coinciding with the ends of bars 909, the related orders of accumulator plates are joined so that, when an impulse is sent into the positive total control relay PT of the highest order, the impulse is carried along into all orders of the same accumulator. Then the relay contacts of these lower orders are also shifted so that the total reading impulses are properly directed out of the readout devices.

In a similar way, the double pronged feelers 932 connected to the negative total relays NT are associated with slanted grouping bars 910 adapting the grouping sheet for common control over the association of two or more of these bars in a group making a negative balance accumulator out of a predetermined number of accumulator plates.

*Total transfer operation*

When the machine is to transfer an amount from one accumulator into another, it is operated in a peculiar fashion which is a combination of a total reading operation and an adding operation. The reading operation is initiated in connection with the accumulator from which the amount is to be derived, and the adding operation is caused in connection with the accumulator into which the amount is to be directed. In other words, two happenings take place at the same time, a total is taken from one accumulator at the same time that said total is added in another accumulator.

Preliminary to the operation of a total transfer, it is necessary to point out from which accumulator the amount is to be taken and to which accumulator the amount is to be directed. This control is exercised by the program sheet PG (Fig. 47) which is seen to have two sets of columns of perforation positions at the extreme right, devoted to total transfer sending and receiving busses or conductors. At the left of the program sheet is a single column in which a "Trans total" perforation selects the general operation as already described.

Referring to Fig. 49d, it is seen that the energization of magnet RT causes closure of contacts RTa to redirect the impulses from the readout devices, which impulses are usually sent in two different directions for total printing control and are now directed in a third path towards the brush reading socket 1333. Relay R8, Fig. 49, is made effective for total operation. The other control effected by total transfer selection is the energization of magnet RTS and the shifting of contacts 1158, 1159 so that the circuits usually leading to the card sensing brushes are instead directed to total transfer plug sockets on the plugboard and from there into another accumulator.

The part played by the program sheet is to pick out the orders of accumulators for sending and the orders to receive the impulses. Certain sensing program brushes 1017 (Fig. 49d) are connected to wires 1309 leading to the relays RT for shifting contacts RTa in those order accumulator plates which are to be used as the sending devices. Another set of program analyzing brushes is connected to wires 1307 leading to adding relays AD in those orders which are to be the receivers of the transferred total. The result is that the impulses sent through the readout devices of one accumulator are directed through the adding control contacts ADa and the starting magnets SR of the other accumulator. A complete total transfer circuit is as follows: from line 1184 (Fig. 49d), through wire 1351, switch NON, timer contacts CR1, relay contacts R13b and R8a, total emitter parts 1133, 1130 and 1132, one of the ten digit wires 731, paths 1352 leading to the positive reading segments of the readout device, then across brush 857 or 858, terminal 873, total transfer contacts RTa, wire 1363, fixed contacts 735, socket 1333, plug wire to the common socket of the total transfer shift contacts, contacts 1159, plug socket 1362, and a plug wire over to a socket 1333 or 1362 of the related and similar denominational order of the receiving accumulator, through fixed contacts 735, wire 1335, adding relay contacts ADa, start magnet SR, wire 1336, fixed contacts 736, and line 1185. Since this impulse is initiated differentially according to the position of the sending accumulator wheel, the receiving wheel is put into motion by magnet SR at a time designed to add the same amount in the receiving wheel. The adding wheel is stopped at the end of the cycle by cam operation of the clutch in the same fashion as when operated in ordinary addition.

*Reset operation*

The program device is provided with controls making it optional whether or not an accumulator reset operation is to take place after total recording or a total transfer operation. The resetting operation ordinarily follows all classes of totals except the progressive class of total, wherein it is desired to hold the accumulator amount as a subtotal and continue the storing of amounts therein.

It is pointed out hereinbefore that, when a reset selecting perforation is found in the program sheet, a circuit is set up through wire 1313 (Fig. 49b) and reset control relay R9. This relay R9 operates to close contacts R9c (Fig. 49d) in series with cam contacts CR9 connected with the stopping control relay SP to stop the accumulator wheel when it reaches the zero or home position during resetting.

Other preliminary resetting controls are set up by operation of relays RE (Fig. 49d) also selectively operated by the program and grouping sheets. When these relays are operated in the accumulator orders to be reset, they close contacts REc in series with circuits to start the rotation of the accumulator wheels toward the home position. Other contacts REa are closed in a circuit for stopping the wheel at the home position. The reset starting and stopping control circuits may be traced as follows: the starting circuit through line 1184 (Fig. 49d), cam contacts CR20 closed early in the resetting cycle, wire 1344, wire 1345, fixed contacts 737, relay contacts REc, accumulator wheel cam contacts 837 closed when the wheel stands at any position other than 0 position, wire 1341, start magnet SR, wire 1336, fixed contacts 736, and line 1185. If the wheel happens to stand at zero, it remains there because no start circuit is possible due to the open condition of the contacts 837.

Should the wheel represent any significant digit, then it is clutched to the driving mechanism and starts moving toward the home position. The circuit for declutching the accumulator wheel at the 0 position comprises line 1184 (Fig. 49d), cam contacts CR9 closed during all the time that a wheel is likely to be turning, relay contacts R9c, wire 1338, fixed contacts 738, wire 1339, contacts 818 closed by the accumulator wheel just before it arrives at the 0 position, relay contacts REa, wire 1364, stop magnet SP, wire 1336, fixed contacts 736, line 1185. The instant at which any wheel is stopped depends upon the distance that it is removed from the home position when resetting is initiated. However, at the end of the resetting cycle, all wheels are aligned in zero positions and ready for the reception of an item amount.

While there have been shown and described and pointed out the fundamental novel features of the invention as applied to a single modification it will be understood that various omissions and substitutions and changes in the form and details of the device illustrated and in its operation may be made by those skilled in the art without departing from the spirit of the invention. It is the intention, therefore, to be limited only as indicated by the scope of the following claims.

The record feeding devices, printing devices and record sorting devices disclosed are not claimed herein but are claimed in divisional applications. The record feeding devices are set forth in a divisional application filed December 29, 1945, Serial No. 638,343. The printing devices are set forth in a divisional application filed April 25, 1946, Serial No. 664,938. The record sorting devices are set forth in a divisional application filed May 15, 1946, Serial No. 669,860.

What is claimed is:

1. A self-contained and universal accumulator unit comprising a plate carrying a rotatable accumulator wheel, a driving gear, a clutch between the wheel and gear, start and stop magnets for operating said clutch, transfer contacts including contacts connected to said start magnet for 9's coupling control, cams attached to said wheel for controlling the transfer contacts, a readout device adjusted by said wheel, and relay devices for controlling said start and stop magnets for adding, subtracting, total taking and resetting control.

2. In a machine of the class described, including item entering and total taking devices, the combination of accumulating devices with each denominational order as a unit and each order device carried on a plate including accumulating mechanism, transfer mechanism, total readout mechanism, resetting mechanism and accumulator operating magnets, operating control relays therefor, a number of feeler contacts arranged along one vertical edge of said plate and insulated therefrom but separately connected to the control relays and magnets; a machine frame for holding a plurality of such plates in vertical alignment, a plurality of horizontal conducting bars arranged in vertical alignment opposite said feeler members, means under control of said item entering and total taking devices for sending accumulating, total taking and resetting control impulses into said bars, and a grouping sheet placed between said feeler contacts and said bars and formed with openings for selectively connecting any one or more orders of said accumulator plates for common control by impulses carried through the conducting bars and into the operating relays and magnets of a predetermined arrangement of accumulator plates.

3. A machine of the kind set forth in claim 2, wherein the conductor bars are mounted in a movable frame, said frame carrying said grouping sheet and movable away from the accumulator plates for removal and replacement of said sheet.

4. In a machine of the class described, a plurality of separate denominational units of accumulating mechanism, each unit having an adding operation control relay, means for operating said mechanisms, a grouping sheet, feeler devices on each of said units connected to said relays and cooperating with said sheet, an impulse conductor cooperating with said sheet on the side opposite said feeler devices, means for sending an adding operation control impulse through said conductor, selection devices connected to said operating means and operated by said relays in preparation for adding control of selected units, means cooperating with the operating means through said selection devices to effect differential operation of the selected mechanisms to enter amounts, said sheet being perforated to permit contact between the conductor and the feeler devices of certain units, whereby adding is effected in the accumulating mechanisms of predetermined units.

5. The invention set forth in claim 4, in combination with transferring control cams operated by said accumulator mechanisms in said units of mechanism, contacts operated by said cams, feeler devices on each of said units connected to said contacts and cooperating with said sheet, paired input and output impulse conductors cooperating with said sheet on the side opposite said feeler devices, means under control of said transfer contacts for sending transfer control impulses through said contacts, feeler devices and input conductors, means cooperating with the output conductors and operating means for adding transfer units in the mechanisms receiving transfer impulses, said sheet being perforated to permit selective contact between certain feeler devices and conductors of units selected to be successive denominational orders, whereby transferring is effected in units grouped for common operation.

6. The invention set forth in claim 4, in combination with subtracting control mechanism for controlling the operating means to add complements in said accumulating mechanism, a pair of conductors provided for elusive unit entry, means under control of each unit of accumulating mechanism for sending a transfer control impulse through said pair of conductors, means for connecting said conductors, one of said conductors being opposite a feeler device on a highest order accumulating unit and the other conductor being opposite a feeler device on the lowest order accumulator unit, said grouping sheet being perforated to permit contact between said conductors and selected feeler devices, whereby a transfer impulse is carried from the unit selected to be the highest order to the lowest order to fill out an added complement.

7. The invention set forth in claim 4, in combination with transferring control cams operated by said accumulator mechanisms in said units of mechanism, contacts operated by said cams, transfer feeler devices on each of said units connected to said contacts and cooperating with said sheet, transfer impulse conductors cooperating with said sheet on the side opposite said transfer feeler devices, means under control of said transfer contacts for sending transfer control impulses through said contacts, feeler devices and conductors, means cooperating with the operating means for adding transfer units in the mechanisms receiving transfer impulses wherein each transfer feeler device is provided with a pair of feeler fingers, and said conductors are slanted bars arranged opposite said fingers so that, when said sheet is perforated with aligned pairs of transfer control perforations, the bottom finger of one order will contact with one end of a slanted bar while the top finger of the next higher order will contact with the other end of the same slanted bar, the other fingers of the same orders making similar contacts, whereby adjacent orders are connected for transferring.

8. The invention set forth in claim 4, wherein the units of a grouped accumulator are separated by unrelated units, in combination with transferring control cams operated by said accumulator mechanisms in said units of mechanism, contacts operated by said cams, transfer feeler devices on each of said units connected to said contacts and cooperating with said sheet, a plurality of elongated conductors extending across all of said units and cooperating with said sheet on the side opposite said transfer feeler devices, means under control of said transfer contacts for sending transfer control impulses through said contacts and transfer feeler devices, means cooperating with the operating means for adding transfer units in the mechanisms receiving transfer impulses, said sheet being perforated to permit selective contact between pairs of conductors and certain transfer feeler devices of units selected to be successive denominational orders, wires connecting each conductor of a related pair to the other conductor which is selected by the sheet to lead to the next higher denominational unit, whereby widely separated orders of a single accumulator are coordinated for transferring control.

9. The invention set forth in claim 4, in combination with a subtraction operation control relay in each unit, means under control of said subtraction control relays and cooperating with the operating means for effecting complemental addition in said mechanisms, feeler devices on each of said units cooperating with said sheet and connected to said subtraction control relays, an impulse conductor cooperating with said sheet on the side opposite said feeler devices, means for sending a subtraction control impulse through said conductor, said sheet being perforated to permit contact between the conductor and the feeler devices of certain units, whereby subtraction is effected in the accumulating mechanisms of predetermined units.

10. The invention set forth in claim 4, in combination with printing devices, means under control of said adding impulse means for controlling operation of said printing devices, listing operation control relays in each of said accumulating units, means under control of said relays for selecting operation of said printing devices, feeler devices in each of said units cooperating with said grouping sheet and connected to said relays, an impulse conductor cooperating with said sheet on the opposite side of said feeler devices, means for sending a listing control impulse through said conductor, said sheet being perforated to permit contact between the conductor and the listing control feeler devices of certain units, whereby recording is effected by printing devices associated with predetermined accumulator units.

11. The invention set forth in claim 4, in combination with a reset control relay in each of said units, means under control of said reset control relays and cooperating with the accumulating mechanisms for restoring them to the home position, feeler devices on each of said units cooperating with said sheet and connected to said reset control relays, an impulse conductor cooperating with said sheet on the side opposite said feeler devices, means for sending a reset operation control impulse through said conductor, said sheet being perforated to permit contact between the conductor and the reset feeler devices of certain units, whereby restoration of certain accumulator mechanisms is effected.

12. The invention set forth in claim 4, in combination with a pair of contacts in each of said units, and means for operating said contacts in each unit under control of the related accumulating mechanism so that one is closed when the mechanism registers 9 and the other is closed when the mechanism represents any other digit, said contacts including a common contact blade, a pair of positive and negative total control relays connected to the separate contacts in each unit, total readout devices cooperating with the accumulating mechanisms to read out a true or complemental setting thereof, means under control of said total control relays for setting up connections to take a true number or complemental reading of the amount in the accumulating mechanism through said readout devices, testing feeler devices on each of said units cooperating with said sheet and connected to said common contact in each unit, an impulse conductor cooperating with said sheet on the side opposite said testing feeler devices, means for sending a total testing control impulse through said conductor, said sheet being perforated to permit contact between the total test conductor and the testing feeler device of the highest order unit of a group of selected units comprising a balance accumulator, whereby the nature of the negative or positive balance is determined.

13. The invention set forth in claim 4, in combination with a pair of contacts in each of said units, means for operating said contacts in each unit under control of the accumulating mechanism so that one is closed when the mechanism registers 9 and the other is closed when the mechanism represents any other digit, said contacts including a common contact blade, a pair of positive and negative total control relays connected to the separate contacts in each unit, total readout devices cooperating with the accumulating mechanisms to read out a true or complemental setting thereof, means under control of said total control relays for setting up connections to take a true number or complemental reading of the amount in the accumulating mechanism through said readout devices, testing feeler devices on each of said units cooperating with said sheet and connected to said common contact in each unit, a test impulse conductor cooperating with said sheet on the side opposite said testing feeler devices, means for sending a total testing control impulse through said conductor, said sheet being perforated to permit contact between the total test conductor and the testing feeler device of the highest order unit of a group of selected units comprising a balance accumulator to determine the nature of the balance, additional balance feeler devices on each of said units cooperating with said sheet and connected to said positive and negative operation control relays, balance conductors cooperating with said sheet on the side opposite said balance feeler devices, each conductor common to the balance feeler devices of a plurality of units, said sheet being perforated to permit contact between the balance conductors and the balance feeler devices of related units, whereby the total testing impulse directed through one or the other of said pair of contacts is also directed through the total control relays of associated units which are grouped together by the grouping sheet for common positive or negative total reading operation.

14. In a machine of the class described, a plurality of separate units of accumulating mechanism arranged in accumulator sets, means for operating said mechanism, a readout device provided in each unit, a set of contact devices connected to the digit representing portions of said readout device, a set of fixed contacts adapted to be engaged by said contact devices when a unit is assembled in said machine, an impulse emitter, a series of connections between the digit representing portions of said emitter and said fixed contact devices, printing devices, switching connections between said printing devices and the readout devices of said sets of accumulator units, a program sheet with indicia for selecting total taking and total transfer operations, means for sensing said indicia, means under control of said sensing means for operating said switch connections to select total printing or total transfer operation, and means under control of said sensing means for performing total transfer operation including means for directing the readout impulses into a selected set of accumulator units.

15. The invention set forth in claim 4, in combination with a pair of contacts in each of said units, means for operating said contacts in each unit under control of the accumulating mechanism so that one is closed when the mechanism registers 9 and the other is closed when the mechanism represents any other digit, said contacts including a common contact blade, a pair of positive and negative total control relays connected to the separate contacts in each unit, total readout devices cooperating with the accumulating mechanisms to read out a true or complemental setting thereof, means under control of said total control relays for setting up connections to take a true number or complemental reading of the amount in the accumulating mechanism through said readout devices, testing feeler devices on each of said units cooperating with said sheet and connected to said common contact in each unit, a test impulse conductor cooperating with said sheet on the side opposite said testing feeler devices, means for sending a total testing control impulse through said conductor, said sheet being perforated to permit contact between the total test conductor and the testing feeler device of the highest order unit of a group of selected units comprising a balance accumulator to determine the nature of the balance, an additional pair of contacts in each unit, one of said contacts operated by the positive total relay and the other operated by the negative total relay, a pair of print control feeler devices in each of said units cooperating with said sheet and connected separately to said contacts, a printing device containing type for recording positive and negative total marks, a pair of print control conductors cooperating with said sheet on the side opposite said print feeler devices, means for sending differentially timed sign printing control impulses through said conductors, means under control of said impulses for controlling said printing device for sign printing, said sheet being perforated to permit contact between the print conductors and print feeler devices of the selected highest order unit of a balance accumulator, whereby a positive or negative sign is recorded to identify the nature of the balance in a group of accumulator units.

16. The invention set forth in claim 4, in combination with a pair of contacts in each of said units, means for operating said contacts in each unit under control of the accumulating mechanism so that one is closed when the mechanism registers 9 and the other is closed when the mechanism represents any other digit, said contacts including a common contact blade, a pair of positive and negative total control relays connected to the separate contacts in each unit, total readout devices cooperating with the accumulating mechanisms to read out a true or complemental setting thereof, means under control of said total control relays for setting up connections to take a true number or complemental reading of the amount in the accumulating mechanism through said readout devices, testing feeler devices on each of said units cooperating with said sheet and connected to said common contact in each unit, a test impulse conductor cooperating with said sheet on the side opposite said testing feeler devices, means for sending a total testing control impulse through said conductor, said sheet being perforated to permit contact between the total test conductor and the testing feeler device of the highest order unit of a group of selected units comprising a balance accumulator to determine the nature of the balance, an additional pair of contacts operated separately by said negative and positive total relays in each unit, said contacts being arranged in series with said readout devices, total amount printing devices controlled by said readout devices, separate total feeler devices cooperating with said grouping sheet and connected to printing control devices and said contacts, a total conductor cooperating with said sheet on the side opposite said total feeler devices and common to said feeler devices, said sheet being perforated to permit contact between the total conductor and the pairs of total feeler devices of certain units, whereby the control of total printing from one or more orders is selected by the sheet.

17. A machine according to claim 4, wherein each unit has a total transfer control relay in addition to the adding control relay, separate feeler devices on each of said units cooperating with said sheet and connected separately to said relays, means for taking a reading of the amount in each unit, devices under control of said total transfer relays for directing the sending of the reading from one accumulator unit to another, conductors cooperating with said sheet on the side opposite said feeler devices, means for sending a reading impulse through the reading means of selected accumulator units, means for sending an adding control impulse through the conductors cooperating with the adding control feelers, means for sending a total transfer control impulse through the conductors associated with the total transfer feelers, said sheet being perforated to permit contact between the rolling total feelers and conductors of the units which are to be impulse sending units and said sheet being further perforated to permit contact between the adding control feelers and conductors of the other units which are to be receiving units, whereby an amount is read out of the certain accumulator units and added in other accumulator units.

18. In a machine of the class described, a plurality of accumulators, means for entering amounts into said accumulators, means for selecting one of said accumulators to have control to transfer an amount to another of said accumulators including a stationary grouping sheet with perforations for making the selection, sensing devices cooperating with all perforation positions of said sheet to determine the location of said selection perforations, and means under control of said sensing devices for effecting operation of said selecting means.

19. In a machine of the class described, a plurality of control plates one for each order, an accumulating device associated with each plate, printing devices for printing item and total amounts accumulated in said accumulator devices, transferring devices for carrying units between orders of said accumulating devices, resetting devices for restoring said accumulating devices, subtracting devices for subtracting amounts in said accumulating devices, total taking devices for reading the amount accumulated in said accumulating devices, a plurality of control relays on each of said plates, each for controlling operation of a related one of said printing, transferring, resetting, subtracting and total taking devices the operations of which are related to operation of said accumulating device, a grouping sheet, a series of feeler devices arranged along one edge of each of said plates but insulated therefrom, said devices being individually connected to said relays, said feeler devices arranged to cooperate with a vertical line of index points on said grouping sheet, a series of horizontal conducting bars arranged on the opposite side of said grouping sheet and intersecting said vertical line at the points occupied by said index points, means for directing differentially timed control impulses into said conducting bars, said sheet being perforated at one or more index points to allow contact between feeler devices and conducting bars for the grouping and control of the accumulator devices and control relays on a selected number of plates, whereby a plurality of groups of a predetermined number of orders can be grouped together for common control for any of the printing, transferring, resetting, subtracting and total taking functions as controlled by the related relays.

20. A machine according to claim 19, wherein the vertical lines of feeler devices relating to adjacent plates are spaced so that a plurality of columns of index positions on the sheet are related to each column of feeler devices, and said sheet is shiftable horizontally to present in an effective position one or the other of a plurality of sets of control perforations, whereby a single grouping sheet exercises selective grouping control in a plurality of different ways.

21. In an accounting machine, an accumulator wheel, means for adjusting said wheel to represent amounts, a readout device comprising a readout brush holder, means for setting said holder under control of said wheel, a pair of wide contact brushes held by said holder, a set of six contact plates with circular openings in which said brushes revolve and contact, five of said plates relating to digit representations, each plate divided into insulated halves, each half having two brush contacting segments touched by the brushes in complemental positions, a common contact plate, said common plate being divided into insulated halves, one of which is contacted by the brushes in complemental positions for reading out the complement of a negative amount and the other of which is contacted by the brushes in true number positions for reading out true numbers of positive balances, an impulse emitter for emitting ten impulses representative of the digits, separate connections for carrying said ten digit impulses from said emitter to the two halves of each of the five contact plates wherein they flow either to the true number or complement segment as selected, means for selecting which half of the common contact plate is to be effective, and accounting means connected to the selected common plate to be controlled differentially by the impulse carried by the brush on a segment of the digit plate and on the selected half of the common contact plate.

22. In an accounting machine controlled by groups of records, said records bearing indicia representative of item data and group identifying data, means for sensing said indicia, accumulating devices, means under control of said sensing means for operating said accumulating devices to accumulate amounts of different item groups, group control devices under control of said sensing means for detecting changes in card groups, machine control devices for controlling the functions of said machine, a program sheet, said sheet having indicia for selecting operations of said control devices of the machine in a predetermined sequence of cycles, means for sensing said indicia on said program sheet, means for holding said sheet, means under control of said group control devices for causing an initial movement of said sheet holding means and said sheet sensing means with respect to each other, and means under control of said sheet sensing means for selecting predetermined machine function control devices in a predetermined order, means for operating the selected function control devices, and means under control of said initiating means for operating said holding means step by step after said initial movement to advance said program sheet under said sheet sensing means to cause a sequence of sheet sensing and machine control operations.

23. The invention set forth in claim 22, in combination with printing devices for recording on record material, line spacing devices for advancing said record material between operations of said printing devices, and means under control of said program sensing devices for initiating operation of said line spacing devices in any predetermined cycle in a sequence of cycles of operation of other of said machine control devices selected by the indicia on the program sheet.

24. The invention set forth in claim 22, in combination with total reading devices cooperating with said accumulating devices, summary punching devices operated under control of said reading devices for punching cards with accumulated data, and means under control of said program sensing means for initiating operation of said reading and summary punching devices in any predetermined cycle in a sequence of cycles of operation of other of said machine control devices selected by the indicia on the program sheet.

25. The invention set forth in claim 22, in combination with devices for resetting said accumulating devices, and means under control of said program sensing means for initiating operation of said resetting devices in any predetermined cycle in a sequence of cycles of operation of other of said machine control devices selected by the indicia on the program sheet.

26. The invention set forth in claim 22, in combination with amount reading devices cooperating with said accumulating devices, total taking devices for controlling operation of said amount reading devices, printing devices, means under control of said total taking devices for operating said printing devices to record a total, and means under control of said program sensing means for initiating operation of said reading and total taking devices in any predetermined cycle in a sequence of cycles of operation of other of said machine control devices selected by the indicia on the program sheet.

27. The invention set forth in claim 22, in combination with readout devices cooperating with certain of said accumulating devices, connections between said readout devices and other of said accumulating devices, means cooperating with said readout devices and said connections for transferring the total out of said certain accumulator devices and adding it into said other accumulator devices, and means under control of said program sensing means for initiating operation of said total transfer means in any predetermined cycle in a sequence of cycles of operation of other of said machine control devices selected by the indicia on the program sheet.

28. The invention set forth in claim 22, in combination with means for suspending automatic operation of said program sheet advancing means, means under control of said program sensing means for operating said suspending means in any predetermined cycle in a sequence of cycles of operation of other of said machine control devices selected by the indicia on the program sheet, and key operated means for resuming operation of said program sheet advancing means.

29. The invention set forth in claim 22, in combination with means for resetting the program sheet holder, and means under control of the program sensing means for initiating operation of the program holder resetting means in any predetermined cycle in a sequence of cycles of operation of other of said machine control devices selected by the indicia on the program sheet.

30. The invention set forth in claim 22, in combination with printing devices, means under control of the entering means and said accumulating devices for operating said printing devices to record items and totals on record material divided into forms and sheets, means for line spacing said record material, means for long feeding said material for ejection of forms and sheets, and means under control of said program sensing means for initiating operation of said ejecting means in any predetermined cycle in a sequence of cycles of operation of other of said machine control devices selected by the indicia on the program sheet.

31. In a machine controlled by records bearing indicia representative of item data, means for sensing said records, means for feeding said records one by one past said sensing means, a program selection sheet, said sheet bearing horizontal rows and vertical columns of index point positions for function selecting program indicia, said rows being divided into blocks for a sequence of cycles of operation, the different points of each row relating to different machine function controls, means for holding said program sheet, a movable means for sensing the rows of index positions on said sheet, means under control of said record sensing means for selecting a preliminary position of said program sensing means, means under control of said selecting means for advancing the program sensing means to one of a plurality of positions in the first preliminary block, means for spacing the program sheet holder to move the sheet from block to block under said program sensing means, machine functional control devices for controlling the operation of said machine and connected separately to said program sensing devices to be called into operation selectively and sequentially under control of said program indicia in selected positions and selected blocks, means cooperating with said holder for restoring it, and means connected to one of said program sensing devices for initiating operation of said restoring means.

32. A machine of the kind set forth in claim 31, in combination with means for suspending operation of said record feeding means, and means under control of said preliminary position selecting means for initiating operation of said suspending means.

33. A machine of the kind set forth in claim 31, in combination with means for holding said program sensing devices in a normal position, means for releasing said holding means, and means under control of said preliminary position selecting means for initiating operation of said releasing means.

34. In a machine of the kind set forth in claim 31, in combination with electrical controls for controlling operation of said holder spacing means, contacts in series with said electrical controls, and means under control of the preliminary position selecting means for closing said contacts, whereby the program spacing operation is made possible after the adjustment of the program sensing devices.

35. A machine of the kind set forth in claim 31, in combination with means for normally preventing operation of said program restoring means, and means under control of said preliminary selecting means for operating said preventing means to permit restoration.

36. A machine of the kind set forth in claim 31, in combination with a program selecting circuit common to all of said program sensing devices, a pair of normally closed contacts in said circuit, and means under control of said restoring means for opening said contacts during restoration.

37. A machine of the kind set forth in claim 31, in combination with an accumulator, readout means therefor, a summary card punching device, printing devices, circuits electrically connecting the readout means to either of said devices including contacts for the printing devices, said contacts normally closing the circuits to said printing devices, means for opening said contacts when the punching control is selected, means for restoring said contacts to a closed position, an interlock with relay devices cooperating with said contact restoring means and preventing movement of said contacts to normal position during a summary punching operation, a holding circuit for said relay devices, normally closed interlock contacts in series with said holding circuit, and means operated by said program spacing means for opening said interlock contacts, whereby a change in program control following a summary punch cycle permits restoration of the print control contacts.

38. In an accounting machine, a plurality of functional control devices for controlling the functions of said machine, a program sheet bearing vertical columns of control indicia in index positions related to said plurality of functional control devices, said index positions arranged in horizontal rows with a plurality of such rows in each of a plurality of blocks, each block relating to one cycle of a sequence of cycles of operation, a drum for holding said program sheet, a bail pivoted on the same center as said drum, a line of sensing brushes attached to but individually insulated on said bail, means for holding said bail in a position wherein the brushes cooperate with a blank portion of said program sheet above the first block of index positions thereon, a plurality of program selection control devices, means under control of said selection control devices for adjusting said bail to one of a plurality of preliminary positions wherein the line of sensing brushes cooperates with one of the rows of index positions in the first block on the program sheet, means under control of said selecting means for operating said bail holding means to permit the bail to move to the preliminary position, a ratchet and pawl mechanism cooperating with said drum, means for controlling the operation of said mechanism to space said program sheet cyclically from block to block under said sensing brushes, means for restoring said drum and said bail to normal position, and means under control of one of said program sensing brushes for initiating operation of said restoring means.

39. A machine controlled by groups of record cards bearing classified data and classified group control numbers, means for sensing data on said records, means for feeding said records successively past said sensing means, a sectionalized means for detecting changes in card groups according to class, manual means for selecting other classes of totals, a plurality of means for controlling the functions of said machine, a program sheet for automatically calling said function controlling means into operation in a predetermined sequence, said sheet bearing a plurality of columns and rows of perforation positions, each vertical column relating to a different functional control and each row relating to a different class of group change for classified totals, said rows being arranged in recurring blocks, each of said blocks related to a cycle of operation of the machine, a line of sensing brushes arranged to cooperate with one or the other of said rows of perforation positions, means normally holding said line of brushes in a normal ineffective position, means under control of said sectionalized group control means and said manual total class selecting means for controlling differential movement of said brushes to a program selecting position dependent on the selected class of total, means for moving said brush holder, connections between said brushes and said function controlling means, a holder for said program sheet, means for moving said holder and said sheet step by step to move the sheet from block to block under the brushes for a sequence of control cycles, and means for restoring said holder and program sheet.

40. In an adding and subtracting machine, means for entering negative and positive amounts, a plurality of accumulating units certain of which constitute a balance accumulator, means under control of said entering means for operating said accumulator, accumulated amount printing devices with a negative sign type, a grouping sheet with indicia for selecting the balance accumulator units for negative entry operation and sign control indicia for selecting a unit to control negative sign printing, means for sensing said balance unit grouping indicia, means under control of said sensing means for conditioning said balance accumulator units for operation by said entering means for negative entry operation, means in said selected sign printing control unit for sensing said sign control indicia, the last mentioned sensing means being connected to the first mentioned sensing means for concurrent operation, and means under control of the last mentioned sensing means for controlling said printing devices to print a negative sign whenever a credit amount is entered.

41. A machine of the class described having in combination a plurality of self contained and universal accumulator units each comprising holding devices supporting accumulating means, transfer means for adding and carrying unit digits between said accumulating means, readout means for reading the amount in the accumulating means and relay devices for controlling said accumulating, transfer and readout means for adding by arranging circuits to said accumulating and transfer means, for subtracting by arranging complemental circuits to the accumulating and transfer means, for total taking by arranging total reading circuit connections to said readout means, and for resetting by arranging zeroizing circuits to said accumulating means, separate impulse sensing and conducting means connected to said relay devices, means for sending control impulses into said relay devices through said sensing and conducting means, and record controlled means including a stationary record with indicia for selectively connecting simultaneously the impulse sending and sensing means of a plurality of groups of selected accumulator units and also selectively connecting simltaneously within the selected groups, selected connections between one or more of the relay devices and the impulse sensing means.

42. In a machine of the class described with item entering and total taking devices in combination with a plurality of accumulating devices, each accumulator device carried on a plate with its reset mechanism, transfer mechanism, total readout mechanism and operating control relays for controlling for adding by arranging circuits to said accumulator device and transfer mechanism, for controlling for total taking by arranging total reading circuits to said readout mechanism and for controlling for resetting by arranging zeroizing circuits to said accumulator device and reset mechanism, a number of sensing means arranged in alignment on said plate and insulated therefrom but separately connected to said control relays, a frame for holding a plurality of such plates side by side in alignment, a plurality of conductors each common to all plates and aligned opposite a particular sensing means of all plates, means for sending accumulating, total taking and resetting control impulses into said conductors, and a grouping sheet placed between said sensing means and said conductors and bearing indicia for selectively connecting a plurality of groups of any one or more accumulator plates for common control by the impulses carried through the conductors and into selected control relays of the selected plates.

43. In a machine of the class described, a plurality of separate units of accumulating mechanism with transferring means, means for operating the accumulating mechanisms, item entering means for controlling said operating means to enter amounts, a stationary grouping sheet with accumulator grouping indicia, means for sensing said indicia, normally open circuits between said operating means and said item entering means, and means under control of said sensing means for closing the circuits of selected accumulating units as predetermined by the indicia, whereby a plurality of groups of accumulating units may be selected for individual or common accumulating control.

44. In a machine of the class described, accumulating mechanism including a plurality of electrical accumulator control devices on separate denominational members, said control devices setting up accumulating and resetting control circuits for said mechanism, each of said members representing an order, said members being supported side by side in a compact formation, primary electrical contact devices on said members and connected to each of said control devices, means for operating said control devices through said contact devices, operating control devices between said operating means and said contact devices and including a plurality of secondary contact devices which are mounted to match in position and arrangement the primary contact devices with which they cooperate, means for mounting said secondary contact devices, a grouping sheet with member grouping indicia located in a predetermined pattern, said sheet being inserted between the primary and secondary contact devices, which cooperate with the indicia, said indicia serving to connect selected plurality of groups of members for operating control, and means for shifting said primary and secondary contact devices relative to each other to separate them and allow removal and insertion of different grouping sheets.

45. In a machine of the class described, the combination of a plurality of accumulating devices, means for entering item amounts into said devices, printing devices for printing said items and totals accumulated in said accumulating devices, total taking devices for taking totals of items accumulated in said accumulating devices, resetting devices for resetting said accumulating devices, a program device including a preselector with complete sets of cyclical selection indicia for all of said devices for all cycles, means for automatically initiating operation of said program device, means for operating said program device to move said preselector step by step in a series of cycles, electrical selection instrumentalities for each of said accumulating, printing, total taking and resetting devices, electrical circuit connections under control of said program device and varied by said preselector indicia for automatically energizing preselected combinations of said instrumentalities for calling into operation any of said devices in any of the cycles of operation of the program device, and means for operating the selected devices.

46. In a machine controlled by the records arranged in groups according to group number indicia thereon, said records also bearing amount indicia, means for sensing the indicia on said records, accumulating devices, printing devices, means under control of said sensing means for operating said accumulating and printing devices, group control devices under control of said sensing means for detecting the appearance of the end of one record group and the beginning of the following group, total taking control devices, resetting control devices, a program device including a preselector with complete sets of indicia positions for cyclical selection indicia for any of said devices in any cycle, means for initiating operation of said program device under control of said group control devices whenever a group change is detected, means for operating said program device to move said preselector step by step in a series of cycles, said program device having associated therewith selection instrumentalities for all of said accumulating, printing, total taking and resetting devices in each cycle step, means under control of said program device and varied by said preselector indicia for automatically operating predetermined combinations of said instrumentalities for selecting any of the accumulating, printing, total taking and resetting devices in any of the cycles of operation of the program device, and means for operating the selected devices.

47. A machine of the kind set forth in claim 46, wherein the group control devices are divided into classified sections according to minor, intermediate, and major classes of record data, said program devices and preselector also exercising classified control under control of said group control devices, means under control of said group control devices to shift program control to differing indicia positions within the cyclical sets to select one of several sequences of control cycles in which any of the accumulating, printing, total taking and resetting devices are automatically called into operation by classified cyclical indicia in any of the program cycles according to the class of the group change.

48. A machine of the kind set forth in claim 46, in combination with means of stopping the machine on the occurrence of a group change, key operated means for selecting progressive and final totals, classified total taking control devices operated by said keys, and means under control of said key selected devices for shifting the preselector with respect to said program device to shift program control to different indicia positions within the cyclical sets and select related sequences of control operation cycles in which any of the accumulating, printing, total taking and resetting devices are automatically called into operation by classified cyclical indicia in any of the program cycles.

49. In an accounting machine, accumulating devices, means for entering items into said devices, printing devices operated under control of said entering means and said accumulating devices for recording items and totals on a record sheet, line spacing devices, sheet ejection devices for advancing said sheet, total taking devices cooperating with said accumulating devices, accumulator resetting devices, summary punching devices under control of said total taking devices, total transfer devices under control of said accumulating devices, a program device including a preselector with rows and columns of indicia positions in which are cyclical selection indicia for any of said devices in any program cycle, means for resetting said program device, means for initiating operation of said program device, means for controlling cyclical operation of said program device to shift said preselector, selection instrumentalities for each of said accumulating, printing, line spacing, sheet ejection, total taking, resetting, summary punching and total transfer devices, means under control of said program device in cooperation with said preselector indicia for initiating operation of any predetermined combination of said selection instrumetalities in any cycle to select any of said devices in a predetermined sequence of cycles of operation terminated by operation of said program resetting means, and means for operating the selected devices.

50. In an accounting machine controlled by groups of records, said records bearing indicia representative of item data and group identifying data, means for sensing said indicia, accumulating devices, means under control of said sensing means for operating said accumulating devices to accumulate the amounts of different item groups, classified group control devices under control of said sensing means for detecting classified changes in card groups, machine control devices for controlling the functions of said machine, a program sheet, said sheet having indicia positions arranged in columns related to control devices and blocks of rows related to cycles and individual rows in each block for group change classes, there being selection indicia in said positions for selecting operations of said control devices of the machine in a predetermined sequence of cycles, means for sensing said indicia on said program sheet, means for holding said sheet, means under control of said group control devices for causing an initial movement of said sheet holding means and said sheet sensing means with respect to each other to bring a particular row of the first indicia block under said sensing means, means under control of said sheet sensing means as predetermined by the selection indicia for selecting predetermined machine function control devices in a predetermined order, means for operating the selected function control devices, and means under control of said initiating means for operating said holding means step by step after said initial movement to advance said program sheet to bring classified rows of said indicia under said sheet sensing means to cause a sequence of sheet sensing and machine control operations.

51. A machine to function according to a selected program, including a plurality of record sources of program data, a plurality of machine-function units, means for selectively deriving program data from one or another of said sources and including sensing elements for the record sources and circuits controlled thereby for selectively calling said units to function, according to a program determined by program data sensed on said record sources, devices for controlling the units, when called into operation under control of the program data, to perform desired functions, record source means for control indicia, means for sensing said control indicia, and means operating under control of said sensing means for rendering the first mentioned means selectively effective to derive the program data selectively from one or another of the sources of program data, according to the control indicia sensed on the record source means.

52. A machine to function according to a desired program, including a plurality of sources of program data, a plurality of machine-function units, means for selectively deriving program data, from said sources and including circuits for selectively calling said units into action, in accordance with the desired program, devices for controlling a unit, when called into action, to perform desired functions, source means for control indicia, and relay means selectively controlled by said source means according to the control indicia for selecting the source from which the first mentioned means is to derive program data.

53. A machine of the kind set forth in claim 45, in combination with means for resetting said program device, and means under control of said program device for calling said program resetting means into operation in any of the cycles of operation of the program devices.

54. A machine of the kind set forth in claim 45, in combination with a program sheet as the preselector in said program device, said sheet bearing progressions of indicia positions corresponding to said cycle steps and indicia representing all of said devices and the plurality of accumulator devices, means for sensing said indicia, and means under control of said sensing means for energizing pre-selected combinations of said selection instrumentalities for selecting any of said devices for operation in any cycle of operation of the program device.

FRED M. CARROLL.
ARTHUR F. SMITH.

REFERENCES CITED

The following references are of record in the file of this patent:

UNITED STATES PATENTS

| Number | Name | Date |
|---|---|---|
| 1,486,149 | Lake | Mar. 11, 1924 |
| 1,827,259 | Peirce | Oct. 13, 1931 |
| 1,875,850 | Carroll | Sept. 6, 1932 |
| 1,914,285 | Peirce | June 13, 1933 |
| 1,933,331 | Lake | Oct. 31, 1933 |
| 1,954,041 | Daly et al. | Apr. 10, 1934 |
| 2,016,711 | Ford | Oct. 8, 1935 |
| 2,046,027 | Little | June 30, 1936 |
| 2,093,529 | Tauschek | Sept. 21, 1937 |
| 2,093,566 | Lake | Sept. 21, 1937 |
| 2,126,621 | Daly | Aug. 9, 1938 |
| 2,156,969 | Bryce | May 2, 1939 |
| 2,174,683 | Bryce et al. | Oct. 3, 1939 |
| 2,174,685 | Carroll et al. | Oct. 3, 1939 |
| 2,174,699 | Keen | Oct. 3, 1939 |
| 2,199,547 | Pierce | May 7, 1940 |
| 2,224,774 | Tauschek | Dec. 10, 1940 |
| 2,244,241 | Bryce | June 3, 1941 |
| 2,286,812 | Keefe | June 16, 1942 |

FOREIGN PATENTS

| Number | Country | Date |
|---|---|---|
| 218,394 | Great Britain | July 7, 1924 |

Certificate of Correction

Patent No. 2,493,858 January 10, 1950

FRED M. CARROLL ET AL.

It is hereby certified that errors appear in the printed specification of the above numbered patent requiring correction as follows:

Column 102, line 56, before the word "lowest" insert *unit selected to be the*; column 104, line 70, after "each" insert *balance*; column 108, line 31, before "means" strike out *and*; column 112, line 6, for "credit" read *negative*; column 114, line 27, for "of" before "stopping" read *for*;

and that the said Letters Patent should be read with these corrections therein that the same may conform to the record of the case in the Patent Office.

Signed and sealed this 30th day of May, A. D. 1950.

[SEAL]

THOMAS F. MURPHY,
*Assistant Commissioner of Patents.*